(12) United States Patent
Volin

(10) Patent No.: US 11,085,196 B1
(45) Date of Patent: Aug. 10, 2021

(54) FOUR-DEVICE-IN-ONE BLEACHER-SKYBOX FOOD-DEHYDRATOR MOBILE-MARINE-SAUNA WIND-AND-SMOKE-REDIRECTING BUNGALOW

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 17/200,920

(22) Filed: Mar. 15, 2021

(51) Int. Cl.
*E04H 1/12* (2006.01)
*A47H 13/04* (2006.01)
(Continued)

(52) U.S. Cl.
CPC .............. *E04H 1/1205* (2013.01); *A23L 3/40* (2013.01); *A47H 13/04* (2013.01); *A61H 33/066* (2013.01);
(Continued)

(58) Field of Classification Search
CPC . E04H 2001/1288–1294; E04H 1/1205–1244; E06B 9/02; E04D 13/064
See application file for complete search history.

(56) References Cited

U.S. PATENT DOCUMENTS 3,741,102 A 6/1973 Kaiser
3,884,414 A 5/1975 Baer
(Continued)

*Primary Examiner* — Adriana Figueroa

(57) ABSTRACT

A four-device-in-one skybox dehydrator sauna wind-redirecting bungalow comprises: adjustable louver blades attached to side gutter beams for preventing rainwater from getting into the bungalow and adjustably controlling amount of sunlight that shines into the bungalow, chutes formed to the side gutter beams and end gutter beams, solar-rechargeable batteries installed within adjustable louver blades for powering led lights and saving costs of replacing non-rechargeable alkaline batteries and helping reduce carbon footprint, a solar panel mounted to adjustable louver blades for collecting solar energy to charge and recharge rechargeable batteries and saving energy costs associated with lighting the bungalow and saving costs of replacing with non-rechargeable alkaline batteries and providing freedom to place the bungalow away from a power outlet and helping reduce carbon footprint, panel frames, panel inserts inserted within the panel frames for enabling the bungalow to become a sauna and a skybox and a dehydrator and providing security and insulation and protection from wind within the bungalow, louver braces inserted within the panel frames for allowing the louvers to be rotated, flipped, and positioned to redirect wind direction and structuringly securing louvers, axis pins inserted within the louver braces for providing eight locking points to reposition and locking and unlocking and pivotingly functionalizing the louver braces, louvers attached to the louver braces for redirecting and blocking and reducing and sealing the bungalow to create a sauna and a skybox and a dehydrator, an inner-track insert slidably inserted within hook-sliding track for providing a smooth sound-dampening track for slide hooks to be inserted for securing a curtain or insect screen, a curtain removably hooked onto slide hooks for providing privacy and protection from harmful sun rays and wind and insects, an extending-and-retracting door for providing protection from wind and harmful sun rays and insulation from cold temperatures and security within bungalow, door-spool housing attached to door-spool-housing bracket for providing discrete storage and protection of the extending-and-retracting door, drain openings formed into the corner-posts, corner-post-base-plate covers slidably attached onto the corner-posts, corner-post base-plates secured to the corner-posts, sliding-door track attached to the corner-post base-plates, the panel frames interchangably and slidably placed into the sliding-door track, anchoring-screw holes drilled into the corner-post base-plates, and tube-screws screwed into the anchoring-screw holes for leveling bungalow when (Continued)

installed on an uneven ground surface and securing the corner-post base-plate to a ground surface and providing adjustment points for each corner-post base-plate, and anchoring bolts screwed through the tube-screws and the anchoring-screw holes.

20 Claims, 161 Drawing Sheets

(51) Int. Cl.
  *E06B 3/46*    (2006.01)
  *E06B 9/02*    (2006.01)
  *E04D 13/064*   (2006.01)
  *A61H 33/06*   (2006.01)
  *H02S 20/30*   (2014.01)
  *H02S 40/34*   (2014.01)
  *F21S 9/03*    (2006.01)
  *A23L 3/40*    (2006.01)
  *H01M 10/46*   (2006.01)
  *B05B 15/60*   (2018.01)
  *F24F 7/00*    (2021.01)
  *E06B 9/52*    (2006.01)
  *F21Y 115/10*   (2016.01)

(52) U.S. Cl.
  CPC ............ *B05B 15/60* (2018.02); *E04D 13/064* (2013.01); *E06B 3/4636* (2013.01); *E06B 9/02* (2013.01); *E06B 9/521* (2013.01); *F21S 9/032* (2013.01); *F24F 7/00* (2013.01); *H01M 10/465* (2013.01); *H02S 20/30* (2014.12); *H02S 40/34* (2014.12); *A23V 2002/00* (2013.01); *F21Y 2115/10* (2016.08); *H01M 2220/10* (2013.01)

(56) References Cited

U.S. PATENT DOCUMENTS

| | | | |
|---|---|---|---|
| 4,038,781 A | 8/1977 | Graham | |
| 4,099,346 A | 7/1978 | Isono | |
| 4,518,012 A | 5/1985 | O'Hara | |
| 4,527,355 A | 7/1985 | Numakami | |
| 4,541,214 A | 9/1985 | Lambert | |
| 4,825,921 A | 5/1989 | Rigter | |
| 5,020,423 A | 6/1991 | Hill | |
| 5,099,905 A | 3/1992 | Rigter | |
| 5,133,398 A | 7/1992 | Yang | |
| 5,267,414 A | 12/1993 | Vaida | |
| 5,306,210 A | 4/1994 | Smit | |
| 5,590,492 A * | 1/1997 | Cucchiara | E04D 13/064 |
| | | | 52/11 |
| 5,669,179 A | 9/1997 | Hanlon | |
| 5,732,507 A | 3/1998 | Edwards | |
| 5,862,633 A * | 1/1999 | Van Ells | F24F 5/00 |
| | | | 52/16 |
| 6,378,262 B1 | 4/2002 | Mercadante | |
| 6,820,385 B2 | 11/2004 | Horn | |
| 7,335,096 B2 | 2/2008 | Perez et al. | |
| D602,602 S | 10/2009 | Sears | |
| 7,900,417 B1 | 3/2011 | Leines | |
| 8,061,106 B2 | 11/2011 | Clark | |
| 8,082,700 B2 * | 12/2011 | Kennedy | E04B 1/3205 |
| | | | 52/86 |
| D680,234 S | 4/2013 | Kalnins | |
| 8,413,389 B2 | 4/2013 | Frigerio | |
| 8,684,553 B2 | 4/2014 | Chen | |
| 8,782,964 B1 * | 7/2014 | Neri | E04F 10/08 |
| | | | 52/79.1 |
| 8,944,132 B1 | 2/2015 | Floyd | |
| D725,560 S | 3/2015 | Mays | |
| 8,978,313 B1 | 3/2015 | Pilla | |
| 9,157,270 B2 | 10/2015 | Hall | |
| 9,587,396 B1 * | 3/2017 | Staschiak | E04B 1/38 |
| D788,940 S | 6/2017 | Lavery | |
| 9,784,031 B2 * | 10/2017 | Volin | E06B 7/14 |
| D823,986 S | 7/2018 | Pledger | |
| 10,113,325 B1 * | 10/2018 | Finn | F16B 5/0084 |
| 10,238,191 B2 | 3/2019 | Shurie | |
| 10,316,509 B2 | 6/2019 | Jackson | |
| D855,307 S | 8/2019 | Rao | |
| 10,392,821 B2 * | 8/2019 | Volin | E04H 1/1205 |
| 10,597,890 B2 | 3/2020 | Hill | |
| 10,760,280 B2 | 3/2020 | Pan | |
| 10,689,848 B2 * | 6/2020 | Castel | E04F 10/08 |
| 10,851,544 B1 * | 12/2020 | Volin | E04F 10/10 |
| 10,920,413 B2 | 2/2021 | Nicholas | |
| 2005/0121149 A1 | 6/2005 | Shih | |
| 2010/0186162 A1 * | 7/2010 | Leonard | E04H 1/1216 |
| | | | 4/664 |
| 2011/0203745 A1 | 8/2011 | Abreu | |
| 2013/0291438 A1 | 11/2013 | Selzer | |
| 2014/0137500 A1 * | 5/2014 | Letourneau | E04H 1/1238 |
| | | | 52/473 |
| 2019/0338528 A1 * | 11/2019 | Torman | E04F 10/10 |
| 2021/0040737 A1 | 2/2021 | Mendonca | |

* cited by examiner

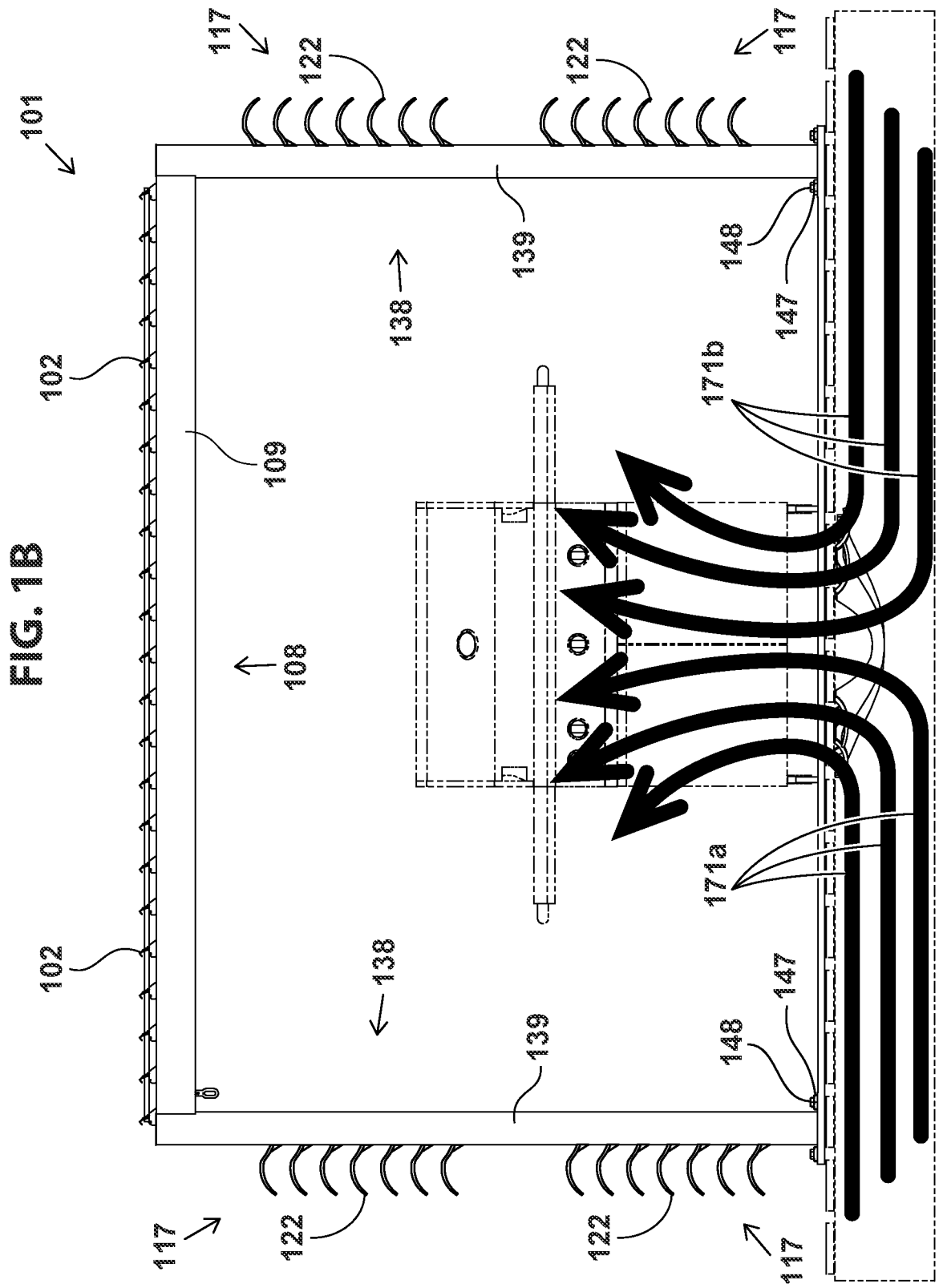

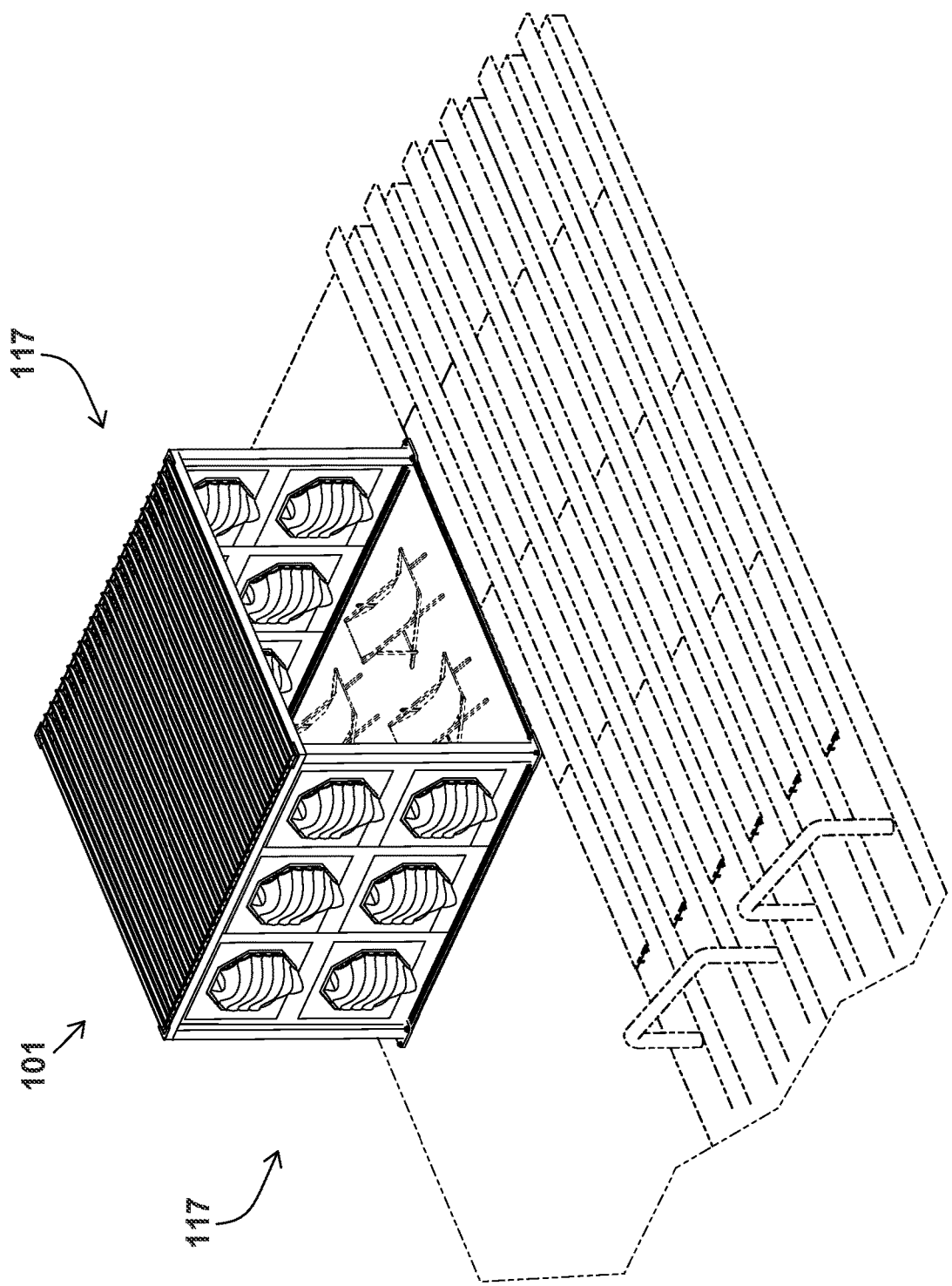

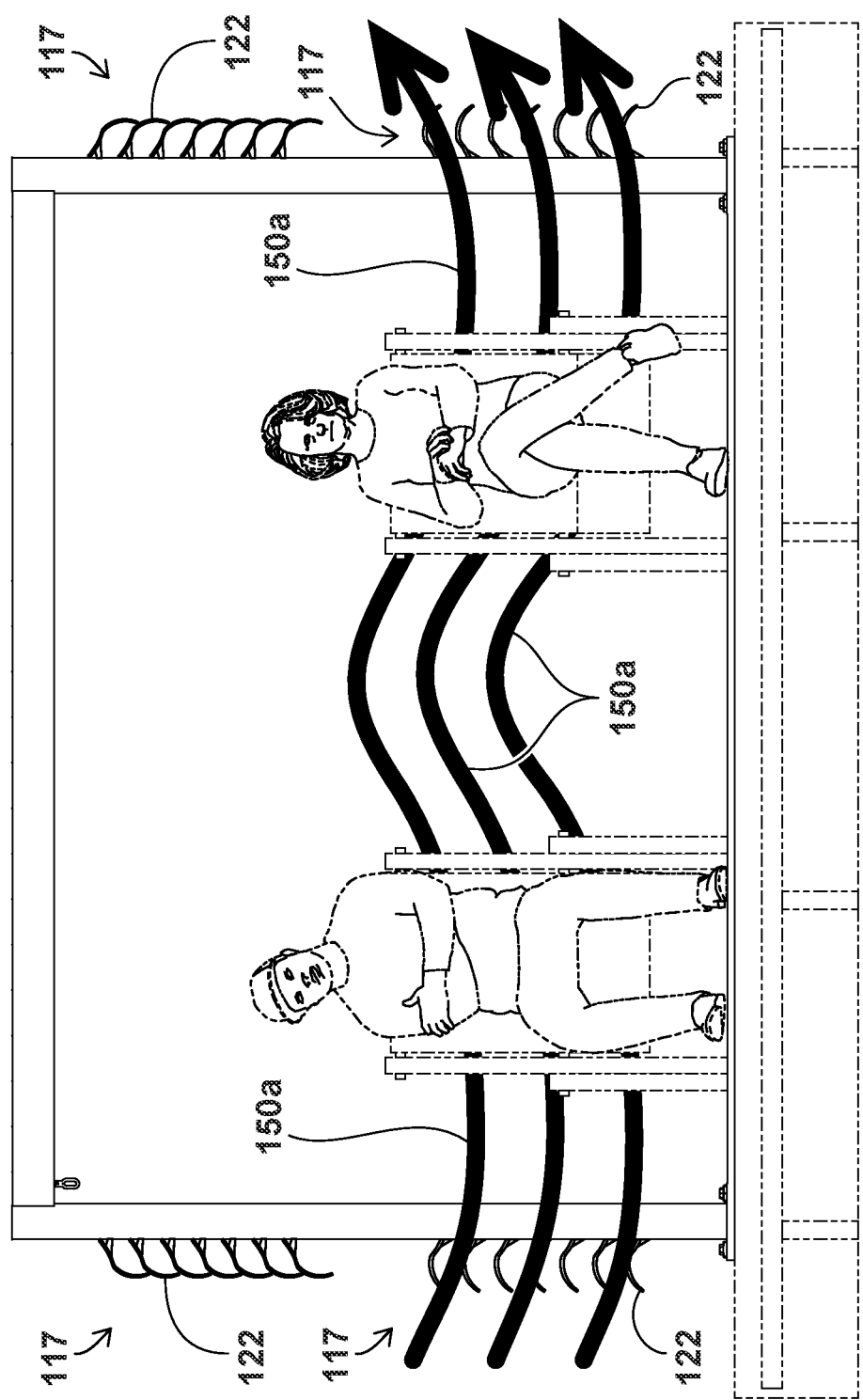

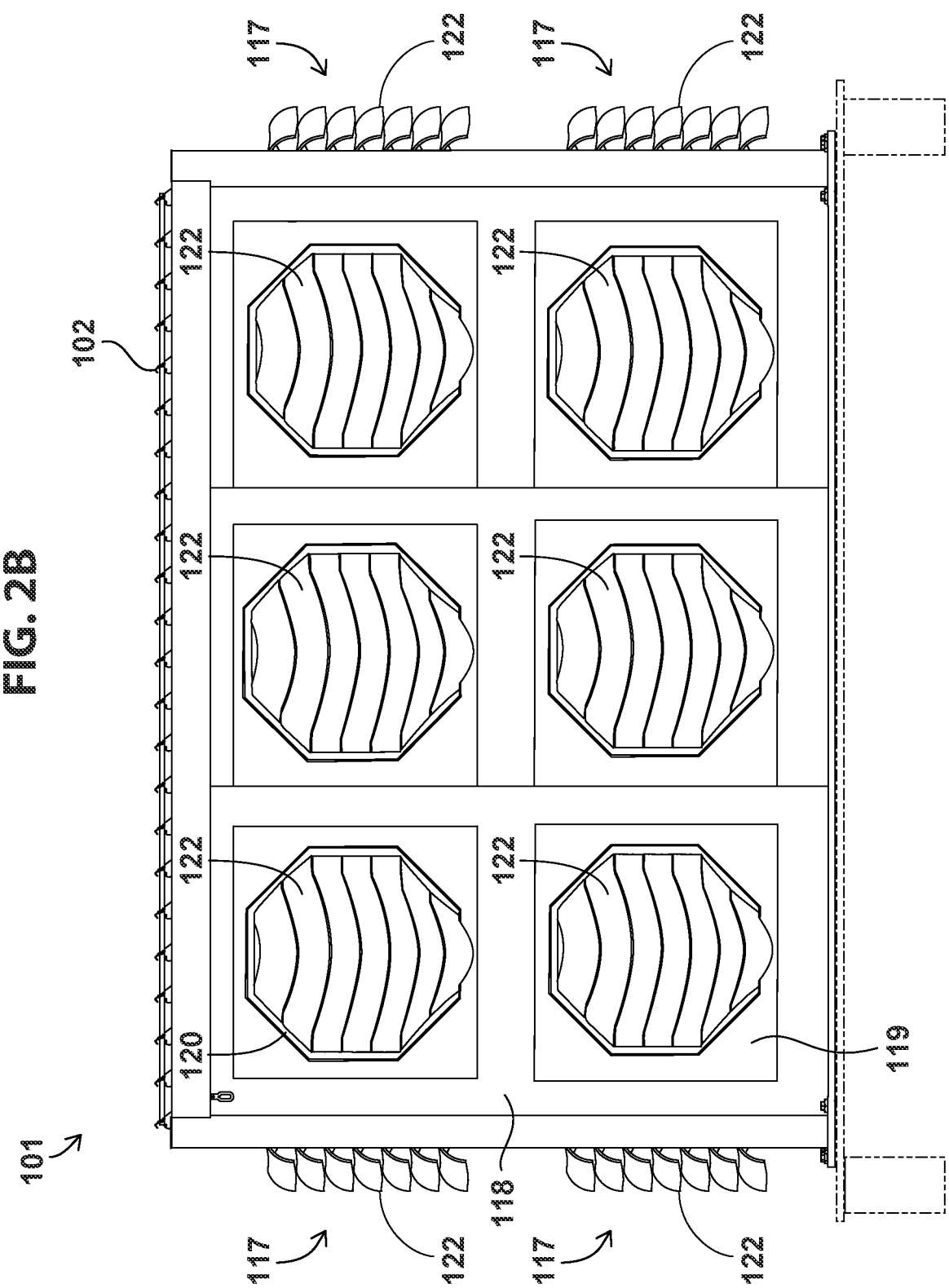

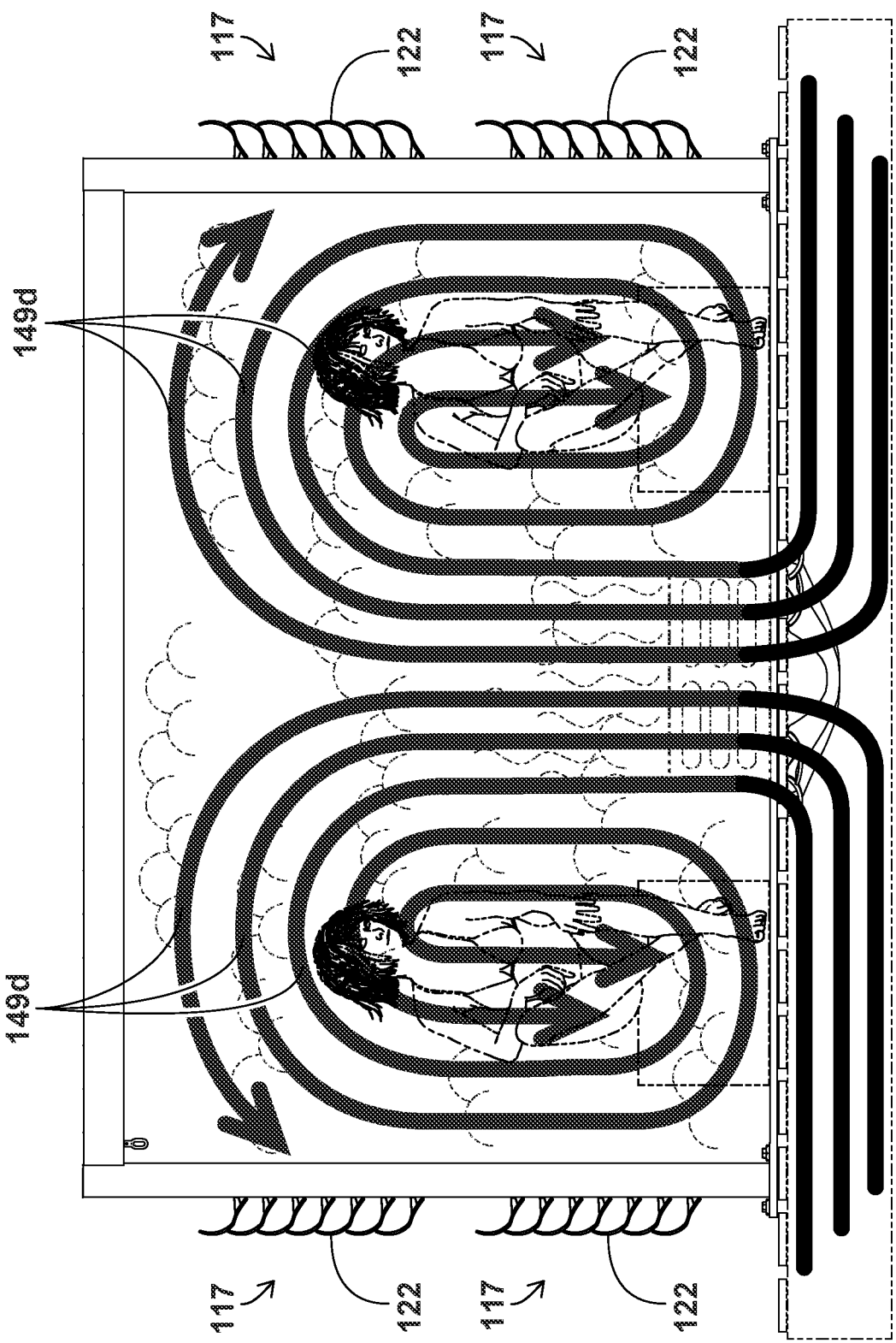

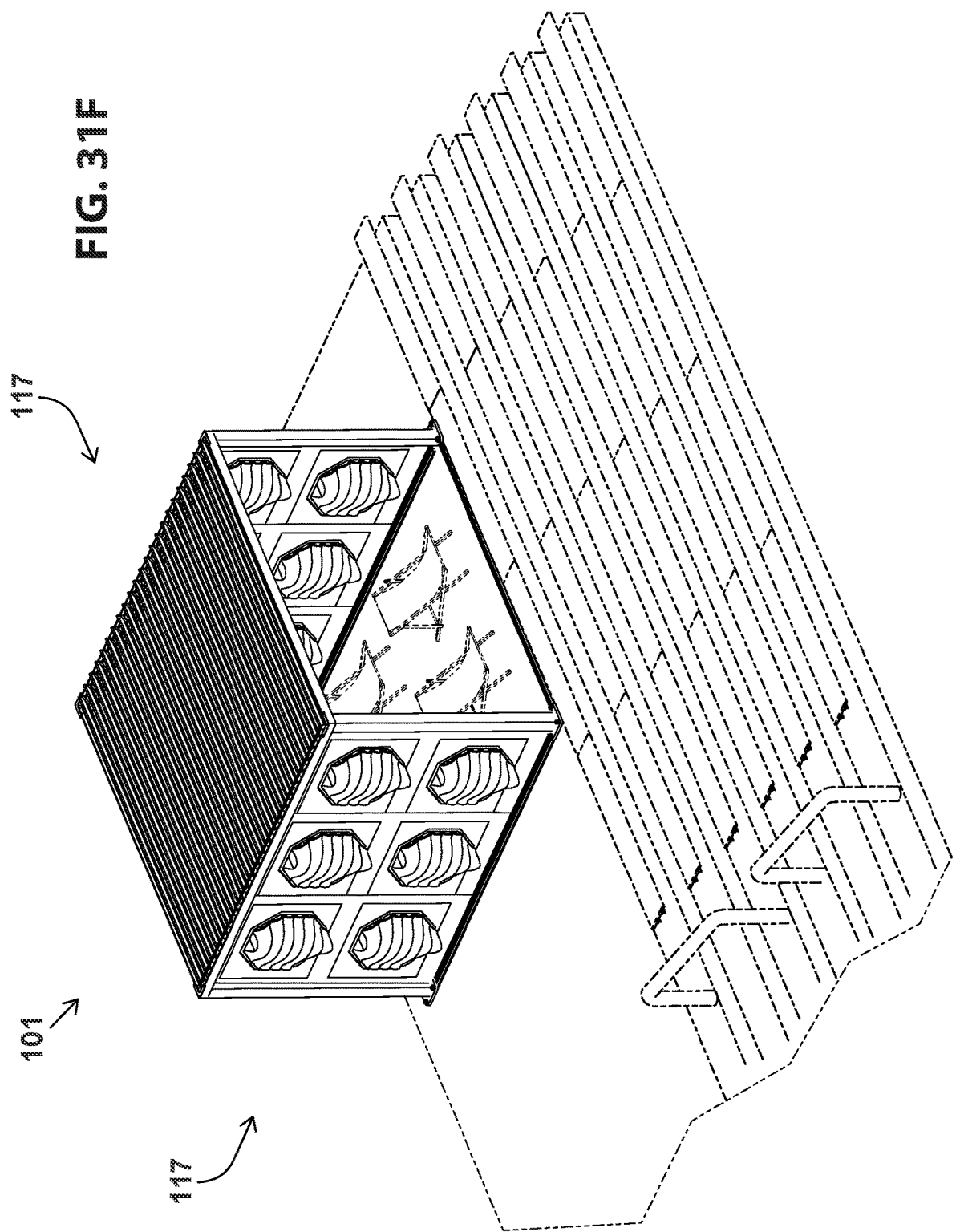

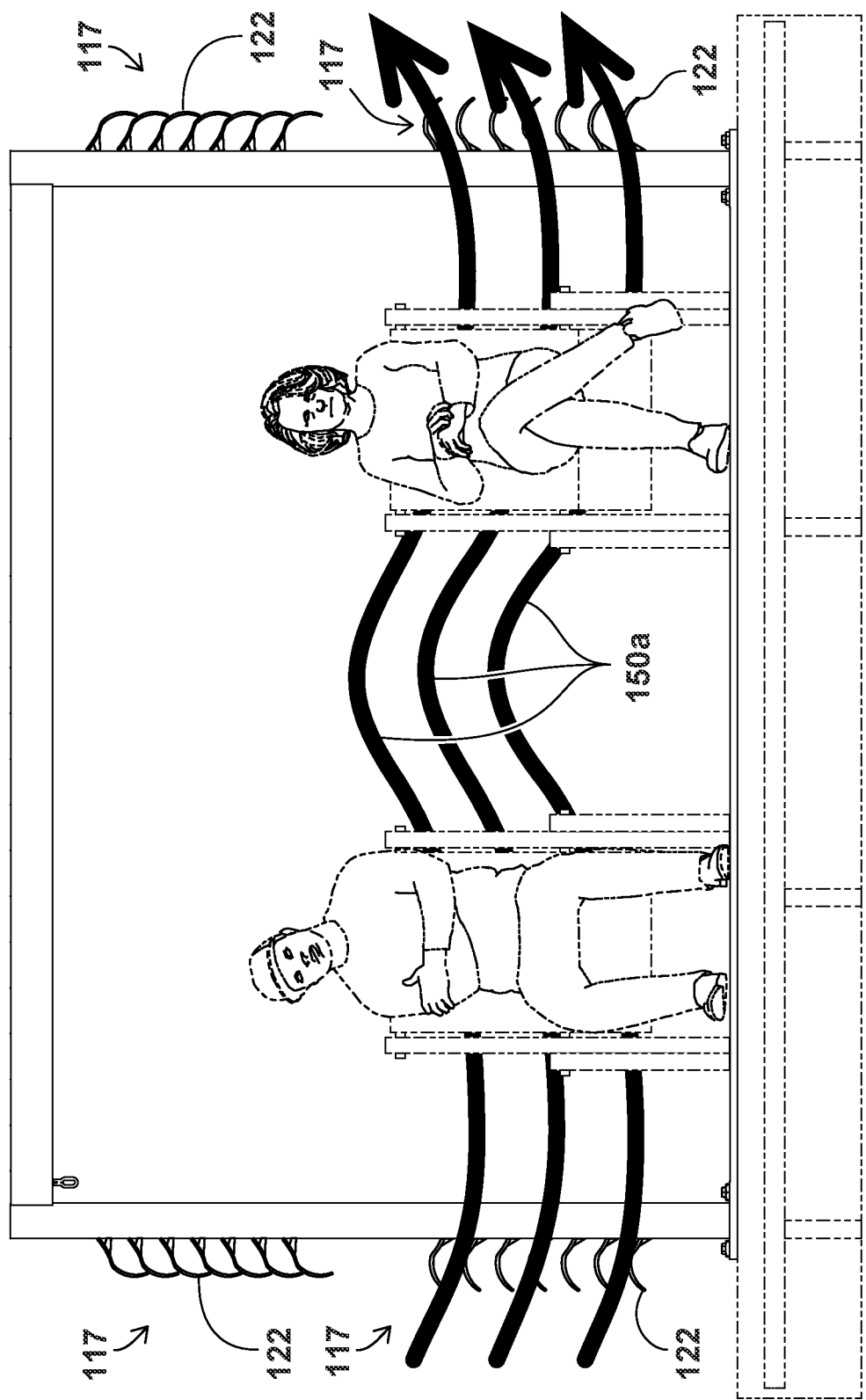

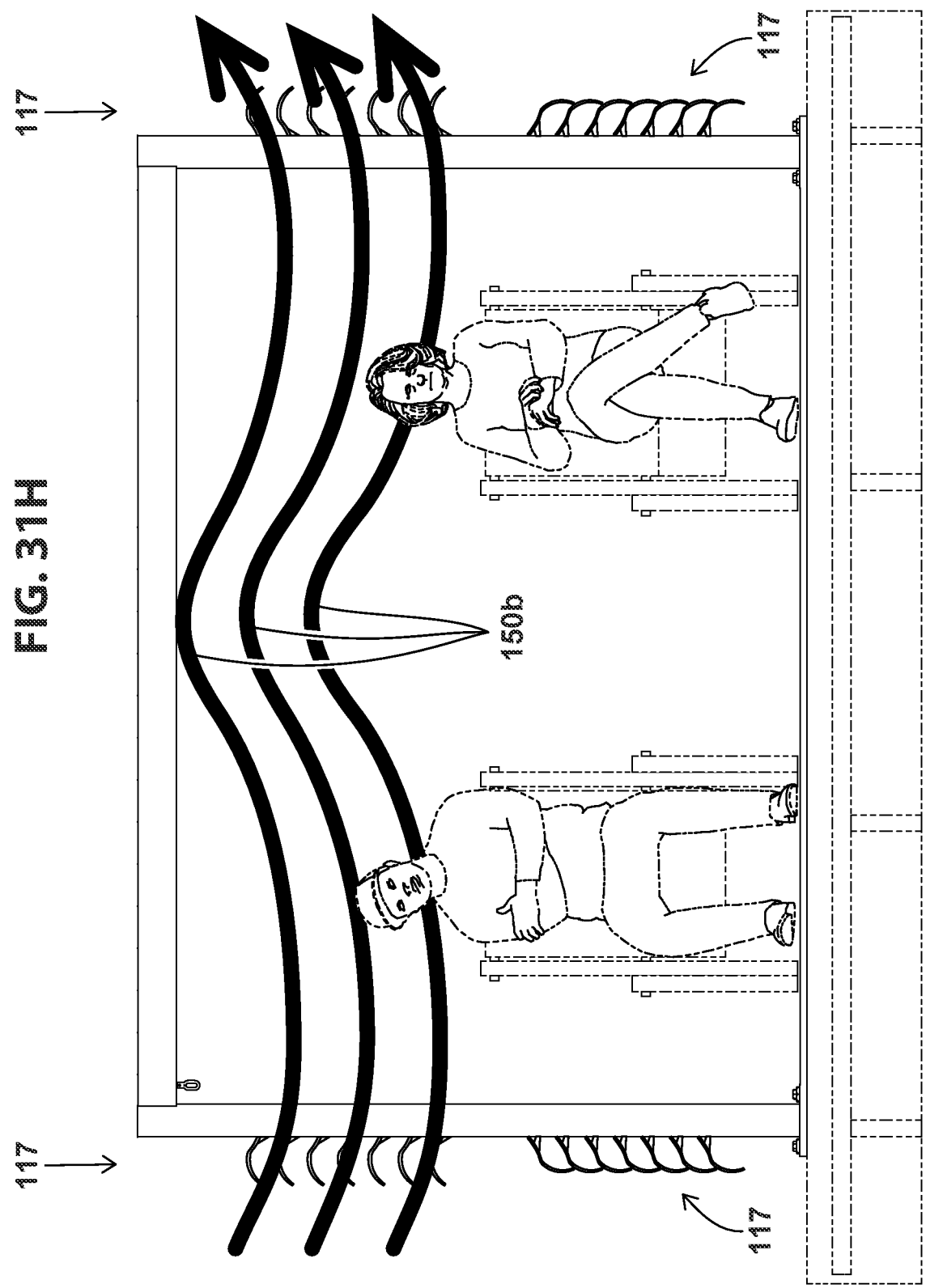

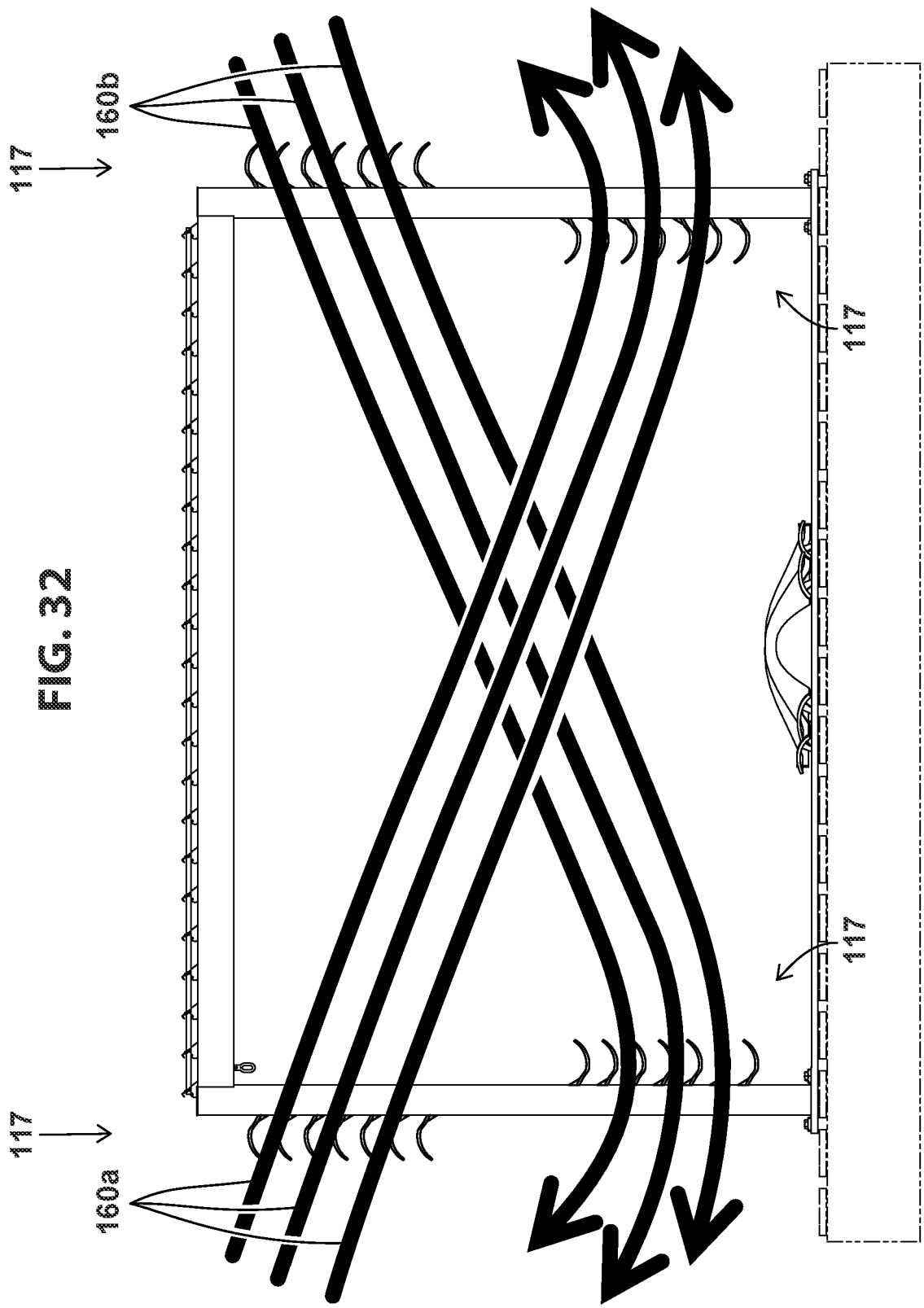

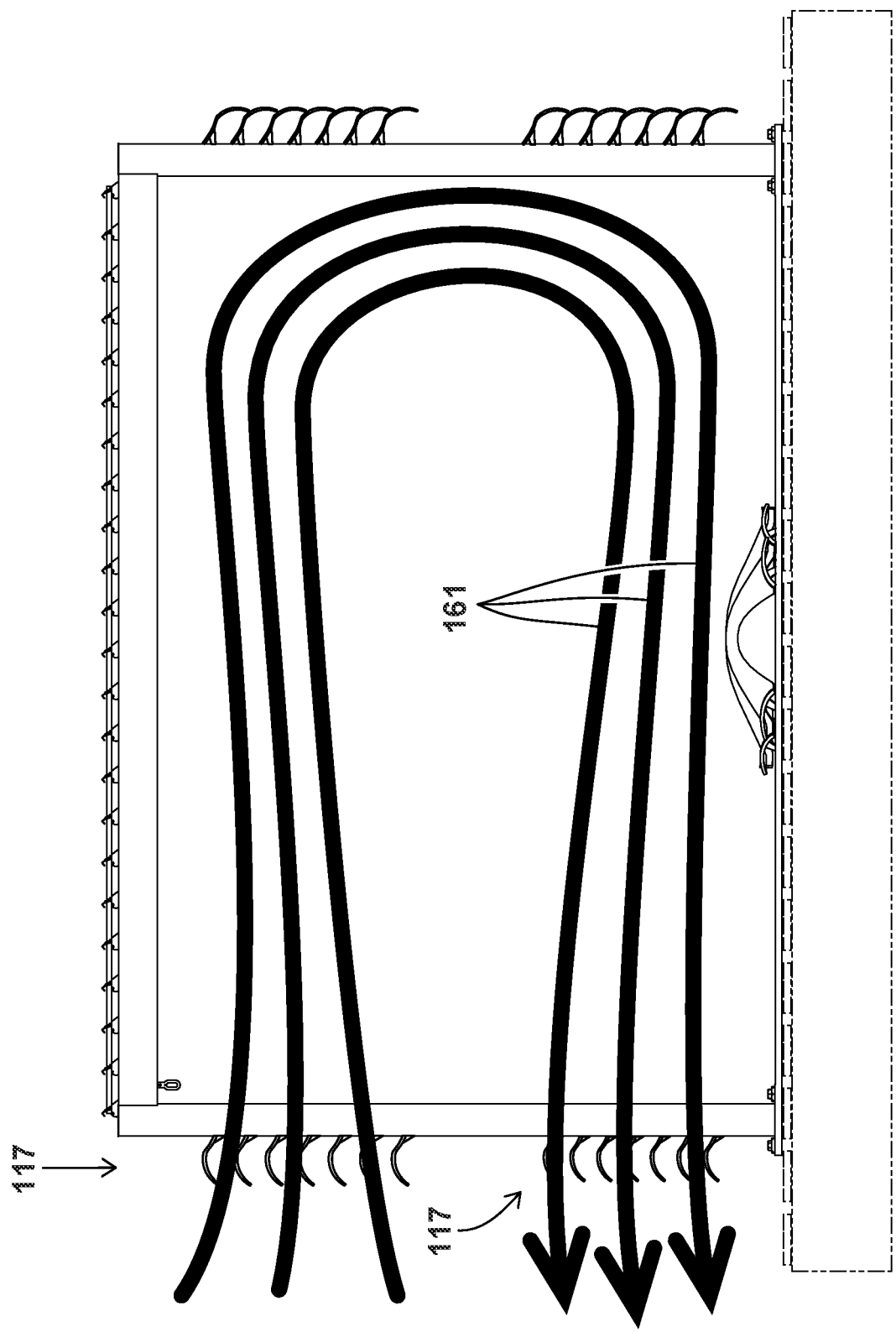

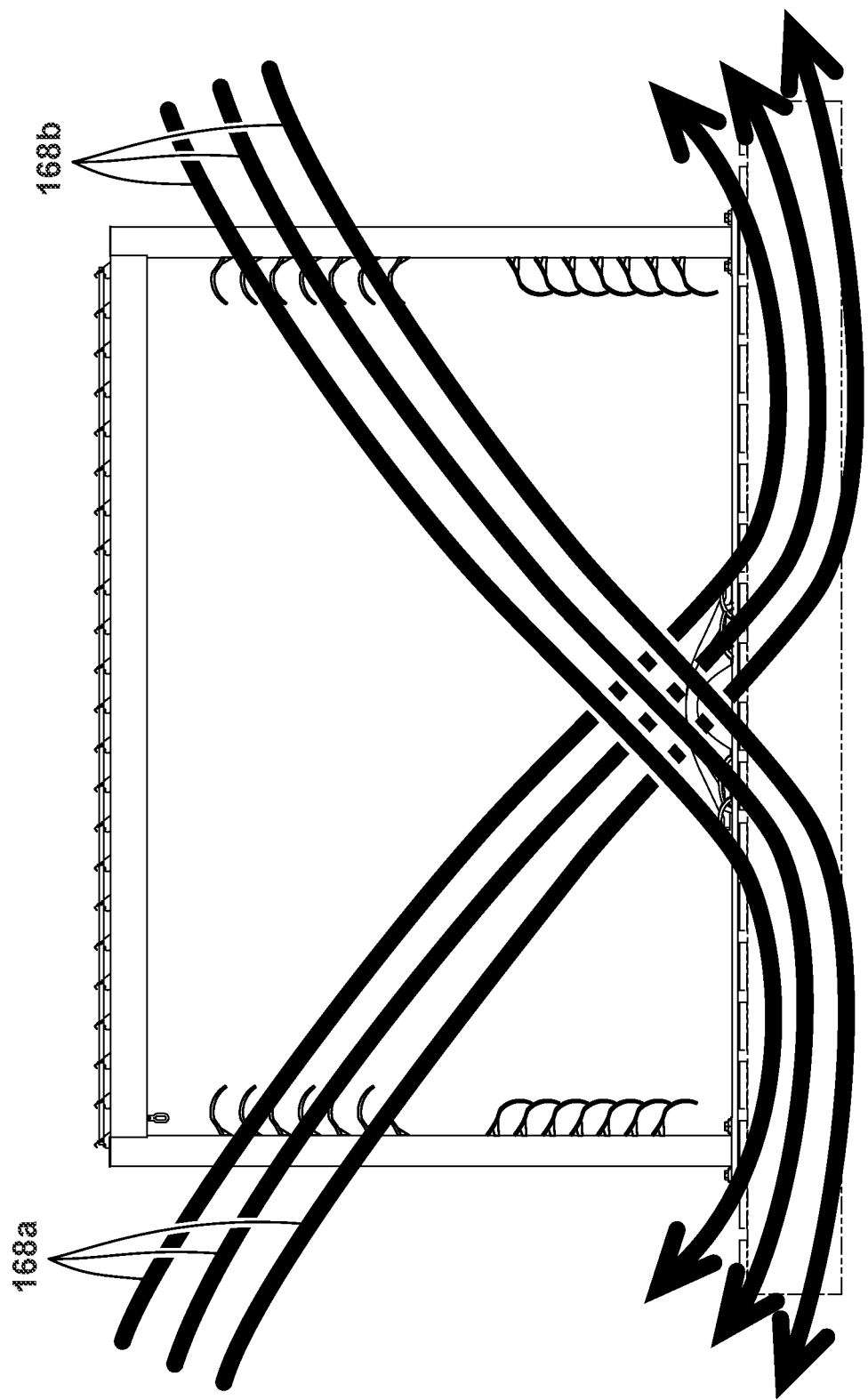

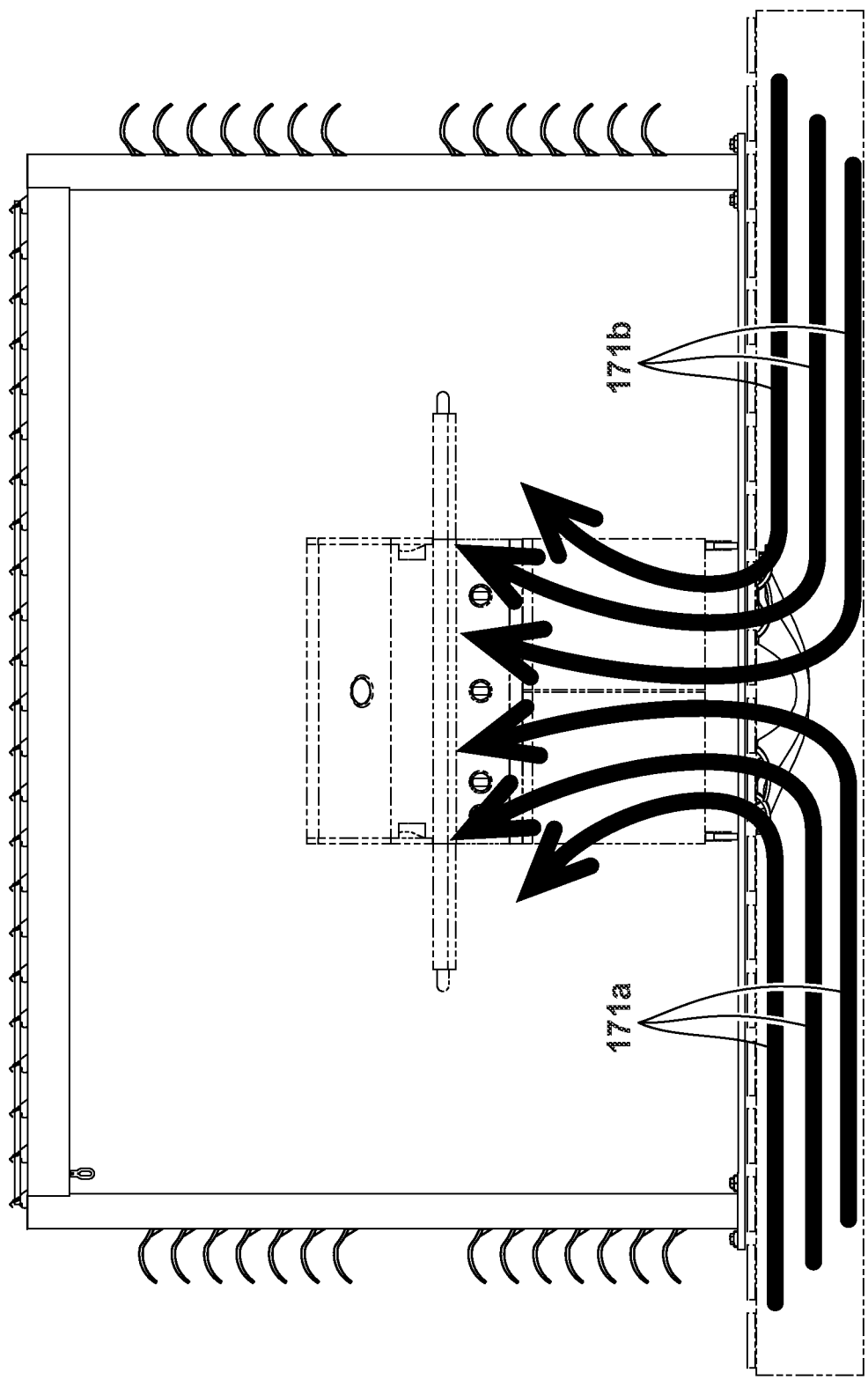

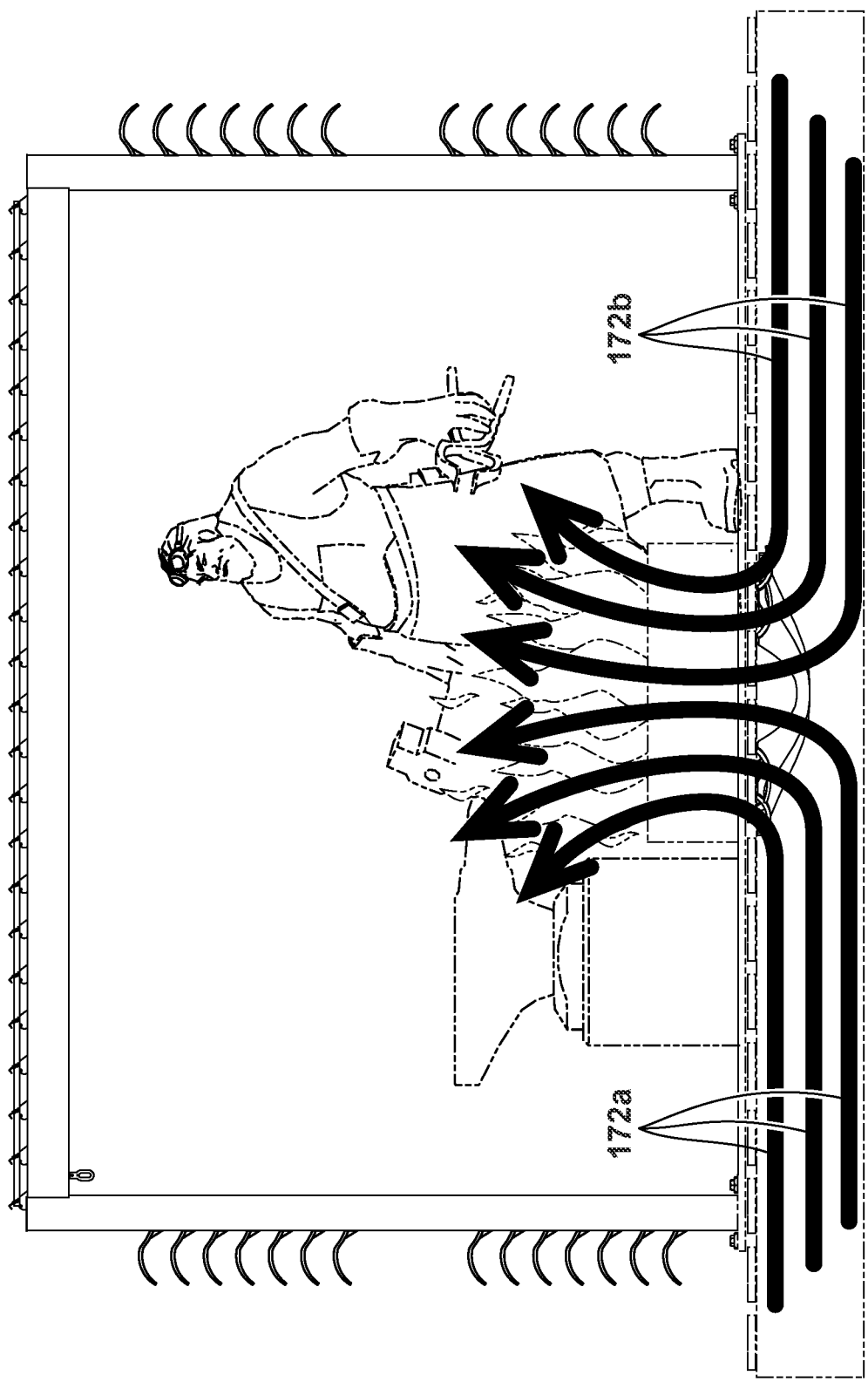

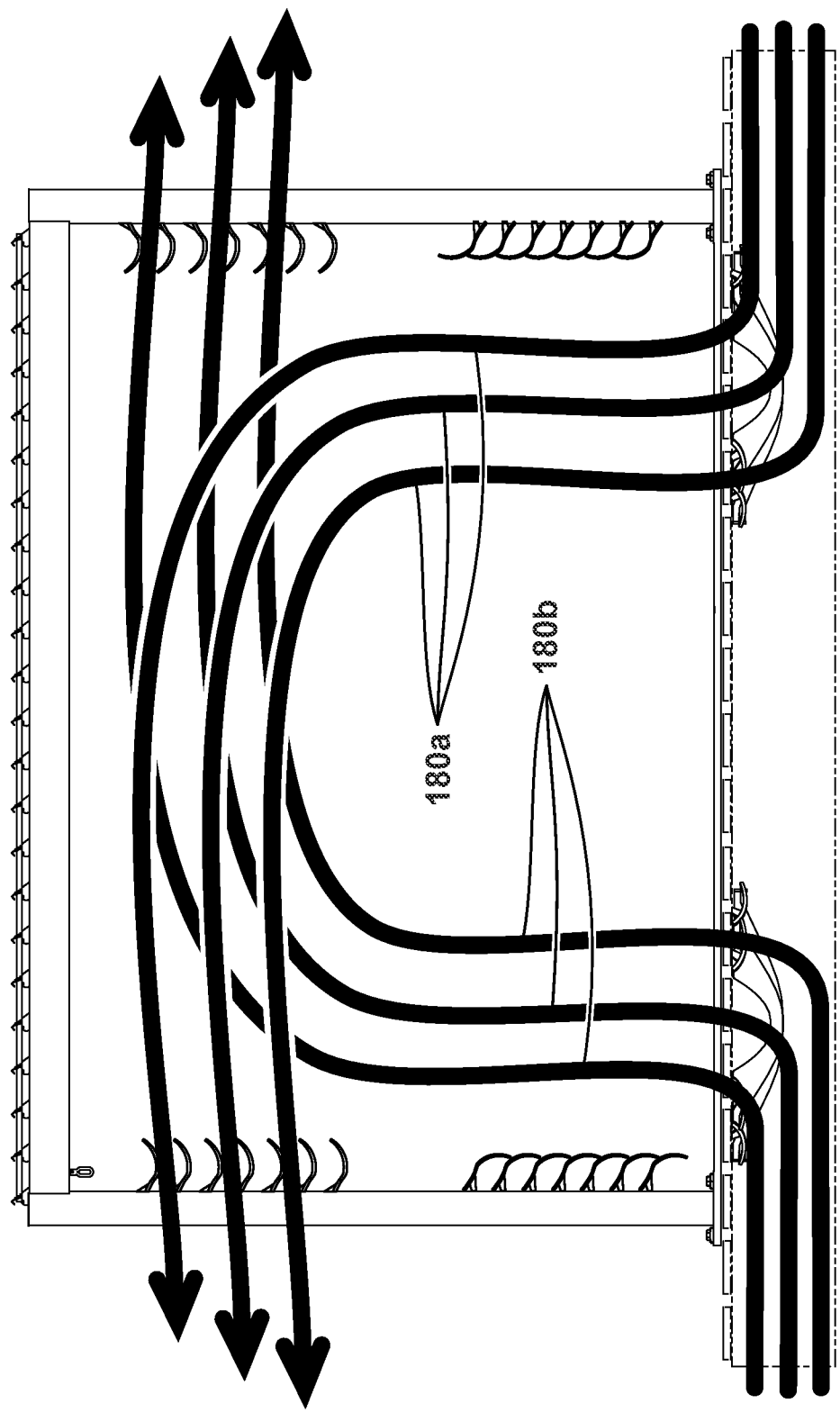

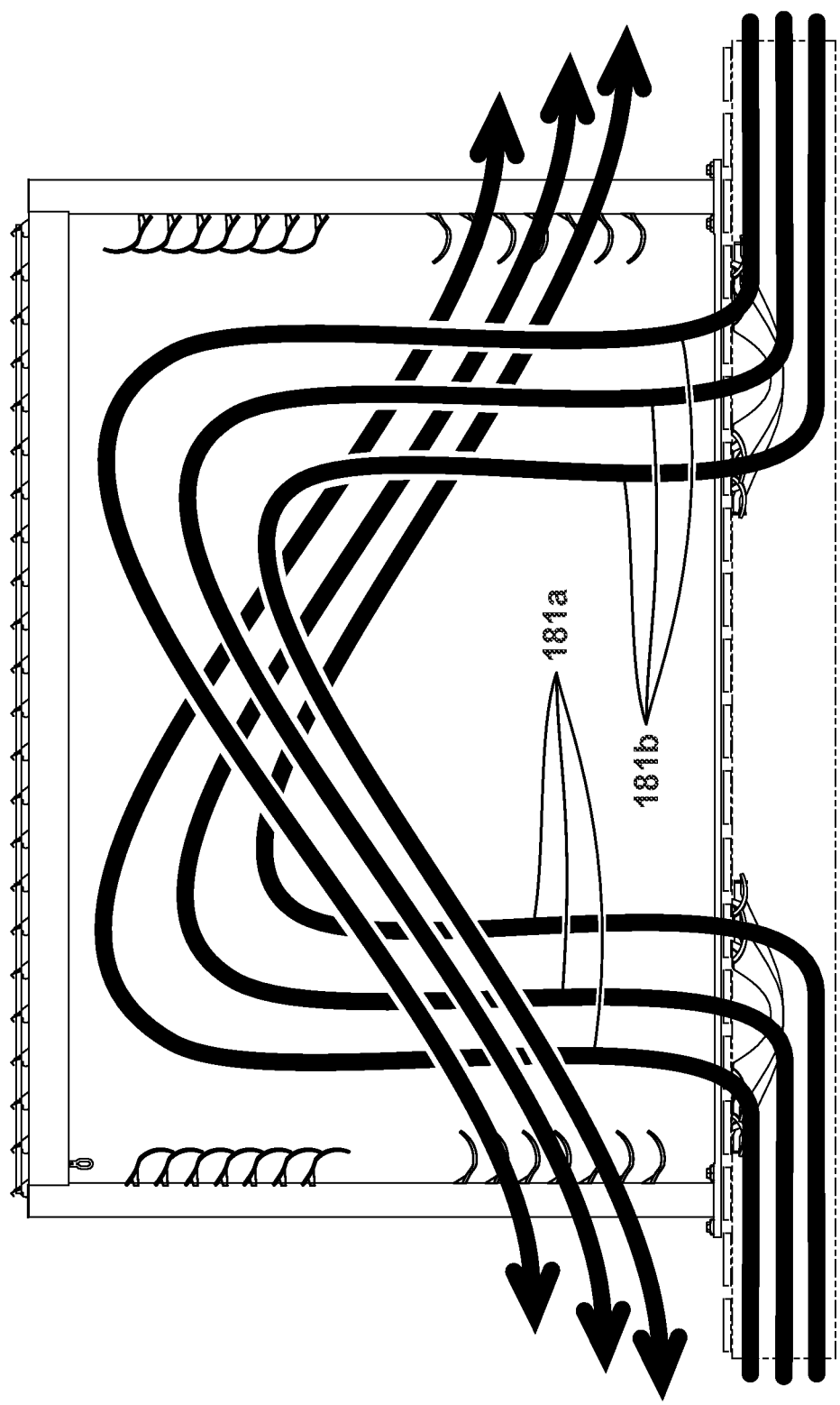

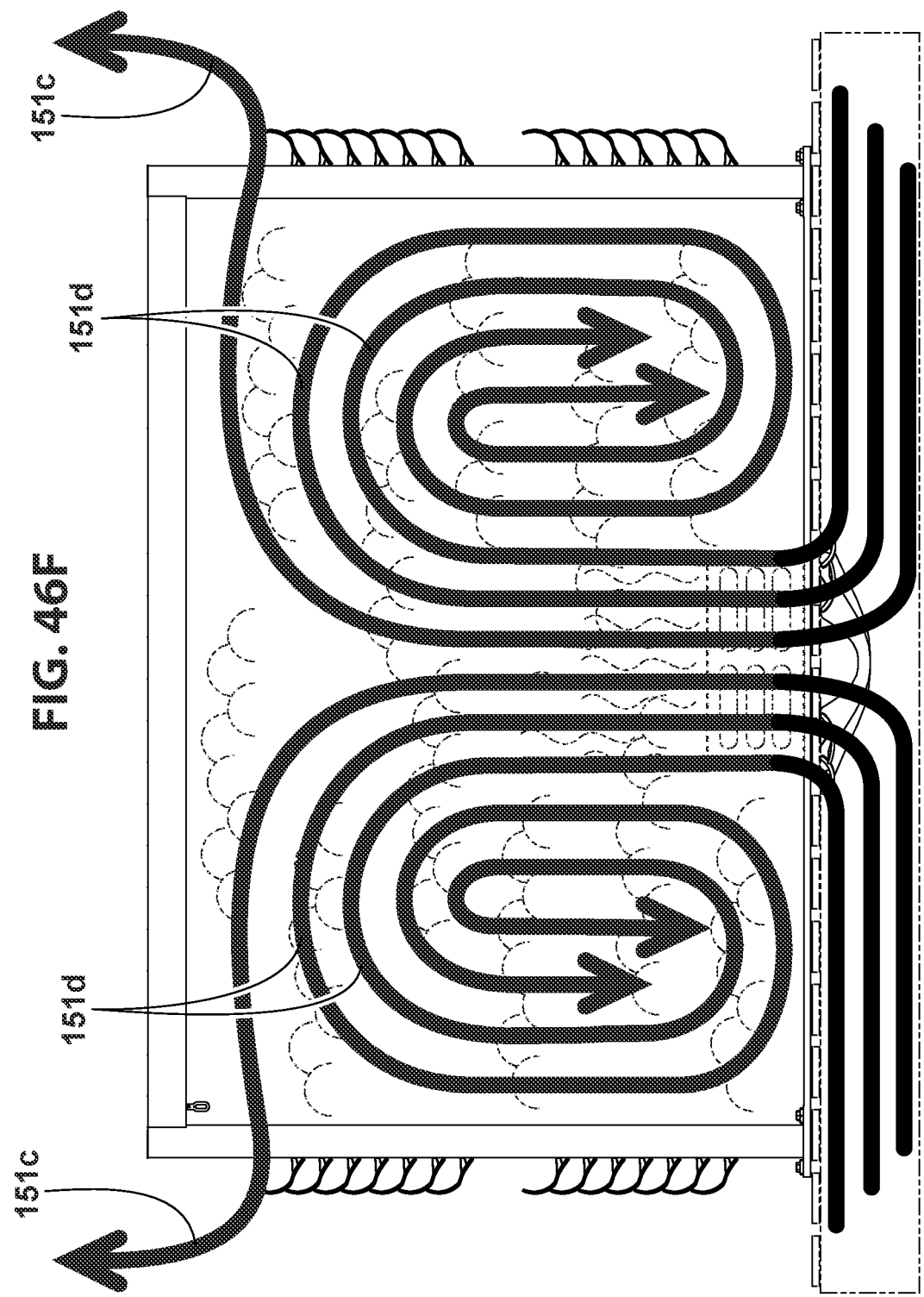

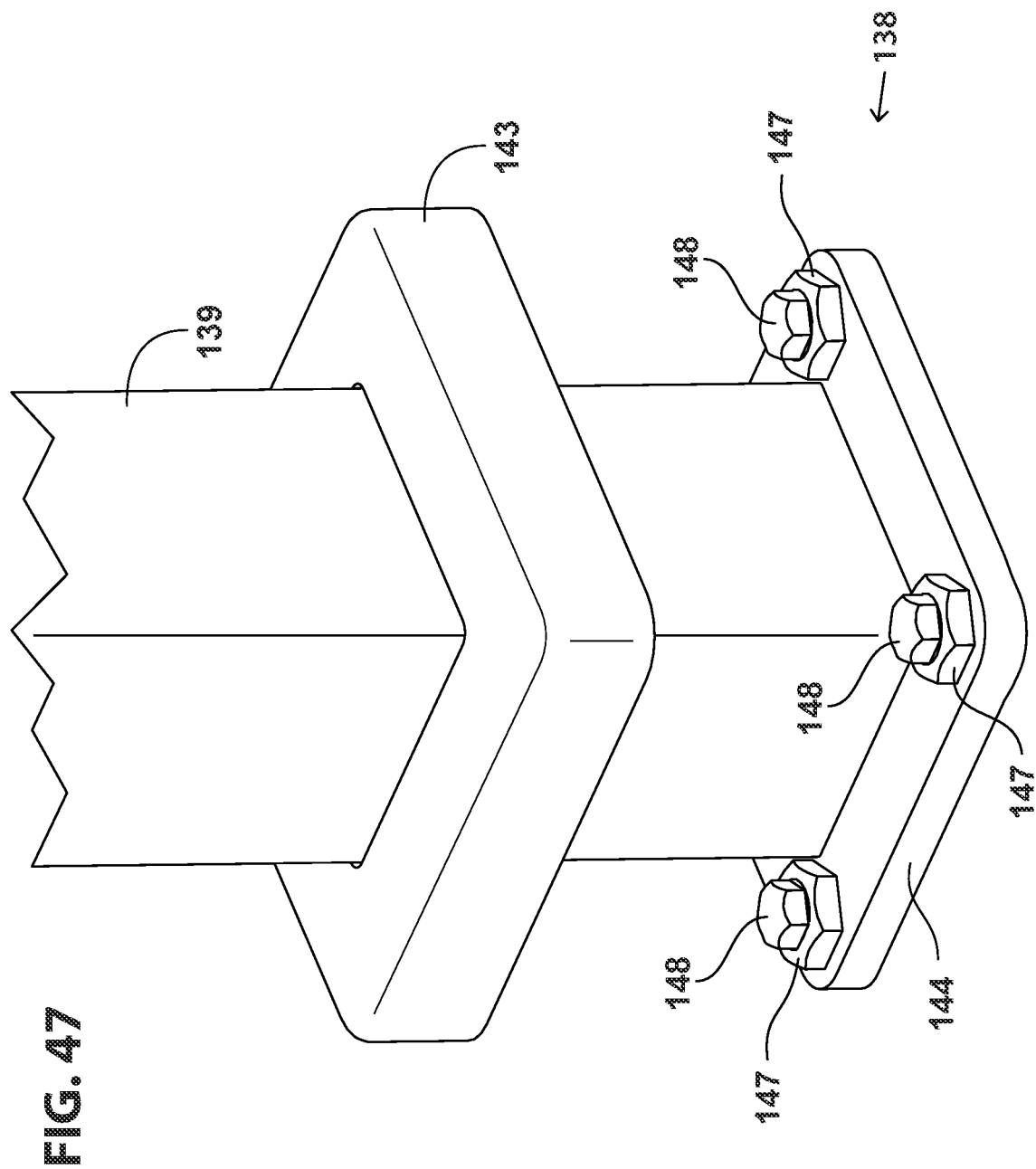

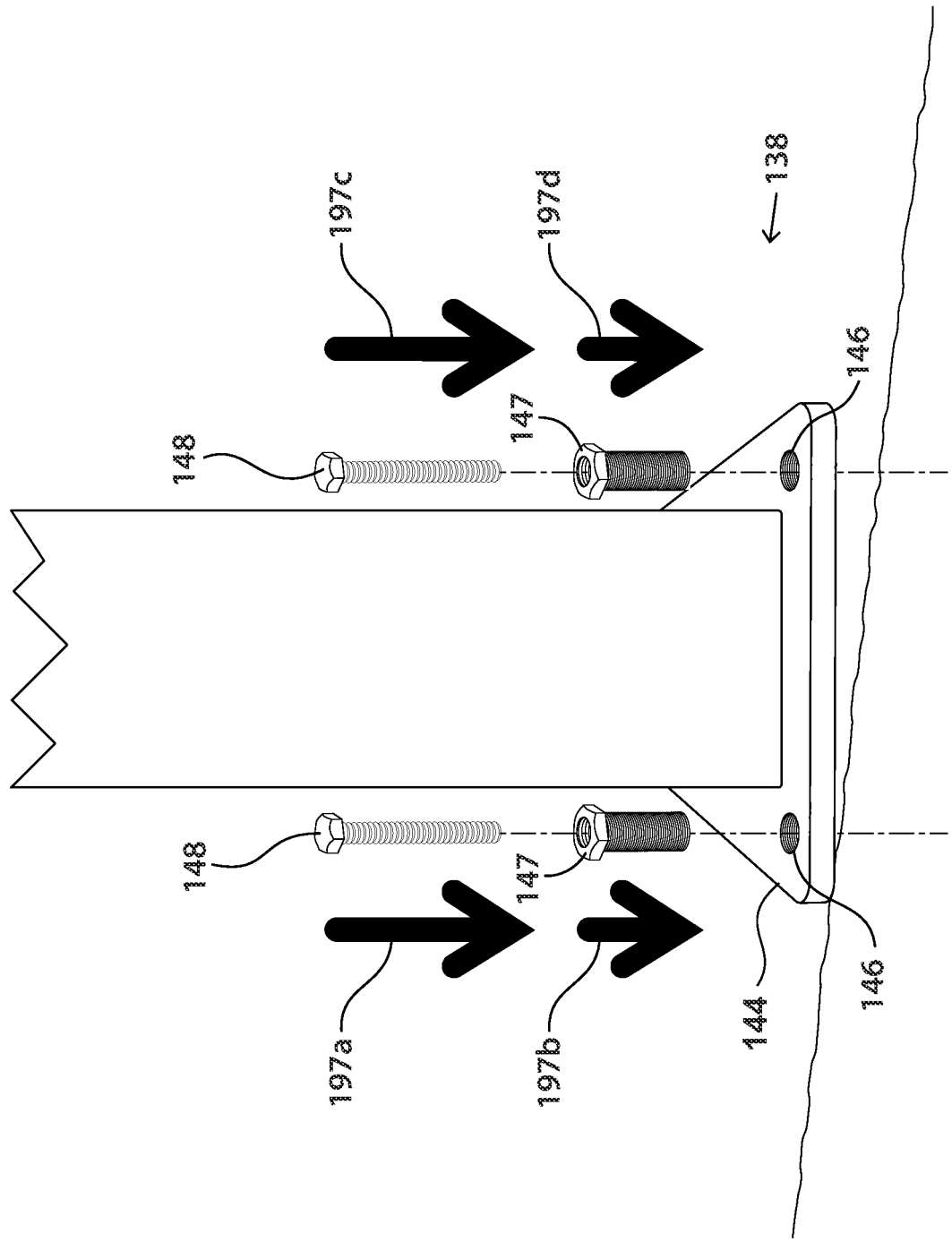

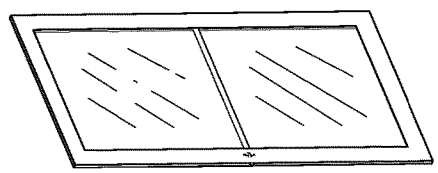
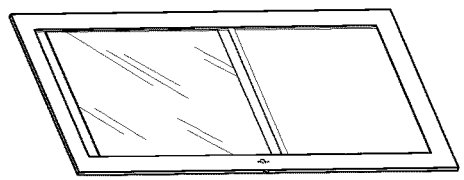
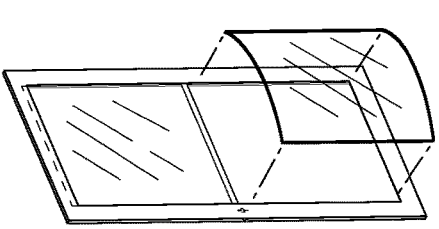
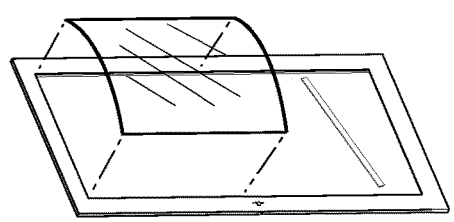

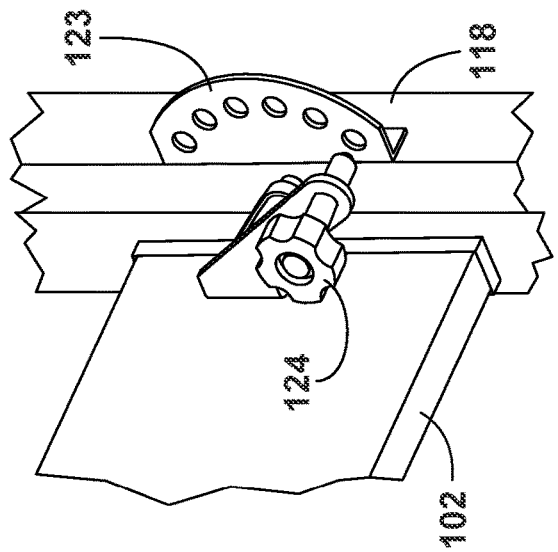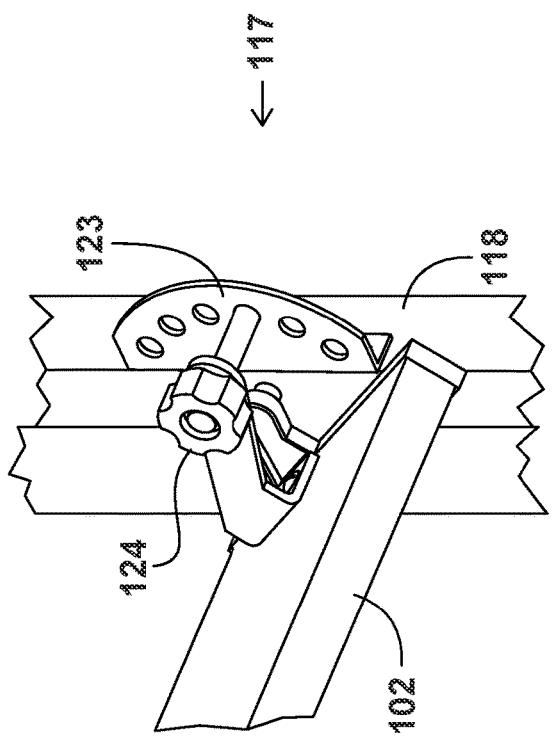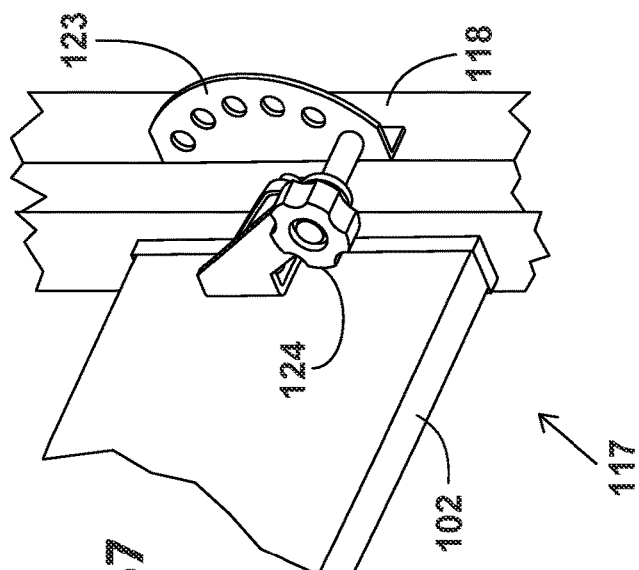

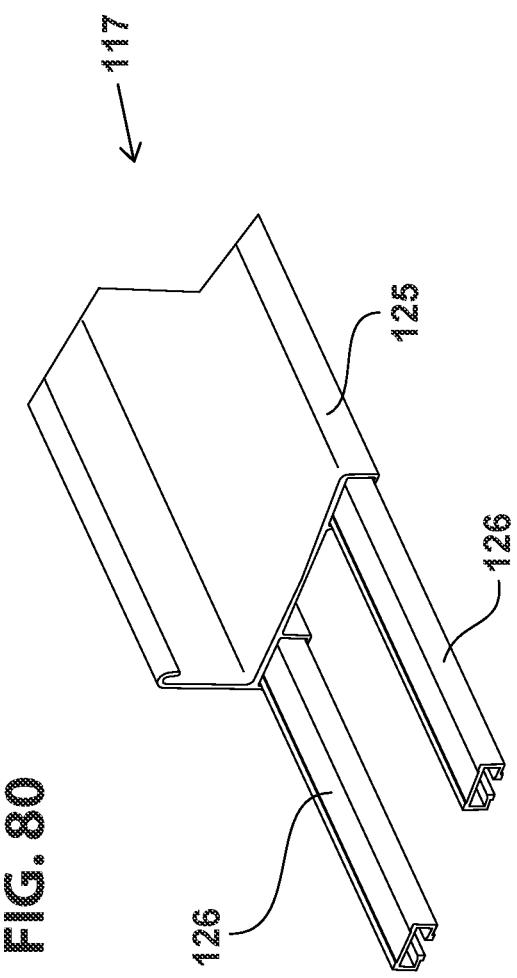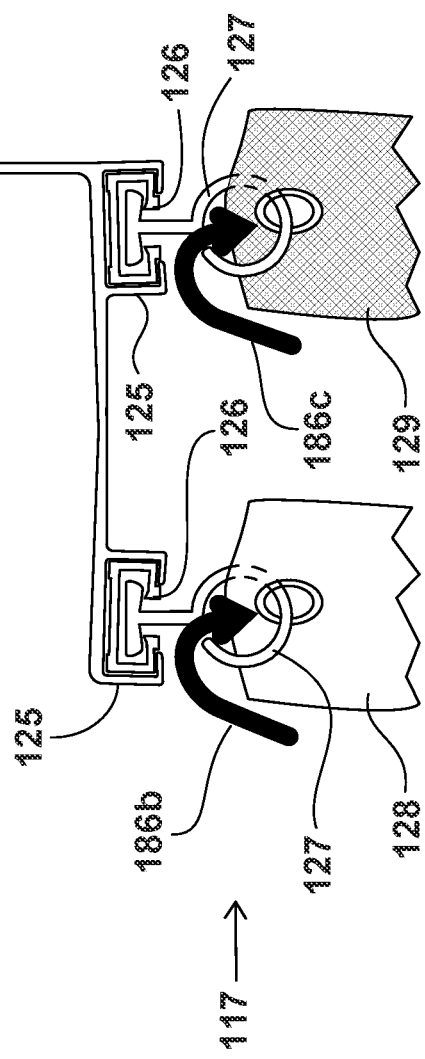

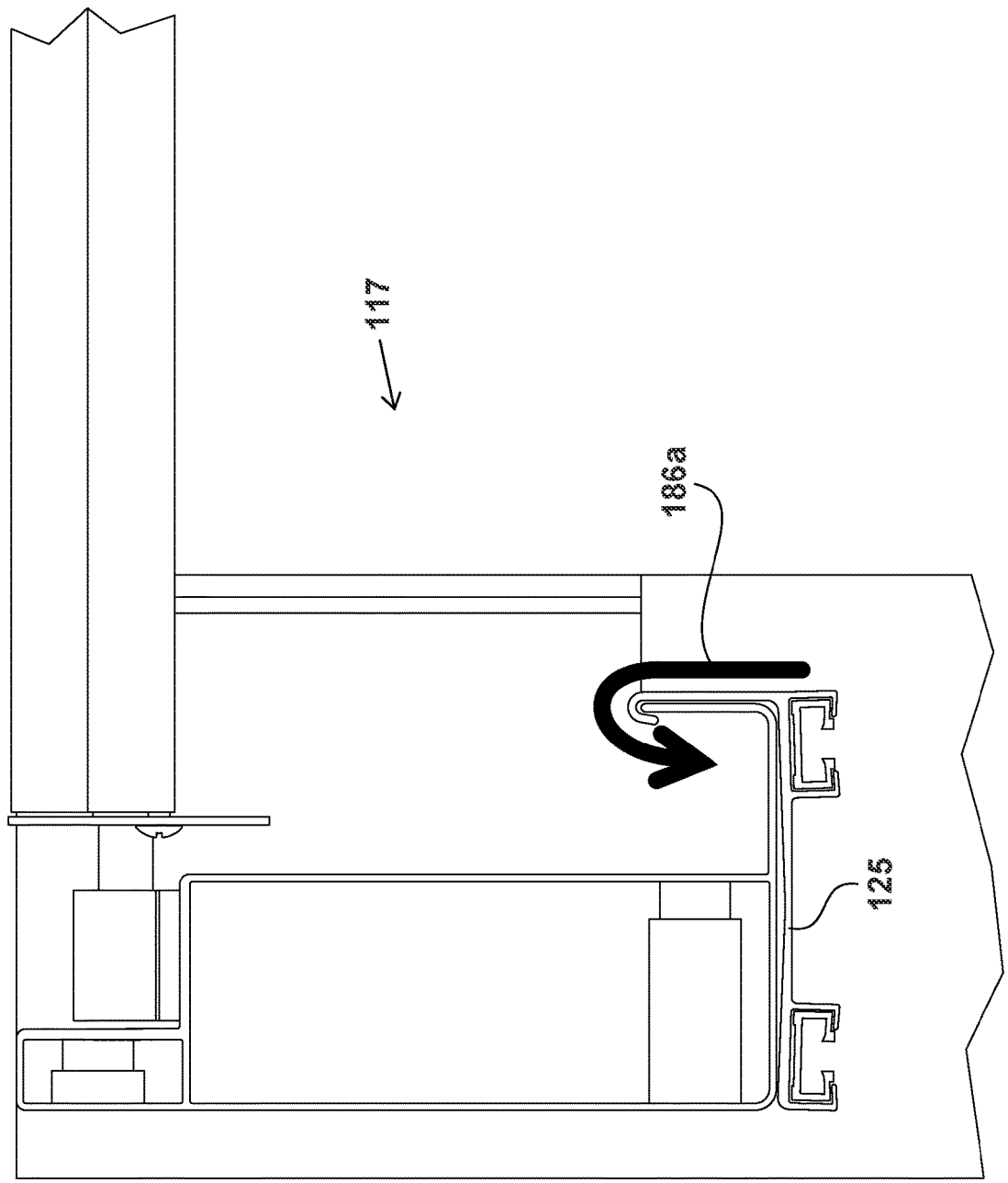

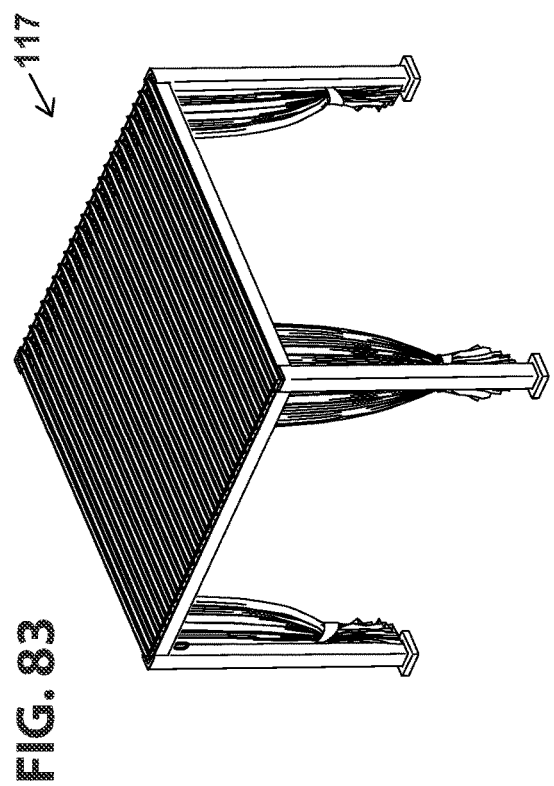
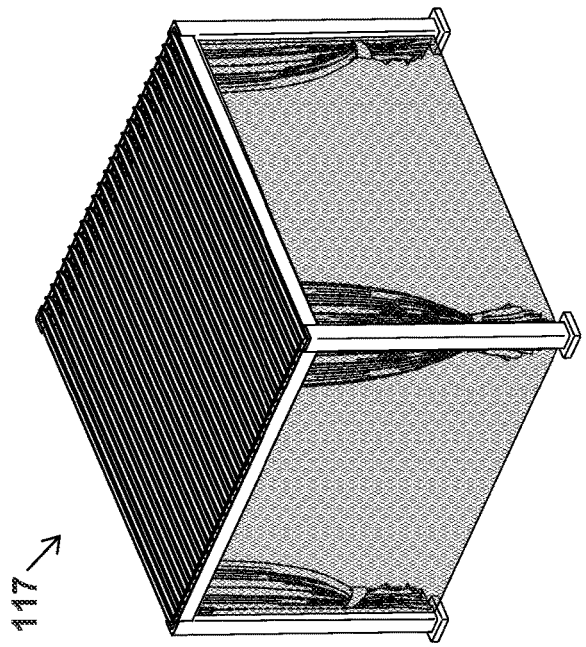

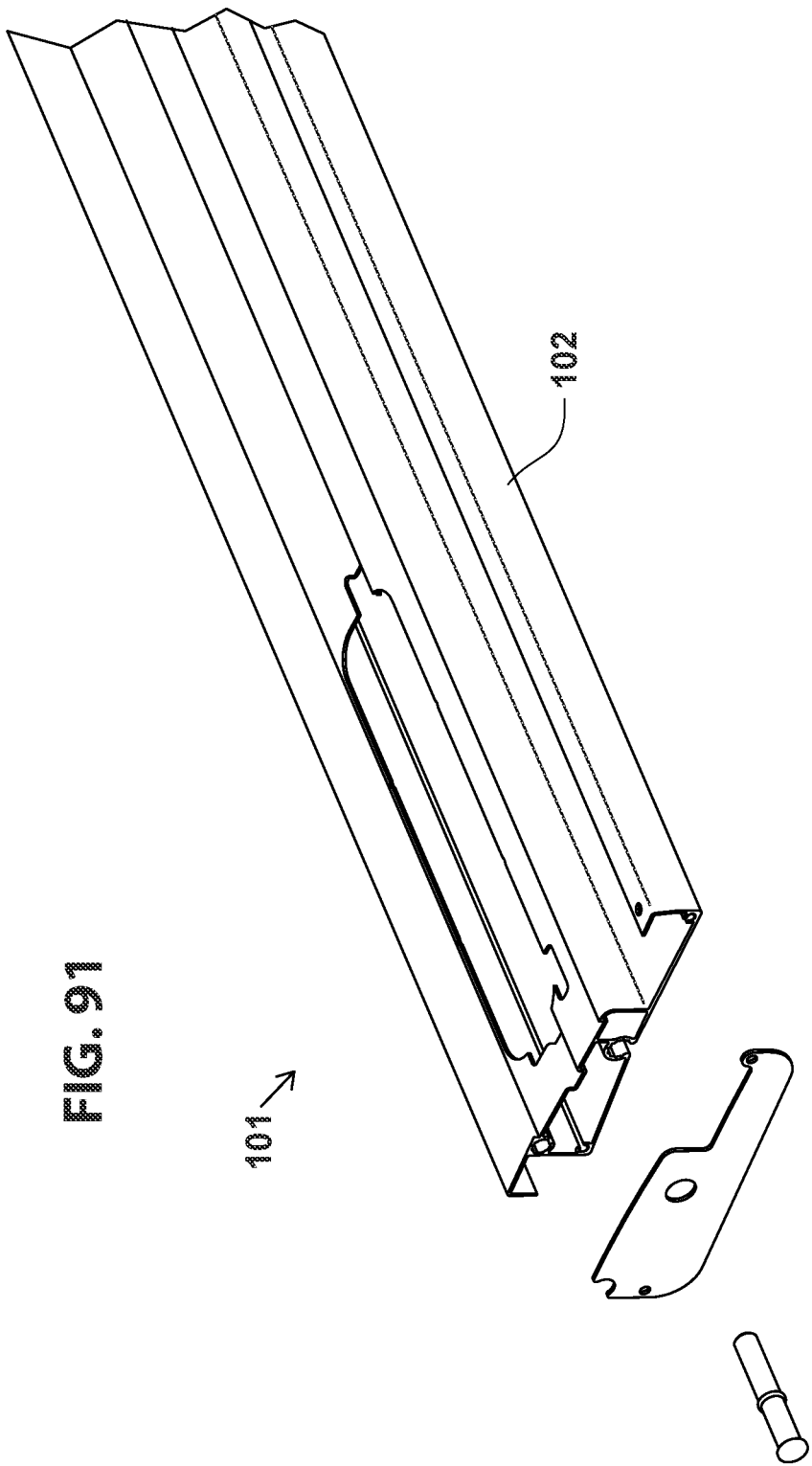

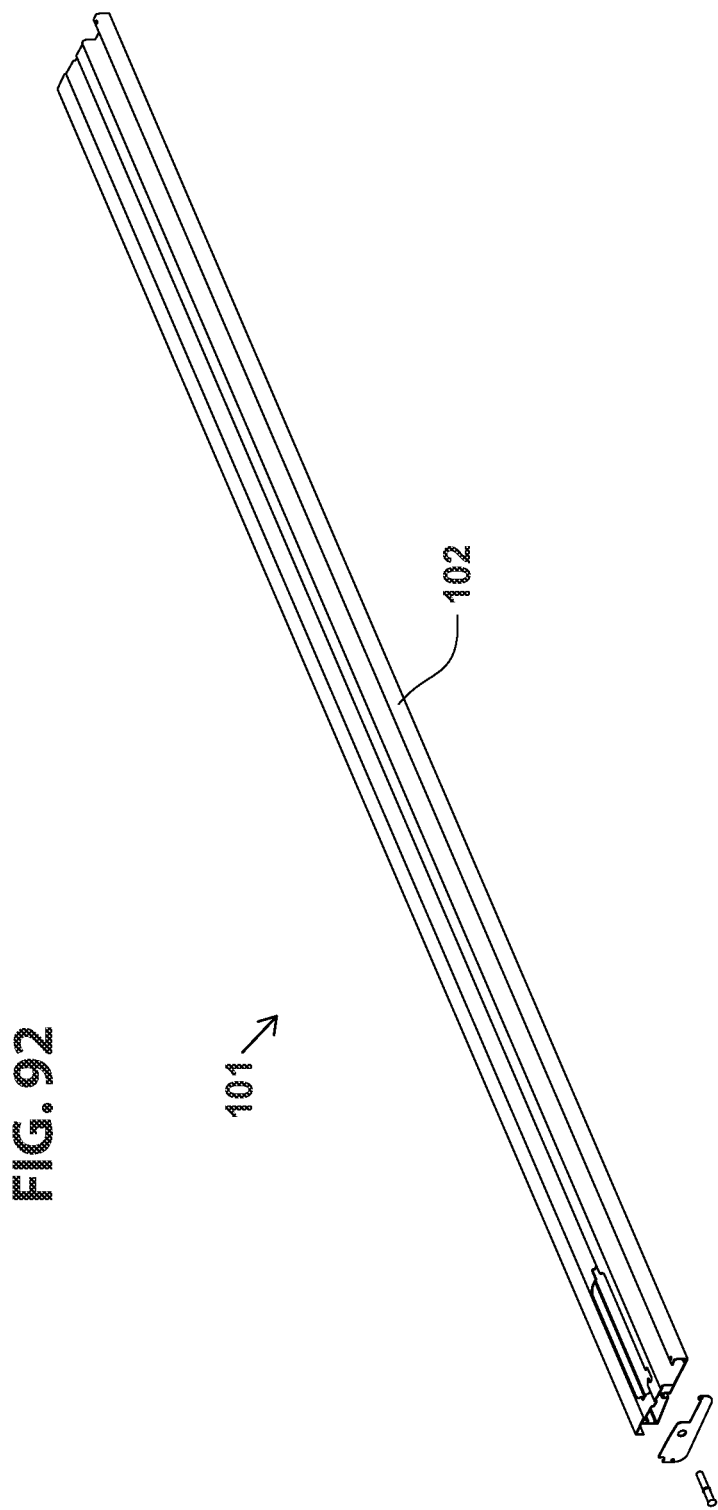

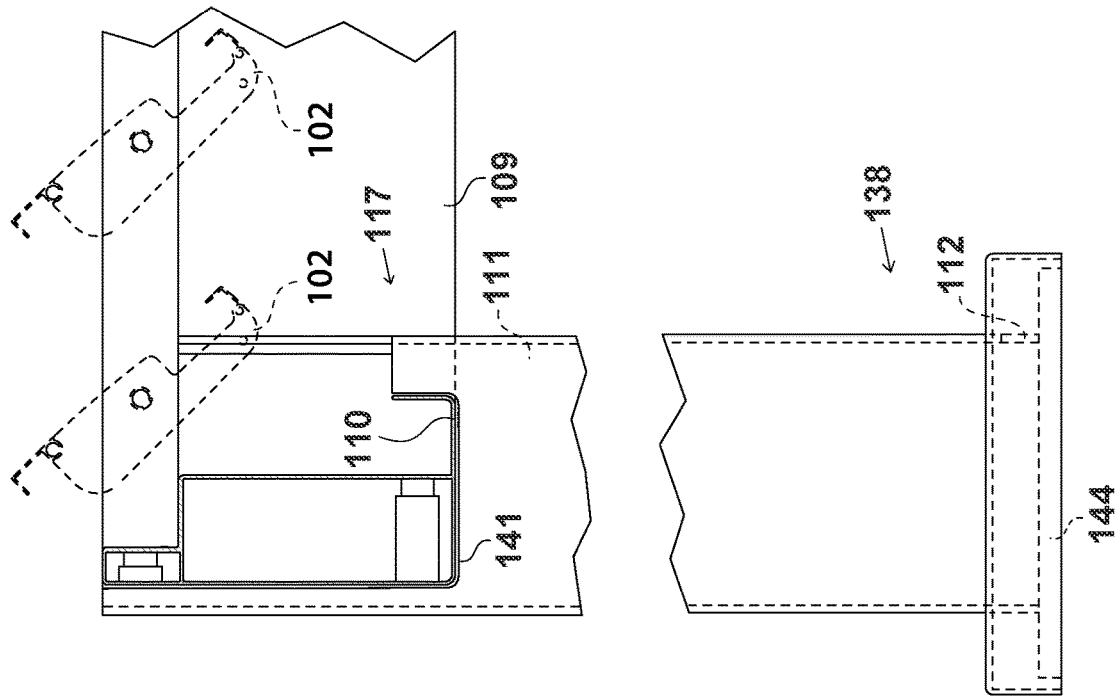
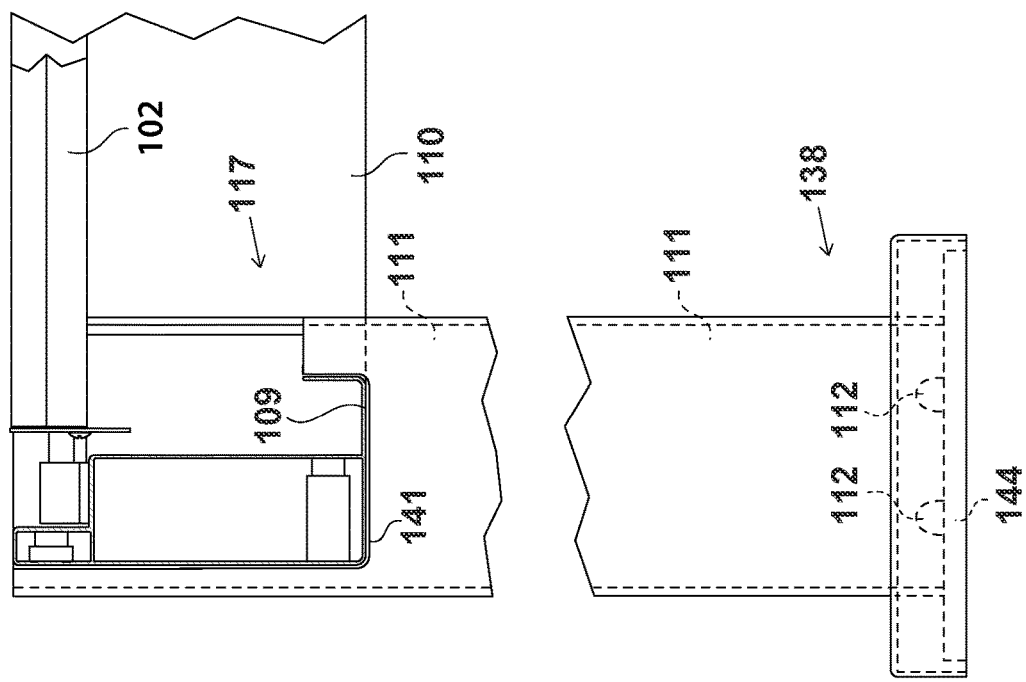

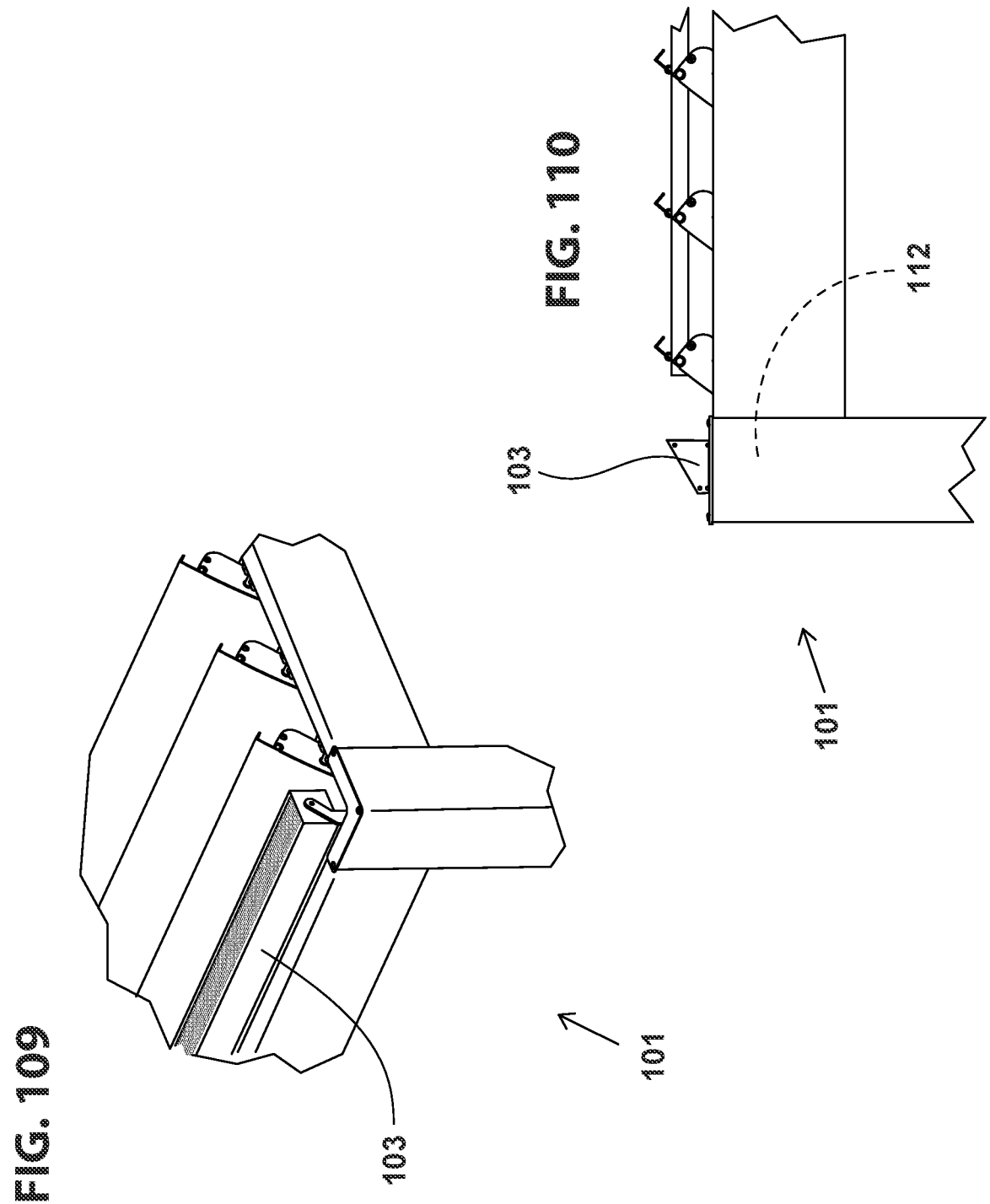

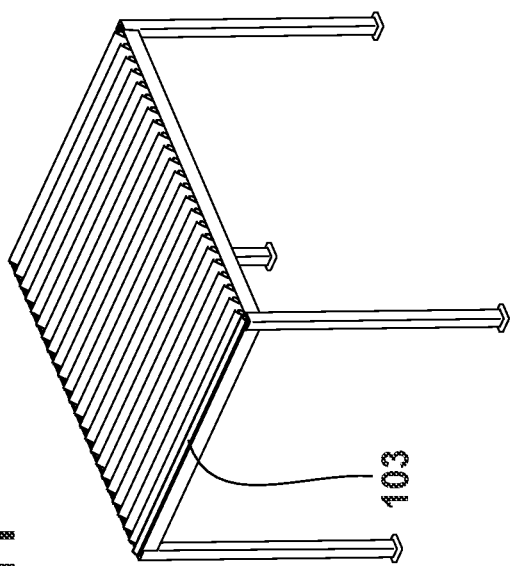
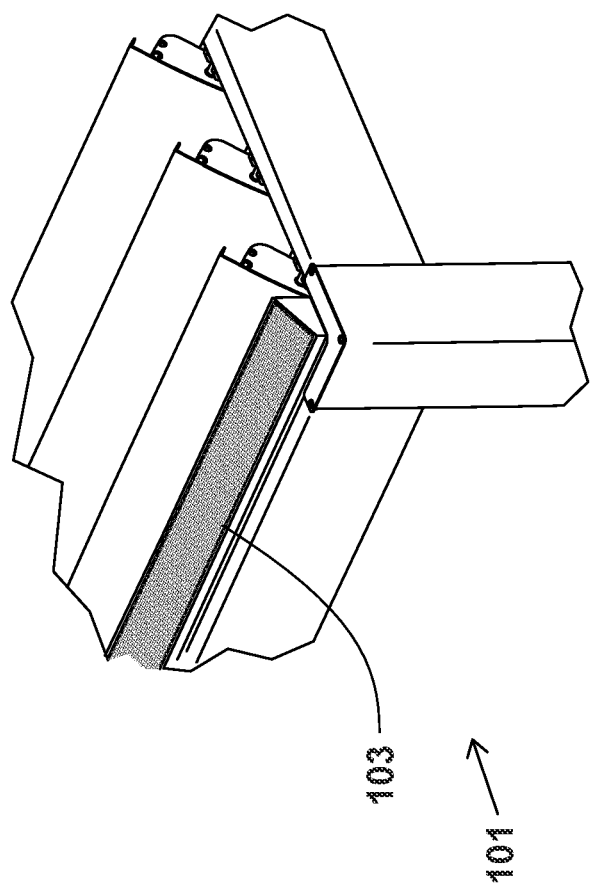
FIG. 111
FIG. 112

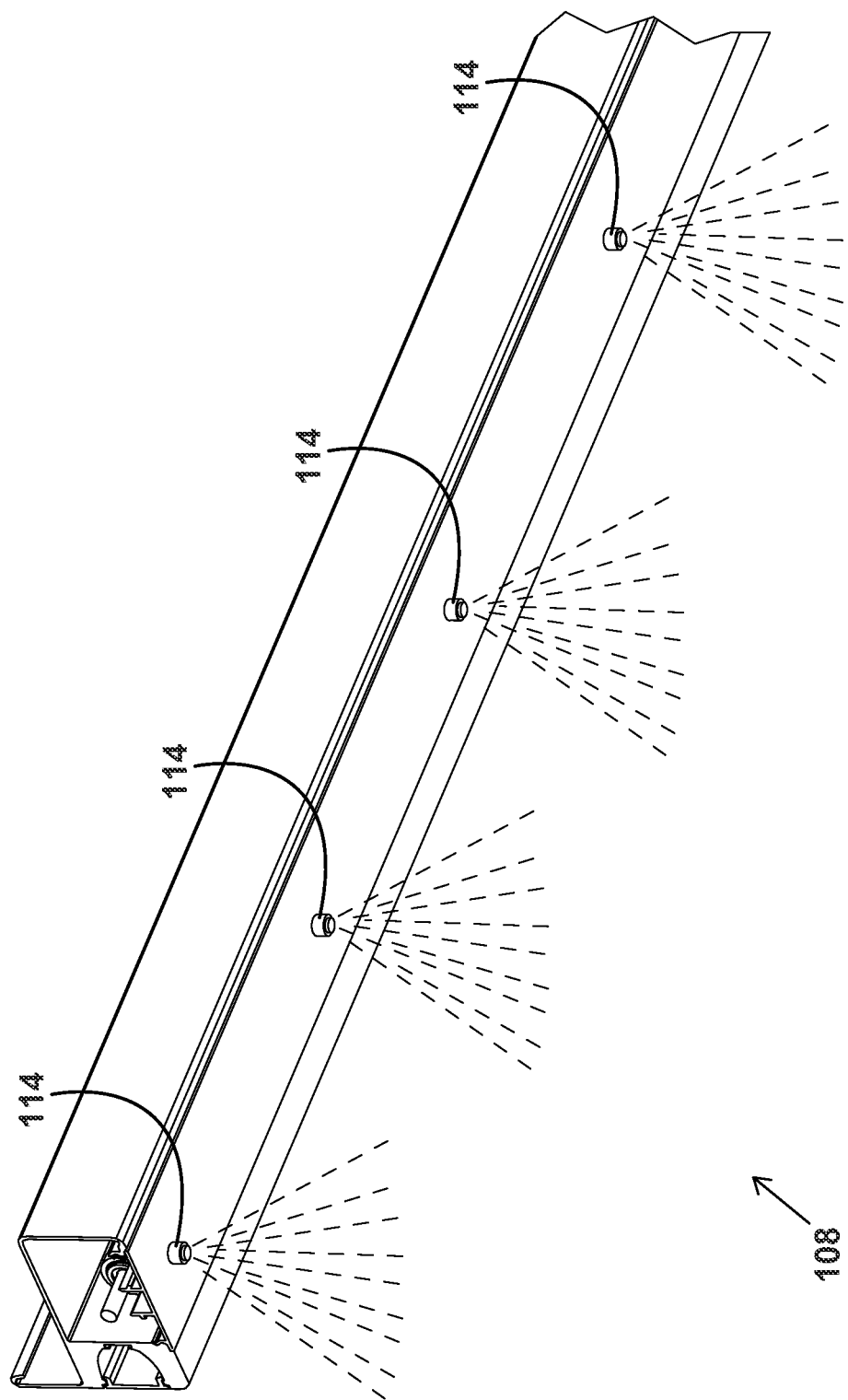

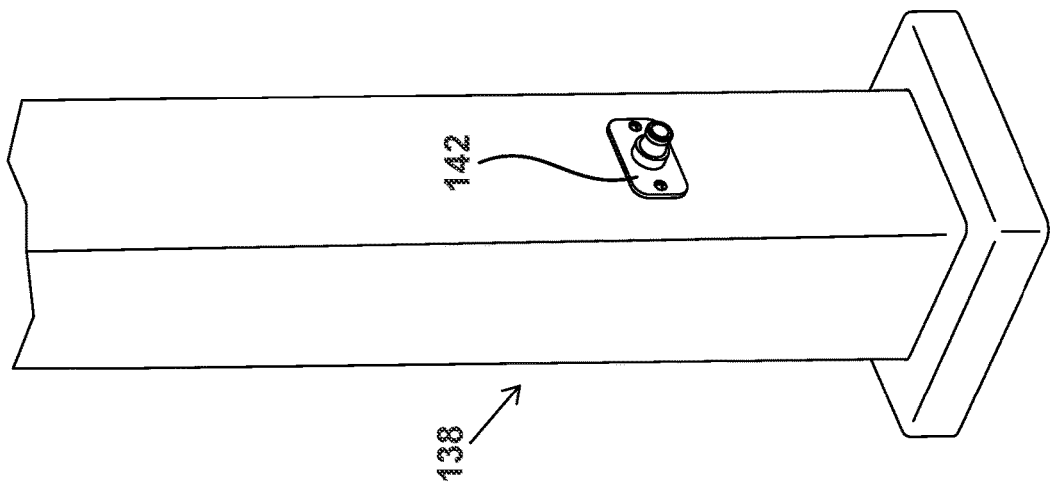
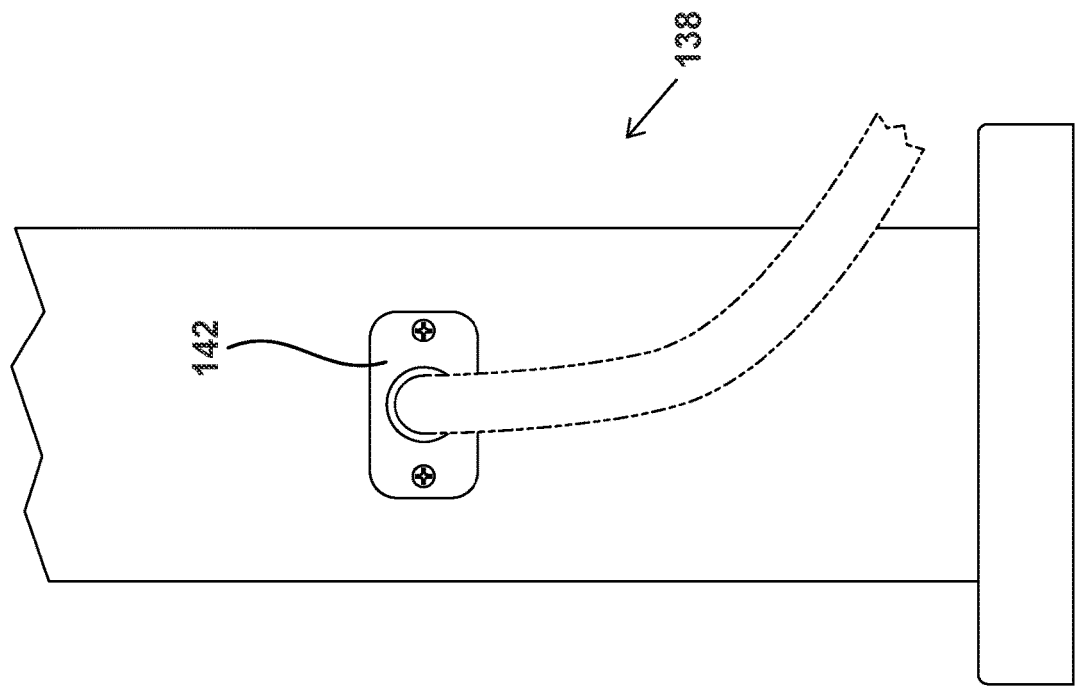

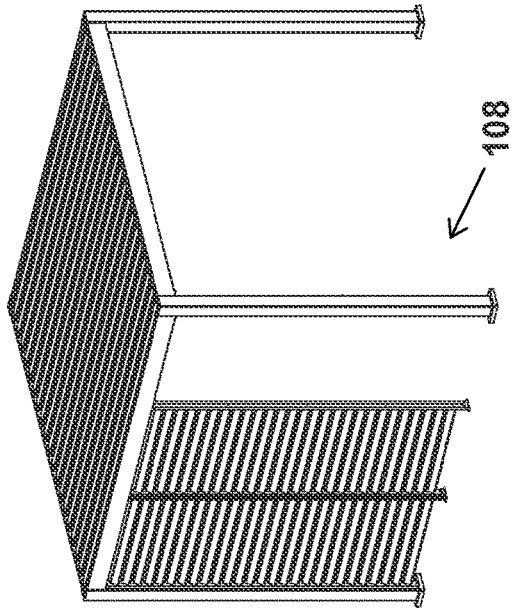
FIG. 127
FIG. 128
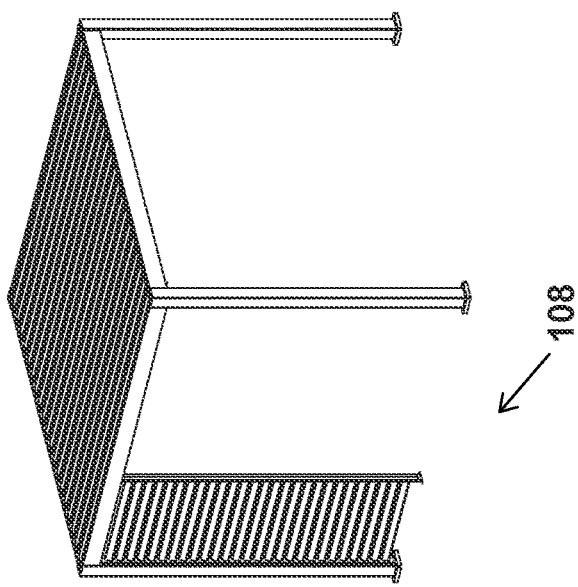
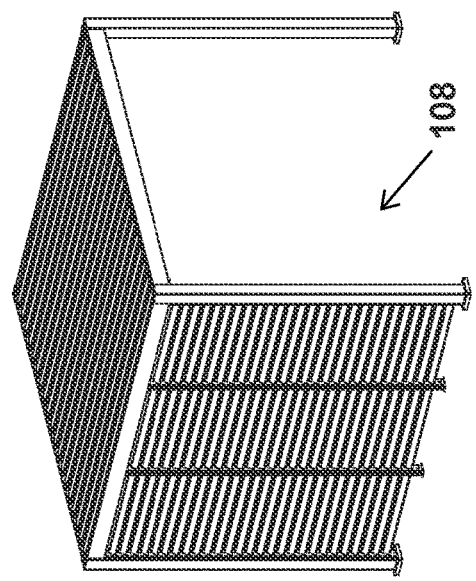
FIG. 129

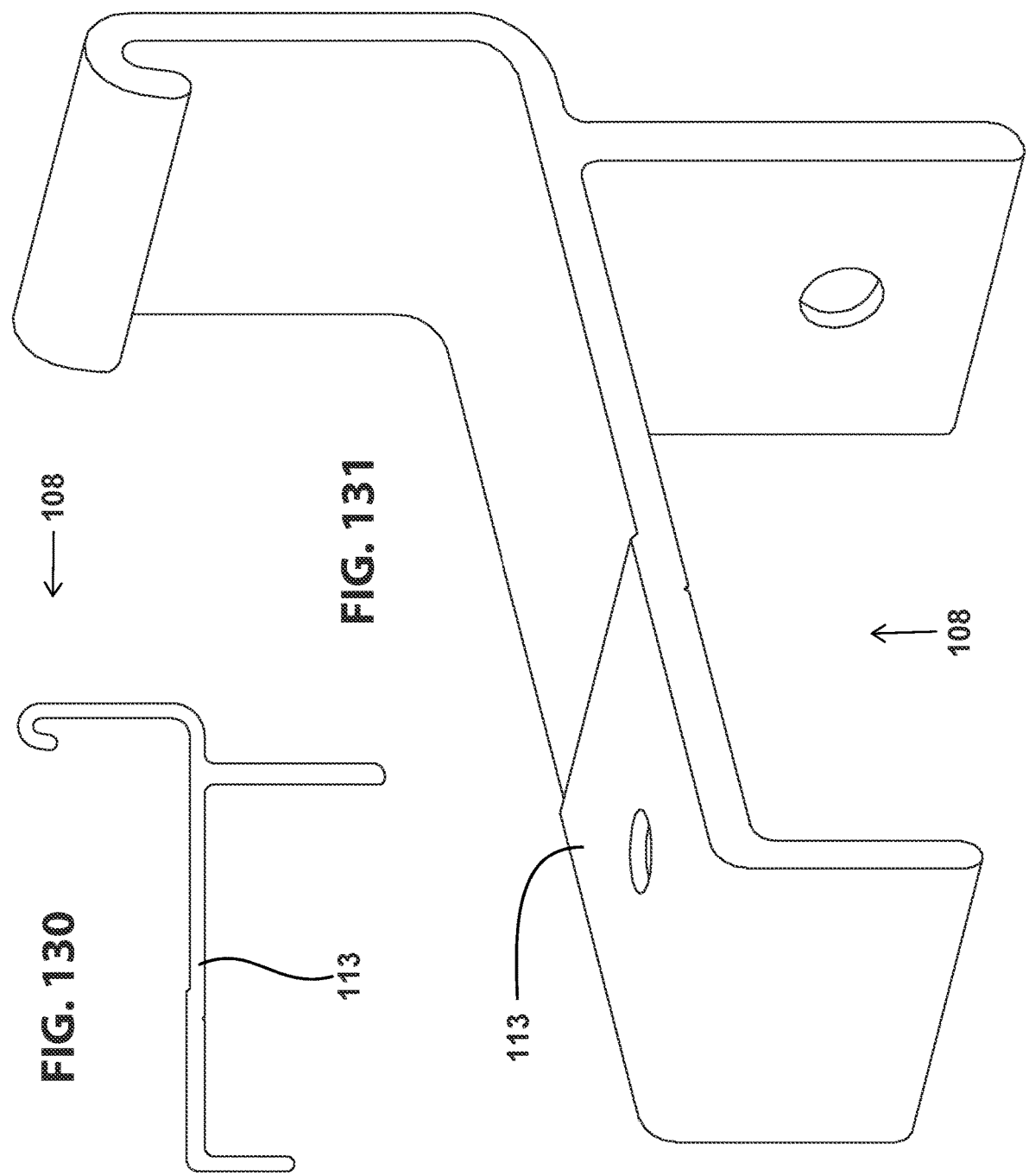

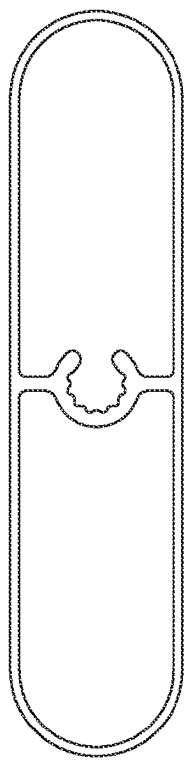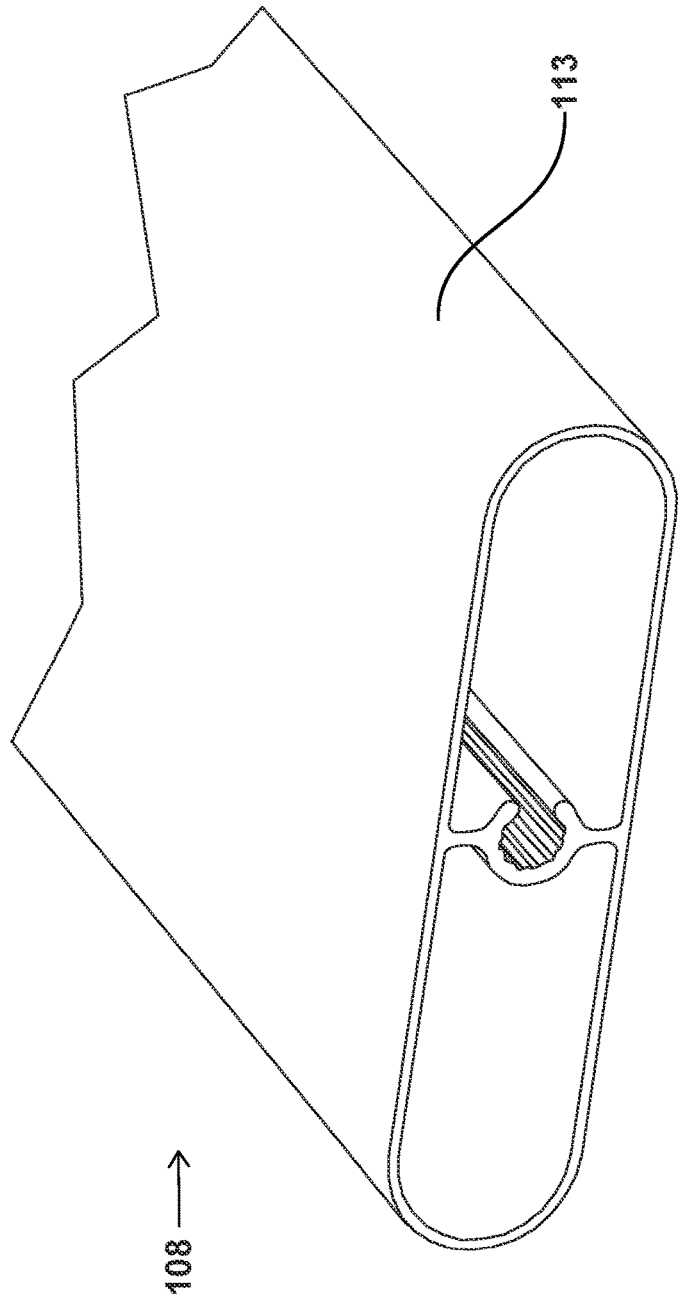

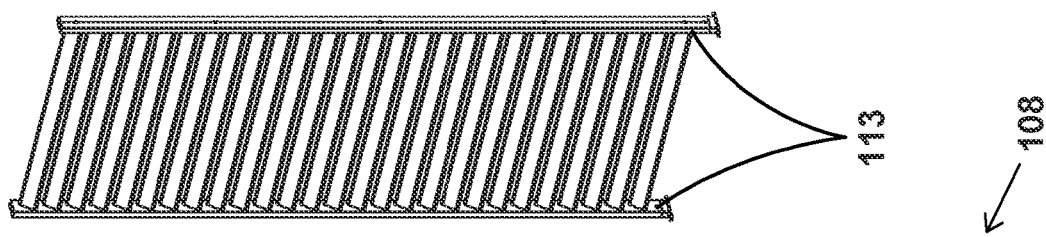
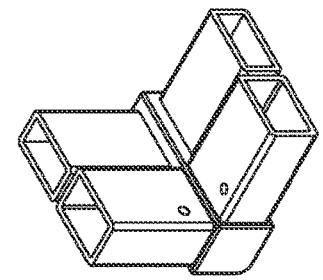
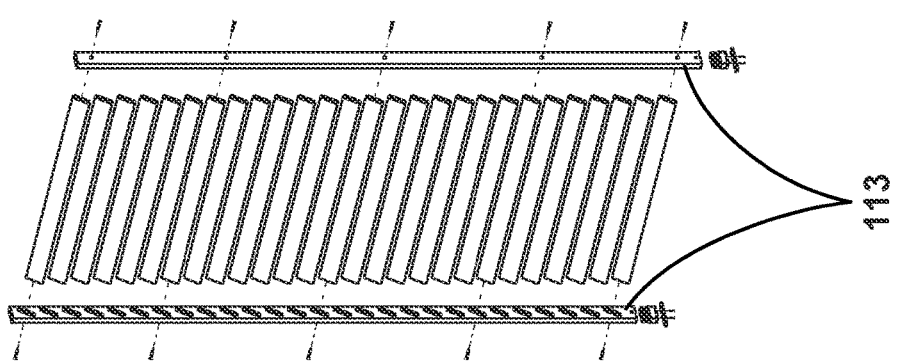

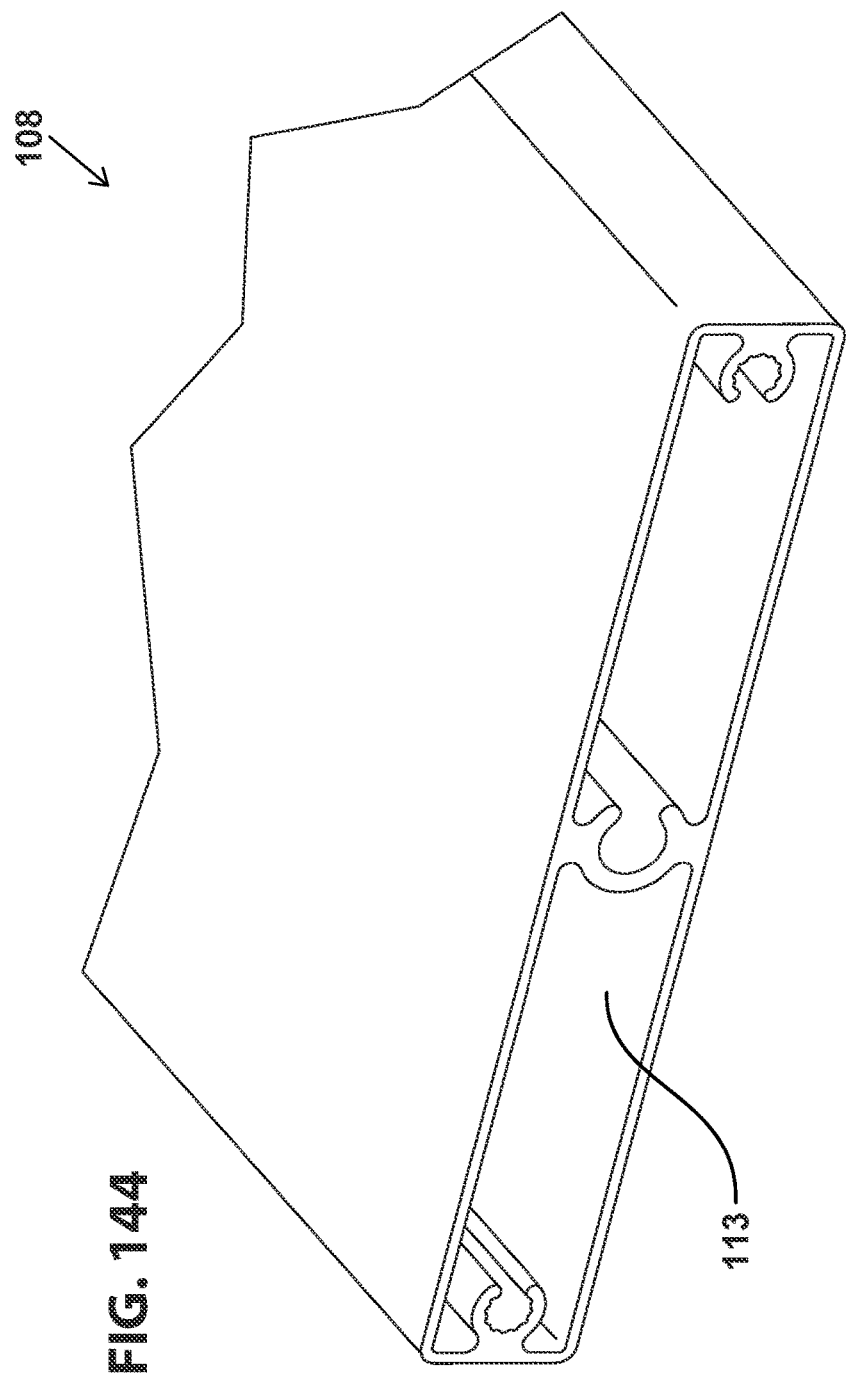
FIG. 143
FIG. 144

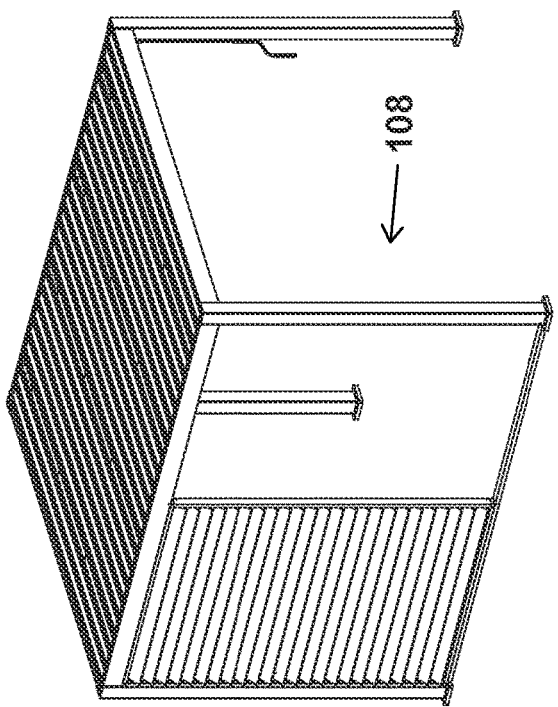
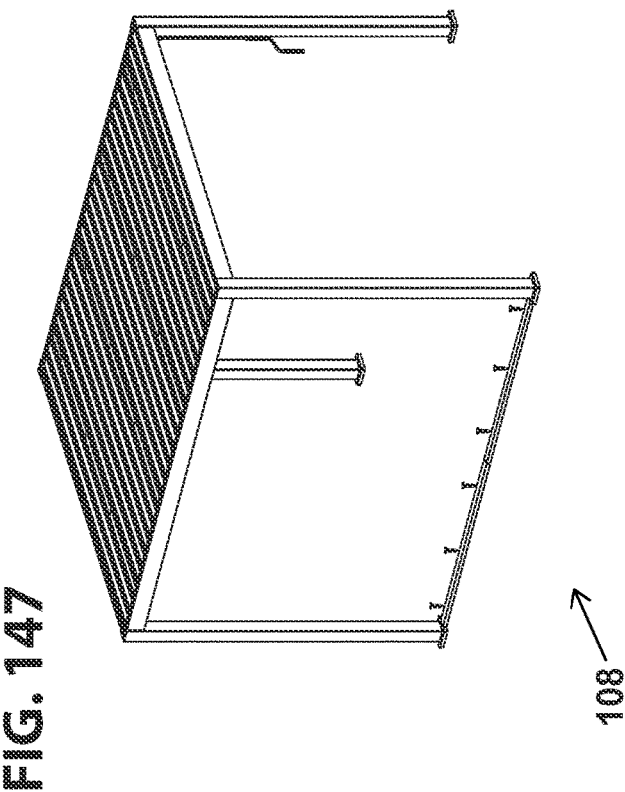

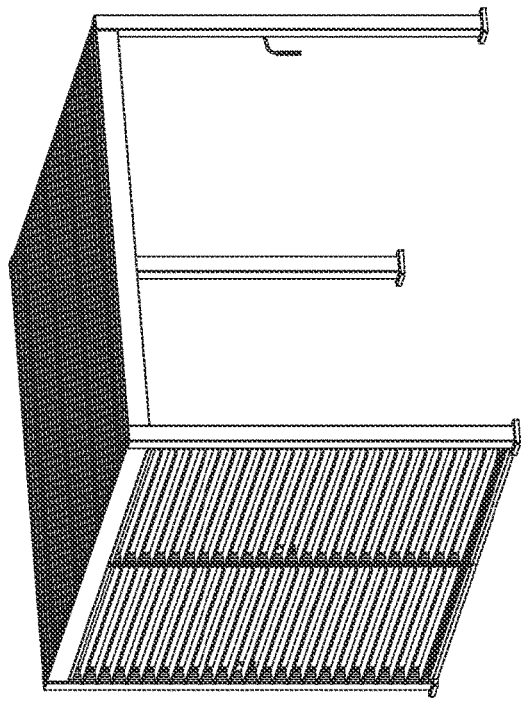
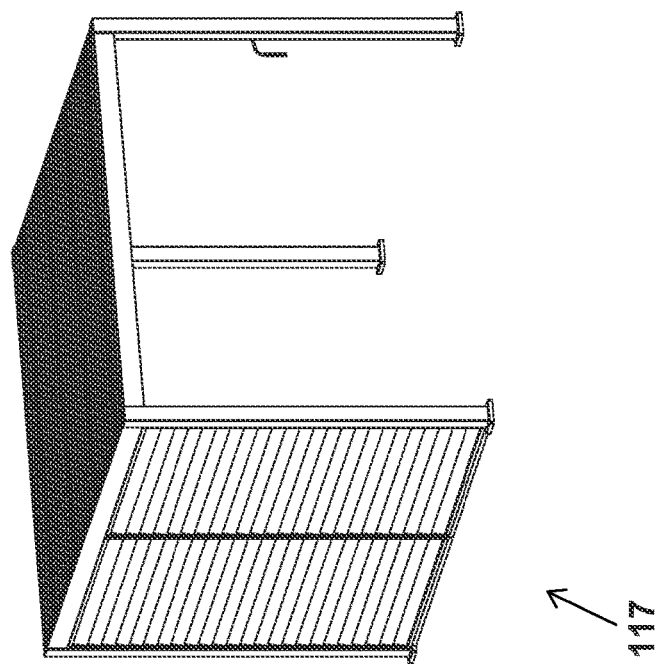

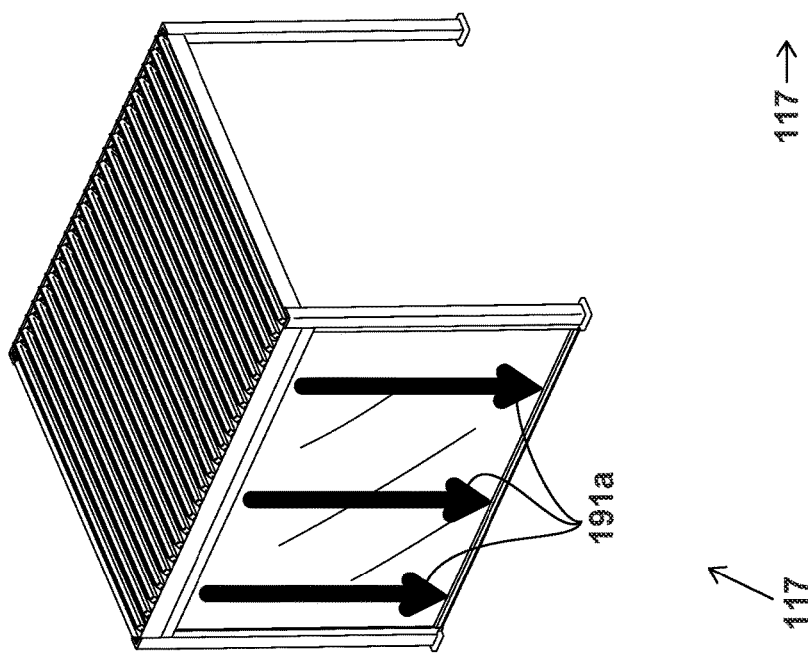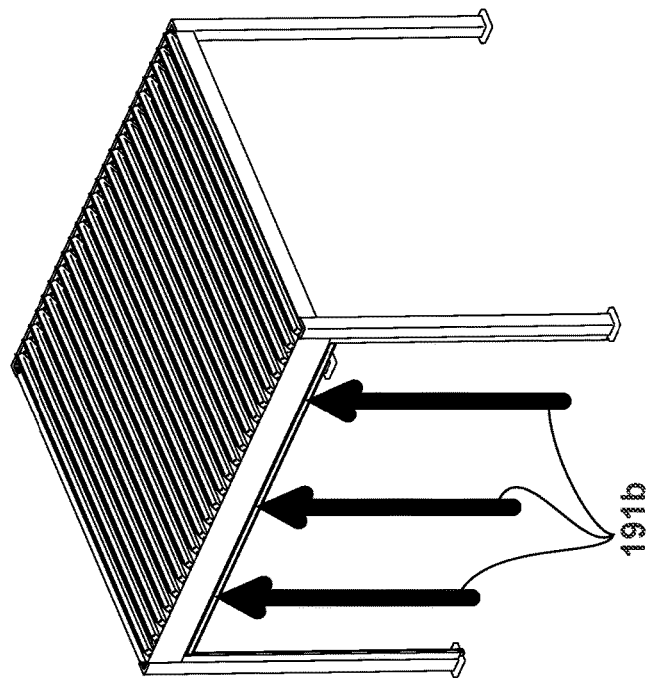

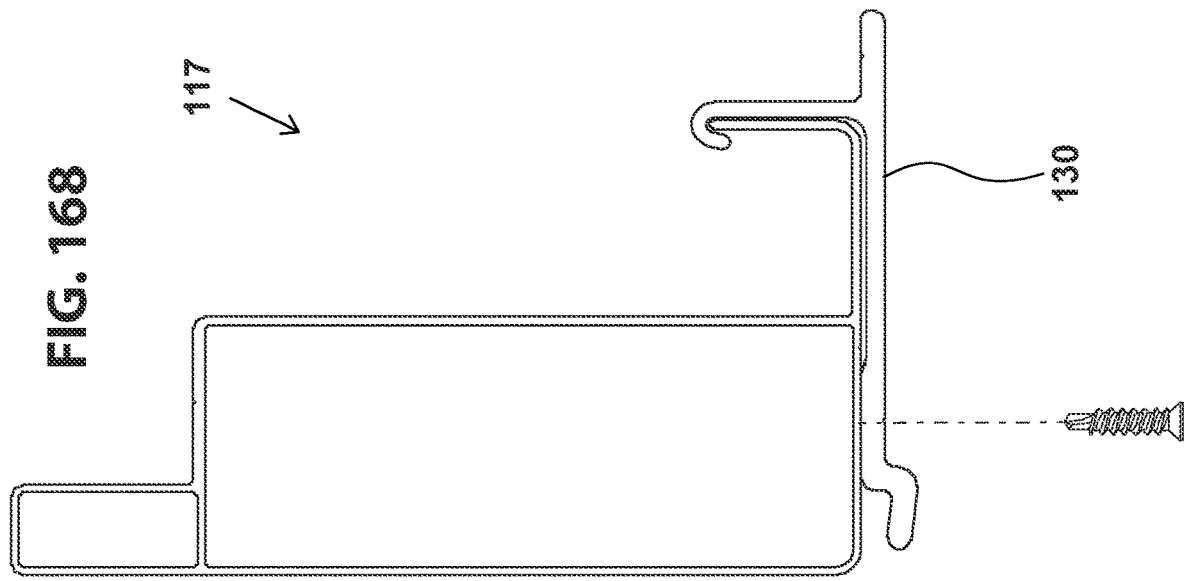
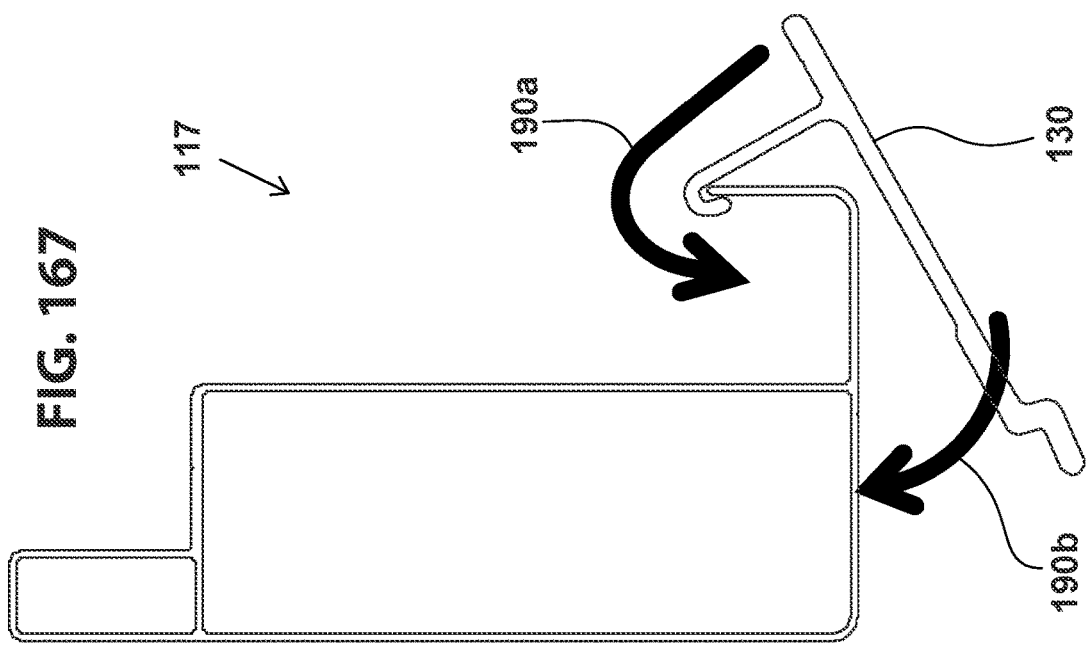

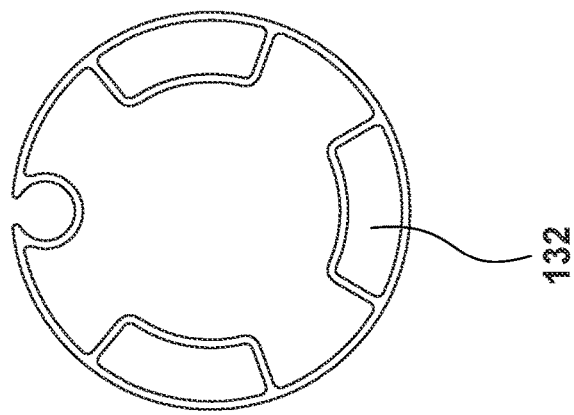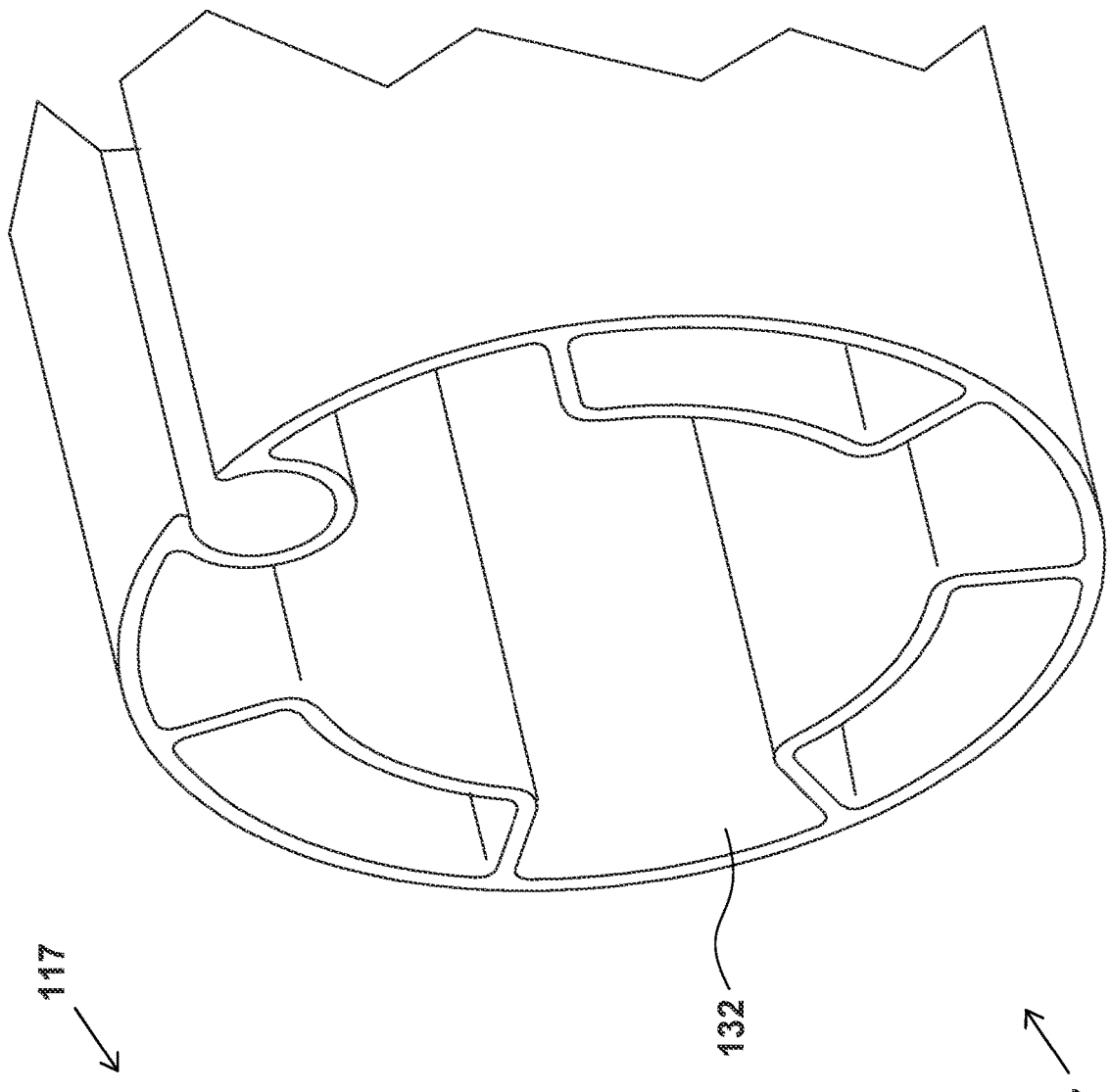

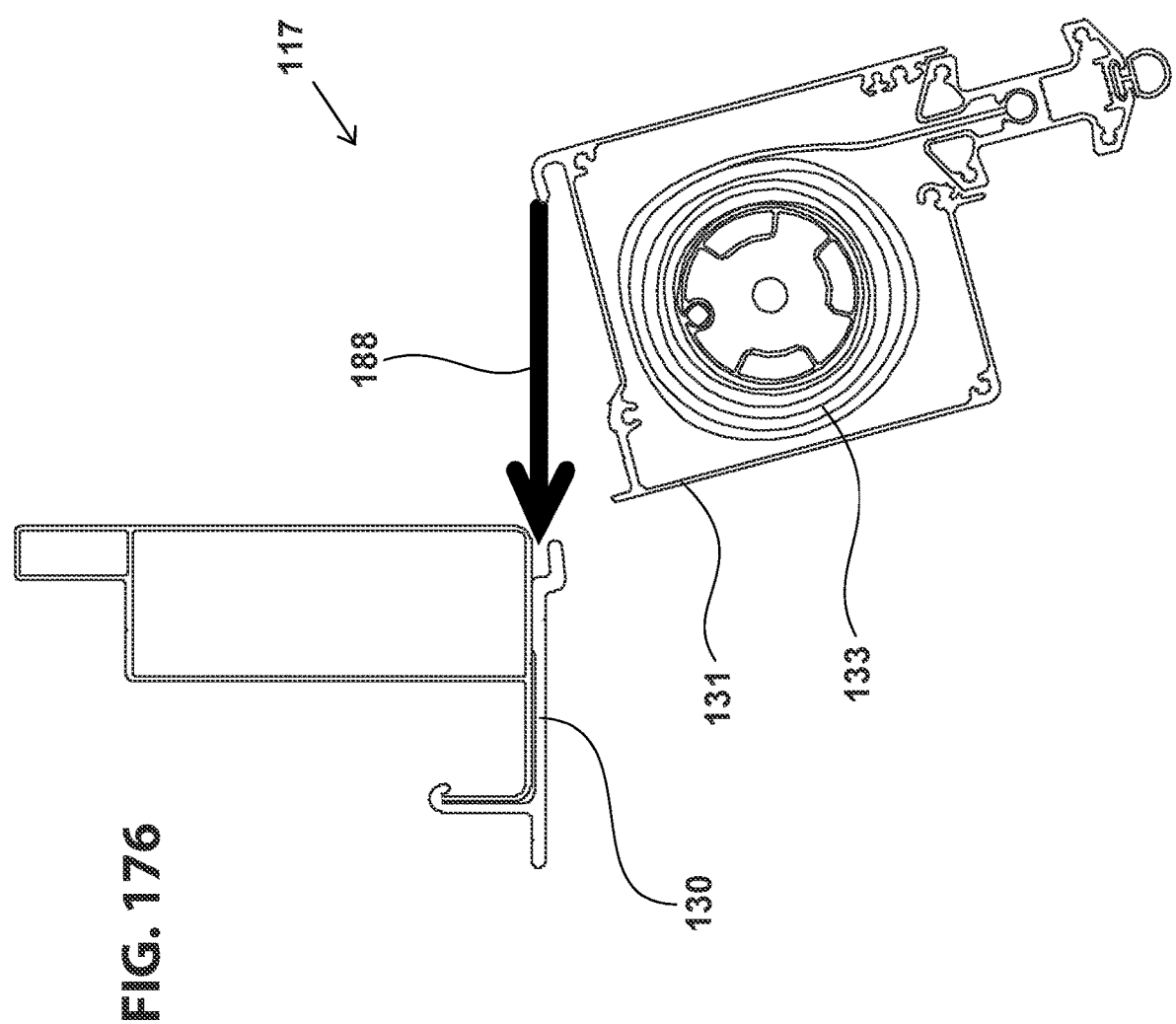

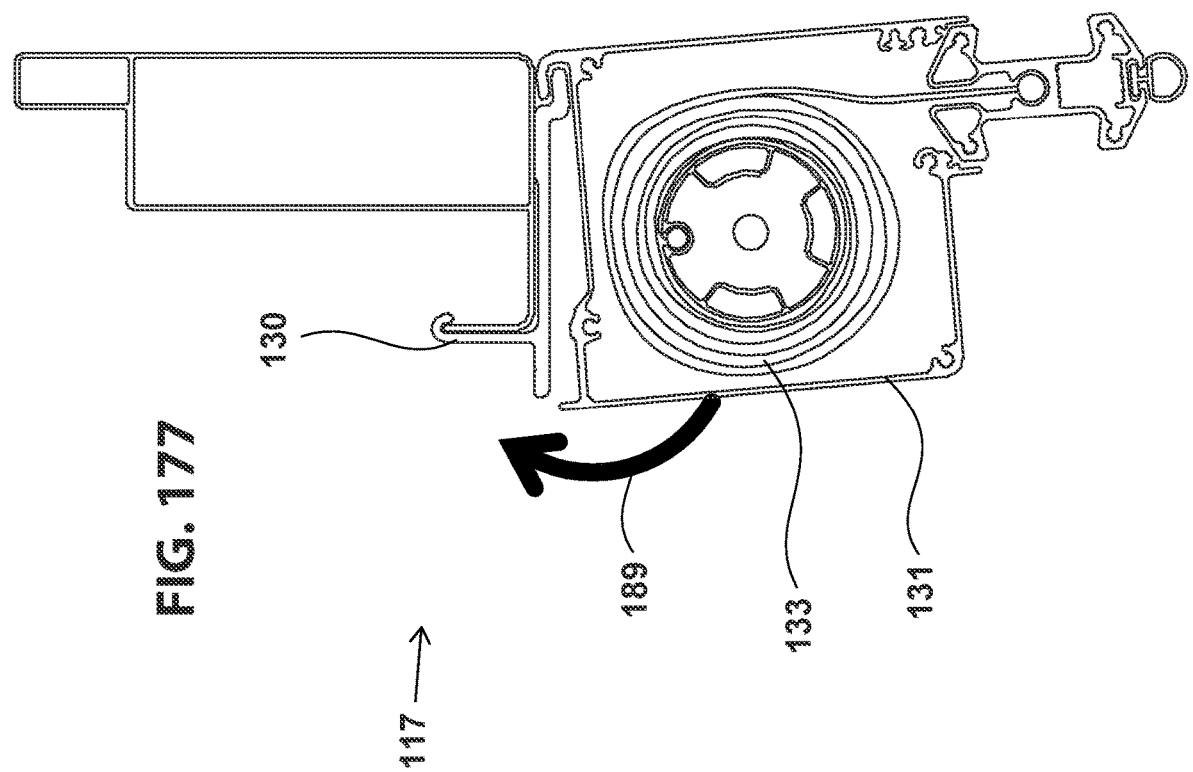

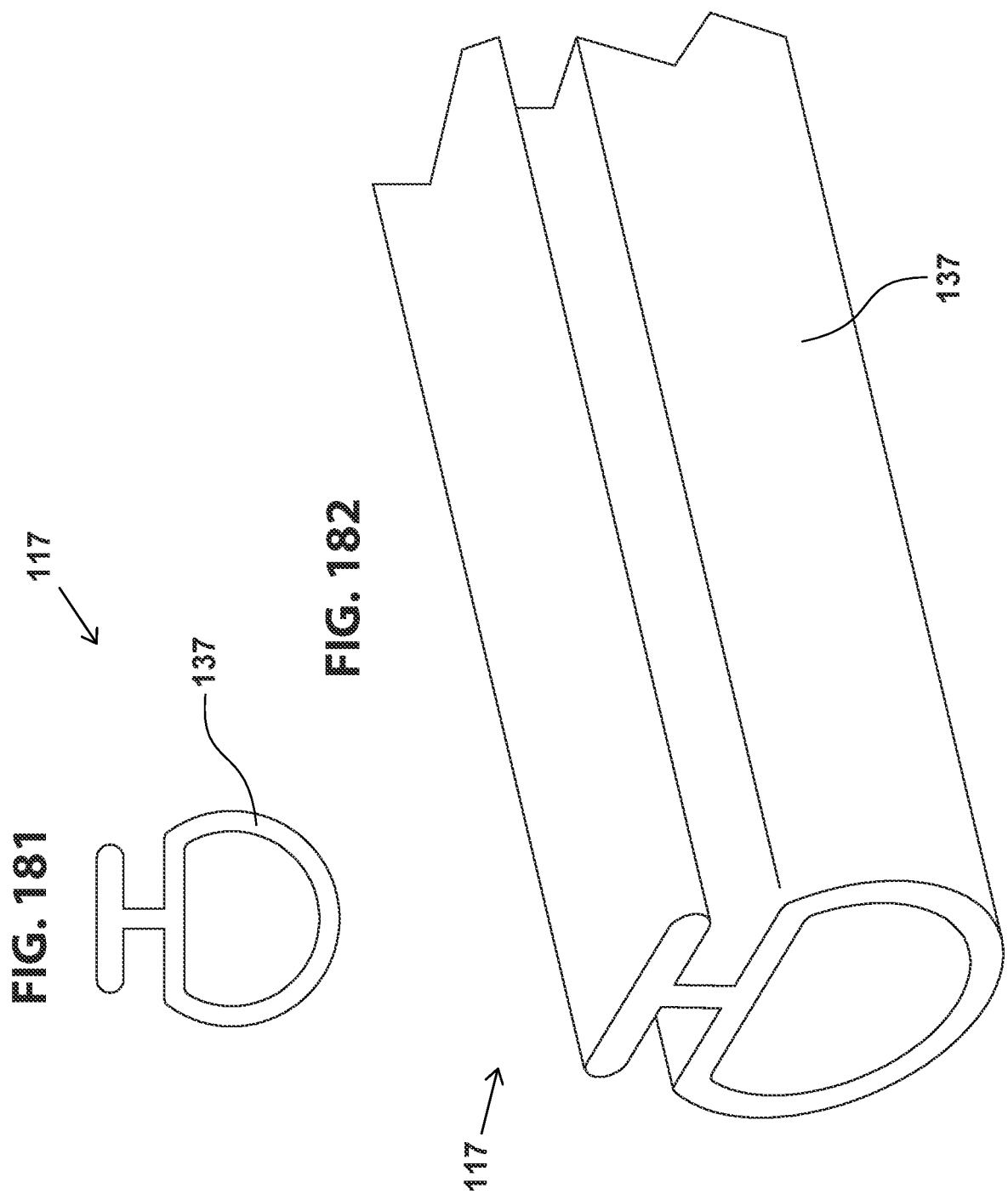

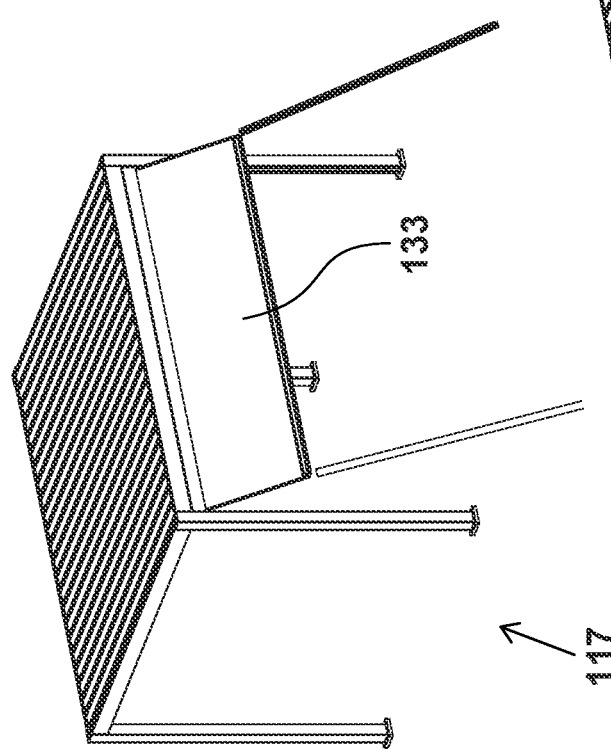
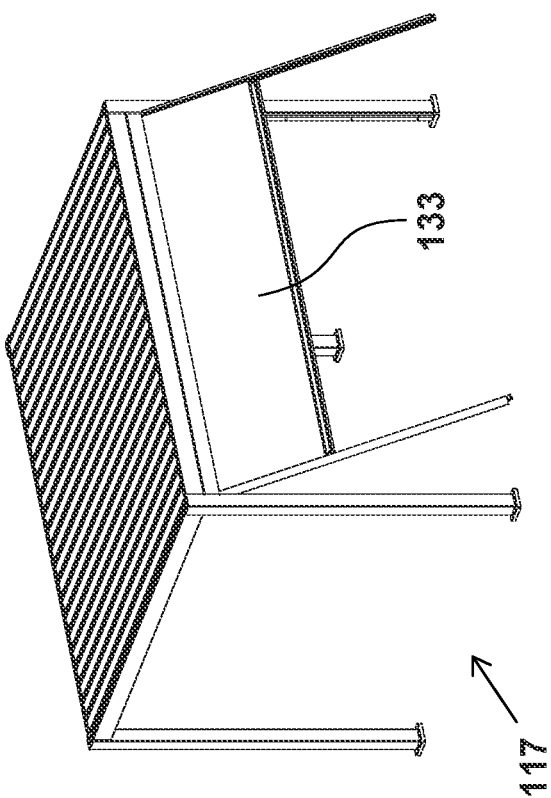

US 11,085,196 B1

FOUR-DEVICE-IN-ONE BLEACHER-SKYBOX FOOD-DEHYDRATOR MOBILE-MARINE-SAUNA WIND-AND-SMOKE-REDIRECTING BUNGALOW

FIELD OF THE INVENTION

The present invention relates to a bungalow, which is economical to produce, is easy to ship as one unit, requires no tools, and can be quickly and easily folded and unfolded. Particularly, the present invention relates to a four-device-in-one bleacher-skybox food-dehydrator mobile-marine-sauna wind-and-smoke-redirecting bungalow, comprising:
1) Rainwater-sealing-and-shedding multi-position-adjustable solar-panel-led-lighting multi-louver-blade-roof system(s),
2) Multi-function discrete rainwater-channeling-and-collecting mist-cooling multi-accessory-attaching gutter-beam system(s),
3) Privacy-enabling wind-and-smoke-redirecting insect-protecting water-mist-cooling horizontal-and-vertical-sliding-door-securing cold-weather-insulating weather-sealing food-dehydrating bleacher-skybox-capable mobile-marine-sauna-capable forge-fire-stoking louvered-window-and-barrier system(s), and
4) Adjustably-leveling rainwater-draining-legs-and-base system(s).

DESCRIPTION OF THE PRIOR ART

A number of bungalows have been introduced.

U.S. Pat. No. 3,741,102, issued 1970 Sep. 28, to S Kaiser, demonstrates a unit for ventilating an enclosure such as a poultry or livestock house is disclosed and claimed herein and includes a rectangular frame mountable within a framed opening in a wall of the enclosure for defining an air inlet opening. Negative pressure is created within the enclosure by suitable exhaust fans mounted therein and causes the flow of fresh air to pass through the inlet opening. The direction of this fresh air is controlled by a plurality of elongated adjustable louvers mounted to the frame, while a sliding door assembly independently controls the amount of air which passes through the inlet opening.

U.S. Pat. No. 3,884,414, issued 1974 Apr. 8, to Stephen C Baer, demonstrates an apparatus for maximizing the transfer of solar energy to the interior of a structure and minimizing heat loss therefrom. The apparatus includes at least one louver panel forming a portion of the exterior of the structure, the louver panel being pivotable about an axis passing through its center of gravity to open the panel. An interior reservoir is fixed to the interior surface of the panel so that the weight of the interior reservoir biases the panel in one direction to open it. An exterior reservoir is fixed to the exterior surface of the panel so that the weight of the exterior reservoir biases the panel in the opposite direction to close it. A tube provides fluid communication between the two reservoirs. A partially vaporized volatile fluid such as freon occupies the tube and the reservoirs. The relative proportions of liquid and vapor in the respective reservoirs are dependent upon the relative vapor pressure in the reservoirs, which is directly proportional to their temperatures.

U.S. Pat. No. 4,038,781, issued 1976 Mar. 19, to Richard W. Graham, demonstrates a louver assembly has a plurality of louver blades and pivot shafts pivotally supported for adjustable movement between open and closed position in a frame which includes two opposed vertical side frame members. A jamb seal between each side frame member and the adjacent ends of the louver blades prevents air flow around the ends of the blades when the blades are closed. Each jamb seal includes a panel installed between a side frame member and the transverse louver blade ends facing that side frame member. Each panel includes a rigid but flexible, substantially flat, face portion adapted for flush contact with the blade ends when the blades are closed, and two outer and two inner elongated rigid supporting ribs integral with respect to the face portion and extending away from that side of the face portion opposite the blades. Transverse slots are provided halfway through the panels to receive the louver pivot shafts as the panels are installed by sliding them between the blade ends and the side frame members.

U.S. Pat. No. 4,099,346, issued 1976 Jul. 27, to Nobujiro Isono, demonstrates a roof in which plurality of louver-type roof plates are designed to be opened and closed by means of a reciprocating connecting rod pivoted to cranks secured to said roof plates. A ratchet gear mechanism is mounted to connect with the said connecting rod through a crank shaft so that the said ratchet gear may rotate tooth by tooth to adjust the roof plates stepwise between a fully open and a fully closed condition. An accommodation for draining rainwater from the roof is disclosed, as are several designs of roof plates.

U.S. Pat. No. 4,518,012, issued 1982 Aug. 23, to Robert J. O'Hara, demonstrates an air damper assembly has a frame which is mounted on the walls of an air flow passageway, with flanges extending inwardly from at least one pair of opposed sides of the frame. A plurality of elongated damper blades have their opposite ends extending into pairs of opposed slots formed by the frame flanges, pivotally supporting the blades on the flanges for pivoting movement between open and closed positions. A pair of retaining stop means are associated with each end of each blade. These retaining stop means project outwardly from opposite sides of the blade and on opposite sides of each of the flanges for limiting pivoting movement of the blade to an open position and for retaining the blade in the respective slots in the flanges. The main body portion of each blade limits pivoting movement of the blade to a closed position by engaging opposite sides of the flanges on which the blade is pivotally supported.

U.S. Pat. No. 4,527,355, issued 1983 Feb. 24, to Hajime Numakami, and Hideyuki Kuroda, demonstrates an opening and closing type louver device comprising a louver in which a number of blades are arranged in a row in a required spaced relation on rotating shafts within a frame. Each blade is opened and closed by a driving mechanism while maintaining their parallel relation. A mounting construction of said blades and an opening and closing type louver device which can prevent slip of a ratchet as a driving mechanism to simply and accurately adjust engagement between the blades.

U.S. Pat. No. 4,541,214, issued 1985 Sep. 17, to Daryl J. Lambert, demonstrates a pergola having a top comprising a plurality of wooden strips aligned in parallel relationship with a bottom planar face inclined to the mutually parallel side faces so as to provide a support orientation easily determinable and effective to provide differential shading from the sun by reason of the change in inclination of the sun during the seasons of the year.

U.S. Pat. No. 4,825,921, issued 1989 May 2, to Steven M. Rigter, demonstrates a screen assembly which is provided having a web or sheet of material and a pair of spaced opposed elongate strengthening and supporting elements. A respective supporting element is secured to or formed along an edge of the material and each element is made from a relatively thin resilient non-extensible material. The assembly includes two opposed guide rails relative to which a respective element is received and guided for movement. The assembly includes a take-up roll on to and from which the material may be retracted and withdrawn.

U.S. Pat. No. 5,020,423, issued 1990 Jul. 20, to James R. Hill, demonstrates a rotating blade damper for an air handling system, the damper having a perimetrical frame and a blade or a plurality of blades each of which is rotatable with respect to the frame between a flow permitting position and a flow blocking position. Each blade is biased toward its flow blocking position but is normally retained in its flow permitting position, for example, by a fusible link. A stop and lock mechanism is provided to stop each blade in a predetermined open or flow permitting position and to securely lock or latch each blade in its closed or flow blocking position. The stop and lock mechanism includes a disc segment which is carried by a blade rod, at a location outside of the damper frame, and a slide plate which is positioned between the damper frame and the disc segment. The slide plate is slidable with respect to the damper frame and the blade rod between a first position, corresponding to the open position of the blade.

U.S. Pat. No. 5,099,905, issued 1992 Mar. 31, to Steven M. Rigter, demonstrates a screen assembly comprising a roll carrying screening material such as flyscreen material, a pair of guides at opposite sides of said roll and receiving opposite edges of said material and a strengthening element fixed for movement with the screen material and extending parallel to the roll, the strengthening element being formed of thin resilient non-extensible material. The element has an arcuate cross section to enable it to be rolled up onto the roll and apertures or slots at either end for engagement over guide tracks in the opposite guides.

U.S. Pat. No. 5,133,398, issued 1992 Jul. 28, to Anthony Yang, and Victor Yang, demonstrates a shutter assembly which requires minimal storing space substantially comprises a plurality of transparent or glass slats which form a shutter by being vertically suspended one after another, a storage case storing the slats in a stacked condition, the storage case being mounted on an upper part of an entrance of a building, a plurality of slat connecting devices each of which perpendicularly connects the bottom end of any succeeding slat to the upper end of any preceding slat, and brake means for applying braking force onto any one of the slats for enabling the shutter to stop at any desired height from the floor of the building. Accordingly, the shutter can be automatically stopped at any desired position from the ground or floor level thus assuring the safety of the user.

U.S. Pat. No. 5,267,414, issued 1992 Jul. 13, to George Vaida, demonstrates a louver assembly is provided which includes a frame having vertical side jambs, a head, a sill, and a central opening. A plurality of vertically-spaced, substantially-straight horizontal louver members extend across the opening between the side jambs, with each of the louver members including a closing section and an actuating section. A pivot member located between the closing section and actuating section extends across the entire louver member to provide structural strength and reinforcement of the louver members. Actuating means are attached to the actuating section of each of the louver members for actuating them between open and closed positions. Finally, the louver members are pivotally mounted off center, with the closing section being larger than the actuating section. The closing section only is exposed to the exterior, such that exterior wind conditions tend to close the louver members more tightly.

U.S. Pat. No. 5,306,210, issued 1991 Aug. 15, to Dirk V. Z. Smit, demonstrates a louvre type roof structure including a plurality of parallel slats mounted on carrier beams extending transversely to the slats, in which the slats are mounted on carrier elements which are in turn mounted on the carrier beams to permit pivotal displacement of the carrier elements and of the slats between a closed position in which they are disposed in a roughly coplanar position, and an open position in which they are disposed in spaced apart parallel planes. The carrier elements are secured to the slats by means of lugs engaging the slats without penetrating the slats. The carrier elements are mounted on the carrier beams by mounting levers, a pair of mounting levers being provided in respect of each carrier element, one of a pair of levers being a fixed lever and being secured to the carrier beam in a fixed position, and the other one being a free lever and being displaceable relative to the carrier beam.

U.S. Pat. No. 5,669,179, issued 1997 Sep. 23, to William S. Hanlon, demonstrates an improved louvered apparatus for the regulation of solar light and heat radiation through windows and the like, is disclosed. The unique configuration of the present invention is innovative, simple, and a considerable improvement over the conventional louvered apparatuses. Some of the various features of the present invention, which are described, herein, include precise very low frictional operation, apparatus is maintenance free, a compact design, uncomplicated fast two-bracket installation, available in the standard manual, or optional remote electronic actuation, and apparatus has been designed to be manufactured inexpensively.

U.S. Pat. No. 5,732,507, issued 1998 Mar. 31, to Gregory Edwards, demonstrates a louvre for a louvre assembly comprises a profile having a plurality of optionally useable pivot mounting positions each of which is selectively adapted to be utilized to mount the louvre in an assembly of adjacent louvres. Anyone of the remaining pivot mounting positions is selectively adapted to be utilized to control the pivotable orientation of the louvre in the assembly. Each louvre comprises an up-turned lip at one edge thereof and an down-turned lip at the other edge thereof. These lips serve to prevent ingress of water to the area below the assembly which forms an openable roof structure. An alternative louvre comprises a pair of like formed, elongate, resilient surface profile sections, each having disposed at opposed lateral edges thereof mutual interengagement means, which upon flexure of the respective sections during assembly results in interengagement of the sections. A prefabricated core having tapered or otherwise lateral edges is located between the surface profile sections.

U.S. Pat. No. 6,378,262, issued 2002 Apr. 30, to Robert Mercadante, demonstrates a louvered window insert comprising two louvered frame sections, each having one vertical member with an upper and lower horizontal member extending from each end thereof and a plurality of louver blades extending horizontally therebetween. The distal ends of the horizontal members and louver blades of the first section have recesses to receive and slidably secure the horizontal members and louver blades of the second section as they travel therethrough allowing a user to size the insert to a window simply by placing the fully overlapped assembly inside an open window and separating the two frame sections thereby reducing the overlap of the horizontal members and the louvers and effectively elongating the insert until the two vertical members are flush to their respective side jambs and then lowering the window until it sits atop the present invention. An additional embodiment is provided wherein the louver blades are generally flat with blade 46 having curved edges for receiving blade. An additional embodiment disclosed a storm window frame adapter along with a storm window track adapter. Also, a tensioning means is provided for securing the upper and lower horizontal frame members to each other.

U.S. Pat. No. 6,820,385, issued 2004 Nov. 23, to Jack Horn, demonstrates an exterior window shutter that is made of thermoplastic resin, has functional louvers, but is still hurricane resistant. The shutter includes a perimeter framework that is adapted to receive a transparent impact resistant member. This impact resistant member is permanently affixed to the perimeter framework to increase structural stability. Additionally, this invention provides a method to make a high strength and structurally stable hurricane resistant louvered shutter.

U.S. Pat. No. 7,335,096, issued 2004 Aug. 23, to Haim Perez, and Emanuel Razon, demonstrates a louver type roof structure includes a plurality of elongated parallel slats mounted on slat hinges pivotally supported on carrier beams transverse to the slats. The slats are pivotable between a closed position in which their longitudinal adjacent edges overlap each other, and an open position in which the slats are spaced apart. The slat hinges are mounted to the slats at their lower surface and allow pivoting of the slats between the closed position and an extreme open position by an angle of at least 90°, preferably 110°. The pivoting axis of the slat hinge is disposed substantially under the longitudinal edge of the slat which is overlapped by the adjacent slat. The roof structure may comprise a border slat adapted to be displaced when urged by an adjacent slat when the latter pivots towards its extreme open position.

U.S. Pat. No. 7,900,417, issued 2011 Mar. 8, to Richard Leines, demonstrates a pergola system which employs tap-lock pin that readily attaches to a beam. The beam is encapsulated, preferably by vinyl extrusions, which allow horizontal strips to easily engage opposing end of the tap-lock pin. Clips with protruding tap-locks are secured to a substrate, allowing horizontal strips with ledges to be engaged with the protruding tap-locks to provide an easily installed pergola shade structure. A shroud or coupler allows expansion so that a plurality of pergola kits can be assembled together and so that a homeowner or do-it-yourselfer can install, alter, or retrofit the pergola(s) with minimal effort and direction.

U.S. Pat. No. 8,061,106, issued 2011 Nov. 22, to Gordon Clark, demonstrates a system of structural elements for a pergola structure including vertical posts supporting a roof formed of carrying rails supported by the posts and cross rails supported by the carrying rails. Each post includes a post core element, a post shell enclosing the post core element, and a post shell adapter. Each carrying rail adapter mounts a carrying rail to a post and includes a post core interior adapter joined with a single or dual carrying rail retainer, and each rail connector mounts a cross rail to a carrying rail. The elements may further include shell extensions and beam filled rails comprising a rail shell and a reinforcing beam insert.

U.S. Pat. No. 8,413,389, issued 2013 Apr. 9, to Alessandro Frigerio, demonstrates an openable covering construction for pergolas and verandas, characterized in that said openable covering construction comprise a plurality of adjoining and partially overlapping bands longitudinally mounted on a supporting frame by a driving system allowing each said bands to be rotated about a longitudinal axis thereof parallel to a sloping side of said covering construction, said driving system driving said bands to at least two positions, a closed position, thereat said bands are partially overlapped onto one another and substantially parallel to the covering construction plane, and an opened position thereat each said band is rotated to a substantially vertical condition with respect to said covering plane, each said band comprising a section member including a contoured surface including, at a side thereof, a perpendicular side wall and, at an opposite side thereof, a channel defining curved wall, thereby a surface directly exposed to rain of said covering construction forms a water collecting and disposal of channel.

U.S. Pat. No. 8,684,553, issued 2014 Apr. 1, to Chi Gon Chen, demonstrates a solar powered lighting fixture having a multi-paneled solar array that maximizes the generation of solar energy during the course of a day. The outdoor lighting fixture of the present invention includes a multi-paneled solar array housing positioned on an extension rod that includes a plurality of solar panels arranged in a slanted configuration about the periphery of the housing unit. The housing unit is positioned on the extension rod so as to be elevated above the ground but below the actual light fixture. Employing a housing unit separate from the light fixture permits a greater variety of shapes to be used for the light fixture. Moreover, it allows the individual solar panels to be positioned at an optimal angle for maximizing exposure to solar radiation. Each of the solar panels is independent of the others, charging the battery separately so as not interfere with the other solar panels.

U.S. Pat. No. 8,944,132, issued 2015 Feb. 3, to Kevin Floyd, demonstrates a mounting fixture that can be mounted horizontally, with a retractable privacy screen on a spring mounted roller, wherein the fixture comprises a first surface and a second surface, wherein the first surface and the second surface are movingly engaged to open and close, wherein the roller is attached to the first surface, wherein the screen has an extended upward position and a retracted downward position wherein an extension member is attached to the shade and the first surface so that when the member is extended the screen is moved vertically to the extended upward position, and when the member is retracted, the screen is moved to the retracted downward position. The spring loaded roller keeps tension on the screen which prevents the extended screen from being unstable or floppy.

U.S. Pat. No. 8,978,313, issued 2014 Apr. 4, to Antonio Pilla, demonstrates a roofing apparatus for deflecting precipitation comprises a first roofing panel movable between a retracted position and an extended position. The roofing apparatus further comprises an electrostatic charging device configured to selectively apply an electrostatic force to the first roofing panel to cause movement of the first roofing panel between the retracted position and the extended position. In another example, a method for deflecting precipitation comprises the steps of providing a first roofing panel biased by gravity and applying an electrostatic force to the first roofing panel to cause the first roofing panel to move between a retracted position and an extended position against the bias of gravity.

U.S. Pat. No. 9,157,270, issued 2015 Oct. 13, to Christopher J Hall, demonstrates a shutter for protecting an opening. The shutter comprising a plurality of horizontal curtain slats for covering the opening, wherein horizontal refers to a direction when viewing slats from a front surface, and wherein the curtain slats hang freely from a upper region of the opening; an upper transition slat movably affixed to a lower end of a first curtain slat; a lower transition slat movably affixed to an upper end of a second curtain slat; and a horizontal reinforcing member comprising at least an upper and a lower reinforcing slat, wherein the upper reinforcing slat is rotatably affixed to a lower end of the first transition slat and the lower reinforcing slat is rotatably affixed to an upper end of the second transition slat, and wherein the upper and lower reinforcing slats are rotatably joined.

U.S. Pat. No. 10,238,191, issued 2019 Mar. 26, to Jaffer Shurie, demonstrates an umbrella with environmental control systems which uses an environmental control system, an electrical control system (ECS), and a fluid delivery system to modify the local environment beneath the umbrella's canopy. The environmental control system has multiple spray nozzles, multiple fans, and multiple heating elements. The spray nozzles mist water onto the user, the fans blow air onto the user, and the heating elements heat up the air beneath the umbrella's canopy. To accomplish this, all of the components of the environmental control system are arranged advantageously beneath the umbrella's canopy. The umbrella has a handle, a support rod, multiple rib members, and a canopy. The support rod acts as a rigid connection channel through which the hoses that connect the spray nozzles to the fluid delivery system run. The ECS is the system that enables the user to selectively activate the various electrical components of the environmental control system.

U.S. Pat. No. 10,316,509, issued 2019 Jun. 11, to Sheldon Grant Jackson, demonstrates a framing system for constructing at least a portion of a building. The framing system comprising beams, cross beams, corner posts, and inline posts. The beams including flanges and a wall arranged between the flanges. The cross beams including a flange and a wall attached to the flange. The corner posts including walls and flanges. The inline posts including flanges and a wall arranged between the flanges. The flanges include slots and the walls include open areas. Panels may attach to the slots. Decorative patterns may be integrally formed in the open areas.

U.S. Pat. No. 10,392,821, issued 2019 Aug. 27, to Dee Volin, demonstrates a four-device-in-one splash-and-drip-eliminating gazebo comprising: a top roof, top-roof columns, top-roof mosquito-mesh panels respectively screwed to the top-roof columns, a bottom roof, respectively screwed to the top-roof columns, rain-water gutters molded to the rain-water gutters as one unit for functioning as gutters and top rails at the same time for collecting rain water to be used for irrigation, splash-drip-eliminating eaves respectively formed at the bottom-roof end of the bottom roof for extending downward into the gutter inside to direct water downward into the gutter inside to eliminate water splash and water drip and for collecting rain water to be used for irrigation, top rails molded to the rain-water gutters as one unit for functioning as gutters and top rails at the same time, the bottom roof screwed to the rain-water gutters and the top rails, corner posts, respectively attached to the rain-water gutters and the top rails, double-U-shaped-end covers respectively slidably coupled with the corner posts for allowing the installation of electrical components on the corner-post inside and for allowing the supply of electricity to the four-device-in-one splash-and-drip-eliminating gazebo from the corner-post inside and for removably covering and protecting electrical components on the corner-post inside, post-locking top-rail slots respectively molded into the top rails for lockably fastening the corner posts to the top rails and for automatically guiding the corner posts into the post-locking top-rail slots, top-rail-locking post slots respectively molded into the corner posts for lockably fastening the corner posts to the top rails and for automatically guiding the top rails into the top-rail-locking post slots to make assembly easier, bottom rails, multi-purpose door frames slidably placed between the top rails and the bottom rails, panels respectively secured to the multi-purpose door frames, H-shaped panel strips respectively secured between the panels, an inner post insertably screwed to the corner posts, a base welded to the inner post, base holes, height-adjustable tube-screws respectively and securably screwed into the base holes for adjusting the height of the corner posts to compensate for uneven terrain and uneven concrete surface and uneven deck surface and for leveling the four-device-in-one splash-and-drip-eliminating gazebo to keep water drainage working properly, anchoring-screw holes respectively molded into the height-adjustable tube-screws, and anchoring screws respectively screwed into the anchoring-screw holes in the height-adjustable tube-screws for securing and strengthening the triangular base and the four-device-in-one splash-and-drip-eliminating gazebo to the ground.

U.S. Pat. No. 10,597,890, issued 2020 Mar. 24, to Ian A. Hill, demonstrates a post base which includes a base member comprising post support wall and a plurality of peripheral side walls extending from the post support wall. The base member further comprises a first tab and a second tab, each extending inward. A plurality of stirrup plates each include at least one slot sized and shaped to receive one of the plurality of tabs of the base member.

U.S. Pat. No. 10,689,848, issued 2020 Jun. 23, to Jean-Louis Castel, demonstrates a device for collecting rainwater in a pergola including posts, a frame with beams and slats, arranged transversely, parallel to each other, the slats being articulated about a substantially median axis and being capable of assuming a substantially vertical position and a substantially horizontal position, manual or motorised unit ensuring the coordinated movements of the slats. The device includes a movable unit, rigidly connected to the slats L.sub.n, including longitudinal deflectors.

U.S. Pat. No. 10,760,280, issued 2020 Mar. 20, to Lianzhang Pan, demonstrates an outdoor shelter and a rail system for the outdoor shelter are described herein. The outdoor shelter includes at least one pair of support post members, each pair of support post members including a first support post member being spaced apart from a second support post member; a first guide rail member coupled to the first support post member; a second guide rail member coupled to the second support post member; and a shade support pole member slidably coupled to the first and second guide rail members, the shade support pole member being coupled to an end portion of a shade member of the outdoor shelter, and the shade support pole member configured to be slidably displaced along the lengths of the first and second guide rail members so as to allow an amount by which the shade member overhangs a side of the outdoor shelter to be user-adjusted.

U.S. Pat. No. 10,920,413, issued 2021 Feb. 16, to Stephen Nicholas, demonstrates a pergola system and bracket which includes a frame having a plurality of vertical spaced apart posts, and horizontal frame members each of which have an internal reinforcing rod passing through at least a portion of the posts/frame members. The internal reinforcing rods are removably secured to a corner connecting element which then connects the posts/frame members to each other making it easier to construct and provides increased stability to the structure upon completion.

U.S. Pat. No. D602,602, issued 2009 Oct. 20, to Ernest Halsey Sears, demonstrates an ornamental design for a pergola roof support structure design, as shown and described.

U.S. Pat. No. D680,234, issued 2013 Apr. 16, to Aida Kalnins, demonstrates an ornamental design for a post for a pergola system, as shown and described.

U.S. Pat. No. D725,560, issued 2015 Mar. 31, to J C. Mays, demonstrates an ornamental design for a vehicle rear quarter louvered window, as shown and described.

U.S. Pat. No. D788,940, issued 2017 Jun. 6, to Bradley Jay Lavery, demonstrates an ornamental design for a pergola, as shown and described.

U.S. Pat. No. D823,986, issued 2018 Jul. 24, to Alan R. Pledger, depicts an ornamental design for a misting system, as shown and described.

U.S. Pat. No. D855,307, issued 2019 Aug. 6, to Raj Rao, demonstrates an ornamental design for an umbrella misting system, as shown and described.

U.S. Publication No. 20050121149, issued 2005 Jun. 9, to Chin-Chang Shih, demonstrates a window blinds slat structure that consists of a knitted fabric, with loops unitarily knitted from the warp yarns or the weft yarns at predetermined intervals apart along the two sides of the slat, the loops enabling the insertion and positioning of long rods at the two sides of the slats. The long rods are inserted such that they are exposed outside the slats, with the slats and the long rods paired in different color combinations for a contrastive, multi-layer look that enhances the aesthetic appearance of the window blinds U.S. Publication No. 20110203745, issued 2011 Aug. 25, to Odilio Abreu, demonstrates an inexpensive and easy to install privacy screen for a single- or double-hung sash window. The invention comprises a plurality of horizontal louvers that are translucent and flexible, and a pair of vertical side members having a plurality of parallel slits. The louvers are affixed in parallel at both ends to the vertical side members by insertion into the slits. When installed in an open single- or double-hung sash window, the invention permits air circulation and the passage of natural light into an enclosed space, while maintaining an occupant's privacy. The invention is to be installed above or below a first sash of the window so as to allow the user to move a second sash to open and close the window with the invention in place.

U.S. Publication No. 20130291438, issued 2013 Nov. 7, to C. Scott Selzer, demonstrates a louvered roof assembly includes a pair of support members and several panels mounted between the support members. The panels are pivotally coupled to the support members for rotation about an axis by corresponding pivot pins. Each of the panels has a first end and a second end. One of the pivot pins is coupled to each end of the panels. A linear drive mechanism is coupled to each of the panels. The linear drive mechanism includes a track bar coupled to each of the panels and an actuator mounted to one of the support members and coupled to the track bar. The actuator is configured to move the track bar such that the panels rotate about the axis of their respective pivot pins.

U.S. Publication No. 20210040737, issued 2021 Feb. 11, to Aaron David Mendonca, demonstrates a modular structures for creating functional spaces which are disclosed herein. The modular structures can include partitions, such as walls, storefronts, and/or doors that can be easily assembled in a desired space and selectively paired together to create a desired floorplan suitable for the environment. These modular structures can be used together to create a suitable layout for a co-working space, an office environment, a school, a hospital, a laboratory, a factory, and various other indoor spaces.

DISADVANTAGES OF THE PRIOR ART

The prior art have failed to solve many problems associated with such bungalows as follows:
1) No prior art mention or disclose any bungalows, having adjustable louver blades 102.
   Therefore, the prior art of bungalows:
   a) Not capable of shedding water into discrete rainwater chutes 111;
   b) Not capable of preventing rainwater from getting into four-device-in-one bleacher-skybox food-dehydrator mobile-marine-sauna wind-and-smoke-redirecting bungalow;
   c) Not capable of adjustably control amount of sunlight shining into four-device-in-one bleacher-skybox food-dehydrator mobile-marine-sauna wind-and-smoke-redirecting bungalow; and
   d) Not capable of adjustably controlling and redirect wind.
2) No prior art mention or disclose any bungalows, having adjustable LED-light-powering solar panel 103.
   Therefore, the prior art of bungalows:
   a) Not capable of collecting solar energy to charge led-powering solar-rechargeable batteries 105 (see FIG. 98, FIG. 99, FIG. 100, FIG. 101, FIG. 102, FIG. 103, and FIG. 104);
   b) Not capable of collecting solar energy to recharge led-powering solar-rechargeable batteries 105 (see FIG. 98, FIG. 99, FIG. 100, FIG. 101, FIG. 102, FIG. 103, and FIG. 104);
   c) Not capable of saving energy costs associated with lighting the four-device-in-one bleacher-skybox food-dehydrator mobile-marine-sauna wind-and-smoke-redirecting bungalow;
   d) Not capable of saving costs of repeatedly replacing with non-rechargeable alkaline batteries;
   e) Not capable of providing freedom to place four-device-in-one bleacher-skybox food-dehydrator mobile-marine-sauna wind-and-smoke-redirecting bungalow away from a power outlet; and
   f) Not capable of helping reduce carbon footprint.
3) No prior art mention or disclose any bungalows, having LED-powering solar-rechargeable batteries 105.
   Therefore, the prior art of bungalows:
   a) Not capable of powering led lights 107;
   b) Not capable of saving costs of repeatedly replacing non-rechargeable alkaline batteries; and
   c) Not capable of helping reduce carbon footprint.
4) No prior art mention or disclose any bungalows, having privacy-enabling wind-and-smoke-redirecting cold-weather-insulating rainwater-sealing skybox-enabling marine-sauna-enabling food-dehydrating-enabling window-panel inserts 119.
   Therefore, the prior art of bungalows:
   a) Not capable of enabling four-device-in-one bleacher-skybox food-dehydrator mobile-marine-sauna wind-and-smoke-redirecting bungalow to become a mobile-marine sauna in the directions of arrows 149b, 149c, and 149d (see FIG. 1C, FIG. 1D, FIG. 1E, FIG. 31A, FIG. 31B, FIG. 31C, and FIG. 31D);
   b) Not capable of enabling four-device-in-one bleacher-skybox food-dehydrator mobile-marine-sauna wind-and-smoke-redirecting bungalow to become bleacher skybox in the directions of arrows 150*a* and 150*b* (see FIG. 1F, FIG. 1G, FIG. 1H, FIG. 31E, FIG. 31F, FIG. 31G, and FIG. 31H);
c) Not capable of enabling four-device-in-one bleacher-skybox food-dehydrator mobile-marine-sauna wind-and-smoke-redirecting bungalow to become food dehydrator in the directions of arrows 151*a*, 151*b*, 151*c*, and 151*d* (see FIG. 1I, FIG. 46E, and FIG. 46F);
d) Not capable of providing security within four-device-in-one bleacher-skybox food-dehydrator mobile-marine-sauna wind-and-smoke-redirecting bungalow;
e) Not capable of providing insulation within four-device-in-one bleacher-skybox food-dehydrator mobile-marine-sauna wind-and-smoke-redirecting bungalow from cold or warm weather;
f) Not capable of providing protection within four-device-in-one bleacher-skybox food-dehydrator mobile-marine-sauna wind-and-smoke-redirecting bungalow from wind; and
g) Not capable of slidably and replaceably allowing door-window-and-wall-panel frames 118 to be positioned in variety of ways.
5) No prior art mention or disclose any bungalows, having privacy-enabling wind-and-smoke-redirecting cold-weather-insulating rainwater-sealing skybox-enabling marine-sauna-enabling food-dehydrator-enabling rotatable-and-reversible-and-flippable louver braces 120.
Therefore, the prior art of bungalows:
a) Not capable of allowing privacy-enabling wind-and-smoke-redirecting cold-weather-insulating rainwater-sealing skybox-enabling marine-sauna-enabling food-dehydrator-enabling louvers 122 to be rotated and positioned to redirect wind direction in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
b) Not capable of allowing privacy-enabling wind-and-smoke-redirecting cold-weather-insulating rainwater-sealing skybox-enabling marine-sauna-enabling food-dehydrator-enabling louvers 122 to be flipped and positioned to redirect wind direction in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D); and
c) Not capable of providing structure for securing privacy-enabling wind-and-smoke-redirecting cold-weather-insulating rainwater-sealing skybox-enabling marine-sauna-enabling food-dehydrator-enabling louvers 122.
6) No prior art mention or disclose any bungalows, having spring-loaded rotation-locking axis pins 121.
Therefore, the prior art of bungalows:
a) Not capable of providing means for easily locking and unlocking privacy-enabling wind-and-smoke-redirecting cold-weather-insulating rainwater-sealing skybox-enabling marine-sauna-enabling food-dehydrator-enabling rotatable-and-reversible-and-flippable louver braces 120 (see FIG. 16, and FIG. 17);
b) Not capable of providing axis for privacy-enabling wind-and-smoke-redirecting cold-weather-insulating rainwater-sealing skybox-enabling marine-sauna-enabling food-dehydrator-enabling rotatable-and-reversible-and-flippable louver braces 120 to pivot (see FIG. 16, and FIG. 17); and
c) Not capable of providing 8 locking points the reposition privacy-enabling wind-and-smoke-redirecting cold-weather-insulating rainwater-sealing skybox-enabling marine-sauna-enabling food-dehydrator-enabling rotatable-and-reversible-and-flippable louver braces 120 at different angles (see FIG. 16, and FIG. 17).
7) No prior art mention or disclose any bungalows, having privacy-enabling wind-and-smoke-redirecting cold-weather-insulating rainwater-sealing skybox-enabling marine-sauna-enabling food-dehydrator-enabling louvers 122.
Therefore, the prior art of bungalows:
a) Not capable of redirecting wind and smoke in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
b) Not capable of blocking wind and smoke in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

c) Not capable of reducing wind and smoke in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
  d) Not capable of sealing four-device-in-one bleacher-skybox food-dehydrator mobile-marine-sauna wind-and-smoke-redirecting bungalow to create a mobile-marine sauna in the directions of arrows 149*b*, 149*c*, and 149*d* (see FIG. 1C, FIG. 1D, FIG. 1E, FIG. 31A, FIG. 31B, FIG. 31C, and FIG. 31D);
  e) Not capable of sealing four-device-in-one bleacher-skybox food-dehydrator mobile-marine-sauna wind-and-smoke-redirecting bungalow to create a bleacher skybox in the directions of arrows 150*a* and 150*b* (see FIG. 1F, FIG. 1G, FIG. 1H, FIG. 31E, FIG. 31F, FIG. 31G, and FIG. 31H);
  f) Not capable of redirecting wind to stoke a blacksmith forge in the directions of arrows 172*a* and 172*b* (see FIG. 40D); and
  g) Not capable of sealing four-device-in-one bleacher-skybox food-dehydrator mobile-marine-sauna wind-and-smoke-redirecting bungalow to become a food dehydrator in the directions of arrows 151*a*, 151*b*, 151*c*, and 151*d* (see FIG. 1I, FIG. 46E, and FIG. 46F).
8) No prior art mention or disclose any bungalows, having easy-to-install sound-dampening-inner-track insert 126.
  Therefore, the prior art of bungalows:
    a) Not capable of providing a track for easy-to-install privacy curtain-and-insect-screen-securing easy-slide hooks 127 to be secured in the directions of arrows 186*b* and 186*c* (see FIG. 81);
    b) Not capable of providing sound-dampening to reduce noise; and
    c) Not capable of providing smooth track for easily sliding easy-to-install privacy curtain-and-insect-screen-securing easy-slide hooks 127 within in the directions of arrows 186*b* and 186*c* (see FIG. 81).
9) No prior art mention or disclose any bungalows, having privacy-enabling wind-protecting curtain 128.
  Therefore, the prior art of bungalows:
    a) Not capable of providing privacy;
    b) Not capable of providing protection from harmful sun rays;
    c) Not capable of providing protection from wind; and
    d) Not capable of providing protection from insects.
10) No prior art mention or disclose any bungalows, having easy-to-install-extending-and-retracting-door-spool housing 131.
  Therefore, the prior art of bungalows:
    a) Not capable of providing easy-to-install attachment to easy-to-install-extending-and-retracting-door-spool-housing bracket 130 in the directions of arrows 188 and 189 (see FIG. 176, FIG. 177, and FIG. 178);
    b) Not capable of providing location for storage of extending-and-retracting door 133 (see FIG. 176, FIG. 177, FIG. 178, and FIG. 192);
    c) Not capable of protecting extending-and-retracting door 133 from damage while inside; and
    d) Not capable of providing discrete location for extending-and-retracting door 133 to retract into in the direction of arrow 190 (see FIG. 192).
11) No prior art mention or disclose any bungalows, having extending-and-retracting door 133.
  Therefore, the prior art of bungalows:
    a) Not capable of providing protection from wind;
    b) Not capable of providing protection from harmful sun rays;
    c) Not capable of providing insulation from cold temperatures; and
    d) Not capable of providing security within the four-device-in-one bleacher-skybox food-dehydrator mobile-marine-sauna wind-and-smoke-redirecting bungalow.
12) No prior art mention or disclose any bungalows, having height-and-angle-adjustable tube-screws 147.
  Therefore, the prior art of bungalows:
    a) Not capable of leveling the four-device-in-one bleacher-skybox food-dehydrator mobile-marine-sauna wind-and-smoke-redirecting bungalow when installed on an uneven ground surface in the directions of arrows 195*a*, 195*b*, 195*c*, 195*d*, 196*a*, 196*b*, 196*c*, 196*d*, 197*a*, and 197*b* (see FIG. 48, FIG. 49, and FIG. 50);
    b) Not capable of securing corner-posts base-plate 144 to the ground; and
    c) Not capable of providing adjustment points for each corner-posts base-plate 144 in the directions of arrows 195*a*, 195*b*, 195*c*, 195*d*, 196*a*, 196*b*, 196*c*, 196*d*, 197*a*, and 197*b* (see FIG. 48, FIG. 49, and FIG. 50).

OBJECTS AND ADVANTAGES OF THE INVENTION

The present invention substantially departs from the conventional concepts and designs of the prior art. In doing so, the present invention provides (a or an) four-device-in-one bleacher-skybox food-dehydrator mobile-marine-sauna wind-and-smoke-redirecting bungalow, having many unique and significant features, functions, and advantages, which overcome all the disadvantages of the prior art, as follows:
1) It is an object of the new invention to provide (a or an) four-device-in-one bleacher-skybox food-dehydrator mobile-marine-sauna wind-and-smoke-redirecting bungalow, having adjustable louver blades 102.
  Therefore, the four-device-in-one bleacher-skybox food-dehydrator mobile-marine-sauna wind-and-smoke-redirecting bungalow is (or are each):
    a) Capable of shedding water into discrete rainwater chutes 111;
    b) Capable of preventing rainwater from getting into four-device-in-one bleacher-skybox food-dehydrator mobile-marine-sauna wind-and-smoke-redirecting bungalow;
    c) Capable of adjustably control amount of sunlight shining into four-device-in-one bleacher-skybox food-dehydrator mobile-marine-sauna wind-and-smoke-redirecting bungalow; and
    d) Capable of adjustably controlling and redirect wind.

2) It is yet another object of the new invention to provide (a or an) four-device-in-one bleacher-skybox food-dehydrator mobile-marine-sauna wind-and-smoke-redirecting bungalow, having an adjustable LED-light-powering solar panel 103.

Therefore, the four-device-in-one bleacher-skybox food-dehydrator mobile-marine-sauna wind-and-smoke-redirecting bungalow is (or are each):
   a) Capable of collecting solar energy to charge led-powering solar-rechargeable batteries 105 (see FIG. 98, FIG. 99, FIG. 100, FIG. 101, FIG. 102, FIG. 103, and FIG. 104);
   b) Capable of collecting solar energy to recharge led-powering solar-rechargeable batteries 105 (see FIG. 98, FIG. 99, FIG. 100, FIG. 101, FIG. 102, FIG. 103, and FIG. 104);
   c) Capable of saving energy costs associated with lighting the four-device-in-one bleacher-skybox food-dehydrator mobile-marine-sauna wind-and-smoke-redirecting bungalow;
   d) Capable of saving costs of repeatedly replacing with non-rechargeable alkaline batteries;
   e) Capable of providing freedom to place four-device-in-one bleacher-skybox food-dehydrator mobile-marine-sauna wind-and-smoke-redirecting bungalow away from a power outlet; and
   f) Capable of helping reduce carbon footprint.

3) It is still yet another object of the new invention to provide (a or an) four-device-in-one bleacher-skybox food-dehydrator mobile-marine-sauna wind-and-smoke-redirecting bungalow, having an LED-powering solar-rechargeable batteries 105.

Therefore, the four-device-in-one bleacher-skybox food-dehydrator mobile-marine-sauna wind-and-smoke-redirecting bungalow is (or are each):
   a) Capable of powering led lights 107;
   b) Capable of saving costs of repeatedly replacing non-rechargeable alkaline batteries; and
   c) Capable of helping reduce carbon footprint.

4) It is even still yet another object of the new invention to provide (a or an) four-device-in-one bleacher-skybox food-dehydrator mobile-marine-sauna wind-and-smoke-redirecting bungalow, having a privacy-enabling wind-and-smoke-redirecting cold-weather-insulating rainwater-sealing skybox-enabling marine-sauna-enabling food-dehydrating-enabling window-panel inserts 119.

Therefore, the four-device-in-one bleacher-skybox food-dehydrator mobile-marine-sauna wind-and-smoke-redirecting bungalow is (or are each):
   a) Capable of enabling four-device-in-one bleacher-skybox food-dehydrator mobile-marine-sauna wind-and-smoke-redirecting bungalow to become a mobile-marine sauna in the directions of arrows 149*b*, 149*c*, and 149*d* (see FIG. 1C, FIG. 1D, FIG. 1E, FIG. 31A, FIG. 31B, FIG. 31C, and FIG. 31D);
   b) Capable of enabling four-device-in-one bleacher-skybox food-dehydrator mobile-marine-sauna wind-and-smoke-redirecting bungalow to become bleacher skybox in the directions of arrows 150*a* and 150*b* (see FIG. 1F, FIG. 1G, FIG. 1H, FIG. 31E, FIG. 31F, FIG. 31G, and FIG. 31H);
   c) Capable of enabling four-device-in-one bleacher-skybox food-dehydrator mobile-marine-sauna wind-and-smoke-redirecting bungalow to become food dehydrator in the directions of arrows 151*a*, 151*b*, 151*c*, and 151*d* (see FIG. 1I, FIG. 46E, and FIG. 46F);
   d) Capable of providing security within four-device-in-one bleacher-skybox food-dehydrator mobile-marine-sauna wind-and-smoke-redirecting bungalow;
   e) Capable of providing insulation within four-device-in-one bleacher-skybox food-dehydrator mobile-marine-sauna wind-and-smoke-redirecting bungalow from cold or warm weather;
   f) Capable of providing protection within four-device-in-one bleacher-skybox food-dehydrator mobile-marine-sauna wind-and-smoke-redirecting bungalow from wind; and
   g) Capable of slidably and replaceably allowing door-window-and-wall-panel frames 118 to be positioned in variety of ways.

5) It is even still yet another object of the new invention to provide (a or an) four-device-in-one bleacher-skybox food-dehydrator mobile-marine-sauna wind-and-smoke-redirecting bungalow, having privacy-enabling wind-and-smoke-redirecting cold-weather-insulating rainwater-sealing skybox-enabling marine-sauna-enabling food-dehydrator-enabling rotatable-and-reversible-and-flippable louver braces 120.

Therefore, the four-device-in-one bleacher-skybox food-dehydrator mobile-marine-sauna wind-and-smoke-redirecting bungalow is (or are each):
   a) Capable of allowing privacy-enabling wind-and-smoke-redirecting cold-weather-insulating rainwater-sealing skybox-enabling marine-sauna-enabling food-dehydrator-enabling louvers 122 to be rotated and positioned to redirect wind direction in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
   b) Capable of allowing privacy-enabling wind-and-smoke-redirecting cold-weather-insulating rainwater-sealing skybox-enabling marine-sauna-enabling food-dehydrator-enabling louvers 122 to be flipped and positioned to redirect wind direction in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D); and
   c) Capable of providing structure for securing privacy-enabling wind-and-smoke-redirecting cold-weatherinsulating rainwater-sealing skybox-enabling marine-sauna-enabling food-dehydrator-enabling louvers 122.

6) It is even still yet another object of the new invention to provide (a or an) four-device-in-one bleacher-skybox food-dehydrator mobile-marine-sauna wind-and-smoke-redirecting bungalow, having spring-loaded rotation-locking axis pins 121

Therefore, the four-device-in-one bleacher-skybox food-dehydrator mobile-marine-sauna wind-and-smoke-redirecting bungalow is (or are each):
a) Capable of providing means for easily locking and unlocking privacy-enabling wind-and-smoke-redirecting cold-weather-insulating rainwater-sealing skybox-enabling marine-sauna-enabling food-dehydrator-enabling rotatable-and-reversible-and-flippable louver braces 120 (see FIG. 16, and FIG. 17);
b) Capable of providing axis for privacy-enabling wind-and-smoke-redirecting cold-weather-insulating rainwater-sealing skybox-enabling marine-sauna-enabling food-dehydrator-enabling rotatable-and-reversible-and-flippable louver braces 120 to pivot (see FIG. 16, and FIG. 17); and
c) Capable of providing 8 locking points the reposition privacy-enabling wind-and-smoke-redirecting cold-weather-insulating rainwater-sealing skybox-enabling marine-sauna-enabling food-dehydrator-enabling rotatable-and-reversible-and-flippable louver braces 120 at different angles (see FIG. 16, and FIG. 17).

7) It is even still yet another object of the new invention to provide (a or an) four-device-in-one bleacher-skybox food-dehydrator mobile-marine-sauna wind-and-smoke-redirecting bungalow, having privacy-enabling wind-and-smoke-redirecting cold-weather-insulating rainwater-sealing skybox-enabling marine-sauna-enabling food-dehydrator-enabling louvers 122

Therefore, the four-device-in-one bleacher-skybox food-dehydrator mobile-marine-sauna wind-and-smoke-redirecting bungalow is (or are each):
a) Capable of redirecting wind and smoke in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
b) Capable of blocking wind and smoke in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
c) Capable of reducing wind and smoke in the directions of arrows 152*a*, 152*b*, 153*a*, 153*b*, 153*c*, 153*d*, 154*a*, 154*b*, 155*a*, 155*b*, 156*a*, 156*b*, 157*a*, 157*b*, 158, 159*a*, 159*b*, 160*a*, 160*b*, 161, 162, 163*a*, 163*b*, 164*a*, 164*b*, 164*c*, 164*d*, 165, 166*a*, 166*b*, 166*c*, 166*d*, 167*a*, 167*b*, 167*c*, 167*d*, 168*a*, 168*b*, 169*a*, 169*b*, 170*a*, 170*b*, 171*a*, 171*b*, 172*a*, 172*b*, 173, 174, 175*a*, 175*b*, 175*c*, 175*d*, 176*a*, 176*b*, 177, 178, 179, 180*a*, 180*b*, 181*a*, and 181*b* (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);
d) Capable of sealing four-device-in-one bleacher-skybox food-dehydrator mobile-marine-sauna wind-and-smoke-redirecting bungalow to create a mobile-marine sauna in the directions of arrows 149*b*, 149*c*, and 149*d* (see FIG. 1C, FIG. 1D, FIG. 1E, FIG. 31A, FIG. 31B, FIG. 31C, and FIG. 31D);
e) Capable of sealing four-device-in-one bleacher-skybox food-dehydrator mobile-marine-sauna wind-and-smoke-redirecting bungalow to create a bleacher skybox in the directions of arrows 150*a* and 150*b* (see FIG. 1F, FIG. 1G, FIG. 1H, FIG. 31E, FIG. 31F, FIG. 31G, and FIG. 31H);
f) Capable of sealing four-device-in-one bleacher-skybox food-dehydrator mobile-marine-sauna wind-and-smoke-redirecting bungalow to become a food dehydrator; and
g) Capable of redirecting wind to stoke a fire or a blacksmith forge in the directions of arrows 172*a* and 172*b* (see FIG. 40D).

8) It is even still yet another object of the new invention to provide (a or an) four-device-in-one bleacher-skybox food-dehydrator mobile-marine-sauna wind-and-smoke-redirecting bungalow, having an easy-to-install sound-dampening-inner-track insert 126

Therefore, the four-device-in-one bleacher-skybox food-dehydrator mobile-marine-sauna wind-and-smoke-redirecting bungalow is (or are each):
a) Capable of providing a track for easy-to-install privacy curtain-and-insect-screen-securing easy-slide hooks 127 to be secured in the directions of arrows 186*b* and 186*c* (see FIG. 81);
b) Capable of providing sound-dampening to reduce noise; and
c) Capable of providing smooth track for easily sliding easy-to-install privacy curtain-and-insect-screen-securing easy-slide hooks 127 within in the directions of arrows 186*b* and 186*c* (see FIG. 81).

9) It is even still yet another object of the new invention to provide (a or an) four-device-in-one bleacher-skybox food-dehydrator mobile-marine-sauna wind-and-smoke-redirecting bungalow, having a privacy-enabling wind-protecting curtain 128

Therefore, the four-device-in-one bleacher-skybox food-dehydrator mobile-marine-sauna wind-and-smoke-redirecting bungalow is (or are each):
a) Capable of providing privacy;
b) Capable of providing protection from harmful sun rays;
c) Capable of providing protection from wind; and d) Capable of providing protection from insects.

10) It is even still yet another object of the new invention to provide (a or an) four-device-in-one bleacher-skybox food-dehydrator mobile-marine-sauna wind-and-smoke-redirecting bungalow, having an easy-to-install-extending-and-retracting-door-spool housing 131

Therefore, the four-device-in-one bleacher-skybox food-dehydrator mobile-marine-sauna wind-and-smoke-redirecting bungalow is (or are each):
   a) Capable of providing easy-to-install attachment to easy-to-install-extending-and-retracting-door-spool-housing bracket 130 in the directions of arrows 188 and 189 (see FIG. 176, FIG. 177, and FIG. 178);
   b) Capable of providing location for storage of extending-and-retracting door 133 (see FIG. 176, FIG. 177, FIG. 178, and FIG. 192);
   c) Capable of protecting extending-and-retracting door 133 from damage while inside; and
   d) Capable of providing discrete location for extending-and-retracting door 133 to retract into in the direction of arrow 190 (see FIG. 192).

11) It is even still yet another object of the new invention to provide (a or an) four-device-in-one bleacher-skybox food-dehydrator mobile-marine-sauna wind-and-smoke-redirecting bungalow, having an extending-and-retracting door 133

Therefore, the four-device-in-one bleacher-skybox food-dehydrator mobile-marine-sauna wind-and-smoke-redirecting bungalow is (or are each):
   a) Capable of providing protection from wind;
   b) Capable of providing protection from harmful sun rays;
   c) Capable of providing insulation from cold temperatures; and
   d) Capable of providing security within the four-device-in-one bleacher-skybox food-dehydrator mobile-marine-sauna wind-and-smoke-redirecting bungalow.

12) It is even still yet another object of the new invention to provide (a or an) four-device-in-one bleacher-skybox food-dehydrator mobile-marine-sauna wind-and-smoke-redirecting bungalow, having height-and-angle-adjustable tube-screws 147

Therefore, the four-device-in-one bleacher-skybox food-dehydrator mobile-marine-sauna wind-and-smoke-redirecting bungalow is (or are each):
   a) Capable of leveling the four-device-in-one bleacher-skybox food-dehydrator mobile-marine-sauna wind-and-smoke-redirecting bungalow when installed on an uneven ground surface in the directions of arrows 195a, 195b, 195c, 195d, 196a, 196b, 196c, 196d, 197a, and 197b (see FIG. 48, FIG. 49, and FIG. 50);
   b) Capable of securing corner-posts base-plate 144 to the ground; and
   c) Capable of providing adjustment points for each corner-posts base-plate 144 in the directions of arrows 195a, 195b, 195c, 195d, 196a, 196b, 196c, 196d, 197a, and 197b (see FIG. 48, FIG. 49, and FIG. 50).

SUMMARY OF THE INVENTION

A four-device-in-one skybox dehydrator sauna wind-redirecting bungalow comprises: adjustable louver blades attached to side gutter beams for preventing rainwater from getting into the bungalow and adjustably controlling amount of sunlight that shines into the bungalow, chutes formed to the side gutter beams and end gutter beams, solar-rechargeable batteries installed within adjustable louver blades for powering led lights and saving costs of replacing non-rechargeable alkaline batteries and helping reduce carbon footprint, a solar panel mounted to adjustable louver blades for collecting solar energy to charge and recharge rechargeable batteries and saving energy costs associated with lighting the bungalow and saving costs of replacing with non-rechargeable alkaline batteries and providing freedom to place the bungalow away from a power outlet and helping reduce carbon footprint, panel frames, panel inserts inserted within the panel frames for enabling the bungalow to become a sauna and a skybox and a dehydrator and providing security and insulation and protection from wind within the bungalow, louver braces inserted within the panel frames for allowing the louvers to be rotated, flipped, and positioned to redirect wind direction and structuringly securing louvers, axis pins inserted within the louver braces for providing eight locking points to reposition and locking and unlocking and pivotingly functionalizing the louver braces, louvers attached to the louver braces for redirecting and blocking and reducing and sealing the bungalow to create a sauna and a skybox and a dehydrator, an inner-track insert slidably inserted within hook-sliding track for providing a smooth sound-dampening track for slide hooks to be inserted for securing a curtain or insect screen, a curtain removably hooked onto slide hooks for providing privacy and protection from harmful sun rays and wind and insects, an extending-and-retracting door for providing protection from wind and harmful sun rays and insulation from cold temperatures and security within bungalow, door-spool housing attached to door-spool-housing bracket for providing discrete storage and protection of the extending-and-retracting door, drain openings formed into the corner-posts, corner-post-base-plate covers slidably attached onto the corner-posts, corner-post base-plates secured to the corner-posts, sliding-door track attached to the corner-post base-plates, the panel frames interchangably and slidably placed into the sliding-door track, anchoring-screw holes drilled into the corner-post base-plates, and tube-screws screwed into the anchoring-screw holes for leveling bungalow when installed on an uneven ground surface and securing the corner-post base-plate to a ground surface and providing adjustment points for each corner-post base-plate, and anchoring bolts screwed through the tube-screws and the anchoring-screw holes.

BRIEF DESCRIPTION OF THE DRAWINGS

FIG. 1A and FIG. 1B illustrate perspective and front views of the four-device-in-one bleacher-skybox food-dehydrator mobile-marine-sauna wind-and-smoke-redirecting bungalow demonstrating wind being redirected.

FIG. 1F, FIG. 1G, and FIG. 1H illustrate perspective and front views of the four-device-in-one bleacher-skybox food-dehydrator mobile-marine-sauna wind-and-smoke-redirecting bungalow functioning as a bleacher skybox.

FIG. 1I illustrates a perspective view of the four-device-in-one bleacher-skybox food-dehydrator mobile-marine-sauna wind-and-smoke-redirecting bungalow functioning as a food dehydrator.

FIG. 2A and FIG. 2B illustrate perspective and front views of the four-device-in-one bleacher-skybox food-dehydrator mobile-marine-sauna wind-and-smoke-redirecting bungalow.

FIG. 31D, FIG. 31E, FIG. 31F, FIG. 31G, and FIG. 31H illustrate perspective and front views of the four-device-in-one bleacher-skybox food-dehydrator mobile-marine-sauna wind-and-smoke-redirecting bungalow functioning as a bleacher skybox.

FIG. 32, FIG. 33, FIG. 34, FIG. 35, FIG. 36, FIG. 37, and FIG. 38 illustrate side and top views demonstrating how the privacy-enabling wind-and-smoke-redirecting cold-weather-insulating rainwater-sealing skybox-enabling marine-sauna-enabling food-dehydrating-enabling louvers can be configured on the walls to redirect wind in a variety of ways.

FIG. 39A, FIG. 39B, FIG. 40A, and FIG. 40B illustrate side and top views demonstrating how the privacy-enabling wind-and-smoke-redirecting cold-weather-insulating rainwater-sealing skybox-enabling marine-sauna-enabling food-dehydrating-enabling louvers can be configured on the walls and the floor to redirect the wind in a variety of ways.

FIG. 40C illustrates a front view of privacy-enabling wind-and-smoke-redirecting cold-weather-insulating rainwater-sealing skybox-enabling marine-sauna-enabling food-dehydrating-enabling louvers demonstrating how, when installed on a floor, can redirect wind to stoke ventilate a barbeque.

FIG. 40D illustrates a front view of privacy-enabling wind-and-smoke-redirecting cold-weather-insulating rainwater-sealing skybox-enabling marine-sauna-enabling food-dehydrating-enabling louvers demonstrating how, when installed on a floor, can redirect wind to stoke a fire or forge used in blacksmithing.

FIG. 46B, FIG. 46C, and FIG. 46D illustrate side views demonstrating how multiple privacy-enabling wind-and-smoke-redirecting cold-weather-insulating rainwater-sealing skybox-enabling marine-sauna-enabling food-dehydrating-enabling louvers can be configured to redirect wind in a variety of ways when installed on the floor.

FIG. 46F illustrates a perspective view of the four-device-in-one bleacher-skybox food-dehydrator mobile-marine-sauna wind-and-smoke-redirecting bungalow functioning as a meat smokehouse.

FIG. 47, FIG. 48, FIG. 49, and FIG. 50 illustrate perspective views demonstrating how the height-and-angle-adjustable tube-screws can be configured to level the four-device-in-one bleacher-skybox food-dehydrator mobile-marine-sauna wind-and-smoke-redirecting bungalow when placed on an uneven surface.

FIG. 62, FIG. 63, FIG. 64, FIG. 65A, FIG. 65B, FIG. 66A, and FIG. 66B illustrate cross-sectional and perspective views demonstrating how the privacy-enabling wind-and-smoke-redirecting cold-weather-insulating rainwater-sealing skybox-enabling marine-sauna-enabling food-dehydrating-enabling window-panel inserts are installed into the door-window-and-wall-panel frames can be configured in a variety of ways.

FIG. 67, FIG. 68, and FIG. 69 illustrate perspective views demonstrating how the privacy-enabling wind-and-smoke-redirecting cold-weather-insulating rainwater-sealing skybox-enabling marine-sauna-enabling food-dehydrating-enabling louvers are installed into the door-window-and-wall-panel frames and functions to open and close the privacy-enabling wind-and-smoke-redirecting cold-weather-insulating rainwater-sealing skybox-enabling marine-sauna-enabling food-dehydrating-enabling louvers.

FIG. 78, FIG. 79, FIG. 80, FIG. 81, FIG. 82, FIG. 83, FIG. 84, FIG. 85, and FIG. 86 illustrate perspective and side views demonstrating the easy-to-install noise-dampening-multi-purpose-curtain-and-insect-screen-hook-sliding track, easy-to-install sound-dampening-inner-track insert, easy-to-install privacy curtain-and-insect-screen-securing easy-slide hooks, and privacy-enabling-wind-protecting-curtain, and insect-preventing screen, and their installation.

FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, and FIG. 106 illustrate perspective and exploded views demonstrating adjustable LED-light-powering solar panel, adjustable-LED-battery cover, LED-powering solar-chargeable batteries, battery housing, and LED lights, and their installation.

FIG. 107, FIG. 108, FIG. 109, FIG. 110, FIG. 111, and FIG. 112 illustrate perspective views demonstrating variations of adjustable LED-light-powering solar panel, adjustable-LED-battery cover, LED-powering solar-chargeable batteries, battery housing, and LED lights.

FIG. 119, FIG. 120, FIG. 121, FIG. 122, FIG. 123, and FIG. 124 illustrate perspective and face views demonstrating a variation of easy-to-install discrete-hydro-mist-emitter track, hydro-mist emitters, hydro-mist-securing clips, and hydro-mist water-supply lines, and their installation.

FIG. 125, and FIG. 126 illustrate perspective and face views demonstrating hydro-mist water-supply quick-release coupler.

FIG. 127, FIG. 128, FIG. 129, FIG. 130, FIG. 131, FIG. 132, FIG. 133, FIG. 134, FIG. 135, FIG. 136, FIG. 137, FIG. 138, FIG. 139, FIG. 140, FIG. 141, FIG. 142, FIG. 143, FIG. 144, FIG. 145, FIG. 146, FIG. 147, and FIG. 148 illustrate perspective and face views demonstrating variations of easy-to-install discrete-hydro-mist-emitter track, hydro-mist emitters, hydro-mist-securing clips, and hydro-mist water-supply lines, and their installation.

FIG. 149, FIG. 150, FIG. 151, FIG. 152, FIG. 153, FIG. 154, FIG. 155, FIG. 156, FIG. 157, FIG. 158, and FIG. 159 illustrate perspective and side views demonstrating a variation of half-moon multi-position-locking bracket, and its operation.

FIG. 160, FIG. 161, FIG. 162, FIG. 163, FIG. 164, FIG. 165, FIG. 166, FIG. 167, FIG. 168, FIG. 169, FIG. 170, FIG. 171, FIG. 172, FIG. 173, FIG. 174, FIG. 175, FIG. 176, FIG. 177, FIG. 178, FIG. 179, FIG. 180, FIG. 181, FIG. 182, FIG. 183, FIG. 184, FIG. 185, FIG. 186, FIG. 187, FIG. 188, FIG. 189, FIG. 190, FIG. 191, FIG. 192, and FIG. 193 illustrate perspective and profile views demonstrating a variation of easy-to-install-extending-and-retracting-door-spool-housing bracket, easy-to-install-extending-and-retracting-door-spool housing, easy-to-install-extending-and-retracting-door spool, extending-and-retracting door, extending-and-retracting-door-side-post bracket and guide, extending-and-retracting-door-securing lock, extending-and-retracting-door-securing bracket, and extending-and-retracting-door water-sealing weather strip, and their installation and operation.

DETAILED DESCRIPTION OF THE INVENTION

Figure 1A:
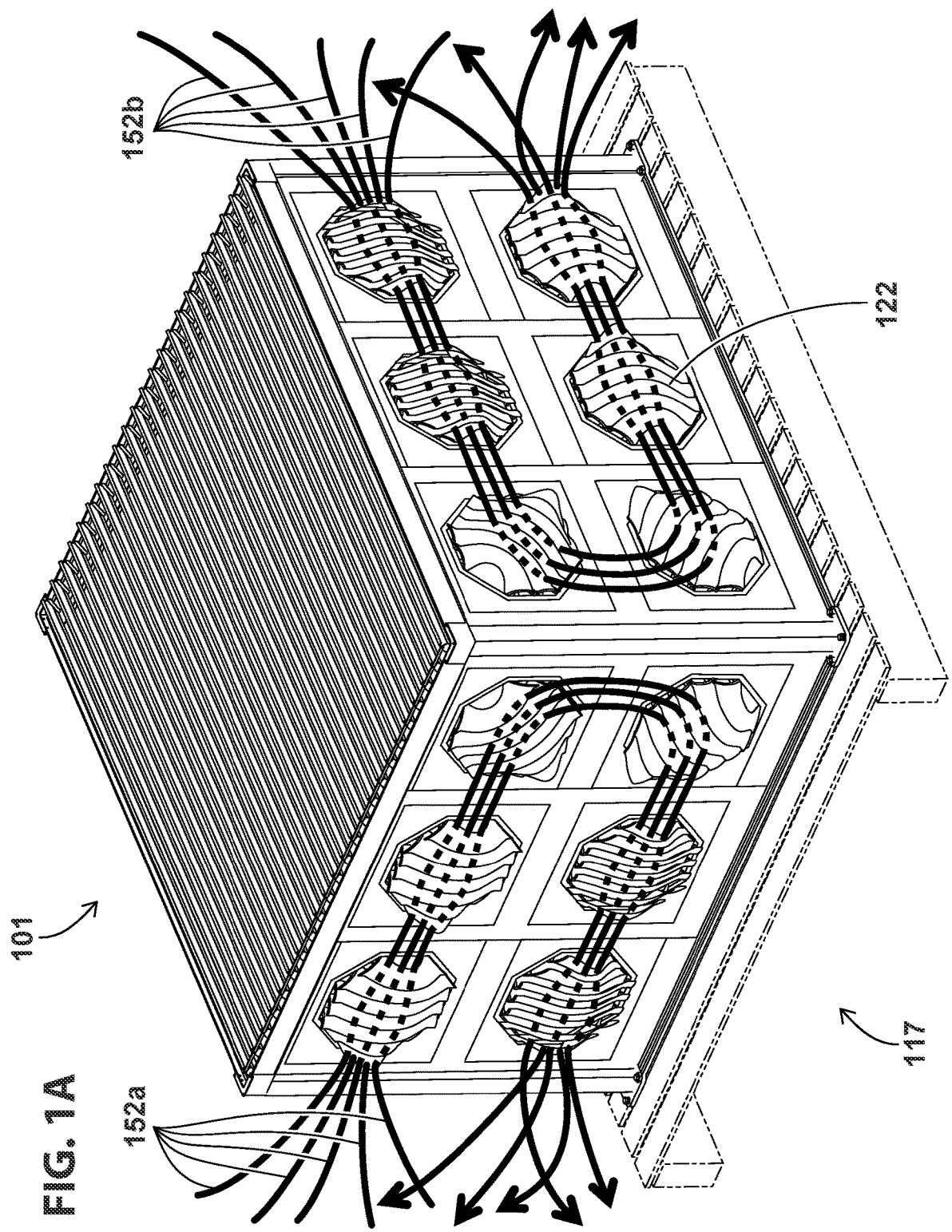
Figure 1C:
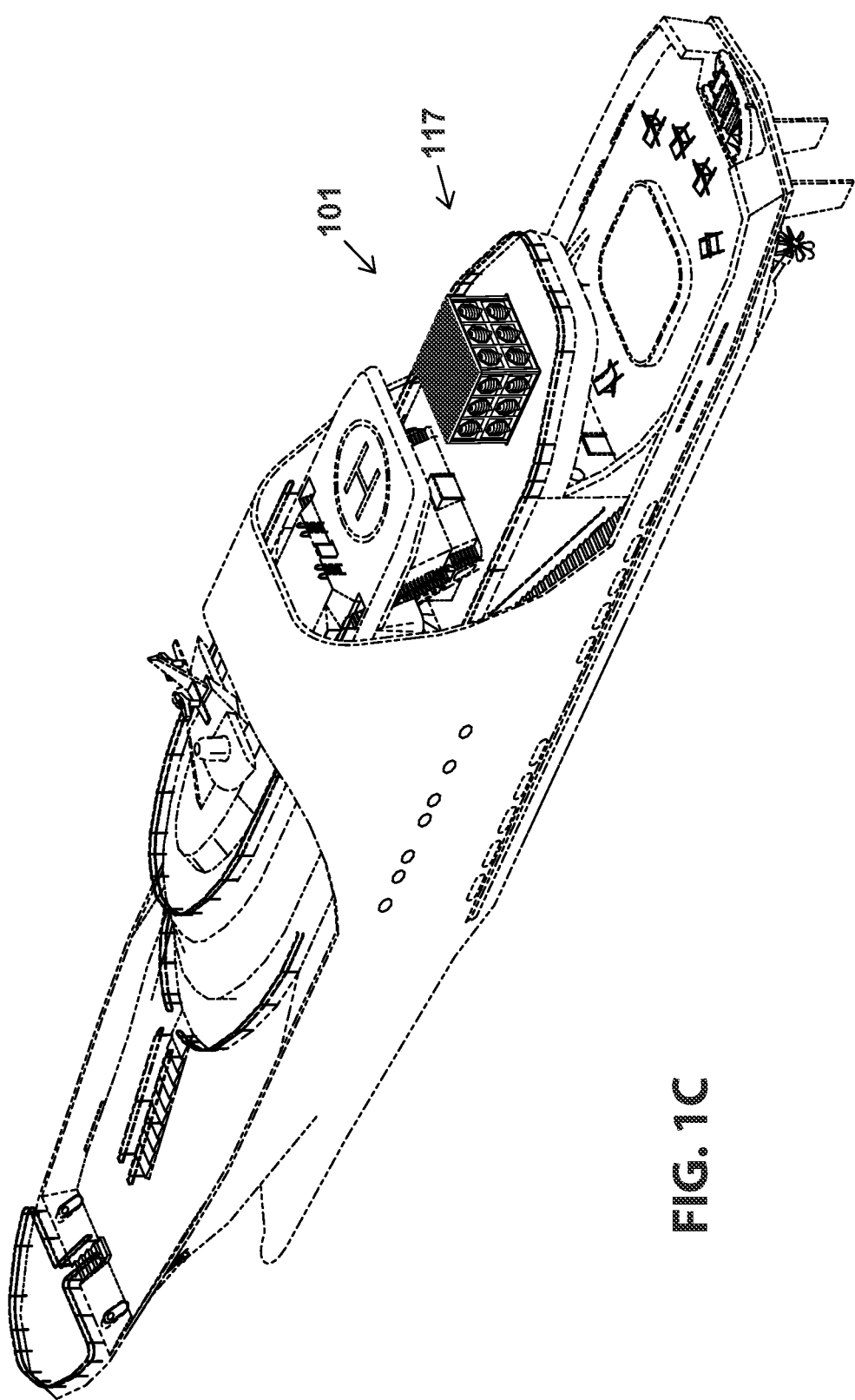
FIG. 1C, FIG. 1D, and FIG. 1E illustrate perspective views of the four-device-in-one bleacher-skybox food-dehydrator mobile-marine-sauna wind-and-smoke-redirecting bungalow functioning as a moveable-marine sauna on ship's deck.
Figure 1D:
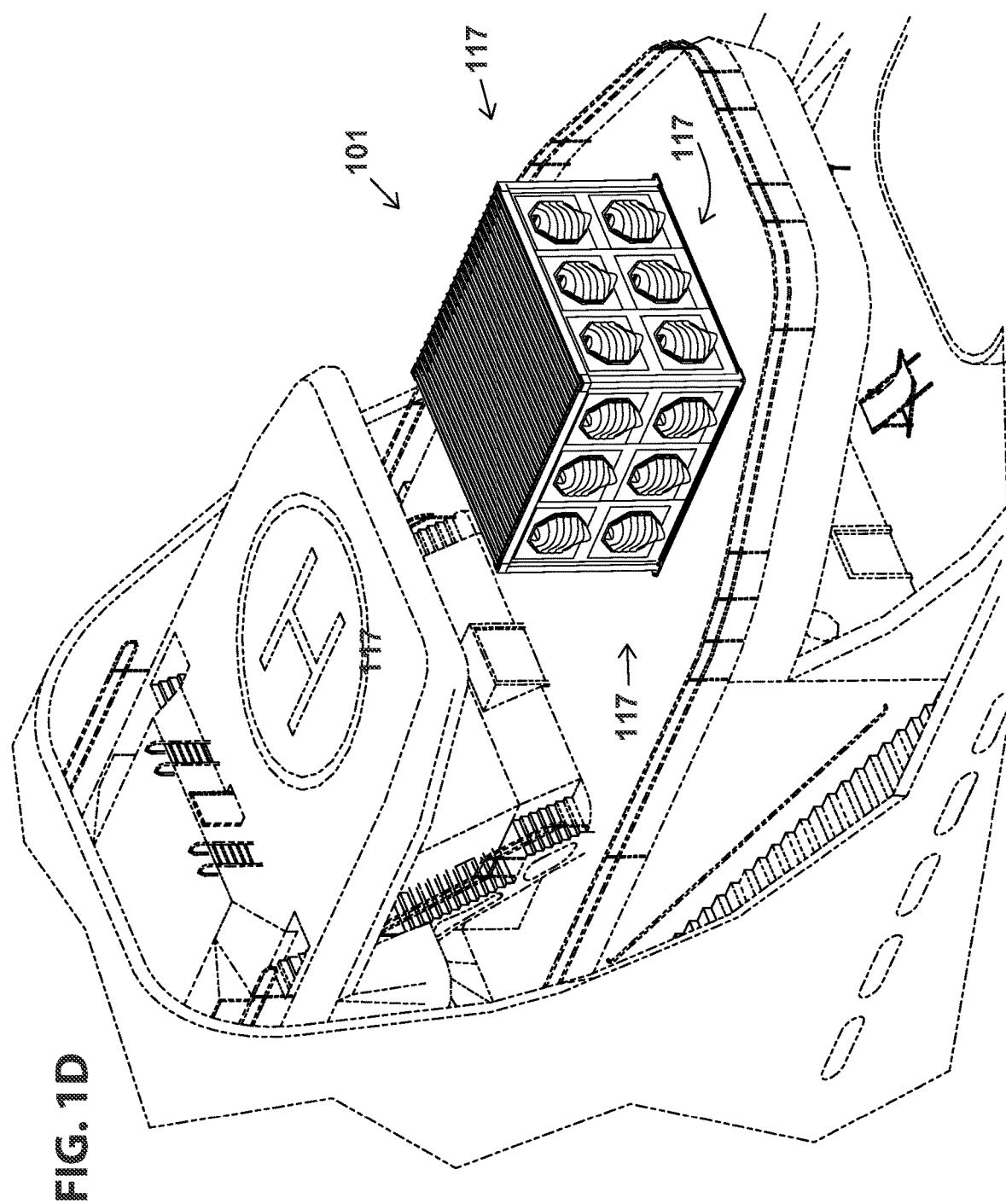
Figure 1E:
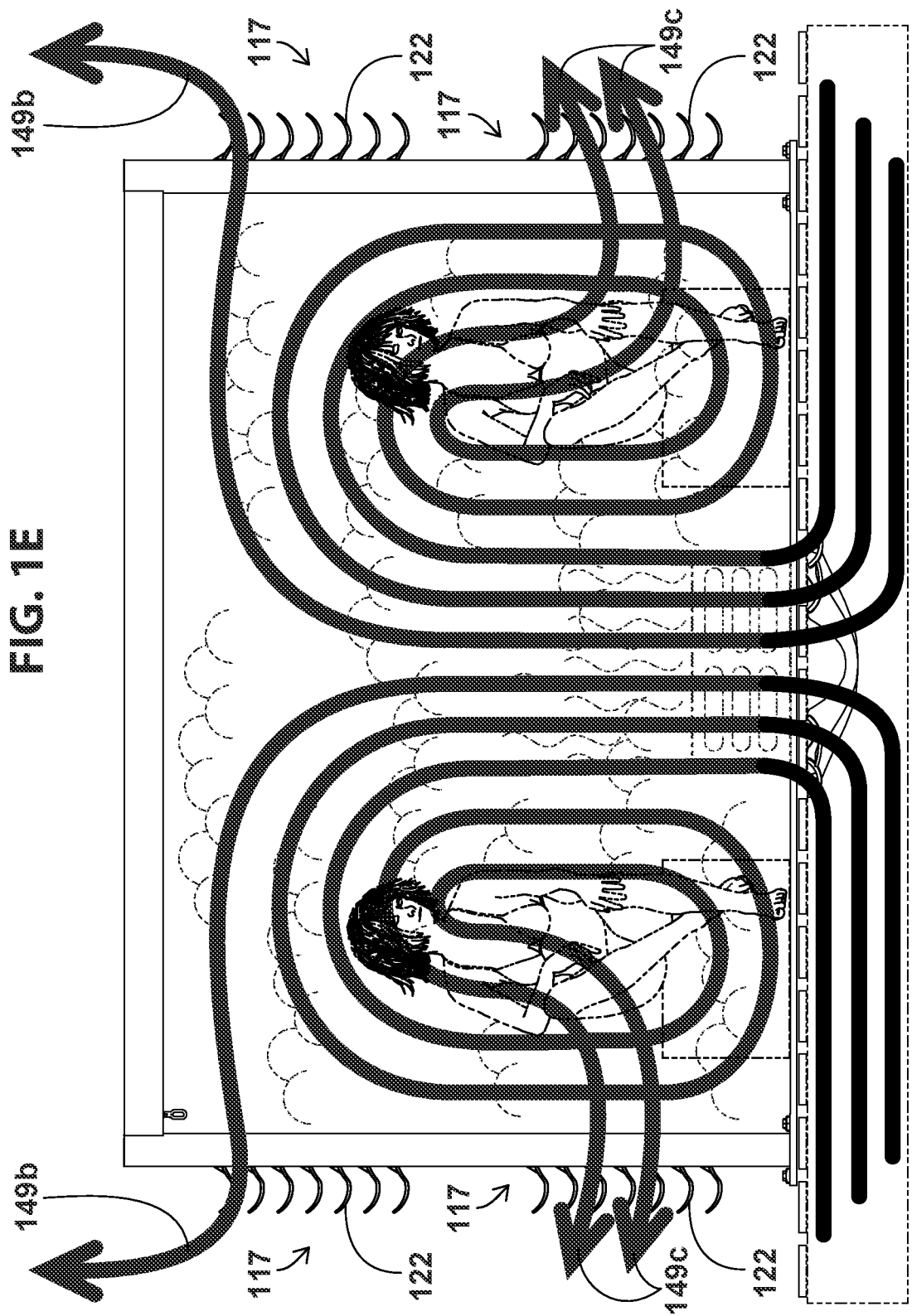
Figure 1F:
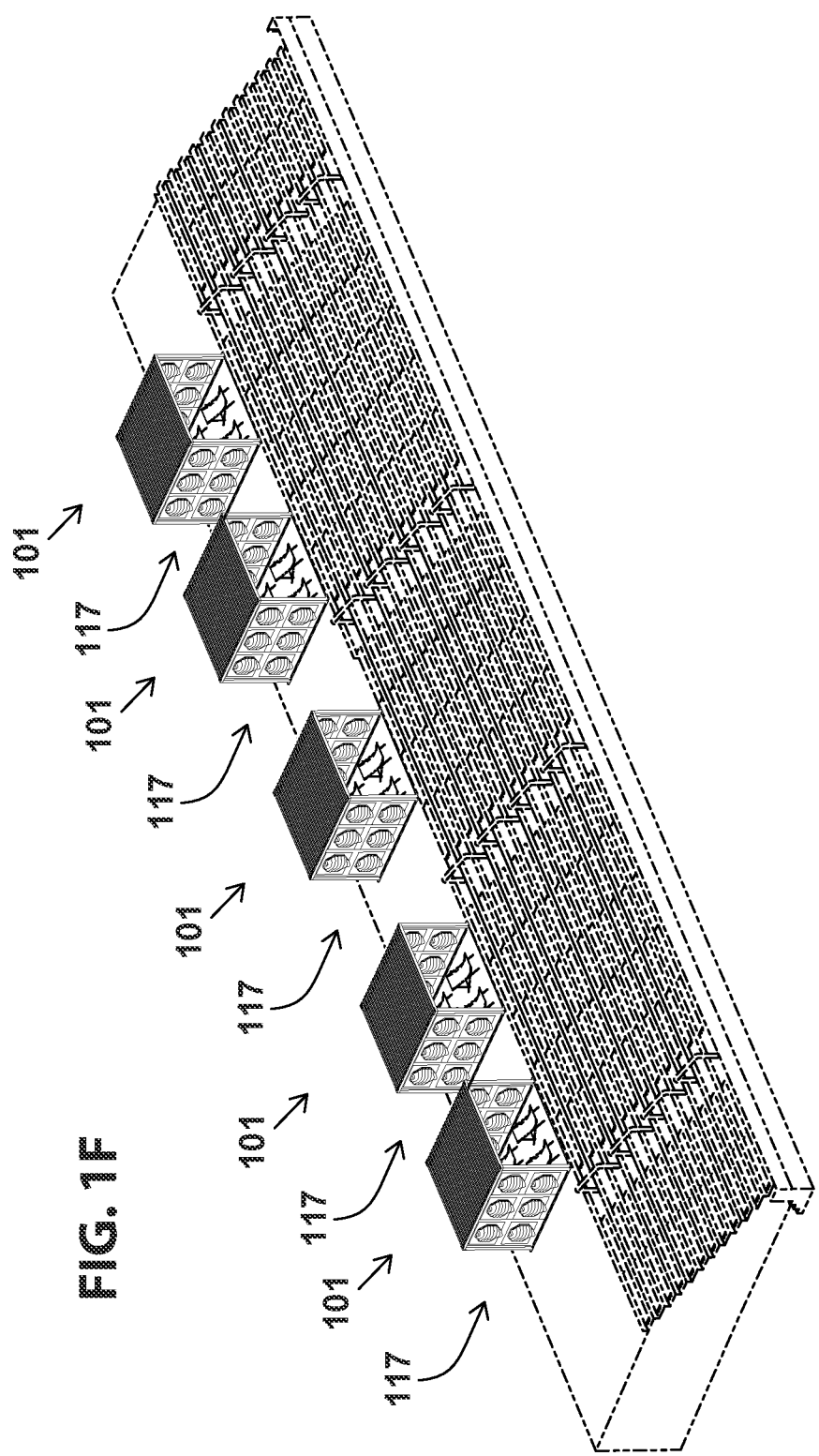
Figure 11:
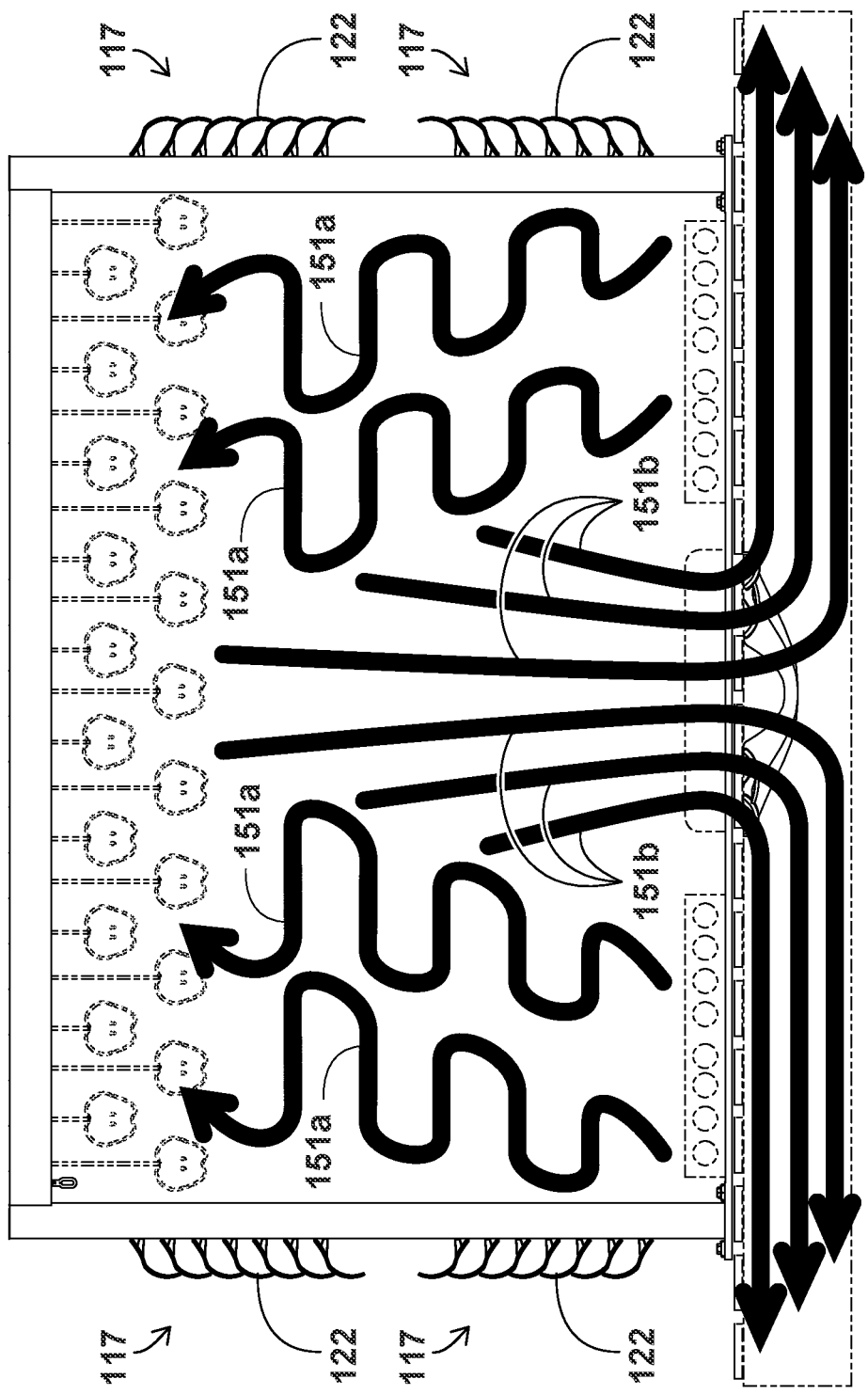
FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, and FIG. 21 illustrate perspective, front, top, and side views illustrating the privacy-enabling wind-and-smoke-redirecting cold-weather-insulating rainwater-sealing skybox-enabling marine-sauna-enabling food-dehydrating-enabling louvers being shown in the open and closed positions.
Figure 2A:
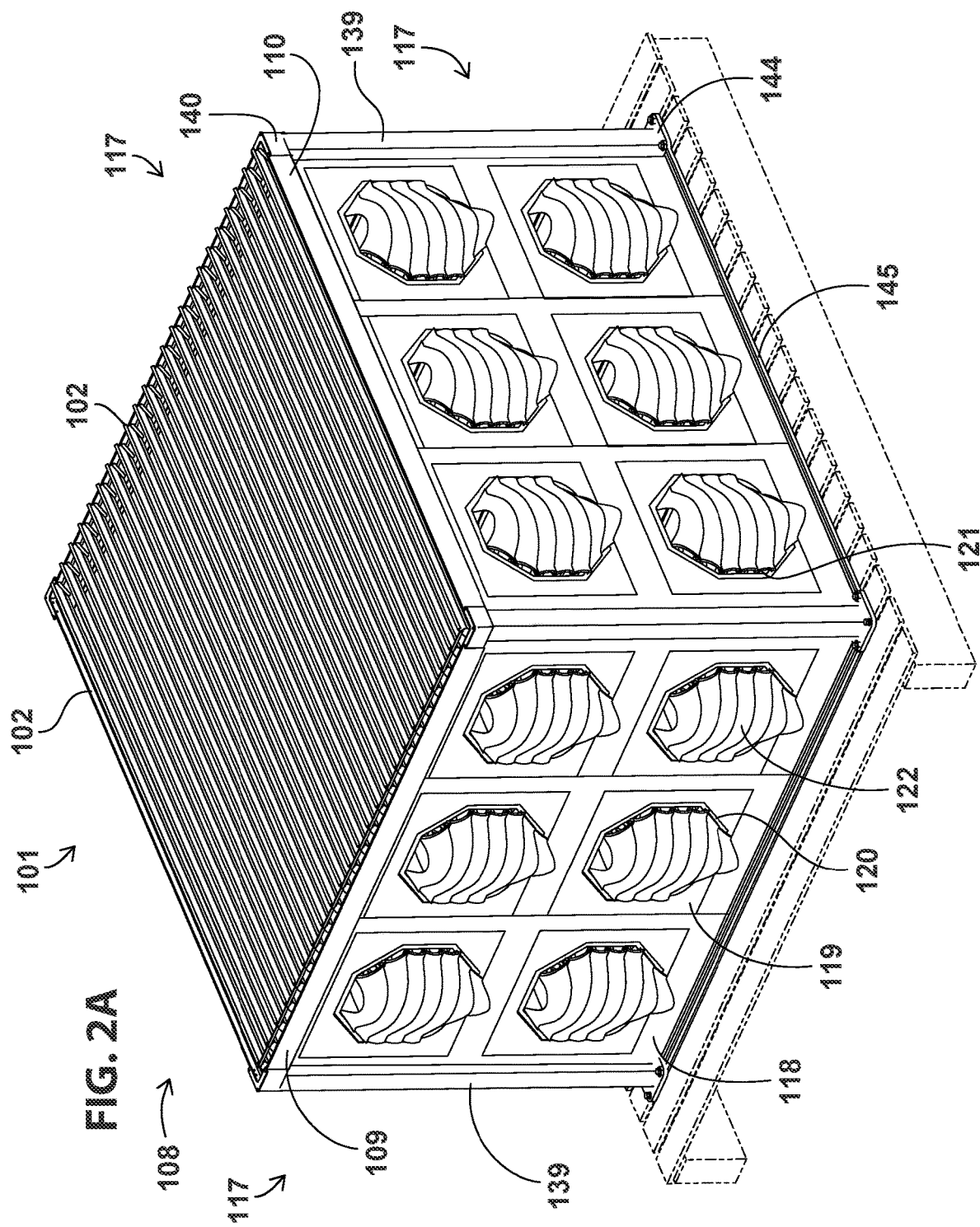
Figure 3:
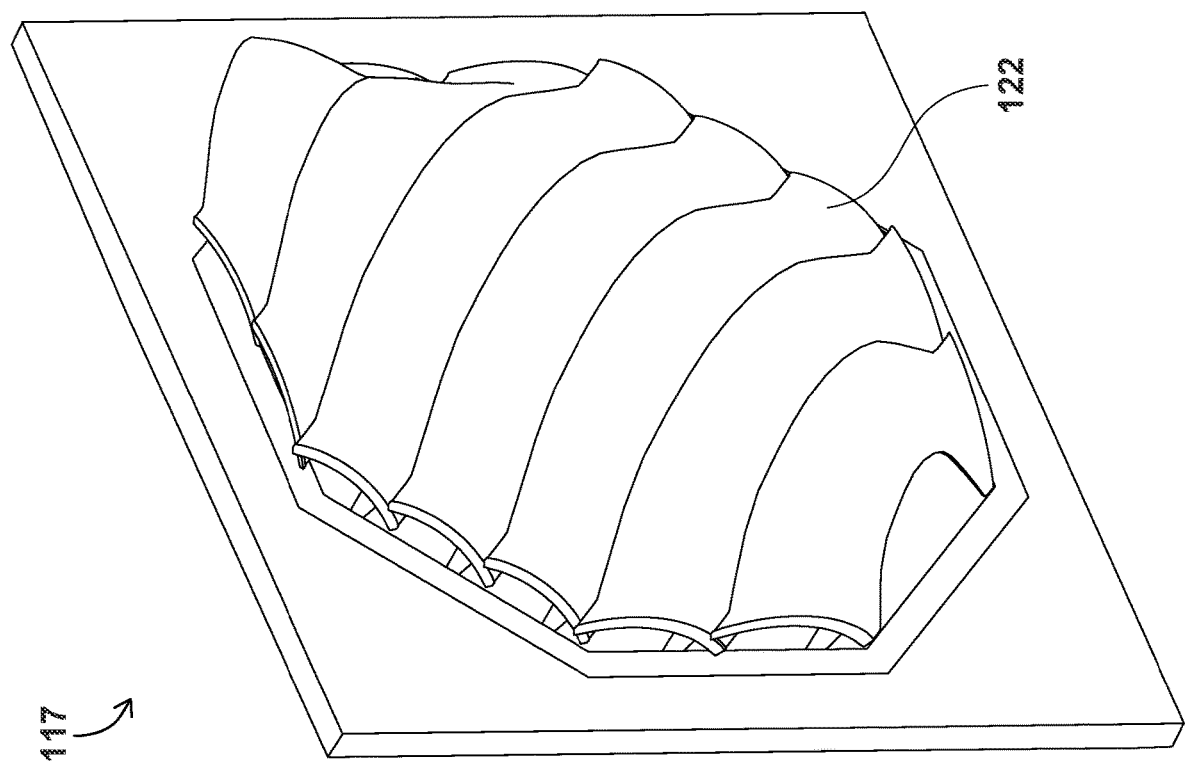
Figure 4:
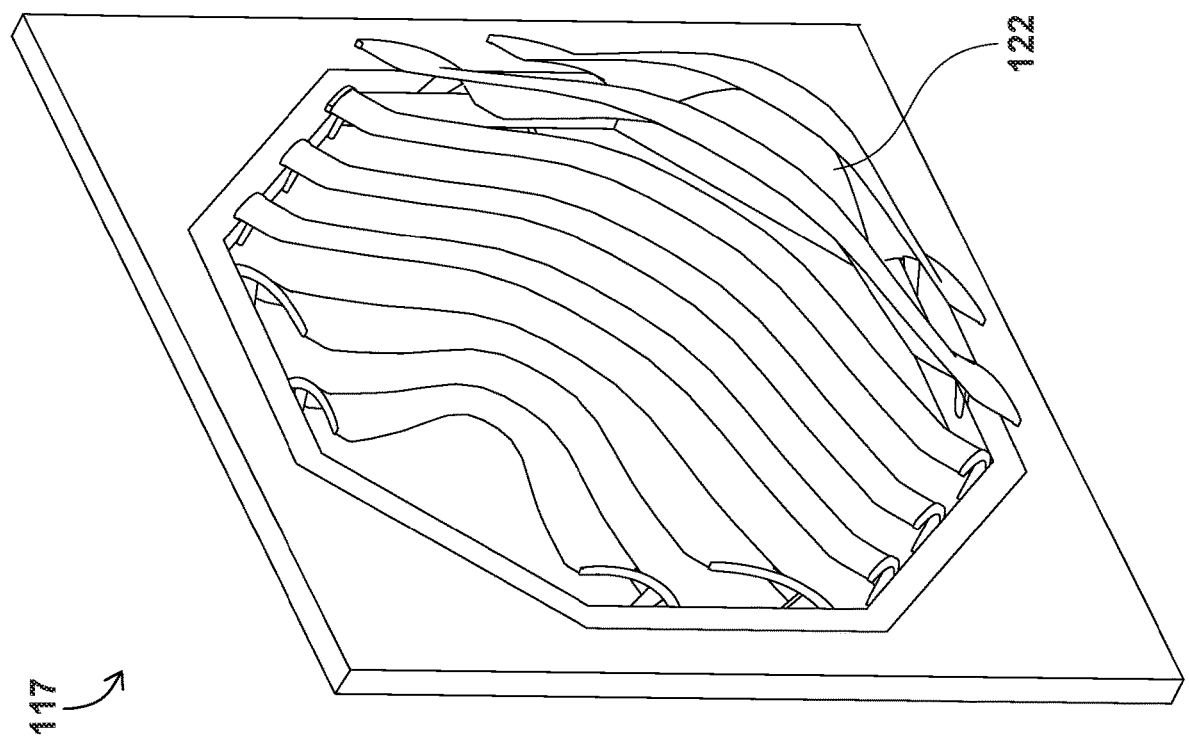
Figure 5:
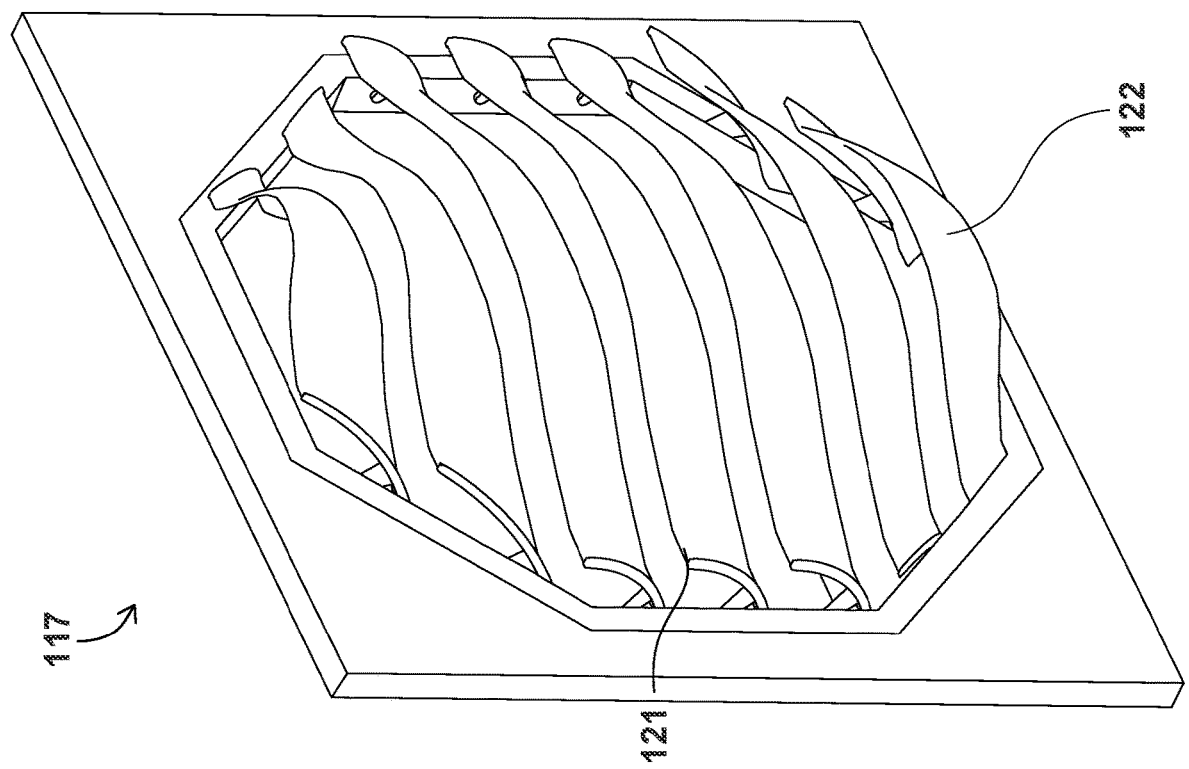
Figure 6:
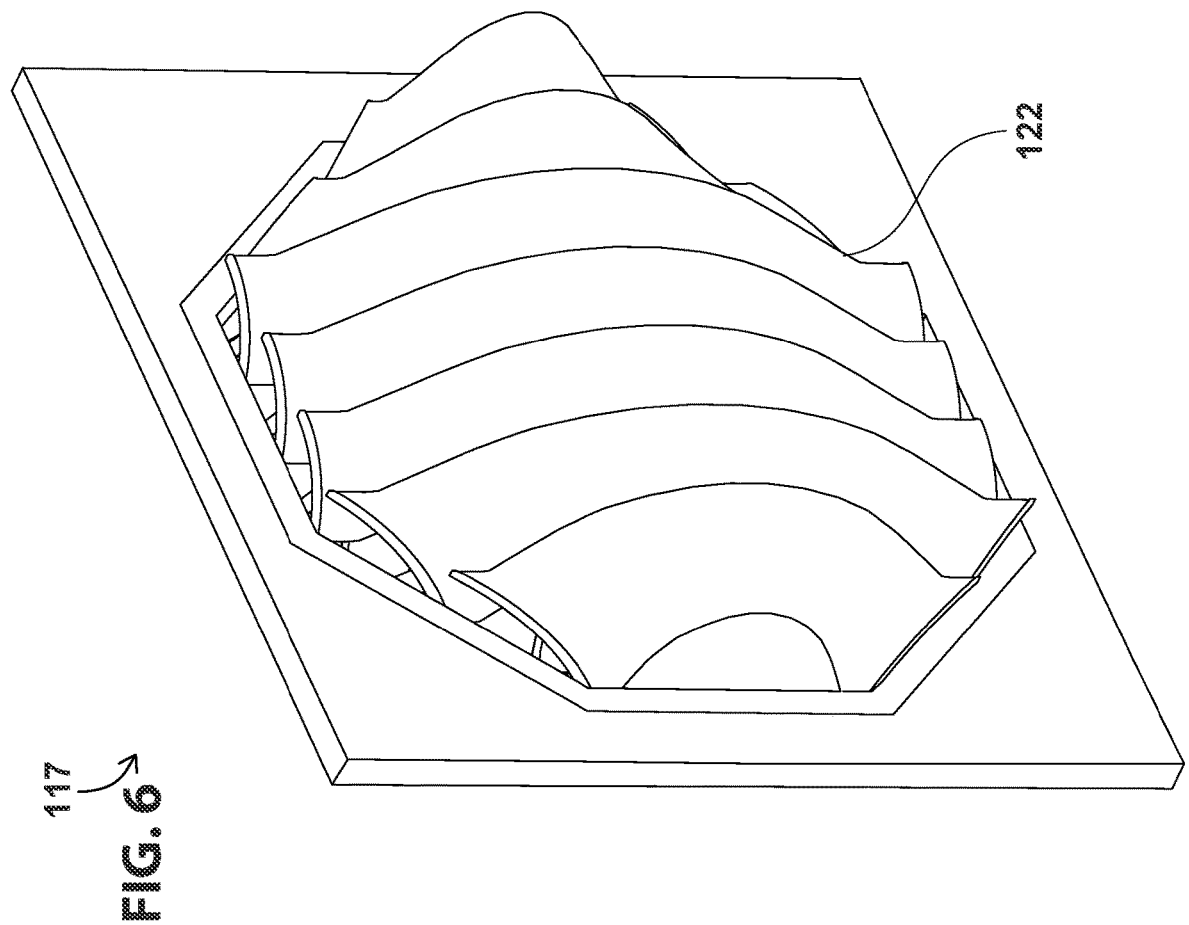
Figure 7:
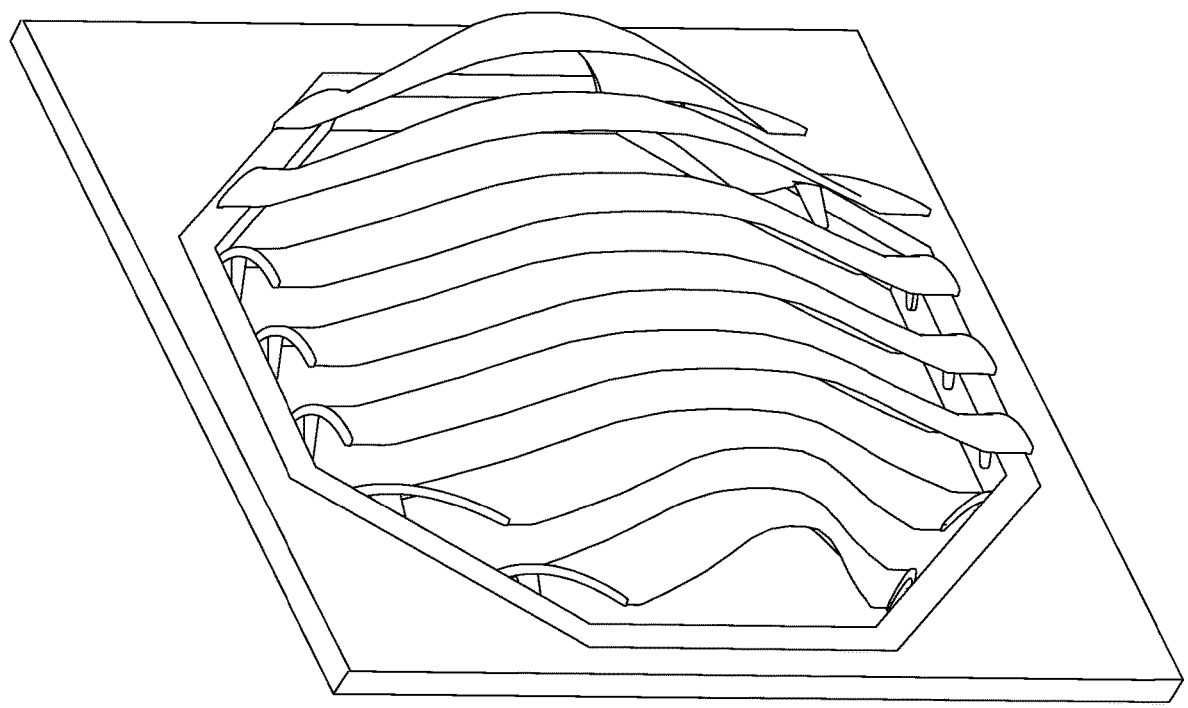

The present invention relates to a bungalow, which is economical to produce, is easy to ship as one unit, requires no tools, and can be quickly and easily folded and unfolded. Particularly, the present invention relates to a four-device-in-one bleacher-skybox food-dehydrator mobile-marine-sauna wind-and-smoke-redirecting bungalow, comprising:

1) Rainwater-sealing-and-shedding multi-position-adjustable solar-panel-led-lighting multi-louver-blade-roof system(s),
2) Multi-function discrete rainwater-channeling-and-collecting mist-cooling multi-accessory-attaching gutter-beam system(s),
3) Privacy-enabling wind-and-smoke-redirecting insect-protecting water-mist-cooling horizontal-and-vertical-sliding-door-securing cold-weather-insulating weather-sealing food-dehydrating bleacher-skybox-capable mobile-marine-sauna-capable forge-fire-stoking louvered-window-and-barrier system(s), and
4) Adjustably-leveling rainwater-draining-legs-and-base system(s).

System and Component

Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, FIG. 31C, FIG. 31D, FIG. 31E, FIG. 31F, FIG. 31G, FIG. 31H, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, FIG. 46D, FIG. 46E, FIG. 46F, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65A, FIG. 65B, FIG. 66A, FIG. 66B, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 91, FIG. 93, FIG. 95, FIG. 96, FIG. 97, FIG. 98, FIG. 99, FIG. 100, FIG. 101, FIG. 102, FIG. 103, FIG. 113, FIG. 114, FIG. 115, FIG. 116, FIG. 125, FIG. 126, FIG. 162, FIG. 163, FIG. 164, FIG. 165, FIG. 166, FIG. 174, FIG. 175, FIG. 176, FIG. 179, FIG. 180, FIG. 181, FIG. 182, and FIG. 183, the four-device-in-one bleacher-skybox food-dehydrator mobile-marine-sauna wind-and-smoke-redirecting bungalow comprises:

1) Rainwater-sealing-and-shedding multi-position-adjustable solar-panel-led-lighting multi-louver-blade-roof system system(s) 101 comprising (or each comprising):
2) Adjustable louver blades 102,
3) Adjustable LED-light-powering solar panel 103,
4) Battery cover 104,
5) LED-powering solar-rechargeable batteries 105,
6) Battery housing 106, and
7) LED lights 107;
8) Multi-function discrete rainwater-channeling-and-collecting mist-cooling multi-accessory-attaching gutter-beam system(s) 108 comprising (or each comprising):
9) Rainwater-channeling side gutter beams 109,
10) Rainwater-channeling end gutter beams 110,
11) Discrete rainwater chutes 111,
12) Discrete rainwater drain openings 112,
13) Easy-to-install discrete-hydro-mist-emitter track 113,
14) Hydro-mist emitters 114,
15) Hydro-mist-securing clips 115, and
16) Hydro-mist water-supply lines 116;
17) Privacy-enabling wind-and-smoke-redirecting insect-protecting horizontal-and-vertical-sliding-door-securing cold-weather-insulating weather-sealing food-dehydrator-capable bleacher-skybox-capable mobile-marine-sauna-capable forge-fire-stoking louvered-window-and-barrier system(s) 117 comprising (or each comprising):
18) Door-window-and-wall-panel frames 118,
19) Privacy-enabling wind-and-smoke-redirecting cold-weather-insulating rainwater-sealing skybox-enabling marine-sauna-enabling food-dehydrating-enabling window-panel inserts 119,
20) Privacy-enabling wind-and-smoke-redirecting cold-weather-insulating rainwater-sealing skybox-enabling marine-sauna-enabling food-dehydrator-enabling rotatable-and-reversible-and-flippable louver braces 120,
21) Spring-loaded rotation-locking axis pins 121, 22) Privacy-enabling wind-and-smoke-directing cold-weather-insulating rainwater-sealing fruit-dehydrator louvers 122,
23) Half-moon multi-position-locking bracket 123,
24) Multi-position-locking spring-loaded louver-adjusting control knob 124,
25) Easy-to-install noise-dampening-multi-purpose-curtain-and-insect-screen-hook-sliding track 125,
26) Easy-to-install sound-dampening-inner-track insert 126,
27) Easy-to-install privacy curtain-and-insect-screen-securing easy-slide hooks 127,
28) Privacy-enabling wind-protecting curtain 128,
29) Insect-preventing screen 129,
30) Easy-to-install-extending-and-retracting-door-spool-housing bracket 130,
31) Easy-to-install-extending-and-retracting-door-spool housing 131,
32) Easy-to-install-extending-and-retracting-door spool 132,
33) Extending-and-retracting door 133,
34) Extending-and-retracting-door-side-post bracket and guide 134,
35) Extending-and-retracting-door-securing lock 135,
36) Extending-and-retracting-door-securing bracket 136, and
37) Extending-and-retracting-door water-sealing weather strip 137;
38) Adjustably-leveling rainwater-draining-legs-and-base system(s) 138 comprising (or each comprising):
39) Corner-posts 139,
40) Corner-post L-shaped caps 140,
41) Gutter-beam cradles 141,
42) Hydro-mist water-supply quick-release coupler 142,
43) Corner-post-base-plate covers 143,
44) Corner-posts base-plates 144,
45) Sliding-door lower track 145,
46) Anchoring-screw holes 146,
47) Height-and-angle-adjustable tube-screws 147, and
48) Anchoring bolts 148.

Material

Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, FIG. 31C, FIG. 31D, FIG. 31E, FIG. 31F, FIG. 31G, FIG. 31H, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, FIG. 46D, FIG. 46E, FIG. 46F, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65A, FIG. 65B, FIG. 66A, FIG. 66B, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 91, FIG. 93, FIG. 95, FIG. 96, FIG. 97, FIG. 98, FIG. 99, FIG. 100, FIG. 101, FIG. 102, FIG. 103, FIG. 113, FIG. 114, FIG. 115, FIG. 116, FIG. 125, FIG. 126, FIG. 162, FIG. 163, FIG. 164, FIG. 165, FIG. 166, FIG. 174, FIG. 175, FIG. 176, FIG. 179, FIG. 180, FIG. 181, FIG. 182, and FIG. 183:

1) Rainwater-sealing-and-shedding multi-position-adjustable solar-panel-led-lighting multi-louver-blade-roof system system(s) 101 is (or are each) made of the combined materials of its components.
2) Adjustable louver blades 102 is (or are each) made of the material of metal.
3) Adjustable LED-light-powering solar panel 103 is (or are each) made of the material of sun-absorbing.
4) Battery cover 104 is (or are each) made of the material of plastic.
5) LED-powering solar-rechargeable batteries 105 is (or are each) made of the material of electric-power-storing.
6) Battery housing 106 is (or are each) made of the material of plastic.
7) LED lights 107 is (or are each) made of the material of LED and electronic.
8) Multi-function discrete rainwater-channeling-and-collecting mist-cooling multi-accessory-attaching gutter-beam system(s) 108 is (or are each) made of the combined materials of its components.
9) Rainwater-channeling side gutter beams 109 is (or are each) made of the material of metal.
10) Rainwater-channeling end gutter beams 110 is (or are each) made of the material of metal.
11) Discrete rainwater chutes 111 is (or are each) made of the material of metal.
12) Discrete rainwater drain openings 112 is (or are each) made of the material of empty space.
13) Easy-to-install discrete-hydro-mist-emitter track 113 is (or are each) made of the material of metal or plastic.
14) Hydro-mist emitters 114 is (or are each) made of the material of metal.
15) Hydro-mist-securing clips 115 is (or are each) made of the material of metal or plastic.
16) Hydro-mist water-supply lines 116 is (or are each) made of the material of plastic or rubber.
17) Privacy-enabling wind-and-smoke-redirecting insect-protecting water-mist-cooling horizontal-and-vertical-sliding-door-securing cold-weather-insulating weather-sealing food-dehydrator capable bleacher-skybox-capable mobile-marine-sauna-capable forge-fire-stoking louvered-window-and-barrier system(s) 117 is (or are each) made of the combined materials of its components.
18) Door-window-and-wall-panel frames 118 is (or are each) made of the material of metal, wood, or composite.
19) Privacy-enabling wind-and-smoke-redirecting cold-weather-insulating rainwater-sealing skybox-enabling marine-sauna-enabling food-dehydrator-enabling window-panel inserts 119 is (or are each) made of the material of metal, glass, plastic, wood, insulation, or composite.
20) Privacy-enabling wind-and-smoke-redirecting cold-weather-insulating rainwater-sealing skybox-enabling marine-sauna-enabling food-dehydrator-enabling rotatable-and-reversible-and-flippable louver braces 120 is (or are each) made of the material of metal, wood, or composite.
21) Spring-loaded rotation-locking axis pins 121 is (or are each) made of the material of metal or plastic.
22) Privacy-enabling wind-and-smoke-redirecting cold-weather-insulating rainwater-sealing skybox-enabling marine-sauna-enabling food-dehydrator-enabling louvers 122 is (or are each) made of the material of metal, wood, or composite.
23) Half-moon multi-position-locking bracket 123 is (or are each) made of the material of metal.
24) Multi-position-locking spring-loaded louver-adjusting control knob 124 is (or are each) made of the material of metal or plastic.

25) Easy-to-install noise-dampening-multi-purpose-curtain-and-insect-screen-hook-sliding track 125 is (or are each) made of the material of metal or plastic.
26) Easy-to-install sound-dampening-inner-track insert 126 is (or are each) made of the material of plastic.
27) Easy-to-install privacy curtain-and-insect-screen-securing easy-slide hooks 127 is (or are each) made of the material of metal or plastic.
28) Privacy-enabling wind-protecting curtain 128 is (or are each) made of the material of canvas, vinyl, or fabric.
29) Insect-preventing screen 129 is (or are each) made of the material of mesh.
30) Easy-to-install-extending-and-retracting-door-spool-housing bracket 130 is (or are each) made of the material of metal.
31) Easy-to-install-extending-and-retracting-door-spool housing 131 is (or are each) made of the material of metal or plastic.
32) Easy-to-install-extending-and-retracting-door spool 132 is (or are each) made of the material of metal or plastic.
33) Extending-and-retracting door 133 is (or are each) made of the material of canvas, vinyl, or fabric.
34) Extending-and-retracting-door-side-post bracket and guide 134 is (or are each) made of the material of metal or plastic.
35) Extending-and-retracting-door-securing lock 135 is (or are each) made of the material of metal or plastic.
36) Extending-and-retracting-door-securing bracket 136 is (or are each) made of the material of metal or plastic.
37) Extending-and-retracting-door water-sealing weather strip 137 is (or are each) made of the material of rubber.
38) Adjustably-leveling rainwater-draining-legs-and-base system(s) 138 is (or are each) made of the combined materials of its components.
39) Corner-posts 139 is (or are each) made of the material of metal.
40) Corner-post L-shaped caps 140 is (or are each) made of the material of metal.
41) Gutter-beam cradles 141 is (or are each) made of the material of metal.
42) Hydro-mist water-supply quick-release coupler 142 is (or are each) made of the material of metal.
43) Corner-post-base-plate cover 143 is (or are each) made of the material of metal or plastic.
44) Corner-posts base-plate 144 is (or are each) made of the material of metal.
45) Sliding-door lower track 145 is (or are each) made of the material of metal.
46) Anchoring-screw holes 146 is (or are each) made of the material of empty space.
47) Height-and-angle-adjustable tube-screws 147 is (or are each) made of the material of metal.
48) Anchoring bolts 148 is (or are each) made of the material of metal.

Shape

Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, FIG. 31C, FIG. 31D, FIG. 31E, FIG. 31F, FIG. 31G, FIG. 31H, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, FIG. 46D, FIG. 46E, FIG. 46F, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65A, FIG. 65B, FIG. 66A, FIG. 66B, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 91, FIG. 93, FIG. 95, FIG. 96, FIG. 97, FIG. 98, FIG. 99, FIG. 100, FIG. 101, FIG. 102, FIG. 103, FIG. 113, FIG. 114, FIG. 115, FIG. 116, FIG. 125, FIG. 126, FIG. 162, FIG. 163, FIG. 164, FIG. 165, FIG. 166, FIG. 174, FIG. 175, FIG. 176, FIG. 179, FIG. 180, FIG. 181, FIG. 182, and FIG. 183:

1) Rainwater-sealing-and-shedding multi-position-adjustable solar-panel-led-lighting multi-louver-blade-roof system system(s) 101 is (or are each) formed into the combined shapes of its components.
2) Adjustable louver blades 102 is (or are each) formed into the shape of (a or an) blade.
3) Adjustable LED-light-powering solar panel 103 is (or are each) formed into the shape of (a or an) rectangle.
4) Battery cover 104 is (or are each) formed into the shape of (a or an) rectangle.
5) LED-powering solar-rechargeable batteries 105 is (or are each) formed into the shape of (a or an) cylinder.
6) Battery housing 106 is (or are each) formed into the shape of (a or an) rectangular box.
7) LED lights 107 is (or are each) formed into the shape of (a or an) LED light.
8) Multi-function discrete rainwater-channeling-and-collecting mist-cooling multi-accessory-attaching gutter-beam system(s) 108 is (or are each) formed into the combined shapes of its components.
9) Rainwater-channeling side gutter beams 109 is (or are each) formed into the shape of (a or an) rectangle.
10) Rainwater-channeling end gutter beams 110 is (or are each) formed into the shape of (a or an) rectangle.
11) Discrete rainwater chutes 111 is (or are each) formed into the shape of (a or an) U.
12) Discrete rainwater drain openings 112 is (or are each) formed into the shape of (a or an) square.
13) Easy-to-install discrete-hydro-mist-emitter track 113 is (or are each) formed into the shape of (a or an) U.
14) Hydro-mist emitters 114 is (or are each) formed into the shape of (a or an) cylinder.
15) Hydro-mist-securing clips 115 is (or are each) formed into the shape of (a or an) arc.
16) Hydro-mist water-supply lines 116 is (or are each) formed into the shape of (a or an) tube.
17) Privacy-enabling wind-and-smoke-redirecting insect-protecting water-mist-cooling horizontal-and-vertical-sliding-door-securing cold-weather-insulating weather-sealing food-dehydrator-capable bleacher-skybox-capable mobile-marine-sauna-capable forge-fire-stoking louvered-window-and-barrier system(s) 117 is (or are each) formed into the combined shapes of its components.
18) Door-window-and-wall-panel frames 118 is (or are each) formed into the shape of (a or an) rectangle.
19) Privacy-enabling wind-and-smoke-redirecting cold-weather-insulating rainwater-sealing skybox-enabling marine-sauna-enabling food-dehydrating-enabling window-panel inserts 119 is (or are each) formed into the shape of (a or an) square.
20) Privacy-enabling wind-and-smoke-redirecting cold-weather-insulating rainwater-sealing skybox-enabling marine-sauna-enabling food-dehydrator-enabling rotatable-and-reversible-and-flippable louver braces 120 is (or are each) formed into the shape of (a or an) octagonal.

29

Figure 8:
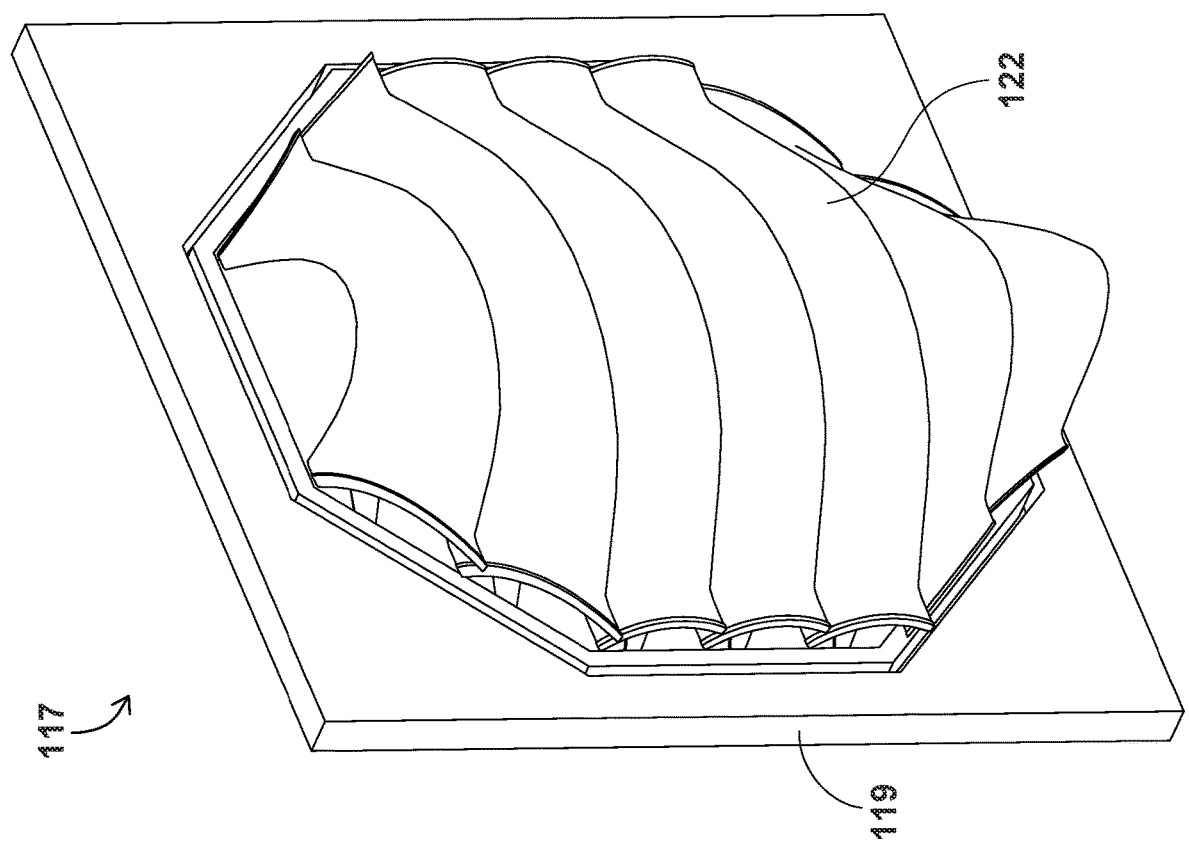
Figure 9:
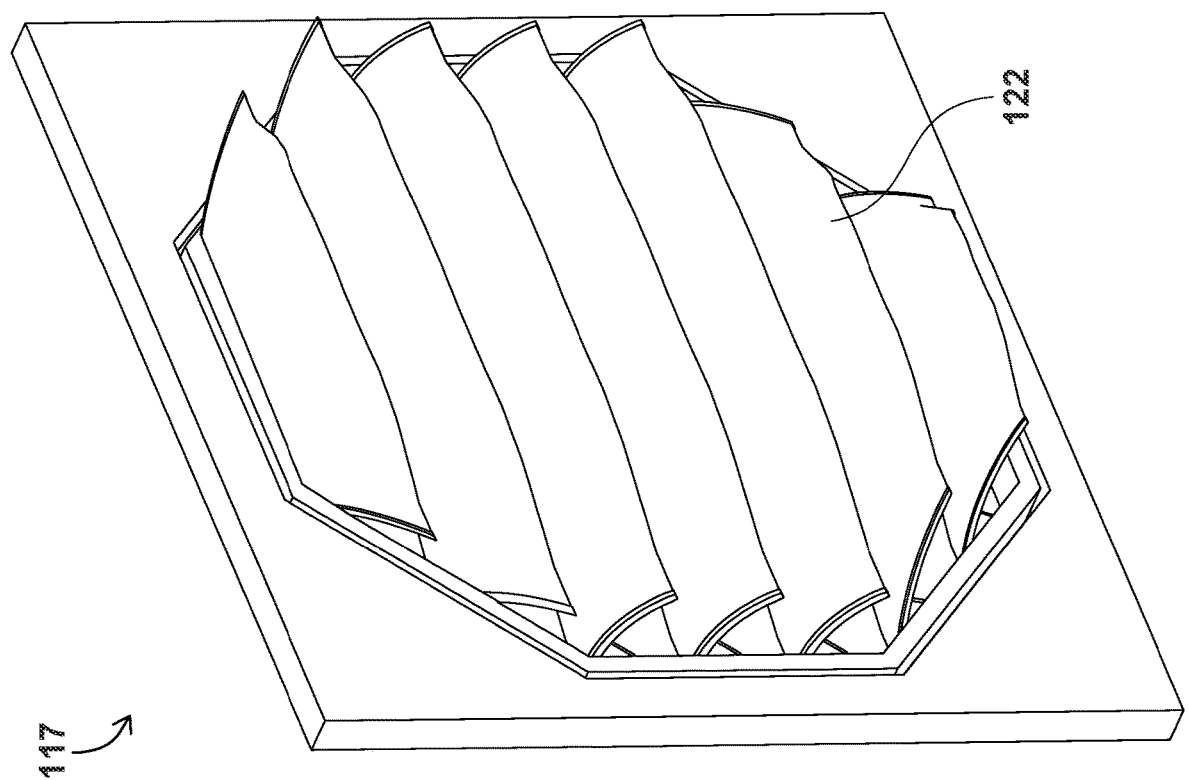
Figure 10:
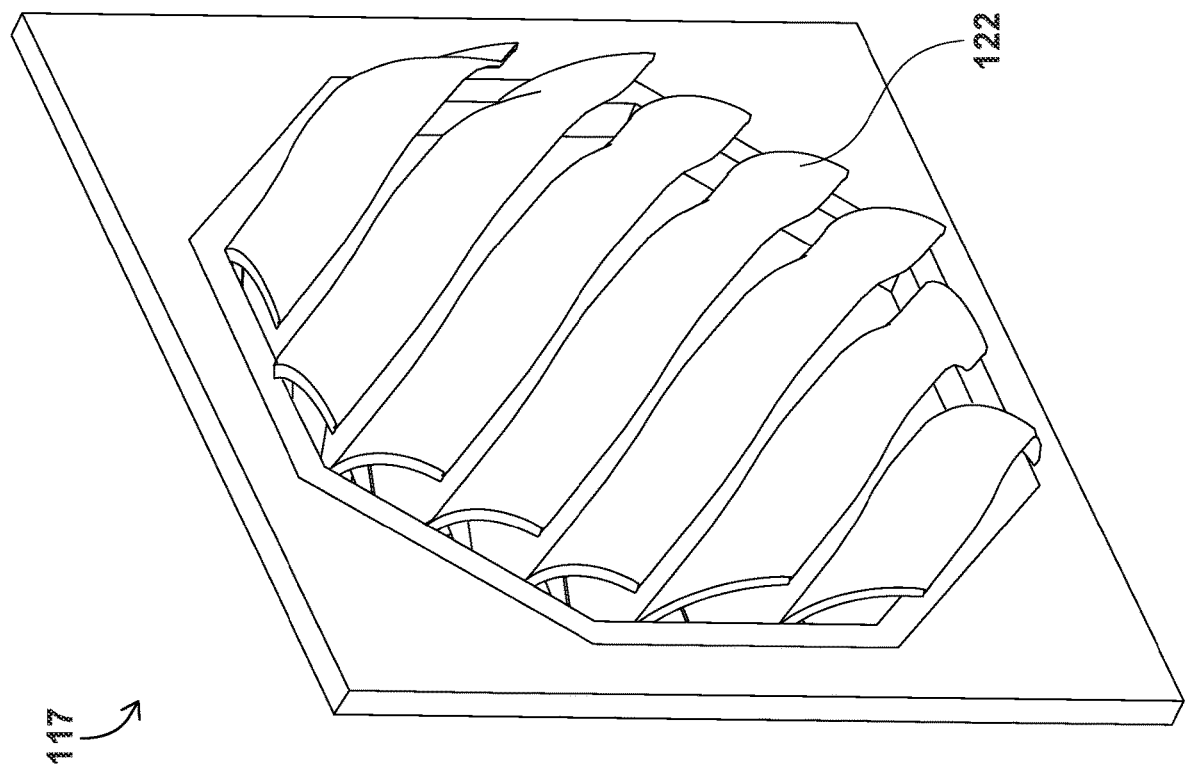
Figure 11:
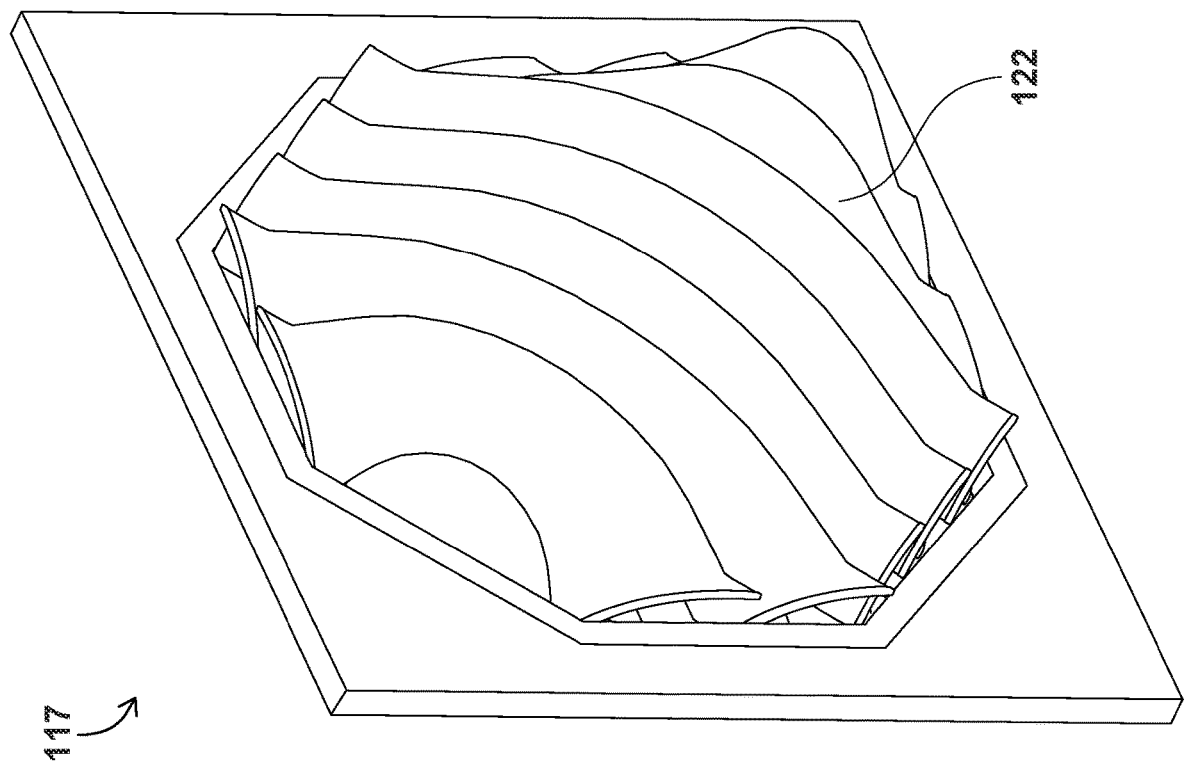
Figure 12:
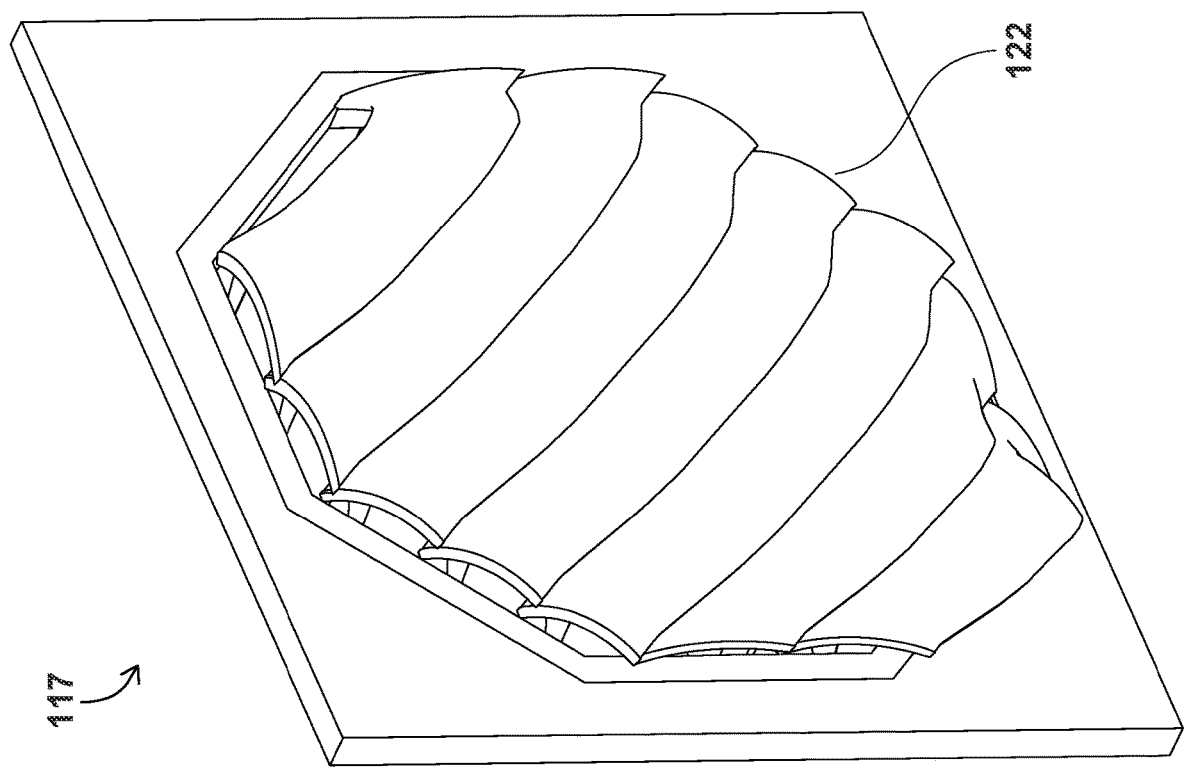
Figure 13:
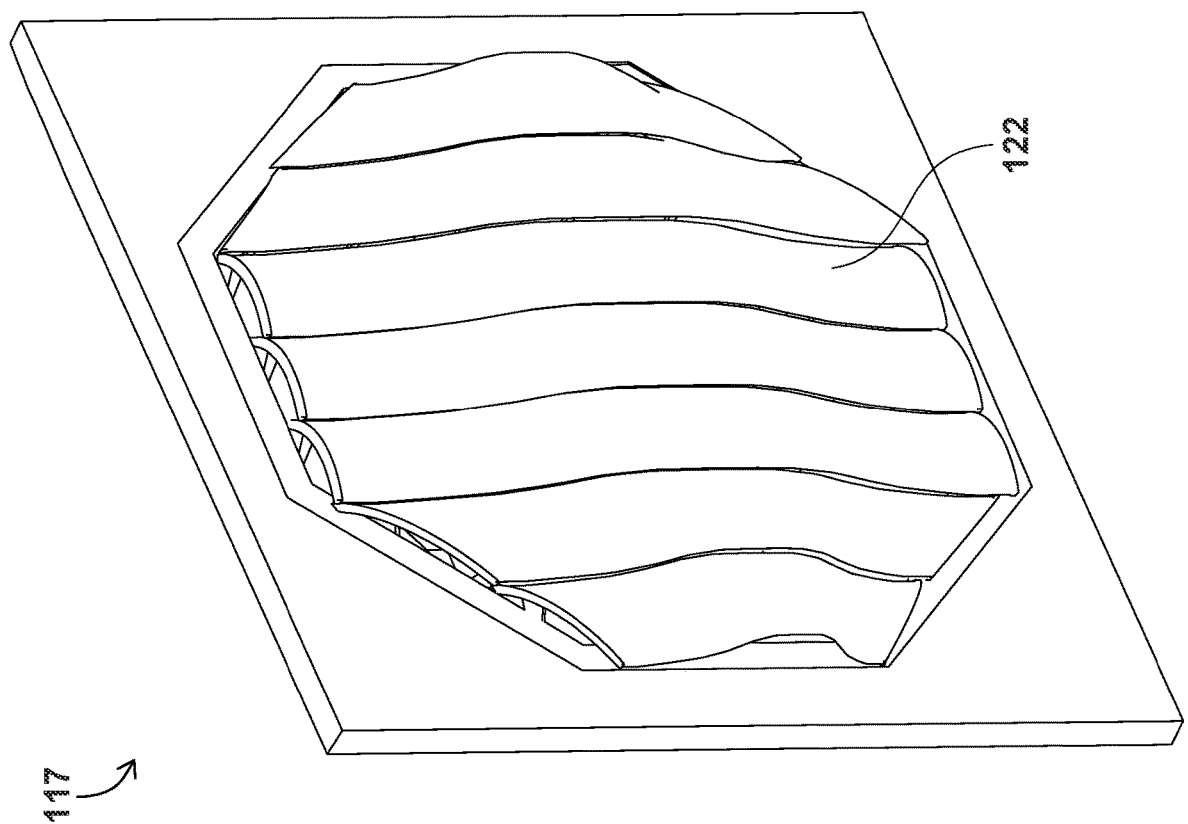
Figure 14:
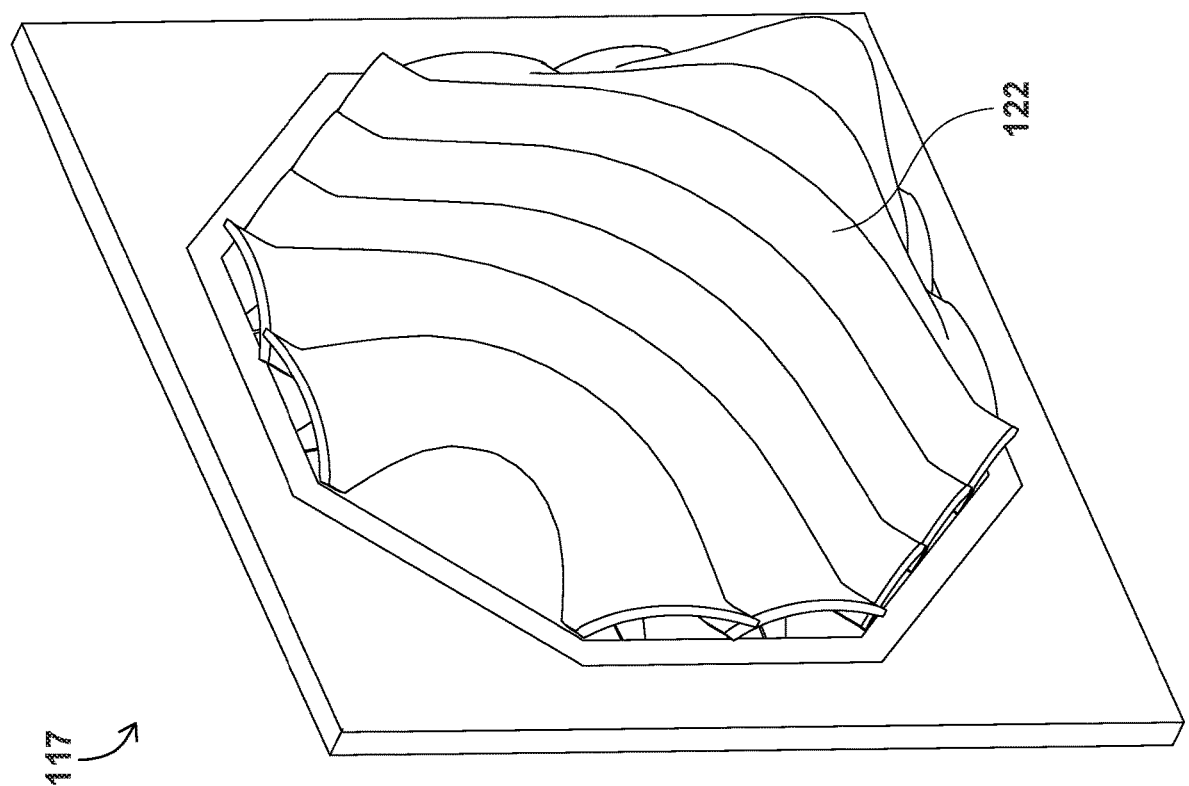
Figure 15:
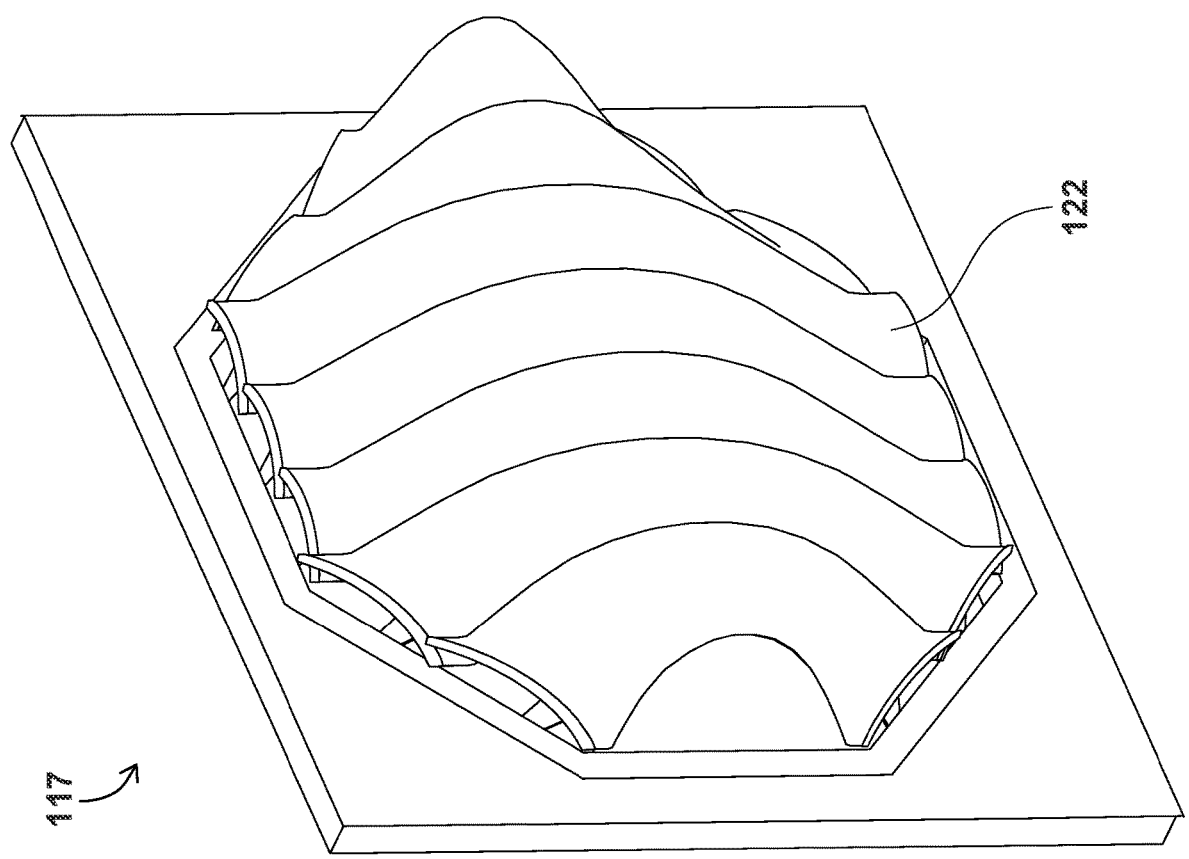

21) Spring-loaded rotation-locking axis pins 121 is (or are each) formed into the shape of (a or an) cylinder.
22) Privacy-enabling wind-and-smoke-redirecting cold-weather-insulating rainwater-sealing skybox-enabling marine-sauna-enabling food-dehydrator-enabling louvers 122 is (or are each) formed into the shape of (a or an) blade.
23) Half-moon multi-position-locking bracket 123 is (or are each) formed into the shape of (a or an) semi-circular.
24) Multi-position-locking spring-loaded louver-adjusting control knob 124 is (or are each) formed into the shape of (a or an) cylinder.
25) Easy-to-install noise-dampening-multi-purpose-curtain-and-insect-screen-hook-sliding track 125 is (or are each) formed into the shape of (a or an) T.
26) Easy-to-install sound-dampening-inner-track insert 126 is (or are each) formed into the shape of (a or an) T.
27) Easy-to-install privacy curtain-and-insect-screen-securing easy-slide hooks 127 is (or are each) formed into the shape of (a or an) T.
28) Privacy-enabling wind-protecting curtain 128 is (or are each) formed into the shape of (a or an) rectangle.
29) Insect-preventing screen 129 is (or are each) formed into the shape of (a or an) rectangle.
30) Easy-to-install-extending-and-retracting-door-spool-housing bracket 130 is (or are each) formed into the shape of (a or an) rectangular-box.
31) Easy-to-install-extending-and-retracting-door-spool housing 131 is (or are each) formed into the shape of (a or an) box.
32) Easy-to-install-extending-and-retracting-door spool 132 is (or are each) formed into the shape of (a or an) cylinder.
33) Extending-and-retracting door 133 is (or are each) formed into the shape of (a or an) rectangle.
34) Extending-and-retracting-door-side-post bracket and guide 134 is (or are each) formed into the shape of (a or an) rectangle.
35) Extending-and-retracting-door-securing lock 135 is (or are each) formed into the shape of (a or an) U.
36) Extending-and-retracting-door-securing bracket 136 is (or are each) formed into the shape of (a or an) figure-8.
37) Extending-and-retracting-door water-sealing weather strip 137 is (or are each) formed into the shape of (a or an) tube-with-a-mushroom-profile.
38) Adjustably-leveling rainwater-draining-legs-and-base system(s) 138 is (or are each) formed into the combined shapes of its components.
39) Corner-posts 139 is (or are each) formed into the shape of (a or an) rectangle-tube.
40) Corner-post L-shaped caps 140 is (or are each) formed into the shape of (a or an) L.
41) Gutter-beam cradles 141 is (or are each) formed into the shape of (a or an) square.
42) Hydro-mist water-supply quick-release coupler 142 is (or are each) formed into the shape of (a or an) cylinder.
43) Corner-post-base-plate cover 143 is (or are each) formed into the shape of (a or an) square-with-a-square-hole.
44) Corner-posts base-plate 144 is (or are each) formed into the shape of (a or an) square.
45) Sliding-door lower track 145 is (or are each) formed into the shape of (a or an) rectangle.
46) Anchoring-screw holes 146 is (or are each) formed into the shape of (a or an) circle.
47) Height-and-angle-adjustable tube-screws 147 is (or are each) formed into the shape of (a or an) tube.
48) Anchoring bolts 148 is (or are each) formed into the shape of (a or an) cylinder.

30

Connection

Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, FIG. 31C, FIG. 31D, FIG. 31E, FIG. 31F, FIG. 31G, FIG. 31H, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, FIG. 46D, FIG. 46E, FIG. 46F, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65A, FIG. 65B, FIG. 66A, FIG. 66B, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 91, FIG. 93, FIG. 95, FIG. 96, FIG. 97, FIG. 98, FIG. 99, FIG. 100, FIG. 101, FIG. 102, FIG. 103, FIG. 113, FIG. 114, FIG. 115, FIG. 116, FIG. 125, FIG. 126, FIG. 162, FIG. 163, FIG. 164, FIG. 165, FIG. 166, FIG. 174, FIG. 175, FIG. 176, FIG. 179, FIG. 180, FIG. 181, FIG. 182, and FIG. 183:

1) Rainwater-sealing-and-shedding multi-position-adjustable solar-panel-led-lighting multi-louver-blade-roof system system(s) 101 is (or are respectively) connected by the combined connections of its components.
2) Adjustable louver blades 102 is (or are respectively) rotatably attached to rainwater-channeling side gutter beams 109.
3) Adjustable LED-light-powering solar panel 103 is (or are respectively) attached to adjustable louver blades 102.
4) Battery cover 104 is (or are respectively) attached to battery housing 106.
5) LED-powering solar-rechargeable batteries 105 is (or are respectively) inserted within battery housing 106.
6) Battery housing 106 is (or are respectively) inserted within adjustable louver blades 102.
7) LED lights 107 is (or are respectively) attached to adjustable louver blades 102.
8) Multi-function discrete rainwater-channeling-and-collecting mist-cooling multi-accessory-attaching gutter-beam system(s) 108 is (or are respectively) connected by the combined connections of its components.
9) Rainwater-channeling side gutter beams 109 is (or are respectively) attached to gutter-beam cradles 141.
10) Rainwater-channeling end gutter beams 110 is (or are respectively) attached to gutter-beam cradles 141.
11) Discrete rainwater chutes 111 is (or are respectively) formed to rainwater-channeling side gutter beams 109 and rainwater-channeling end gutter beams 110.
12) Discrete rainwater drain openings 112 is (or are respectively) formed into corner-posts 139.
13) Easy-to-install discrete-hydro-mist-emitter track 113 is (or are respectively) hooked onto discrete rainwater chutes 111.
14) Hydro-mist emitters 114 is (or are respectively) snapped into hydro-mist-securing clips 115.
15) Hydro-mist-securing clips 115 is (or are respectively) formed into easy-to-install discrete-hydro-mist-emitter track 113.
16) Hydro-mist water-supply lines 116 is (or are respectively) connected to hydro-mist emitters 114.
17) Privacy-enabling wind-and-smoke-redirecting insect-protecting water-mist-cooling horizontal-and-verticalsliding-door-securing cold-weather-insulating weather-sealing food-dehydrator-capable bleacher-skybox-capable mobile-marine-sauna-capable forge-fire-stoking louvered-window-and-barrier system(s) 117 is (or are respectively) connected by the combined connections of its components.

18) Door-window-and-wall-panel frames 118 is (or are respectively) interchangably and slidably placed into sliding-door lower track 145.

19) Privacy-enabling wind-and-smoke-redirecting cold-weather-insulating rainwater-sealing skybox-enabling marine-sauna-enabling food-dehydrating-enabling window-panel inserts 119 is (or are respectively) inserted within door-window-and-wall-panel frames 118.

20) Privacy-enabling wind-and-smoke-redirecting cold-weather-insulating rainwater-sealing skybox-enabling marine-sauna-enabling food-dehydrator-enabling rotatable-and-reversible-and-flippable louver braces 120 is (or are respectively) rotatably inserted within door-window-and-wall-panel frames 118.

21) Spring-loaded rotation-locking axis pins 121 is (or are respectively) inserted within privacy-enabling wind-and-smoke-redirecting cold-weather-insulating rainwater-sealing skybox-enabling marine-sauna-enabling food-dehydrator-enabling rotatable-and-reversible-and-flippable louver braces 120.

22) Privacy-enabling wind-and-smoke-redirecting cold-weather-insulating rainwater-sealing skybox-enabling marine-sauna-enabling food-dehydrator-enabling louvers 122 is (or are respectively) rotatably and adjustably attached to privacy-enabling wind-and-smoke-redirecting cold-weather-insulating rainwater-sealing skybox-enabling marine-sauna-enabling food-dehydrator-enabling rotatable-and-reversible-and-flippable louver braces 120.

23) Half-moon multi-position-locking bracket 123 is (or are respectively) attached to door-window-and-wall-panel frames 118.

24) Multi-position-locking spring-loaded louver-adjusting control knob 124 is (or are respectively) springingly attached to privacy-enabling wind-and-smoke-redirecting cold-weather-insulating rainwater-sealing skybox-enabling marine-sauna-enabling food-dehydrator-enabling louvers 122.

25) Easy-to-install noise-dampening-multi-purpose-curtain-and-insect-screen-hook-sliding track 125 is (or are respectively) removably attached to discrete rainwater chutes 111 and screwed to rainwater-channeling side gutter beams 109.

26) Easy-to-install sound-dampening-inner-track insert 126 is (or are respectively) slidably inserted within easy-to-install noise-dampening-multi-purpose-curtain-and-insect-screen-hook-sliding track 125.

27) Easy-to-install privacy curtain-and-insect-screen-securing easy-slide hooks 127 is (or are respectively) slidably inserted within easy-to-install sound-dampening-inner-track insert 126.

28) Privacy-enabling wind-protecting curtain 128 is (or are respectively) removably hooked onto easy-to-install privacy curtain-and-insect-screen-securing easy-slide hooks 127.

29) Insect-preventing screen 129 is (or are respectively) removably hooked onto easy-to-install privacy curtain-and-insect-screen-securing easy-slide hooks 127.

30) Easy-to-install-extending-and-retracting-door-spool-housing bracket 130 is (or are respectively) removably attached to rainwater-channeling side gutter beams 109.

31) Easy-to-install-extending-and-retracting-door-spool housing 131 is (or are respectively) attached to easy-to-install-extending-and-retracting-door-spool-housing bracket 130.

32) Easy-to-install-extending-and-retracting-door spool 132 is (or are respectively) rollably inserted with easy-to-install-extending-and-retracting-door-spool housing 131.

33) Extending-and-retracting door 133 is (or are respectively) rolled around easy-to-install-extending-and-retracting-door spool 132.

34) Extending-and-retracting-door-side-post bracket and guide 134 is (or are respectively) attached to corner-posts 139.

35) Extending-and-retracting-door-securing lock 135 is (or are respectively) attached to extending-and-retracting door 133.

36) Extending-and-retracting-door-securing bracket 136 is (or are respectively) attached to corner-posts base-plate 144.

37) Extending-and-retracting-door water-sealing weather strip 137 is (or are respectively) attached to extending-and-retracting-door-securing lock 135.

38) Adjustably-leveling rainwater-draining-legs-and-base system(s) 138 is (or are respectively) connected by the combined connections of its components.

39) Corner-posts 139 is (or are respectively) attached to rainwater-channeling side gutter beams 109 and rainwater-channeling end gutter beams 110.

40) Corner-post L-shaped caps 140 is (or are respectively) screwed to corner-posts 139.

41) Gutter-beam cradles 141 is (or are respectively) formed into corner-posts 139.

42) Hydro-mist water-supply quick-release coupler 142 is (or are respectively) mounted to corner-posts 139 and attached to hydro-mist water-supply lines 116.

43) Corner-post-base-plate cover 143 is (or are respectively) slidably attached onto corner-posts 139.

44) Corner-posts base-plate 144 is (or are respectively) secured to corner-posts 139.

45) Sliding-door lower track 145 is (or are respectively) attached to corner-posts base-plate 144.

46) Anchoring-screw holes 146 is (or are respectively) drilled into corner-posts base-plate 144.

47) Height-and-angle-adjustable tube-screws 147 is (or are respectively) screwed in anchoring-screw holes 146.

48) Anchoring bolts 148 is (or are respectively) screwed through height-and-angle-adjustable tube-screws 147 into anchoring-screw holes 146.

Function

Referring to FIG. 23, FIG. 24, FIG. 25, FIG. 26, FIG. 27, FIG. 28, FIG. 29, FIG. 30, FIG. 31A, FIG. 31B, FIG. 31C, FIG. 31D, FIG. 31E, FIG. 31F, FIG. 31G, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, FIG. 46D, FIG. 46E, FIG. 46F, FIG. 48, FIG. 49, FIG. 50, FIG. 81, FIG. 82, FIG. 83, FIG. 117, FIG. 150, FIG. 152, FIG. 167, FIG. 176, FIG. 177, FIG. 192, and FIG. 193:

1) Rainwater-sealing-and-shedding multi-position-adjustable solar-panel-led-lighting multi-louver-blade-roof system system(s) 101 is (or are respectively) for performing the combined functions of its components.

2) Adjustable louver blades 102 is (or are respectively) for:
   a) Shedding water into discrete rainwater chutes 111;
   b) Preventing rainwater from getting into the four-device-in-one bleacher-skybox food-dehydrator mobile-marine-sauna wind-and-smoke-redirecting bungalow;

c) Adjustably controlling amount of sunlight that shines into the four-device-in-one bleacher-skybox food-dehydrator mobile-marine-sauna wind-and-smoke-redirecting bungalow; and d) Adjustably controlling and redirecting wind and smoke.

3) Adjustable LED-light-powering solar panel 103 is (or are respectively) for:

a) Collecting solar energy to charge led-powering solar-rechargeable batteries 105
(see FIG. 98, FIG. 99, FIG. 100, FIG. 101, FIG. 102, FIG. 103, and FIG. 104);

b) Collecting solar energy to recharge led-powering solar-rechargeable batteries 105
(see FIG. 98, FIG. 99, FIG. 100, FIG. 101, FIG. 102, FIG. 103, and FIG. 104);

c) Saving energy costs associated with lighting the four-device-in-one bleacher-skybox food-dehydrator mobile-marine-sauna wind-and-smoke-redirecting bungalow;

d) Saving costs of repeatedly replacing with non-rechargeable alkaline batteries;

e) Providing freedom to place the four-device-in-one bleacher-skybox food-dehydrator mobile-marine-sauna wind-and-smoke-redirecting bungalow away from a power outlet; and f) Helping reduce carbon footprint.

4) Battery cover 104 is (or are respectively) for:

a) Securing led-powering solar-rechargeable batteries 105 within battery housing 106
(see FIG. 95, FIG. 98, FIG. 99, FIG. 100, FIG. 101, and FIG. 102); and b) Preventing rainwater from reaching led-powering solar-rechargeable batteries 105.

5) LED-powering solar-rechargeable batteries 105 is (or are respectively) for:

a) Powering led lights 107;

b) Saving costs of repeatedly replacing non-rechargeable alkaline batteries; and c) Helping reduce carbon footprint.

6) Battery housing 106 is (or are respectively) for:
Securing led-powering solar-rechargeable batteries 105 (see FIG. 95, FIG. 98, FIG. 99, FIG. 100, FIG. 101, and FIG. 102).

Figure 94:
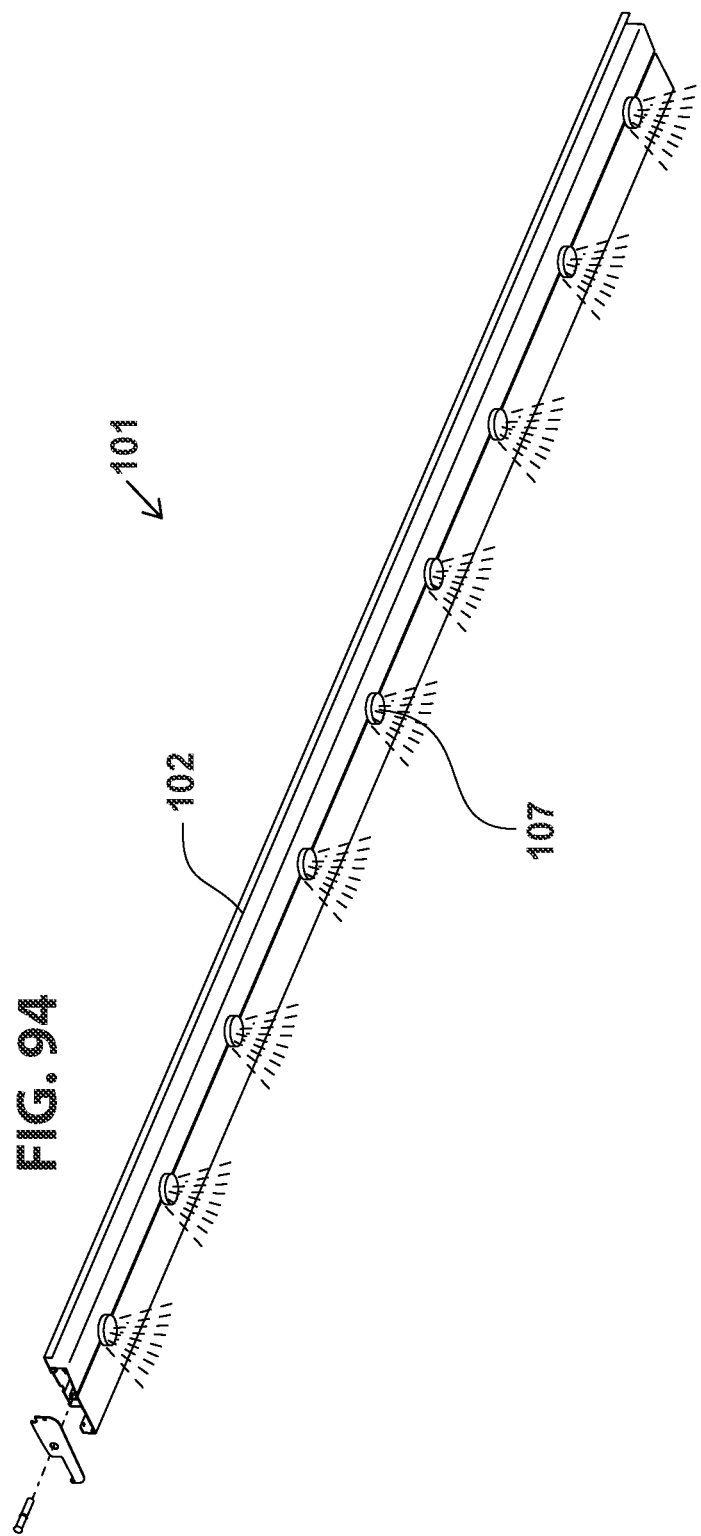
Figure 95:
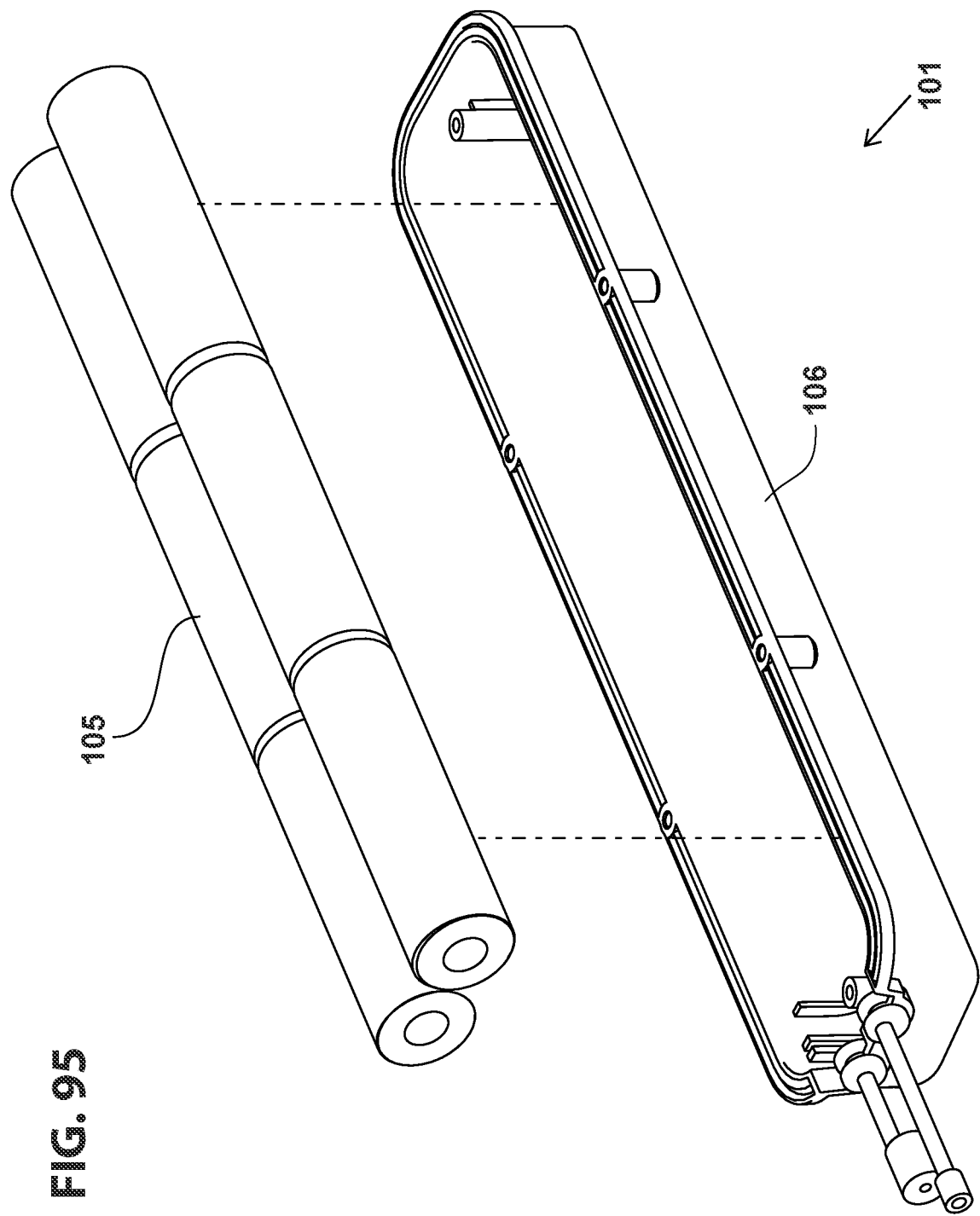
Figure 96:
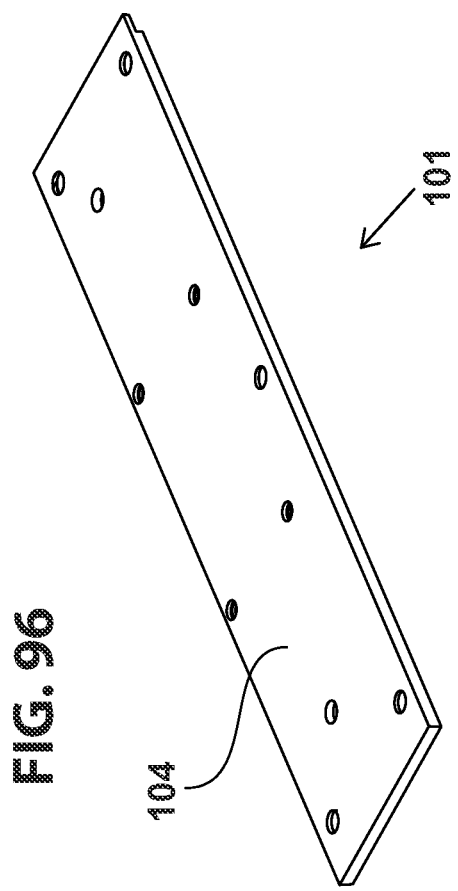
Figure 97:
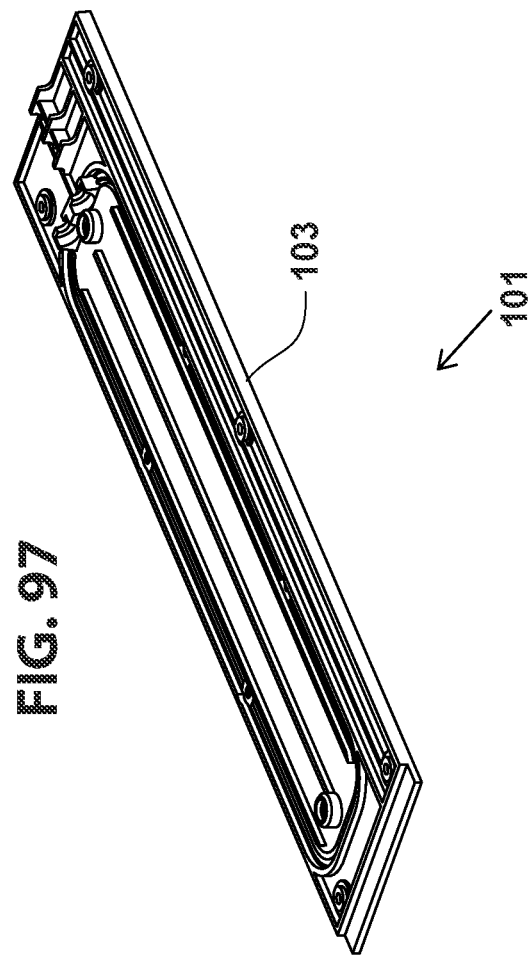
Figure 98:
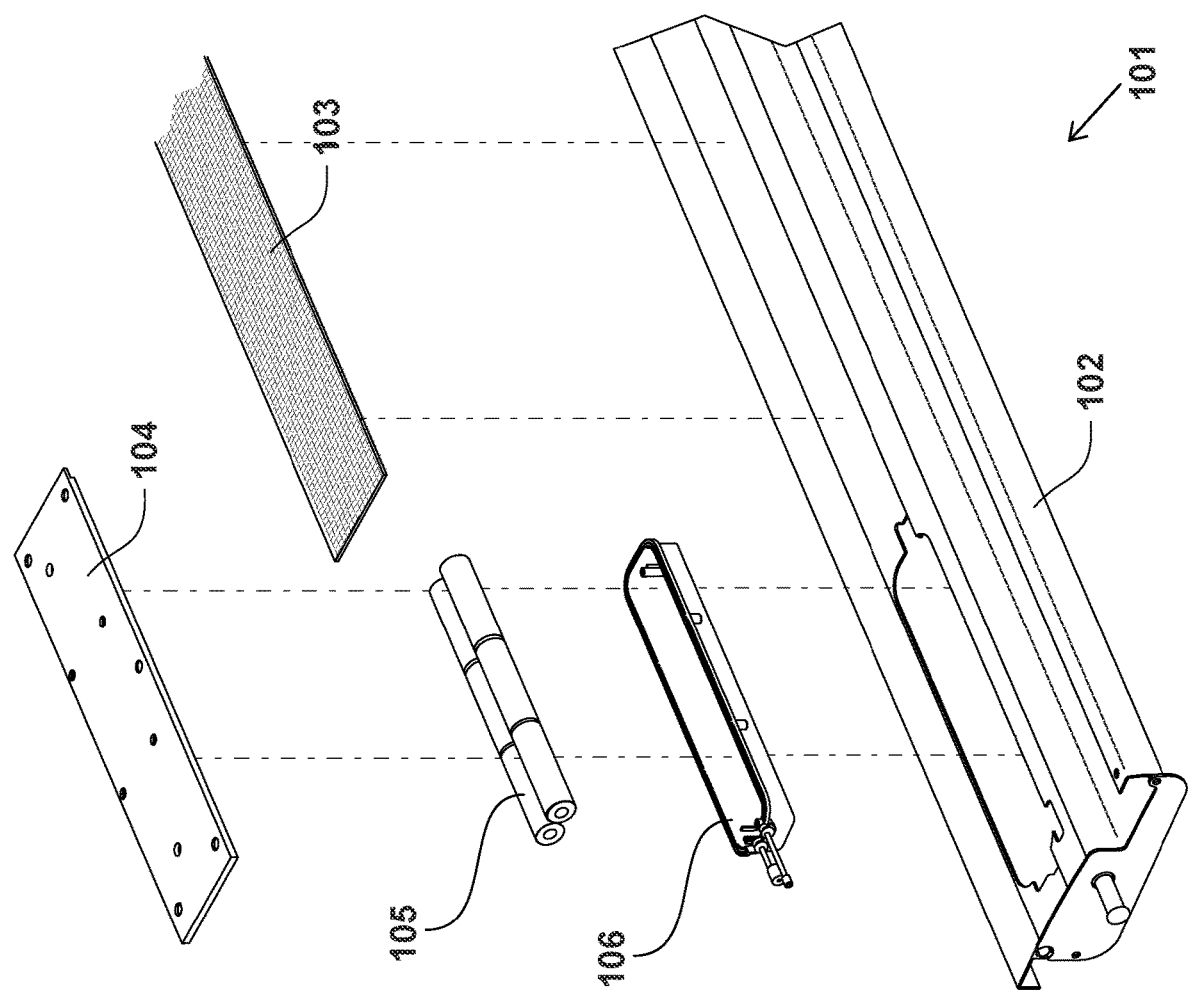
Figure 99:
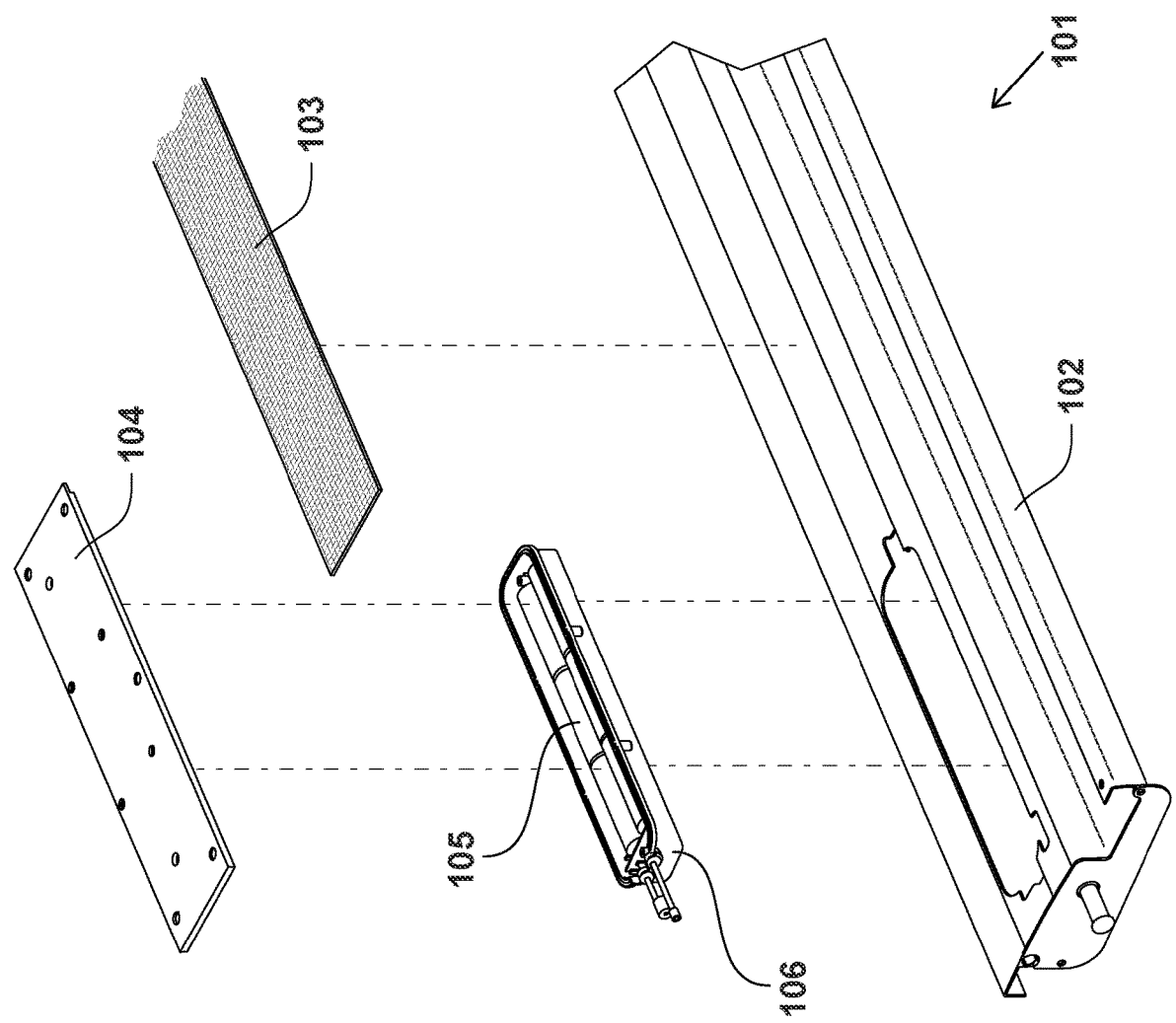
Figure 100:
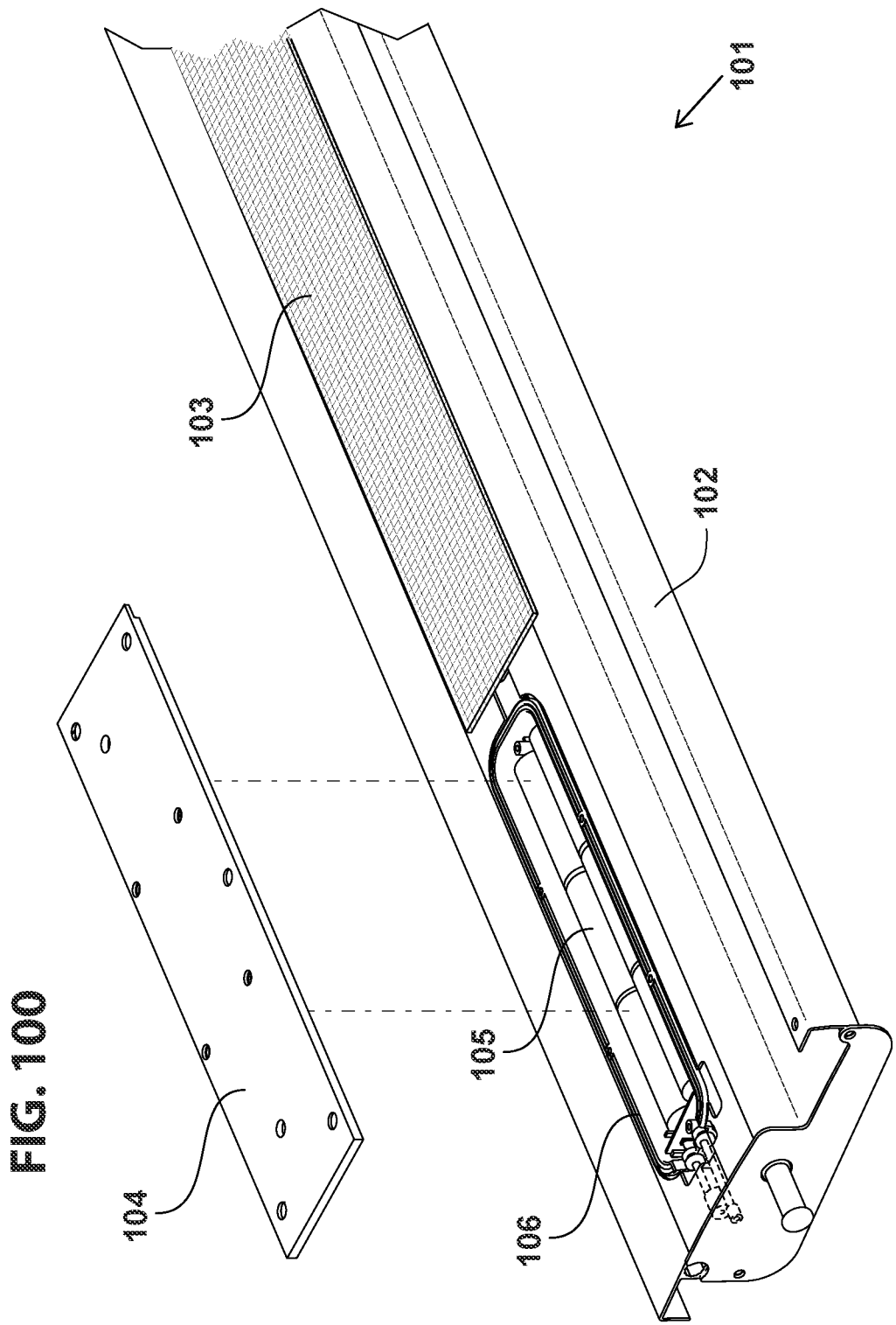
Figure 101:
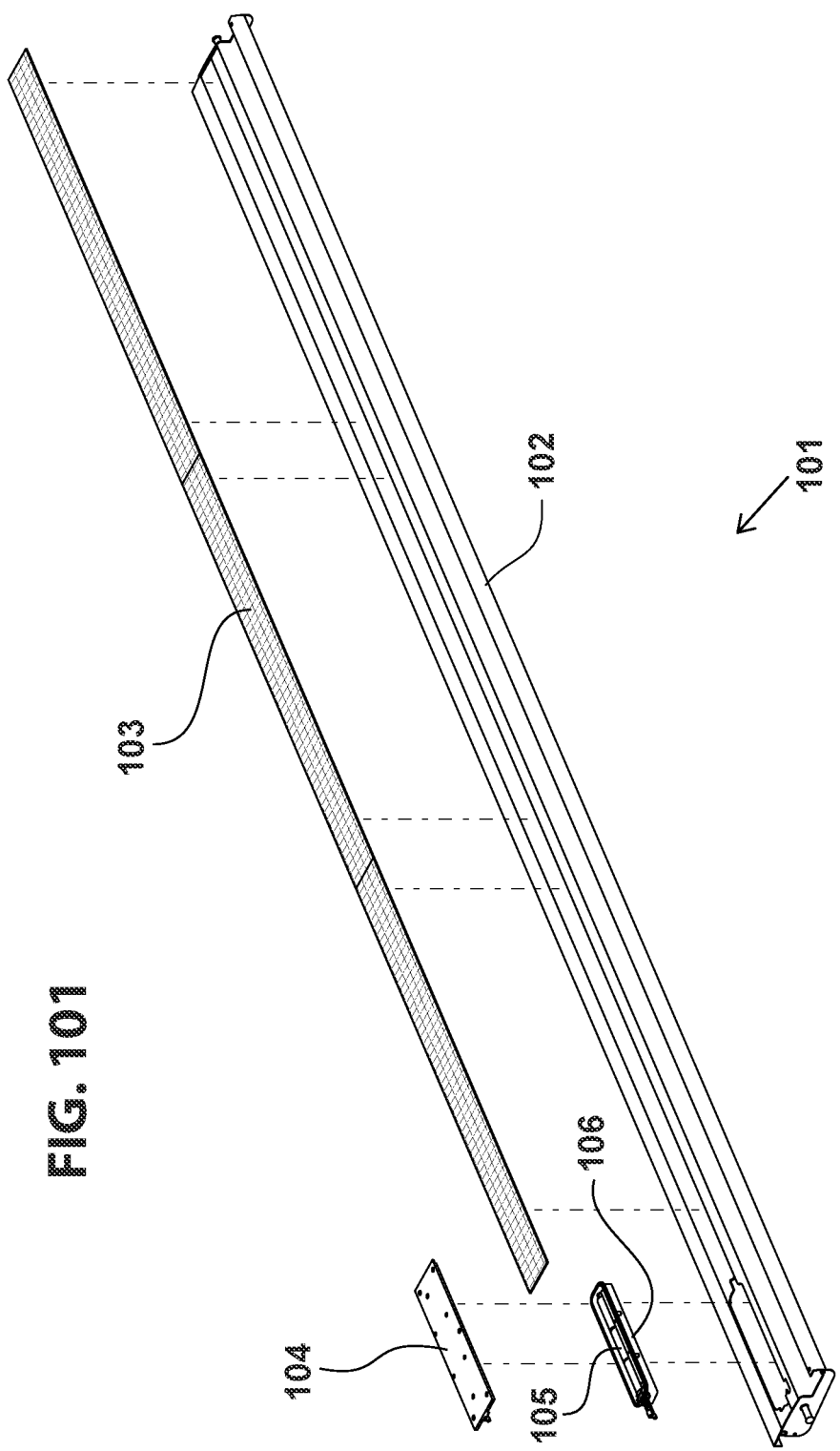
Figure 102:
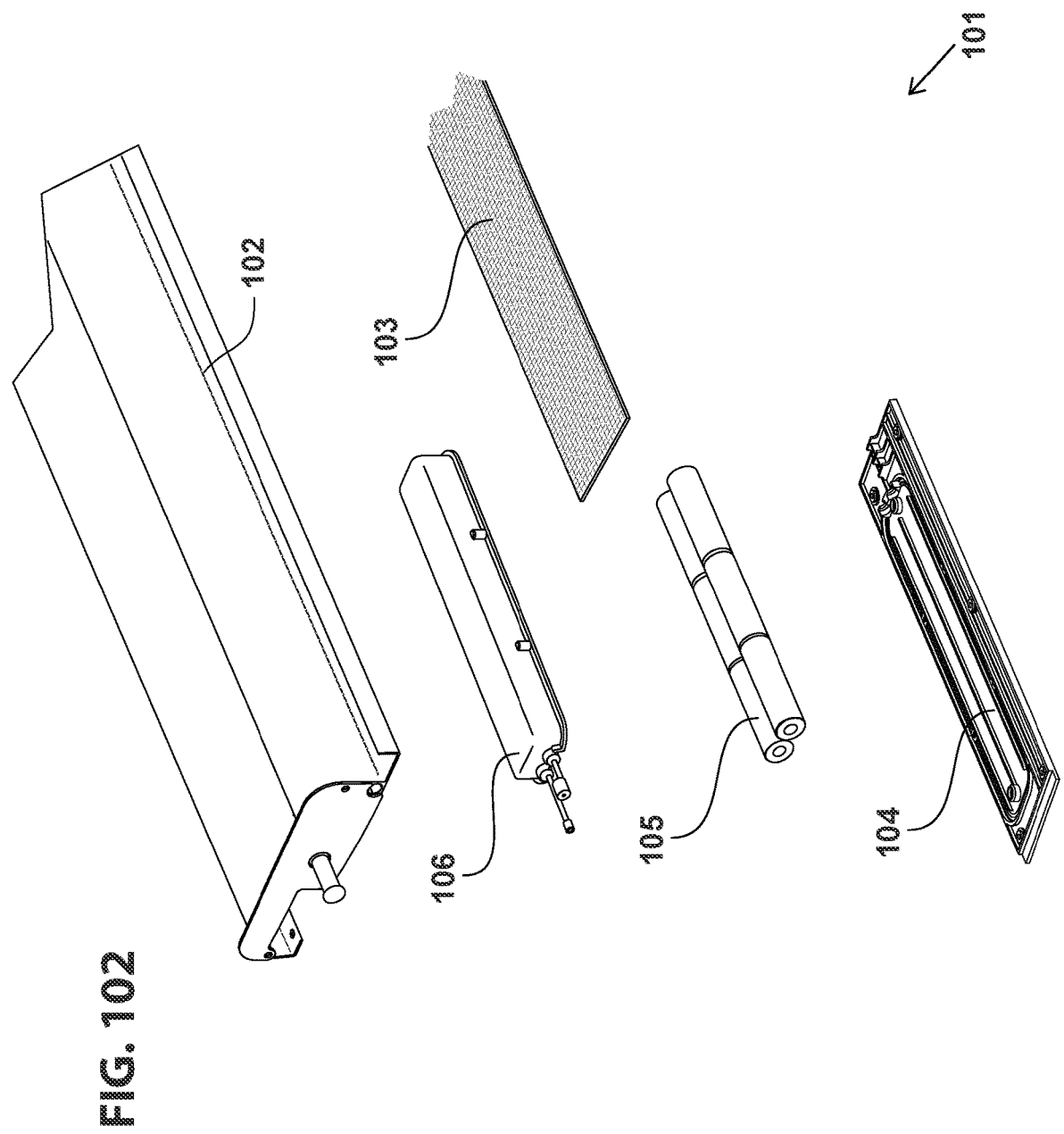
Figure 103:
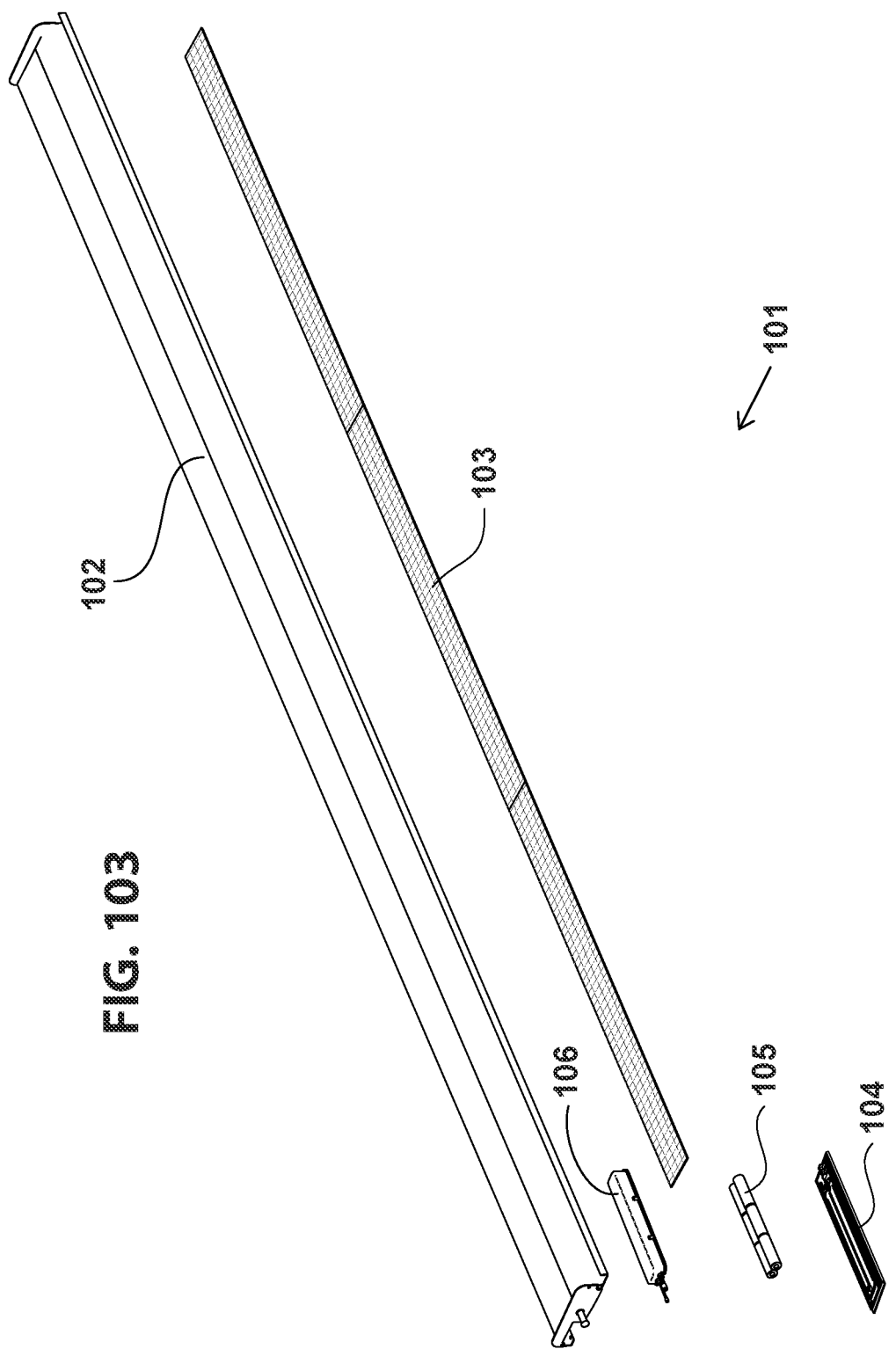
Figure 104:
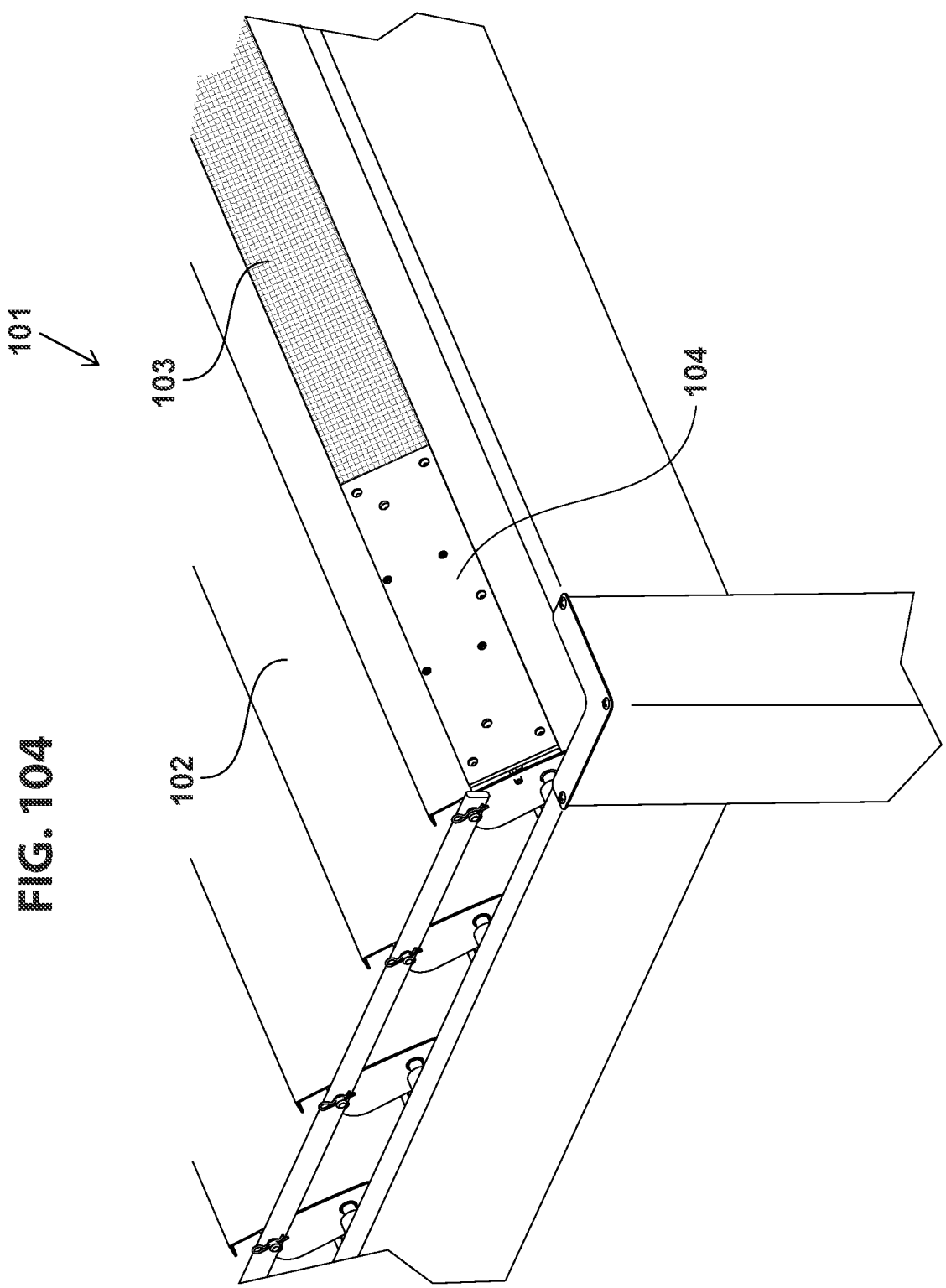
Figure 107:
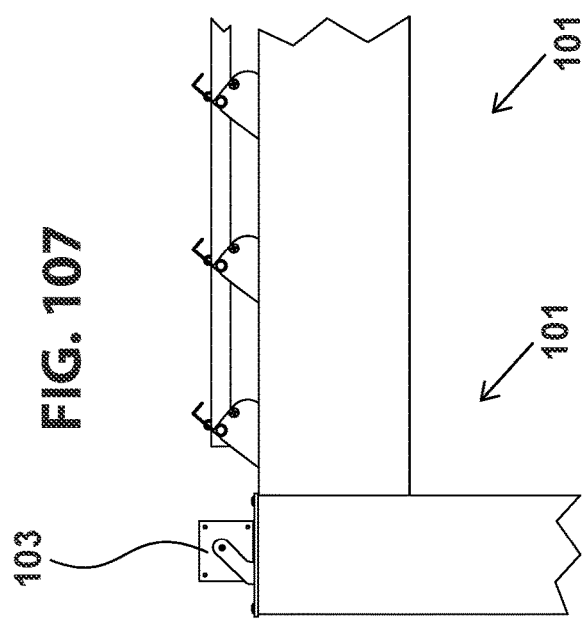
Figure 108:
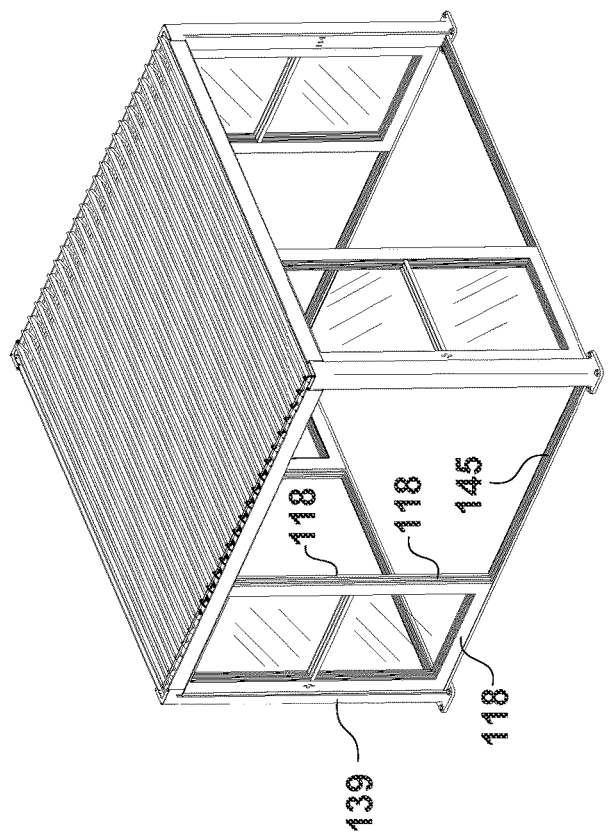
Figure 113:
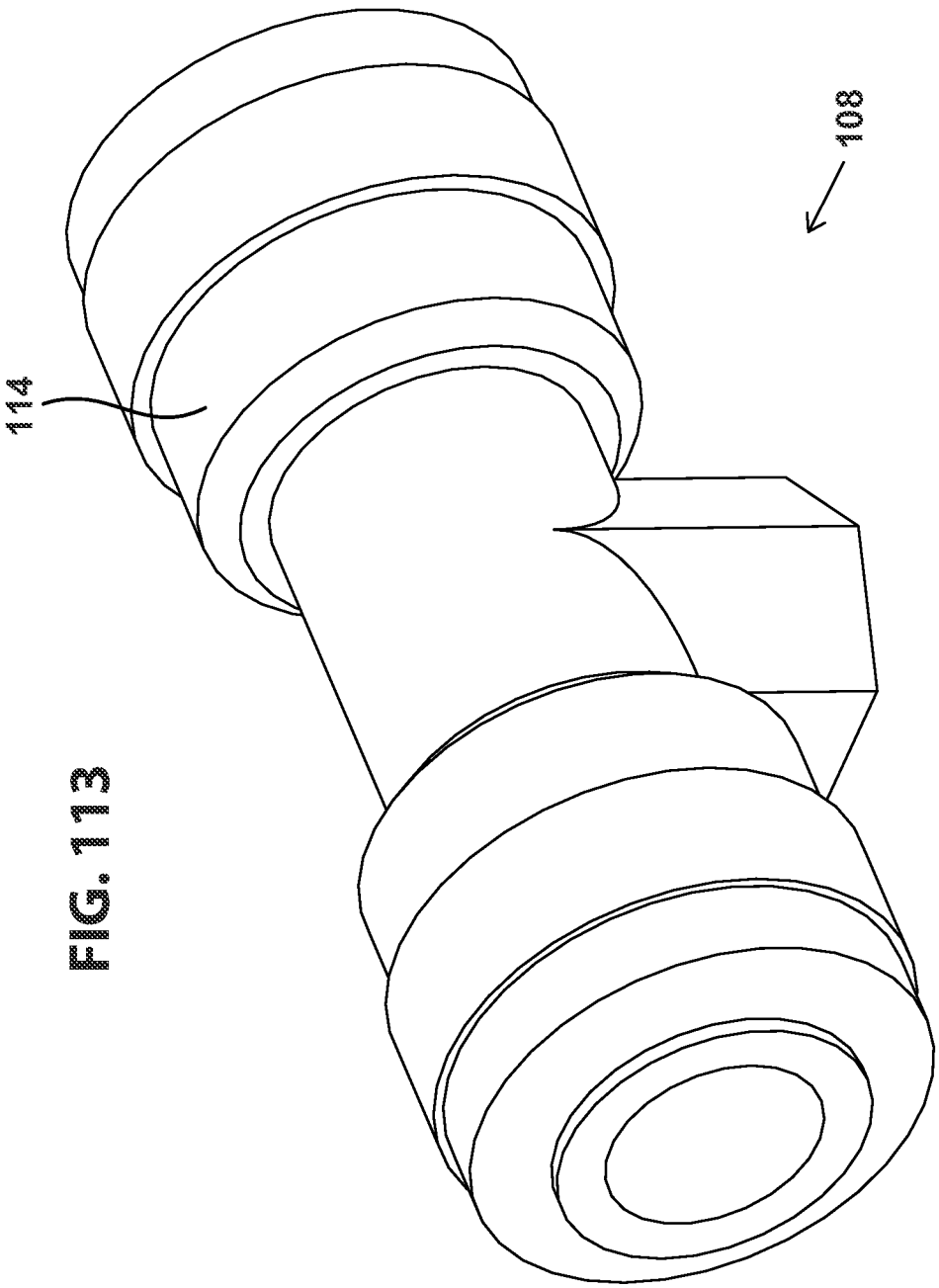
FIG. 113, FIG. 114, FIG. 115, FIG. 116, FIG. 117, and FIG. 118 illustrate perspective and face views demonstrating easy-to-install discrete-hydro-mist-emitter track, hydro-mist emitters, hydro-mist-securing clips, and hydro-mist water-supply lines, and their installation.
Figure 114:
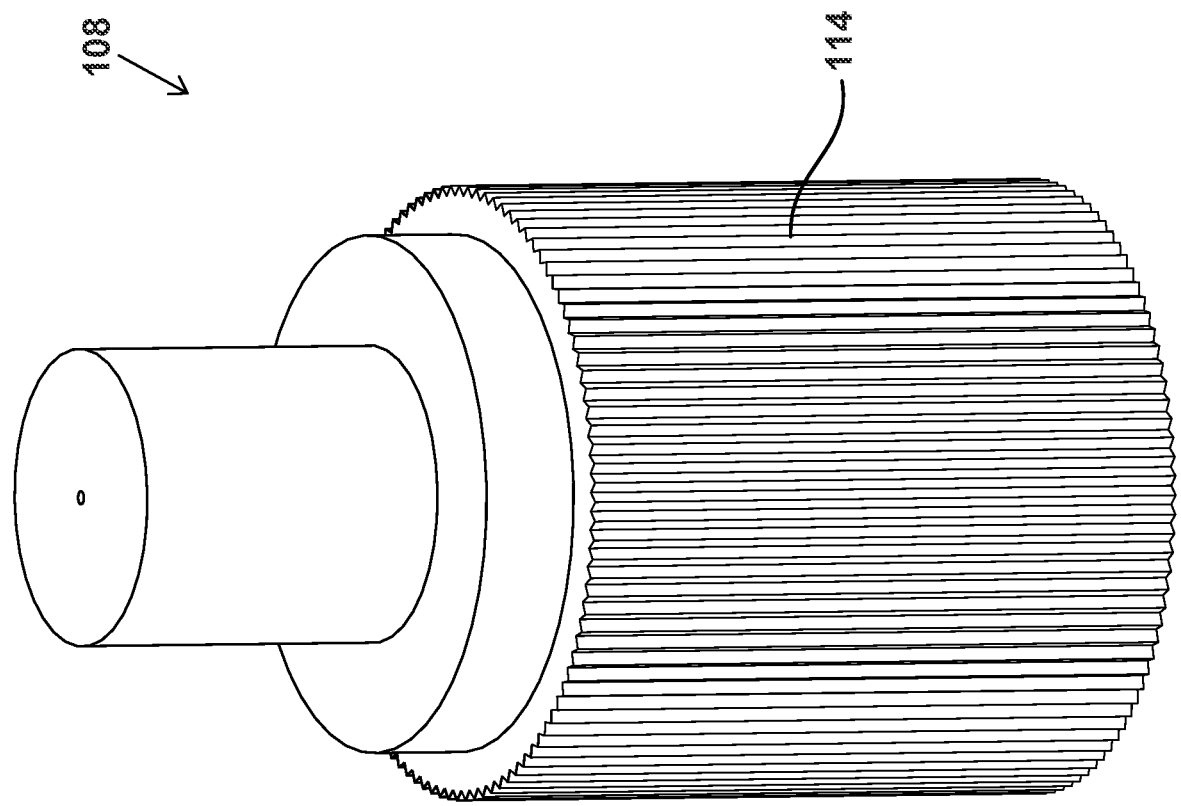
Figure 115:
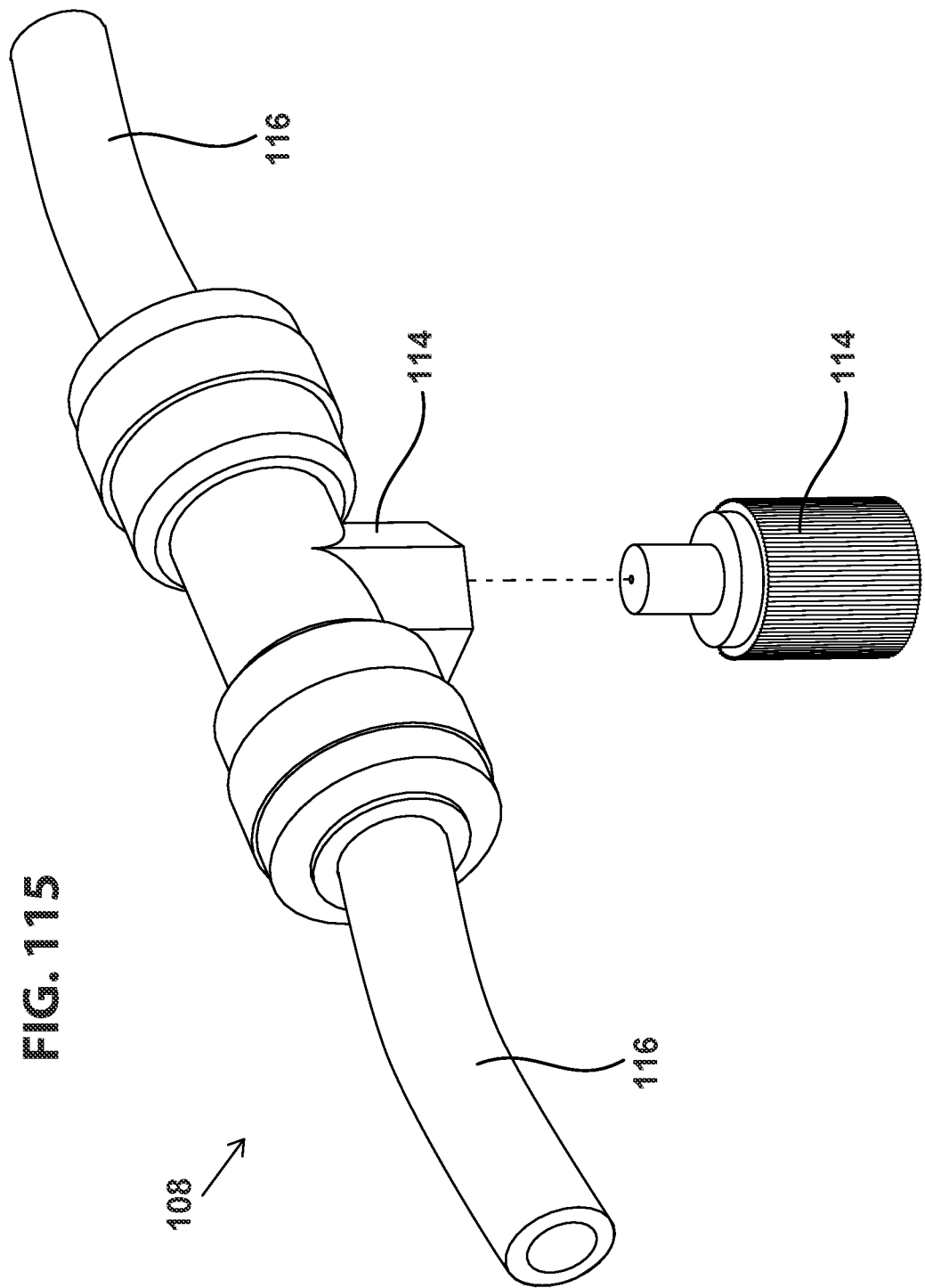
Figure 116:
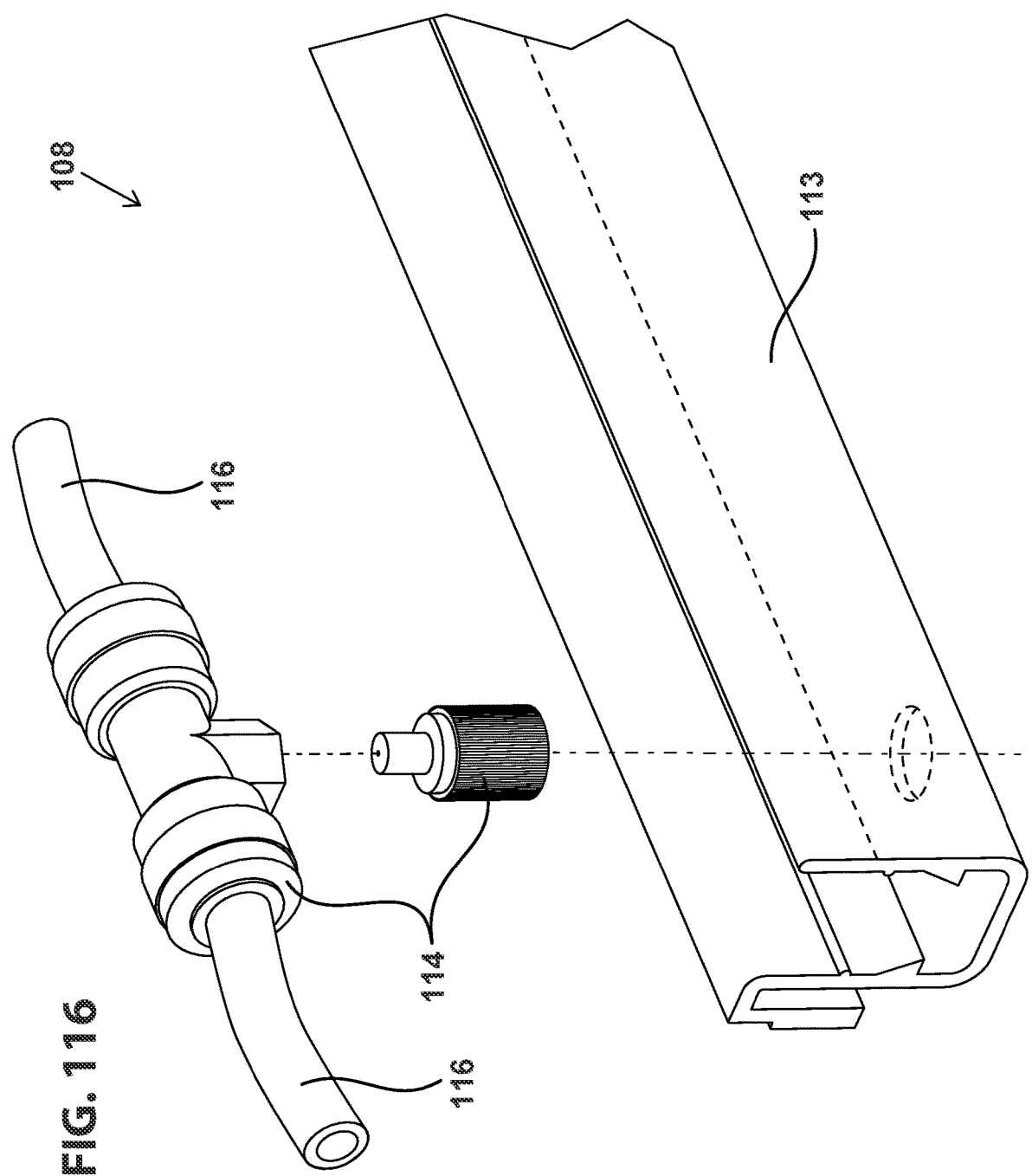
Figure 117:
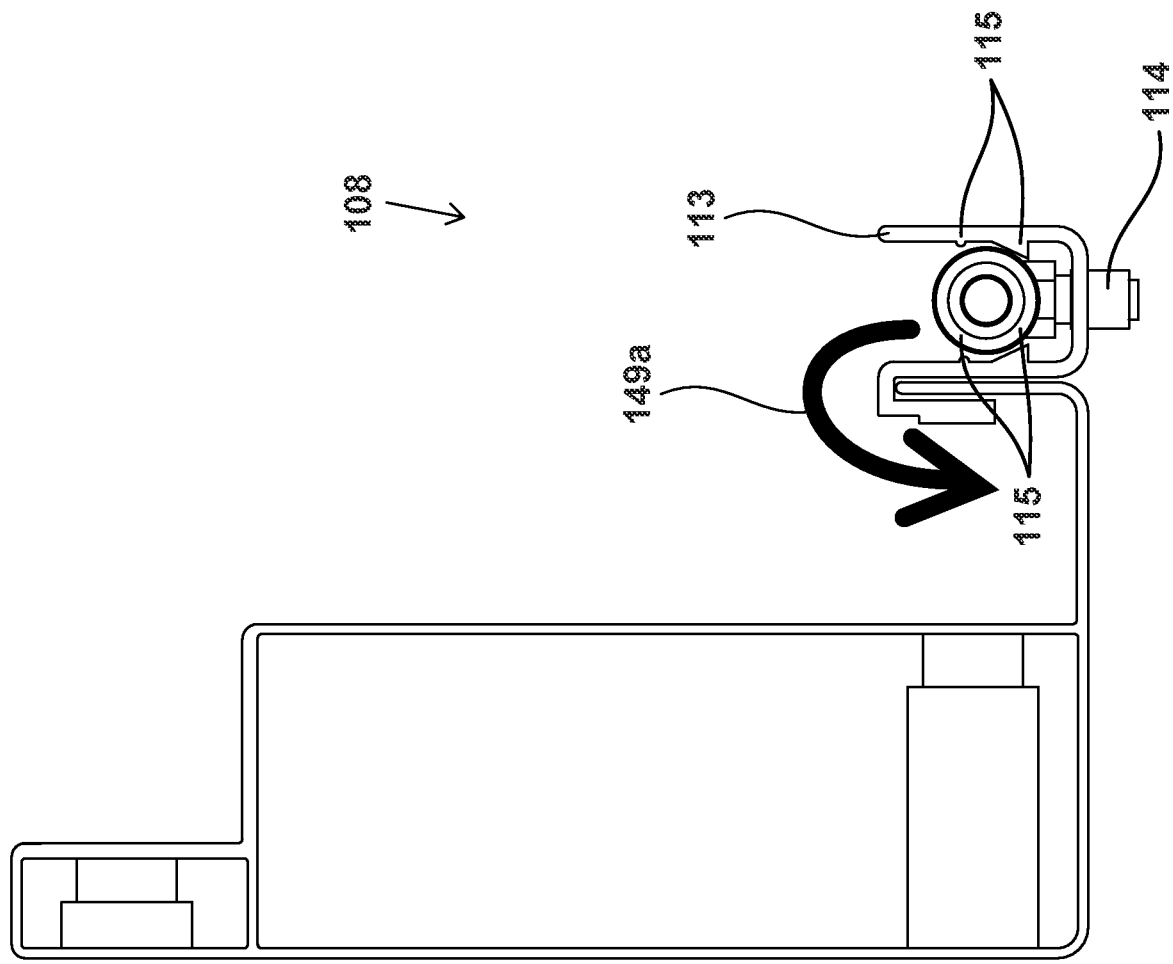
Figure 118:
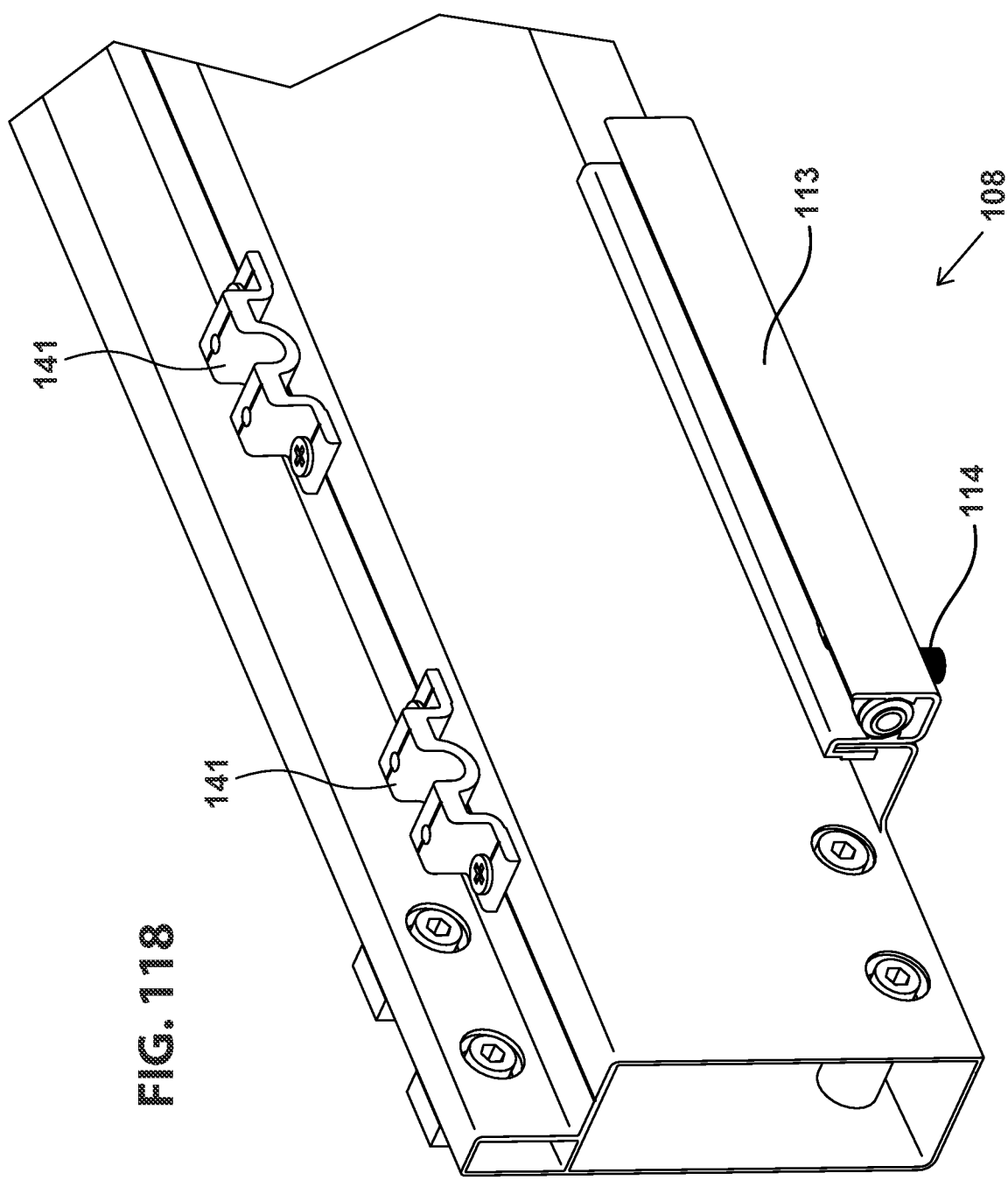
Figure 120:
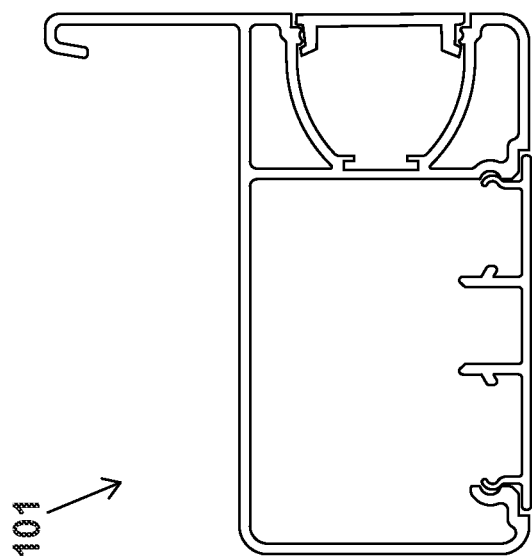
Figure 119:
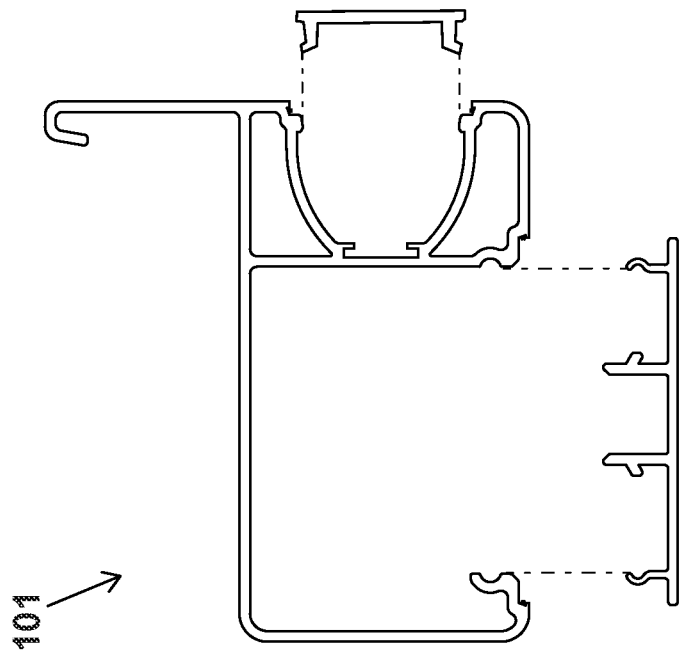
Figure 121:
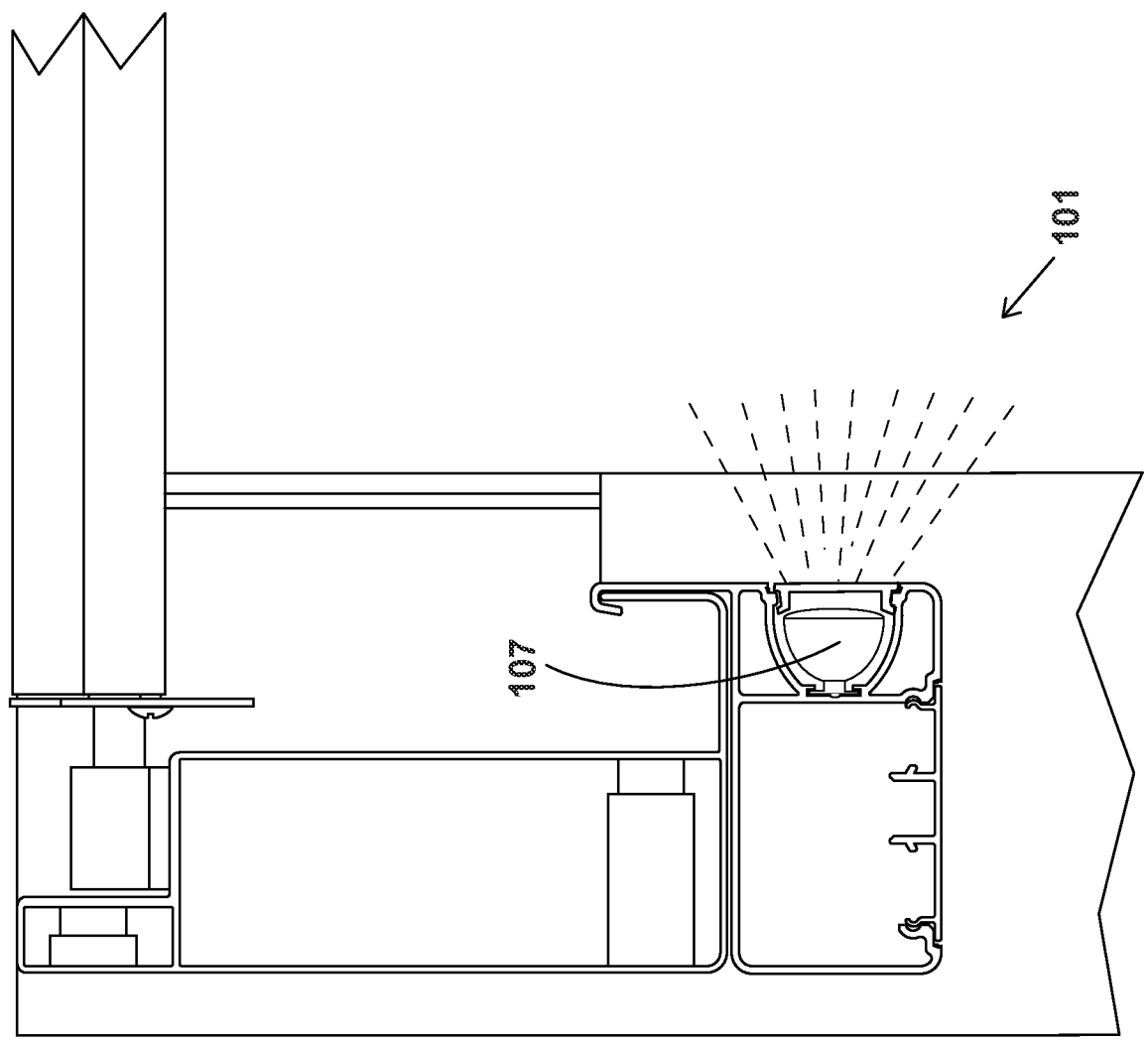
Figure 122:
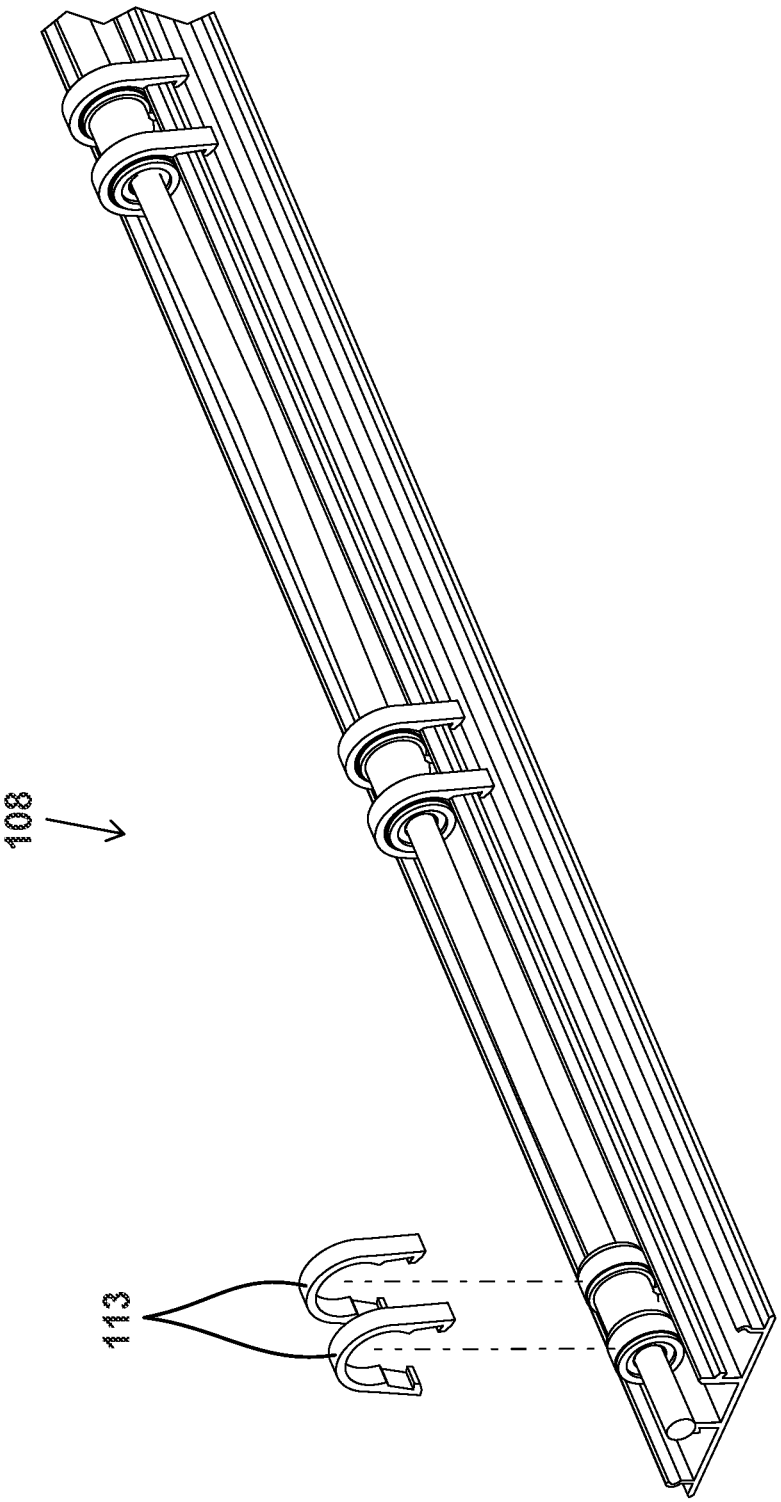
Figure 123:
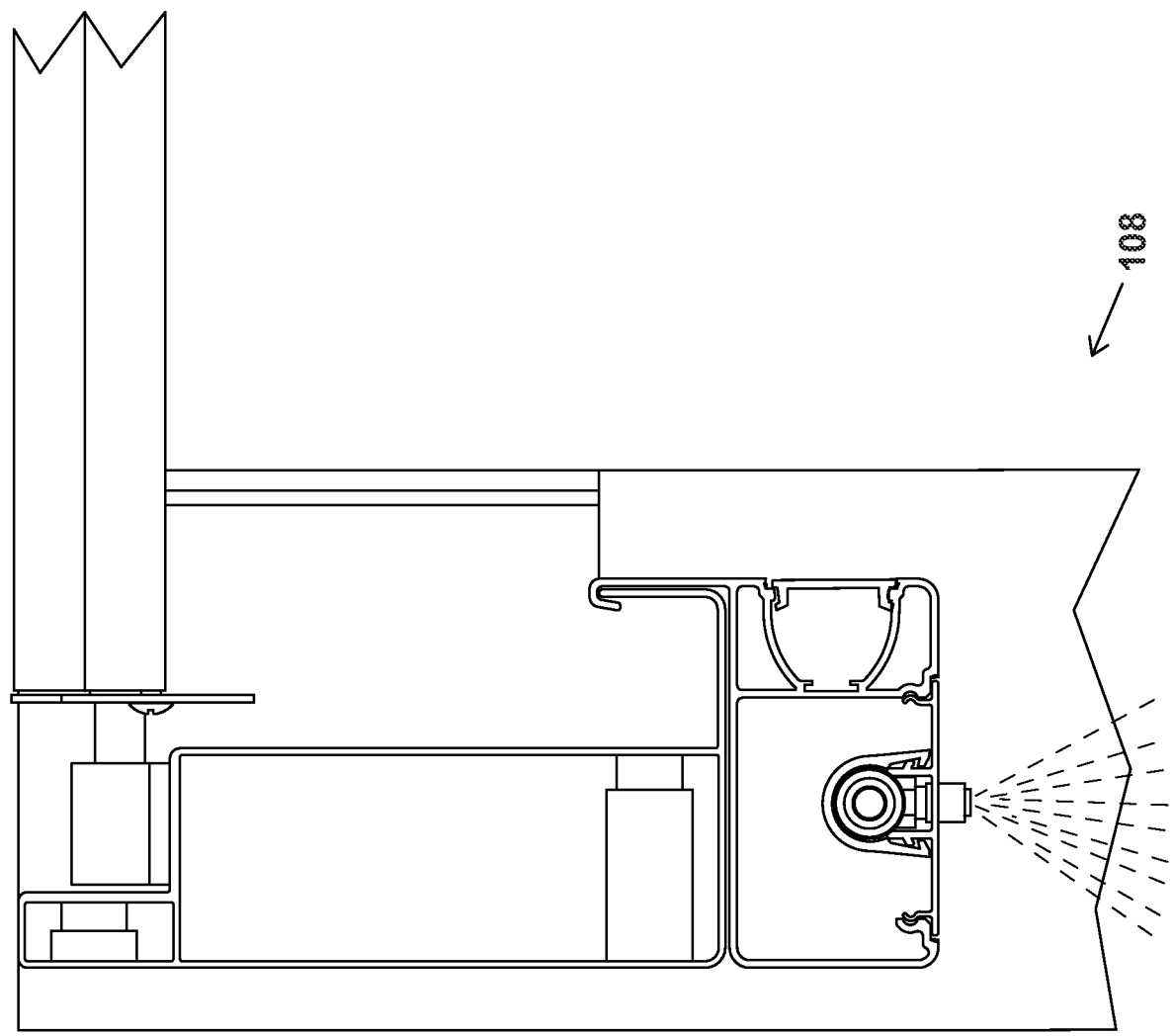
Figure 133:
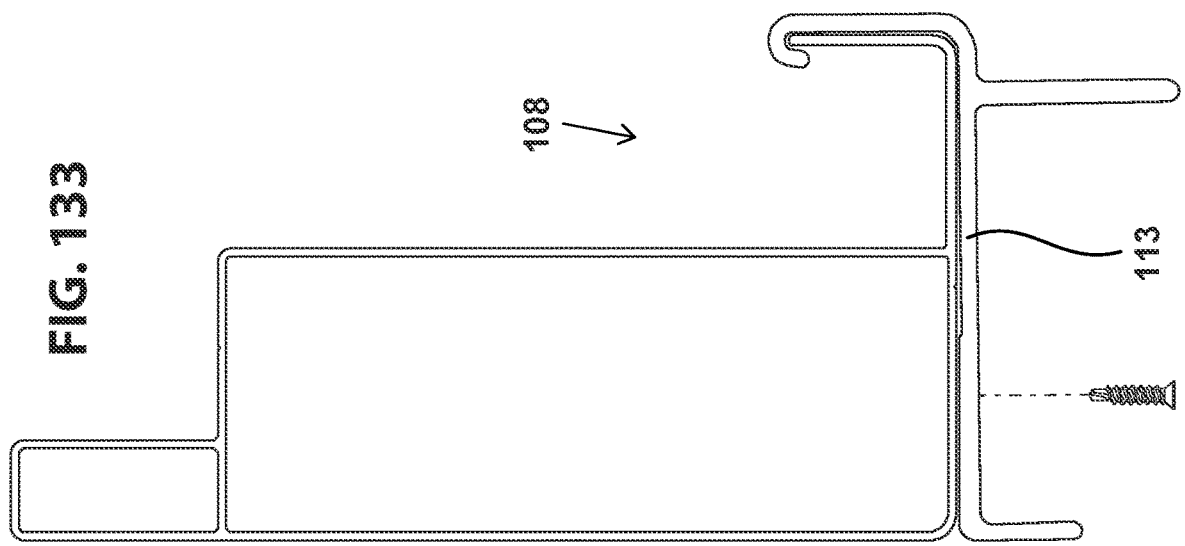
Figure 132:
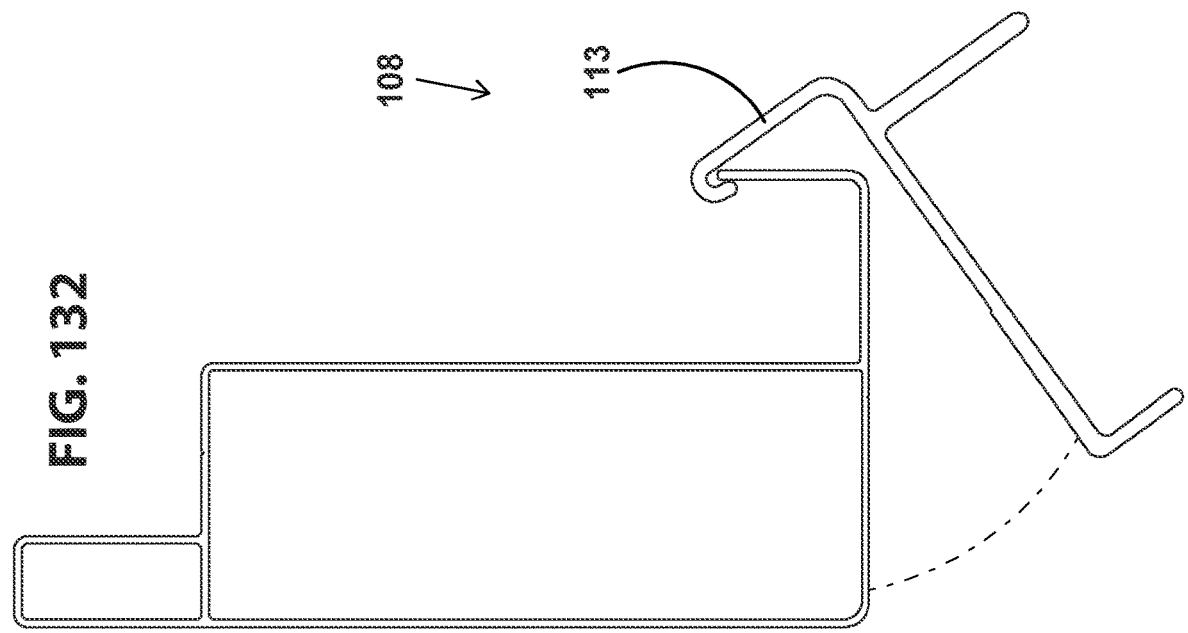
Figure 134:
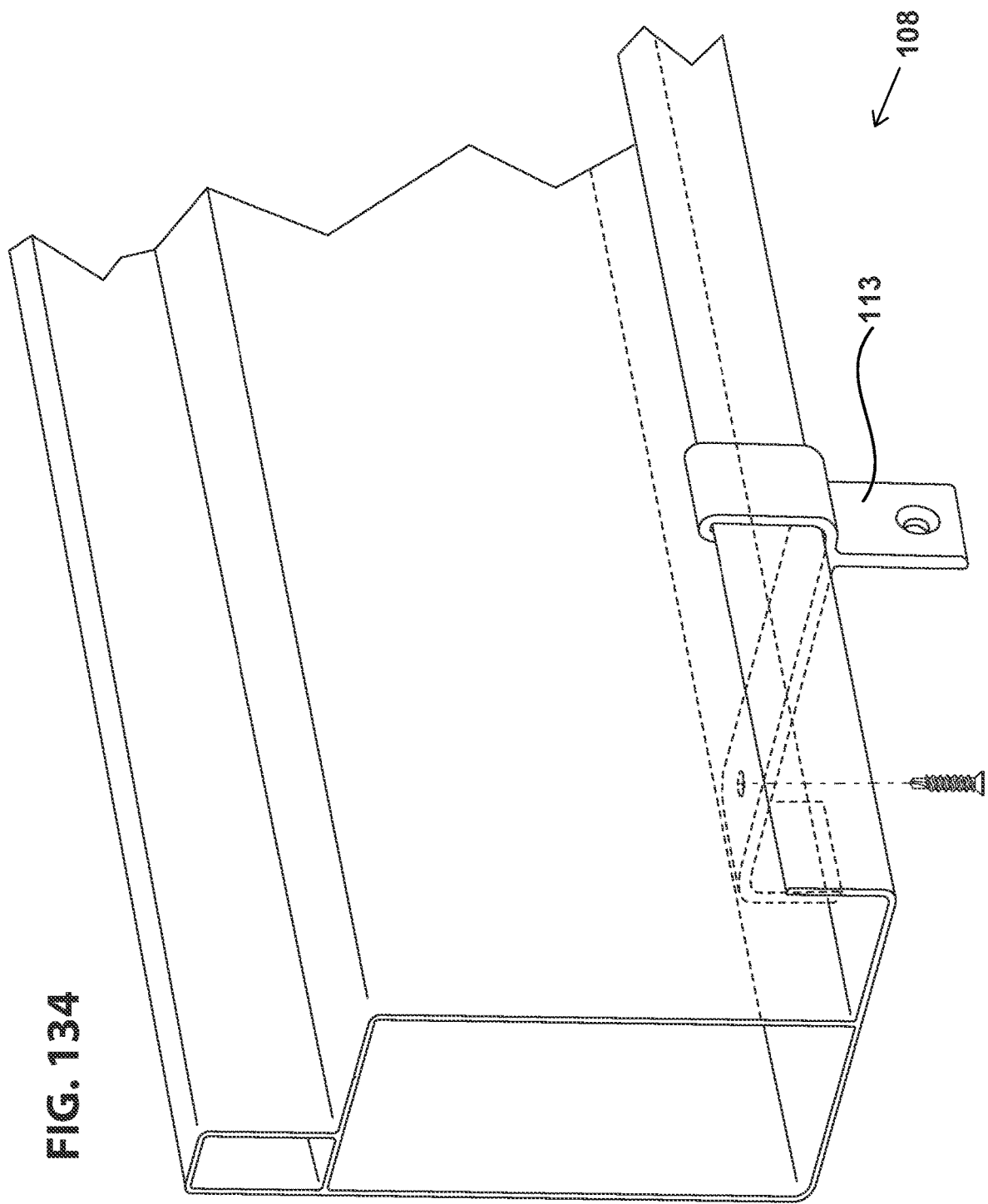
Figure 135:
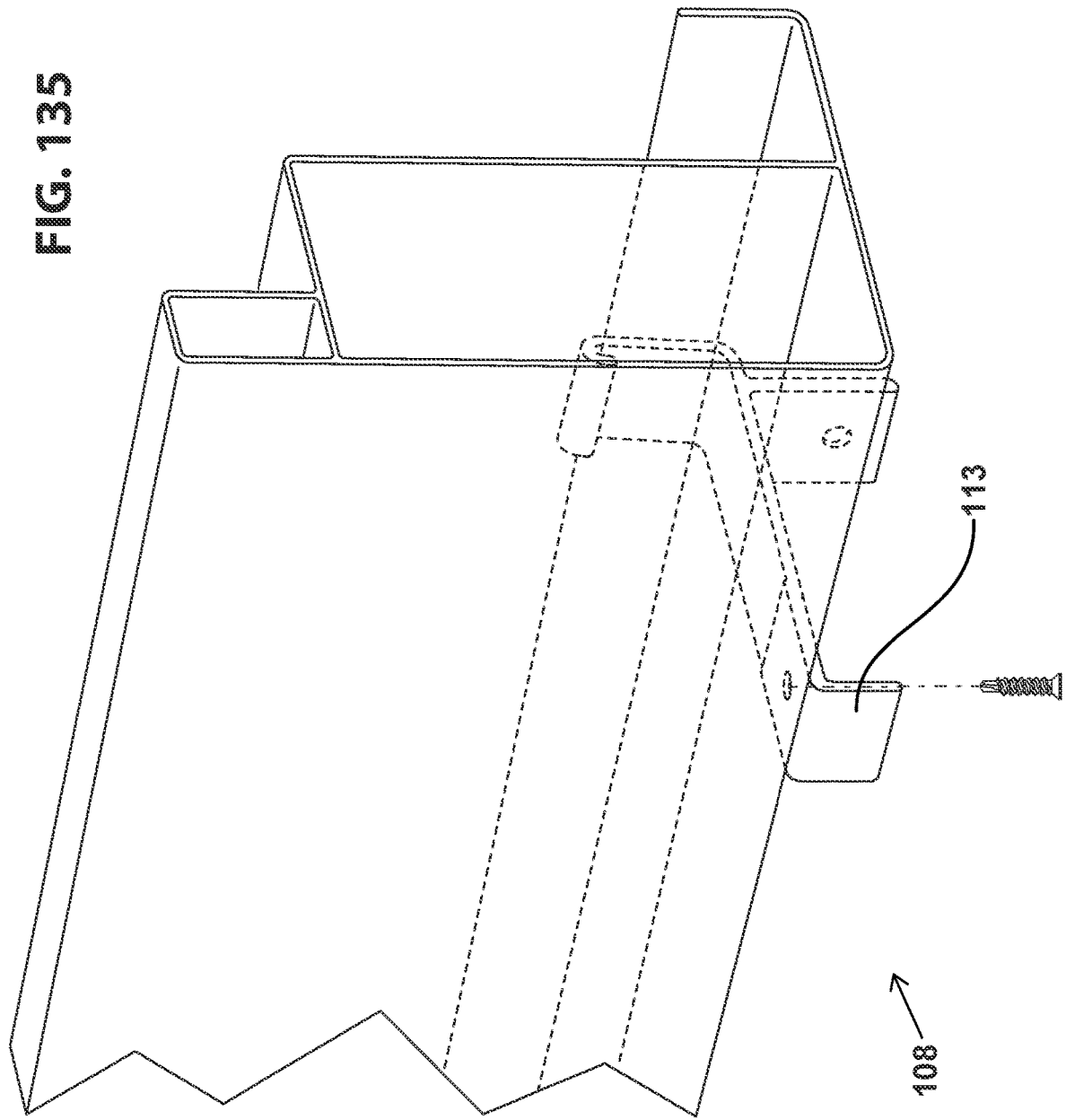
Figure 136:
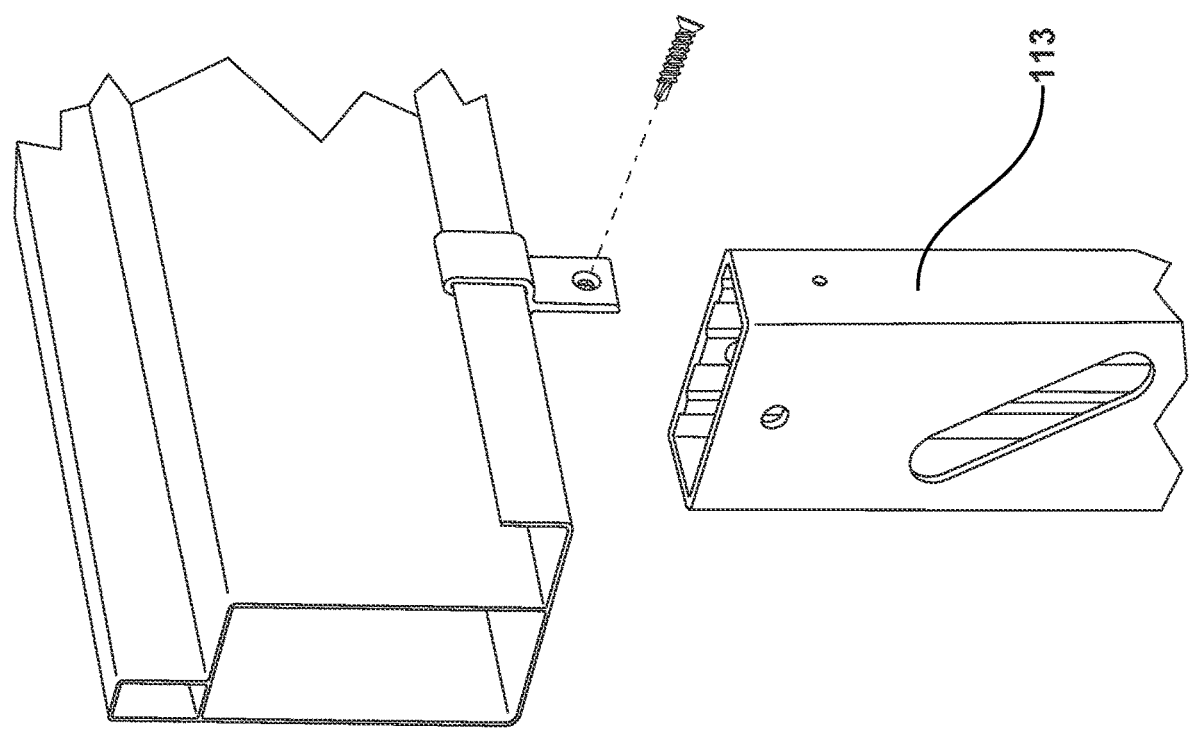
Figure 139:
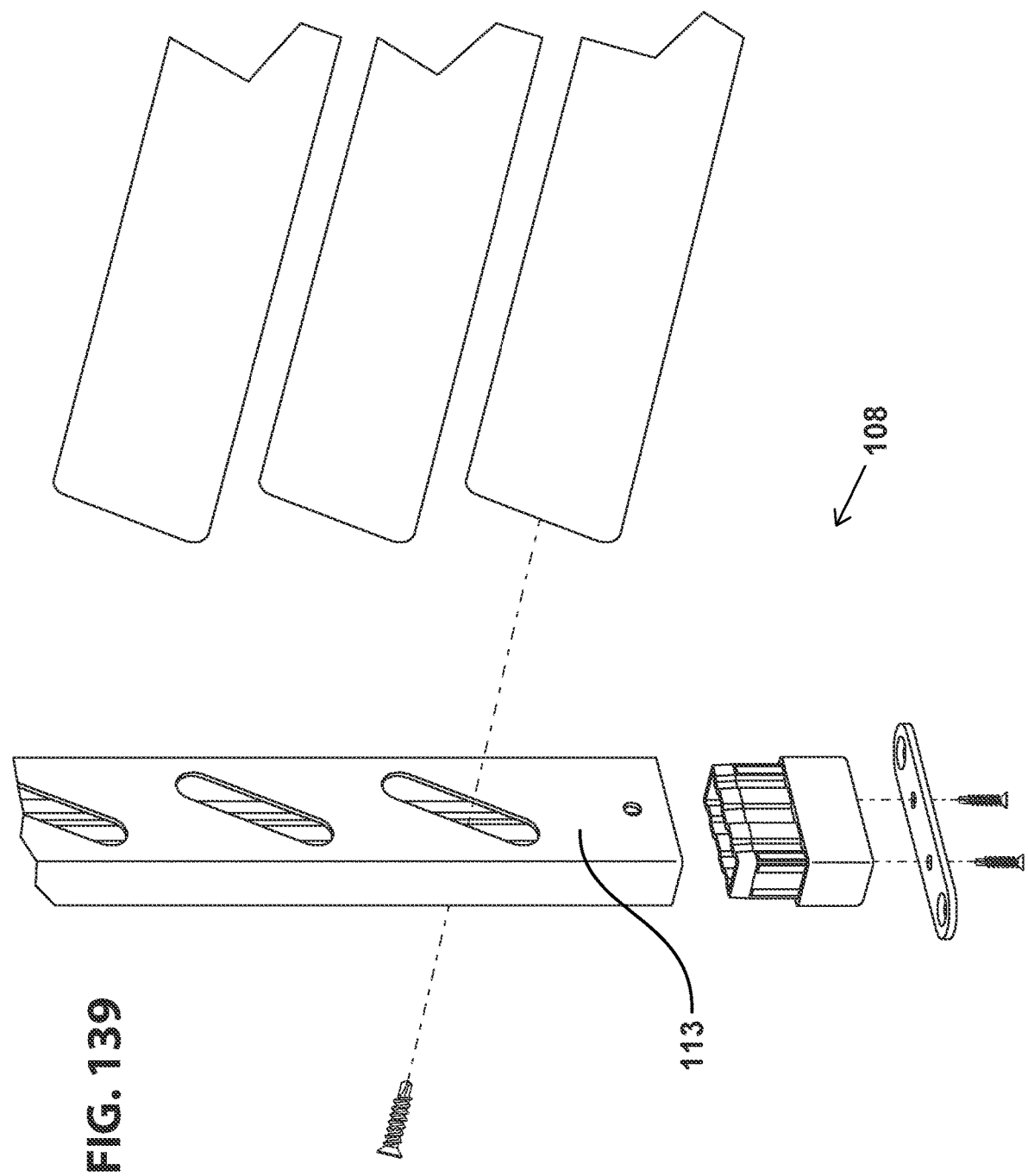
Figure 145:
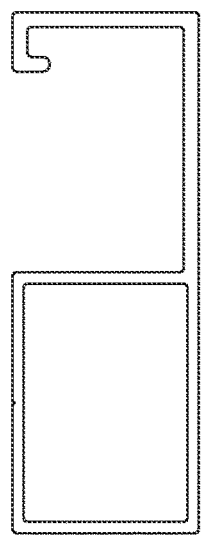
Figure 146:
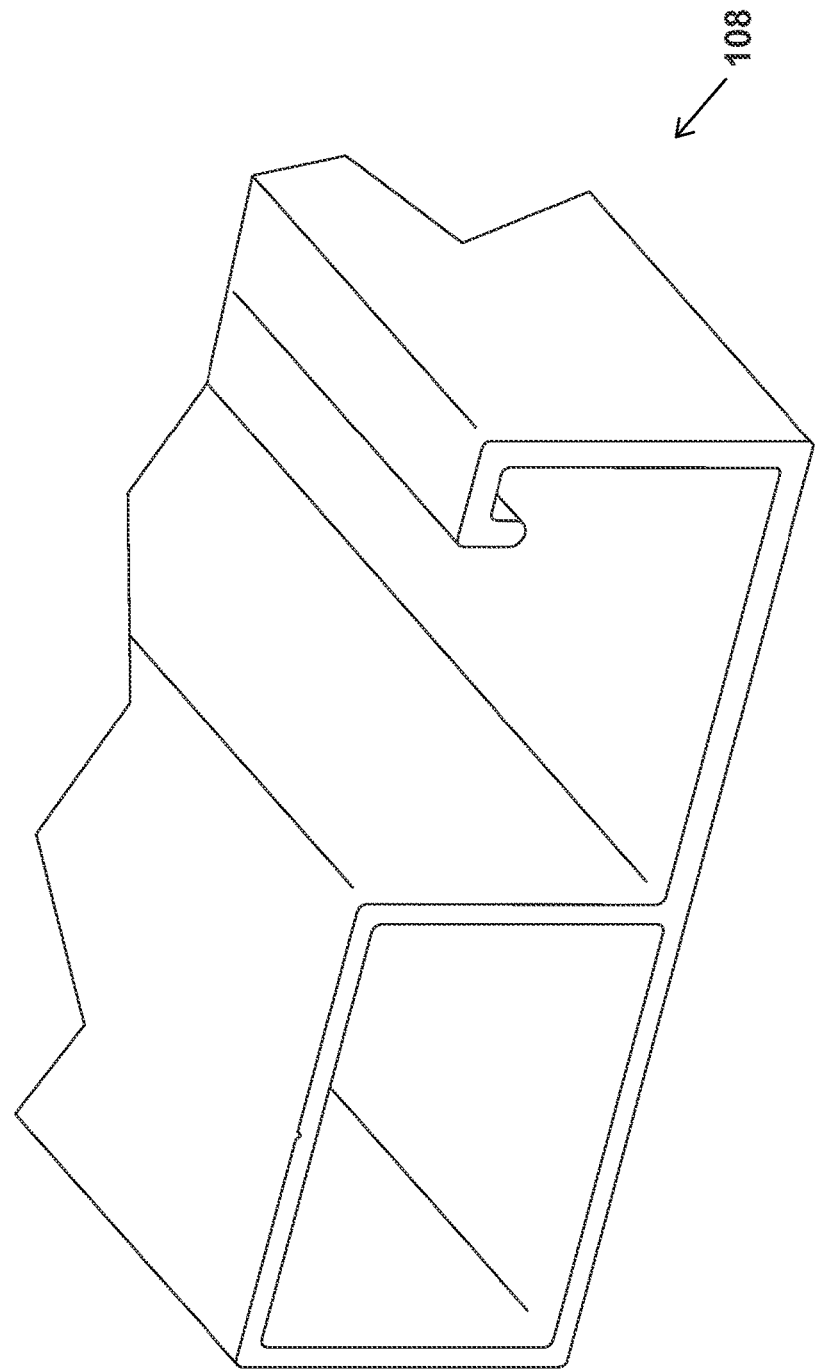
Figure 149:
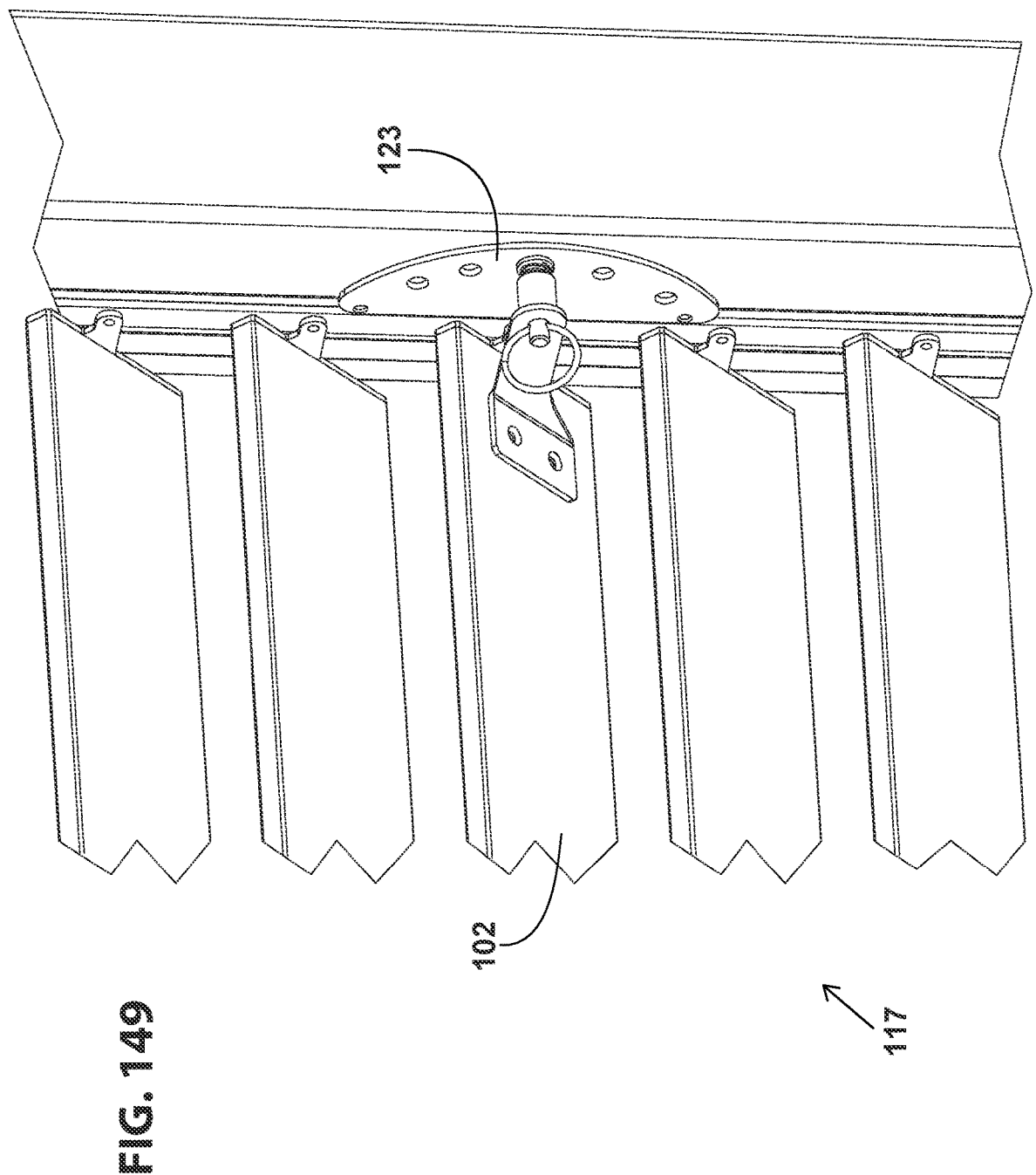
Figure 151:
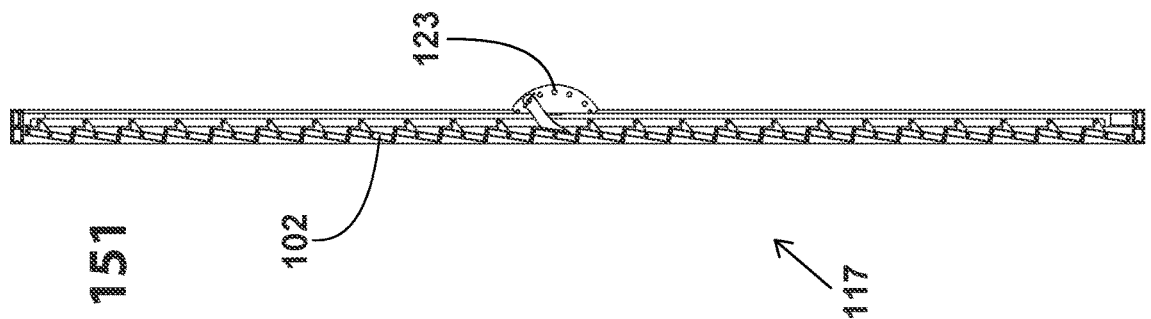
Figure 150:
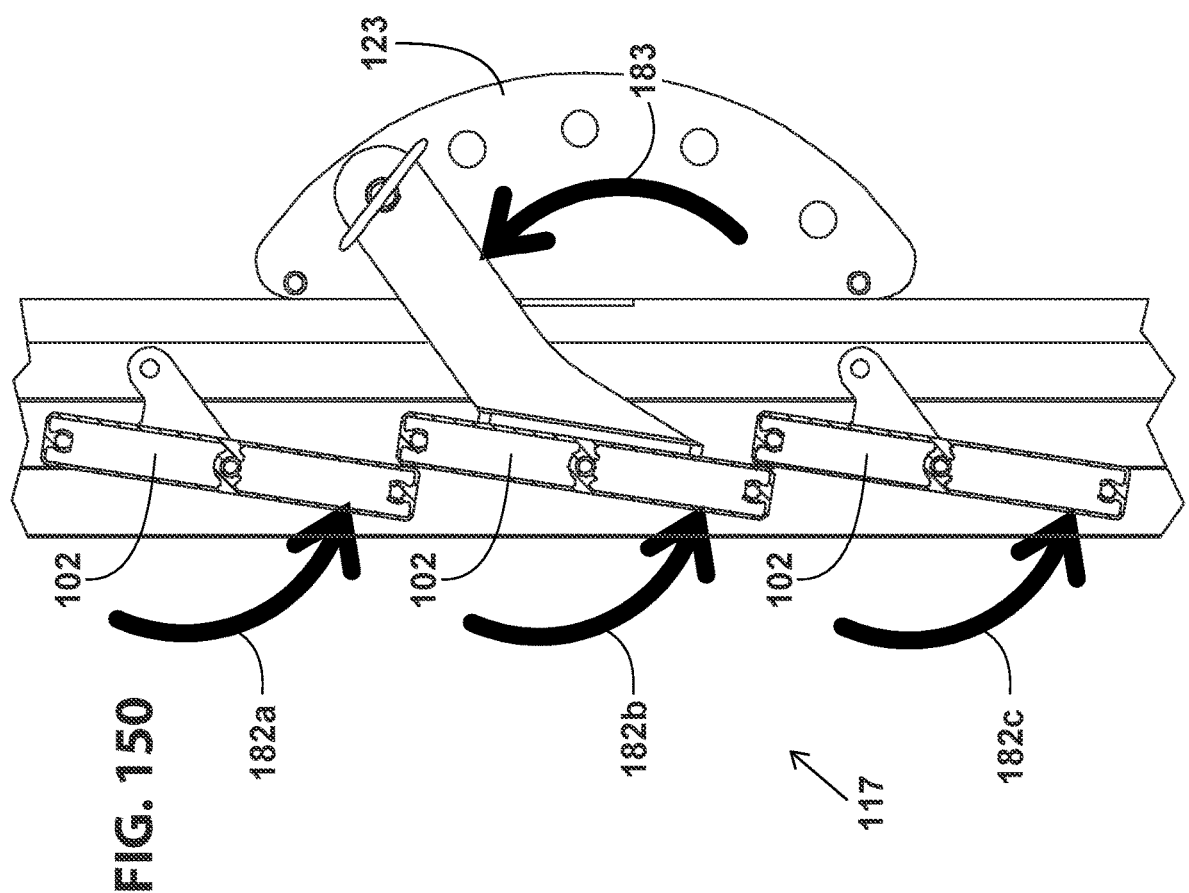
Figure 153:
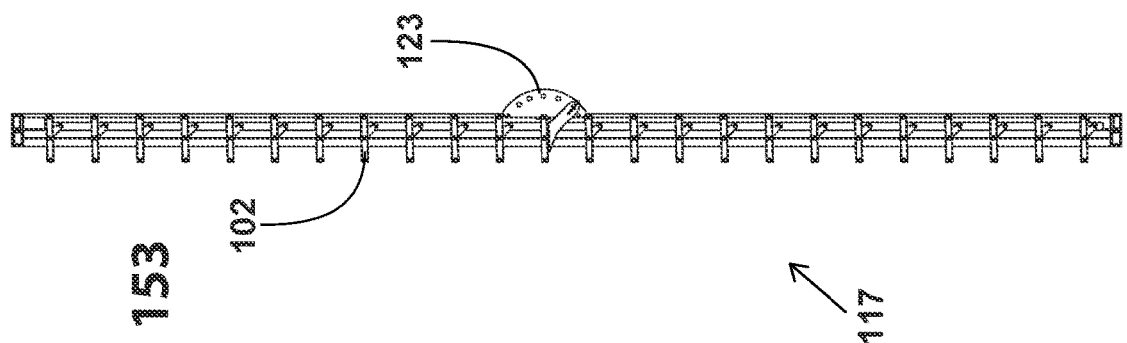
Figure 152:
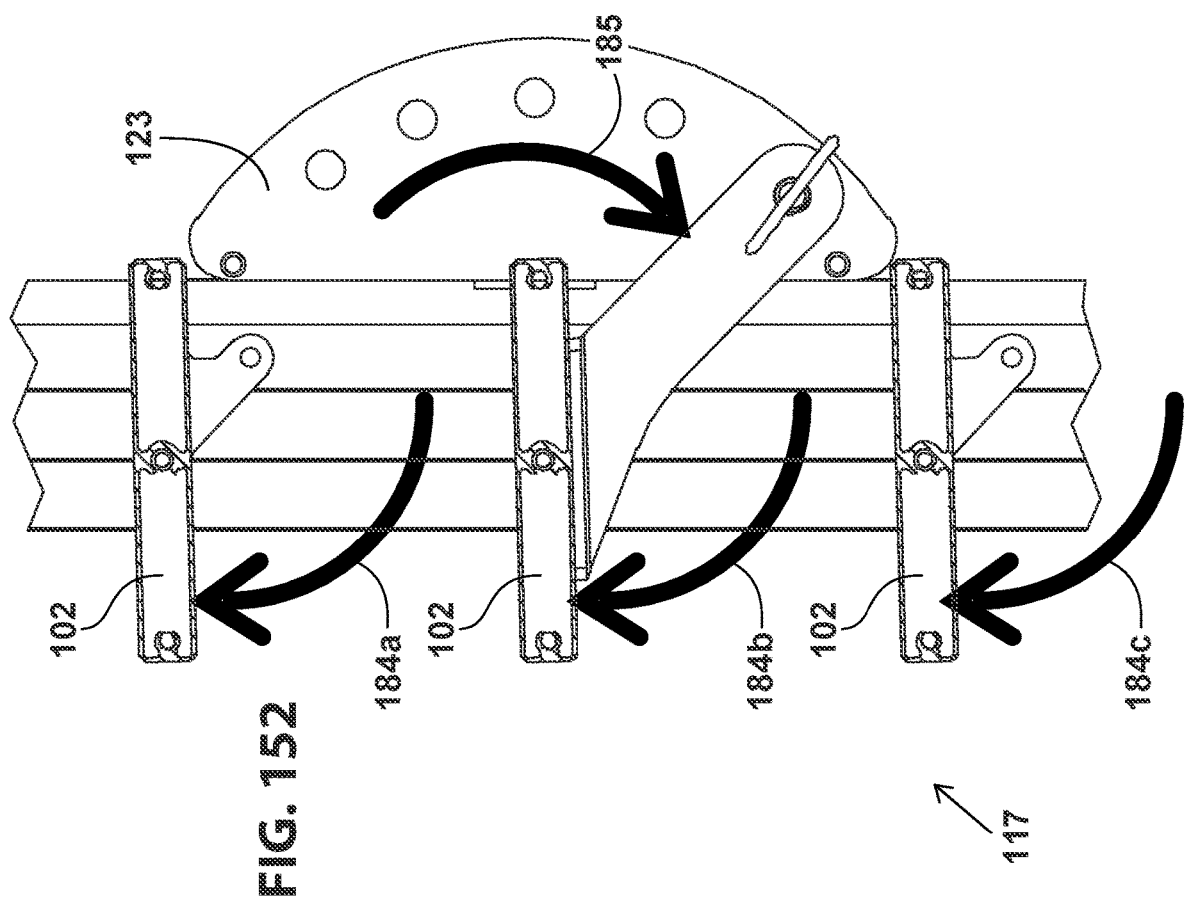
Figure 154:
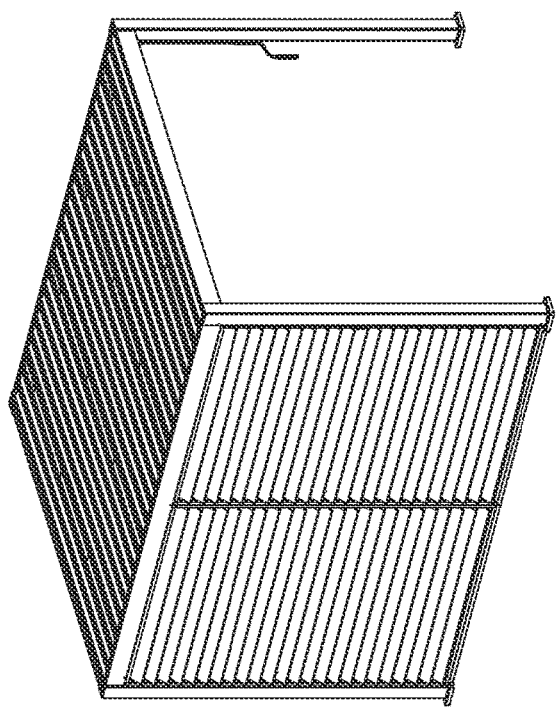
Figure 155:
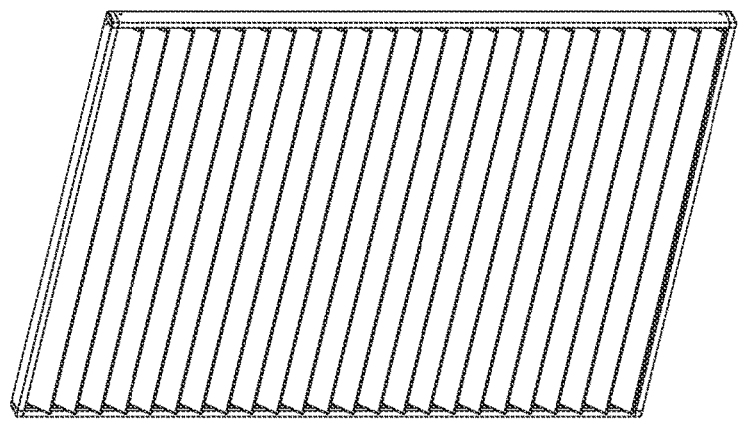
Figure 157:
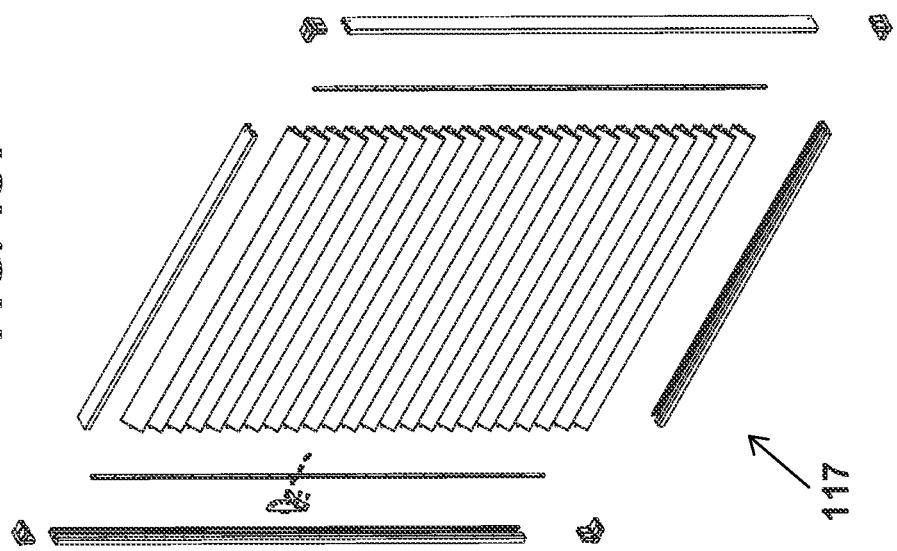
Figure 156:
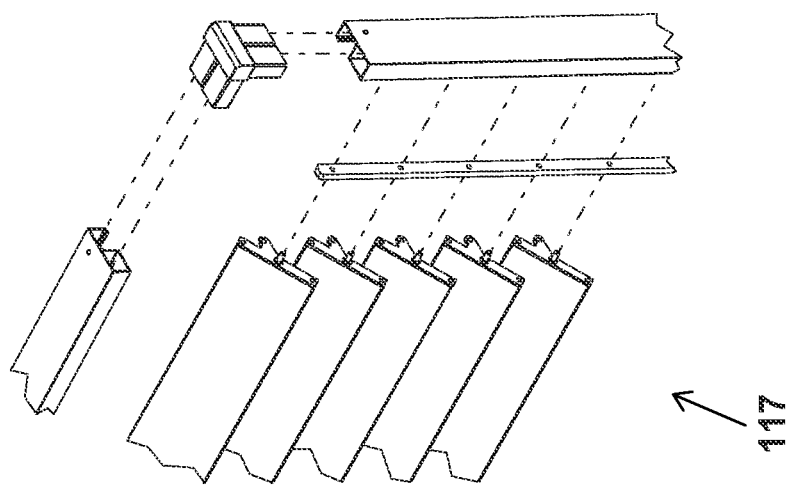
Figure 162:
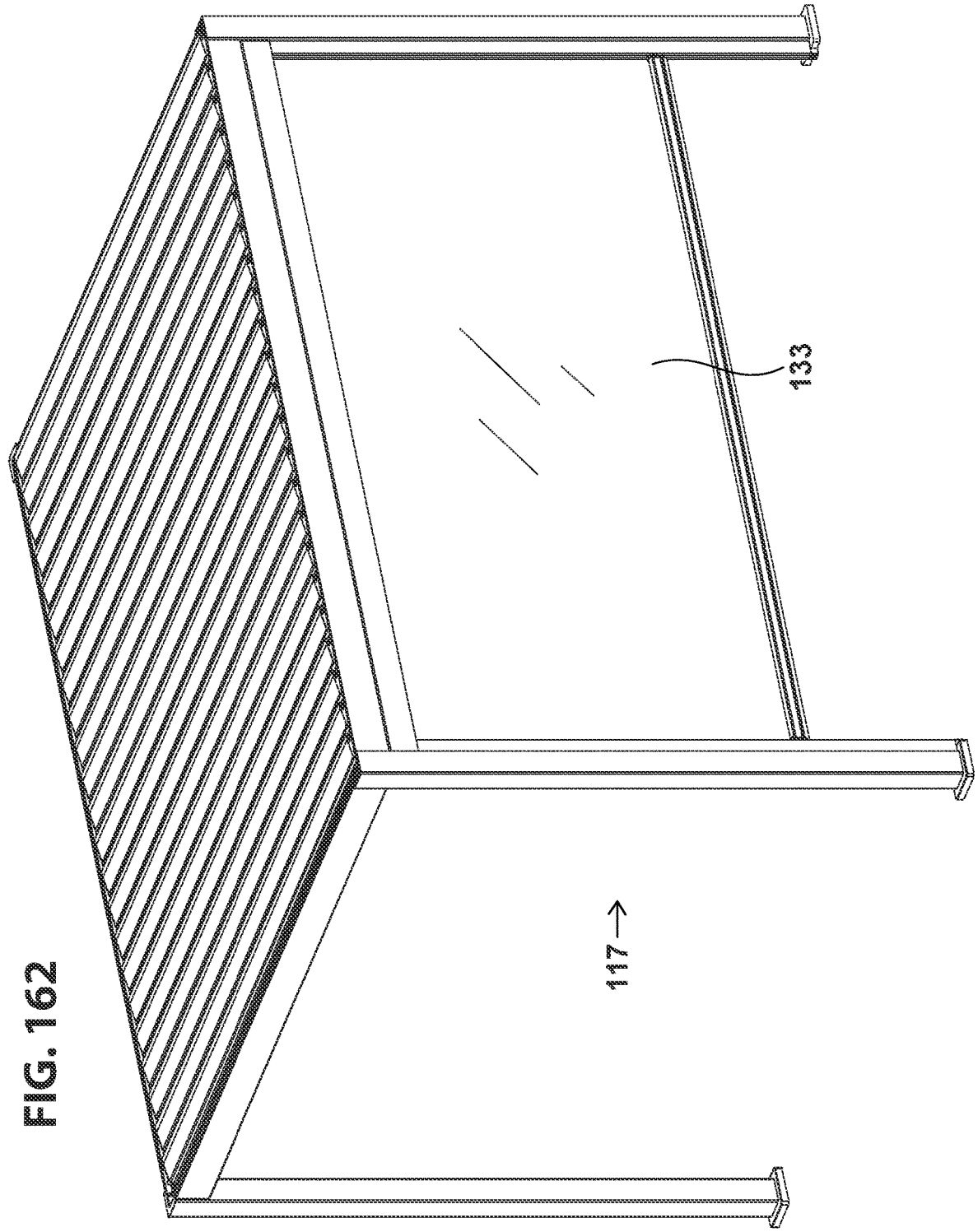
Figure 163:
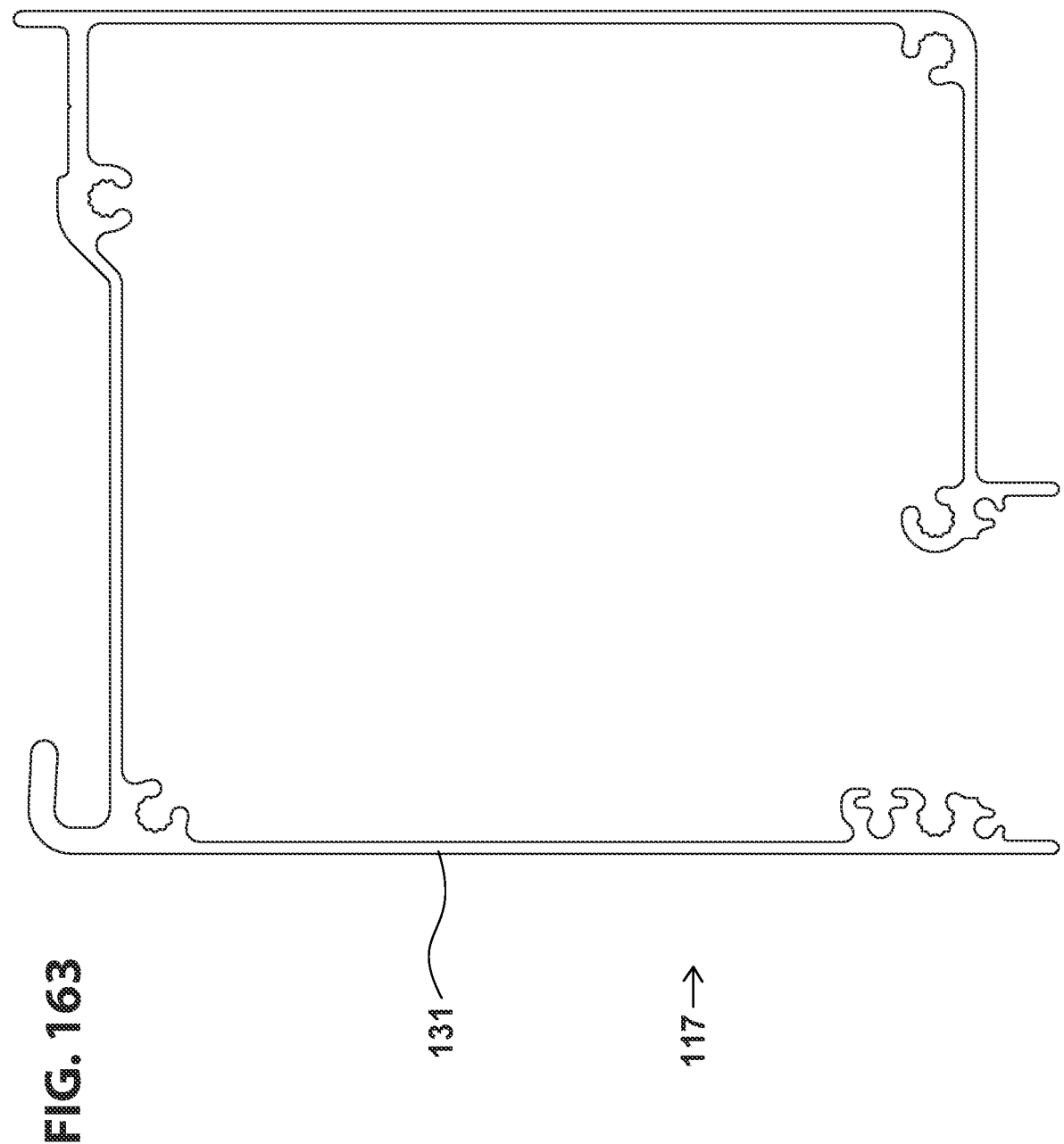
Figure 164:
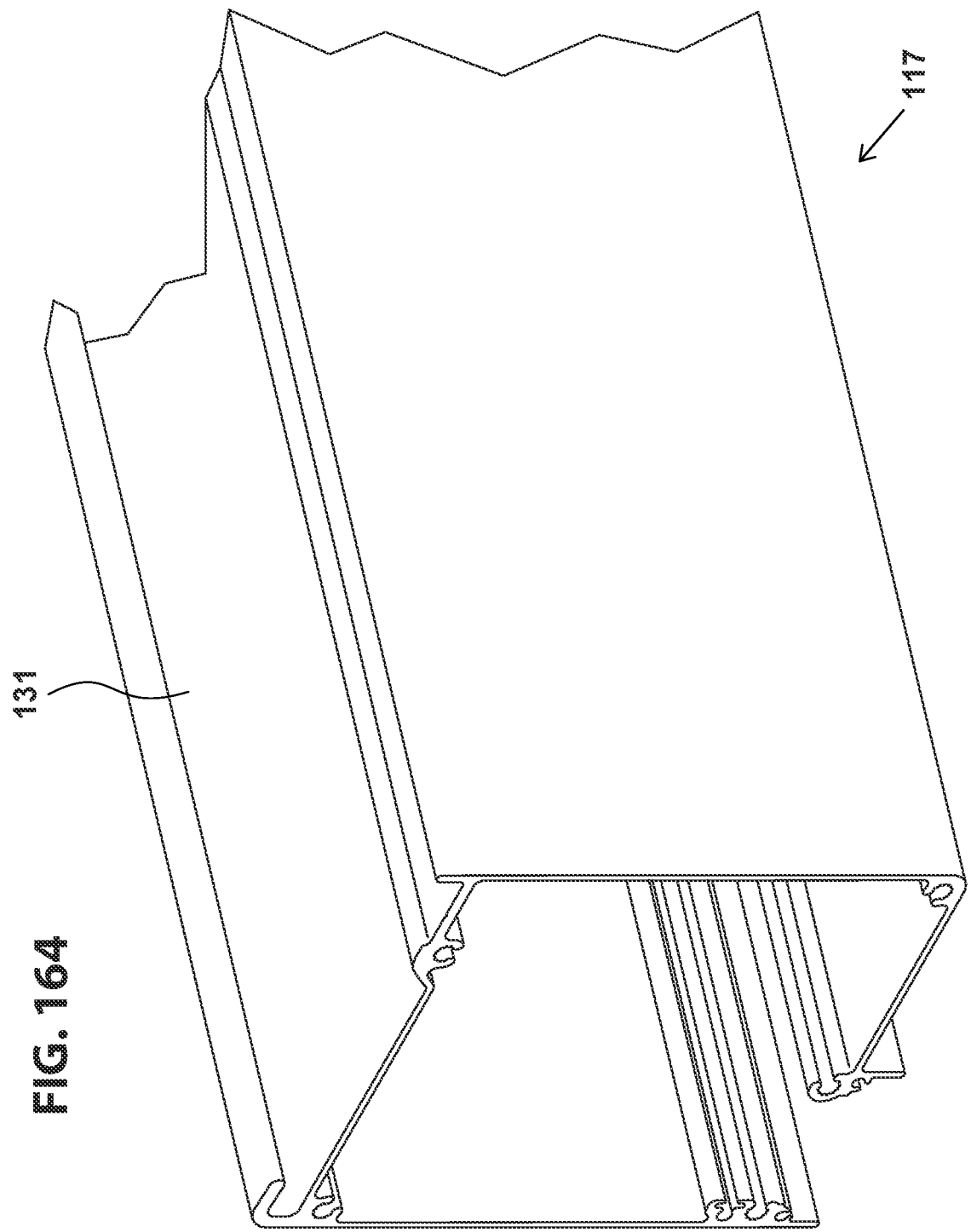
Figure 165:
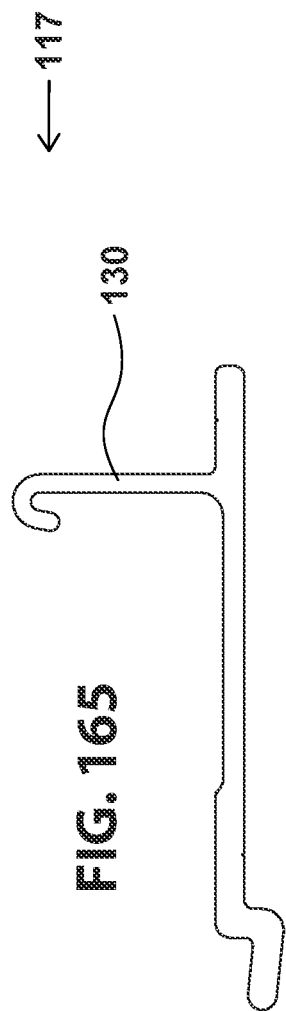
Figure 166:
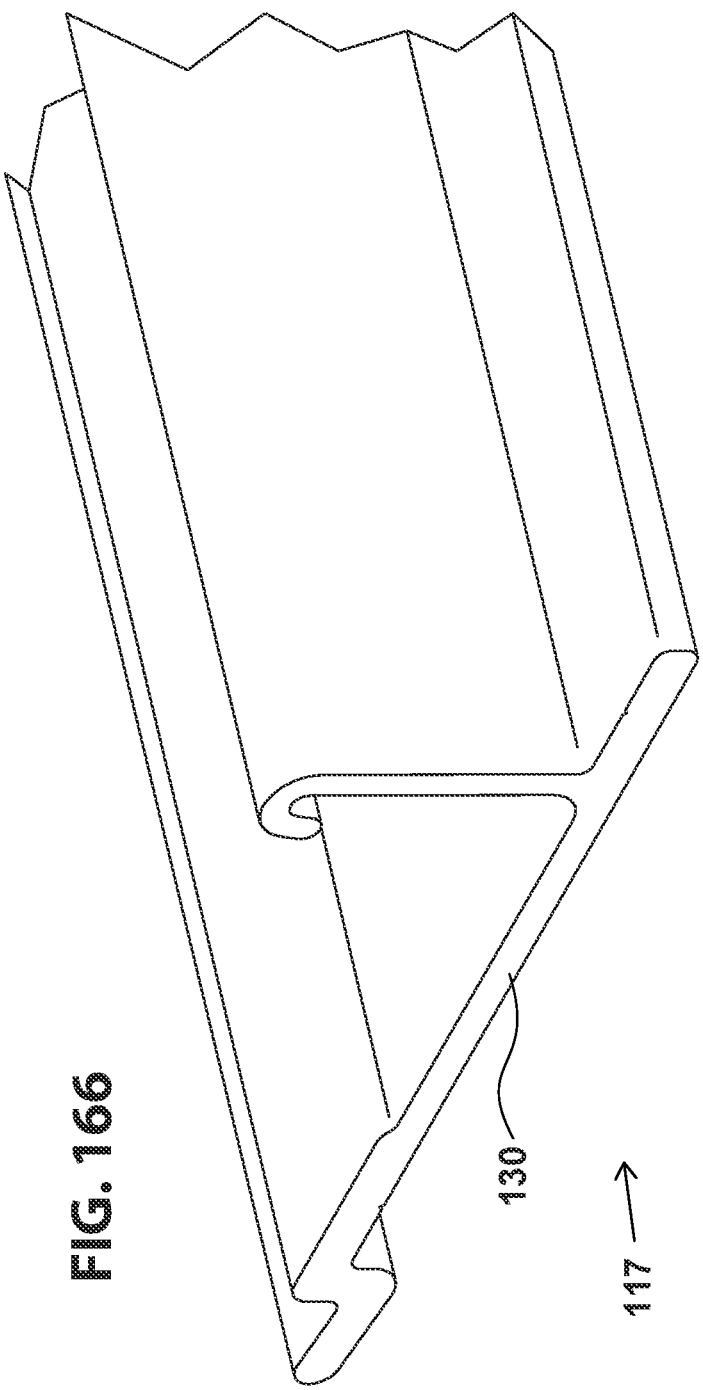
Figure 169:
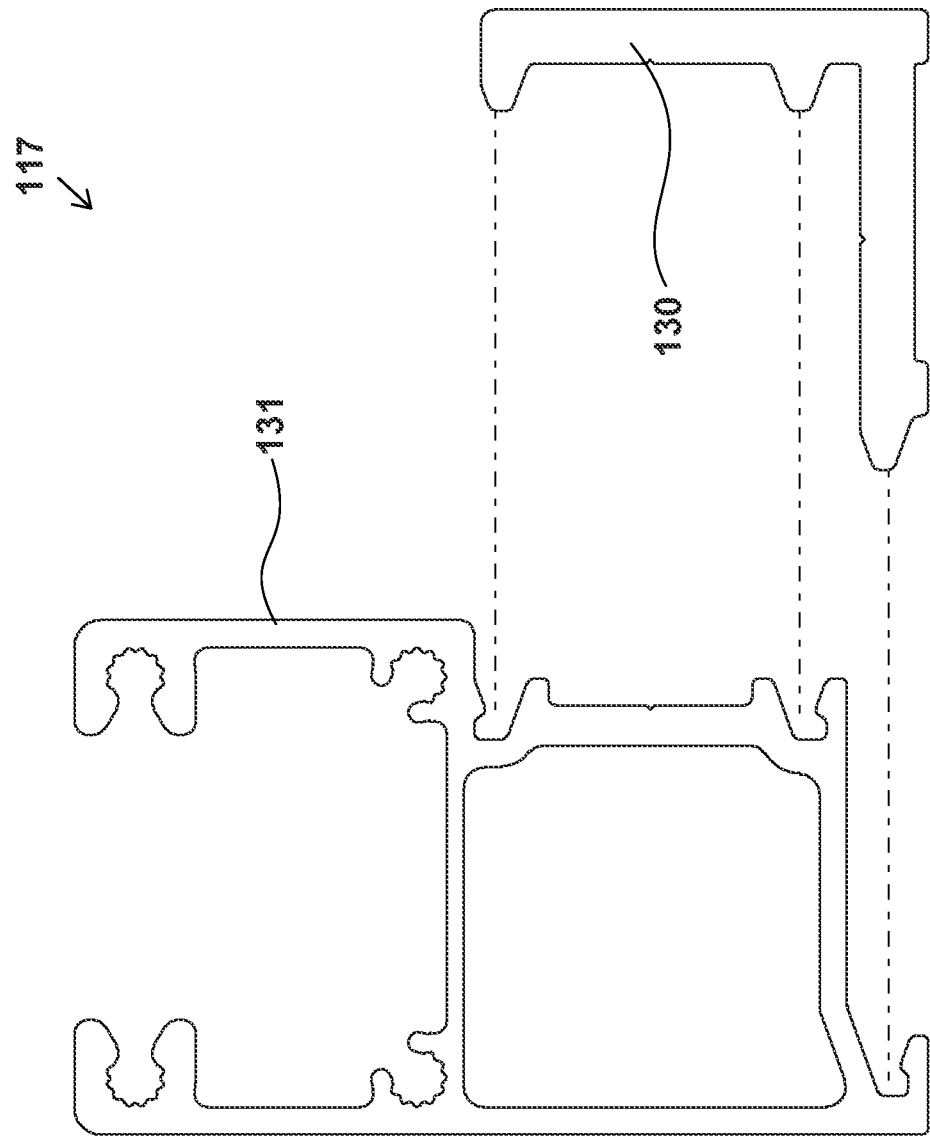
Figure 170:
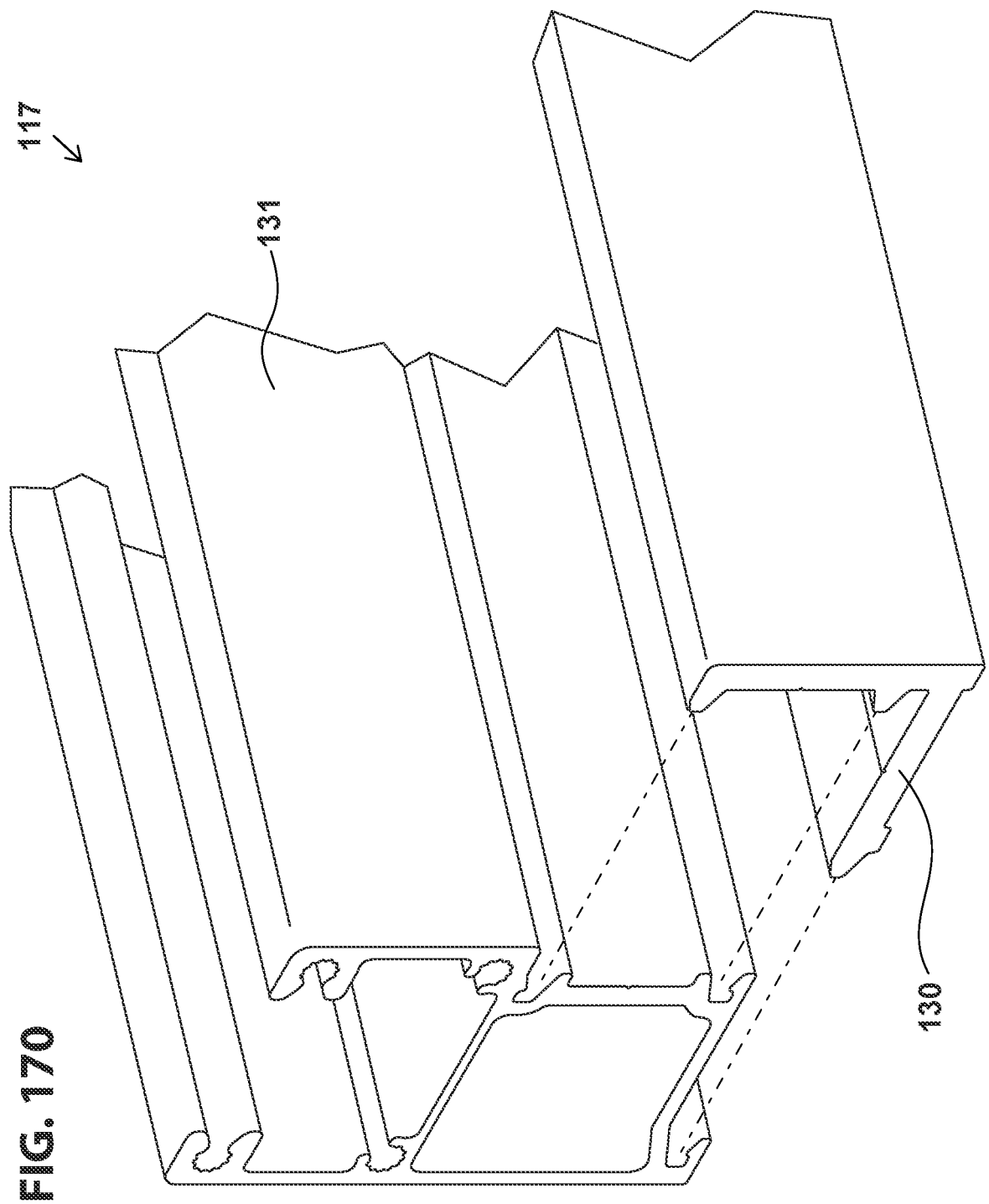
Figure 172:
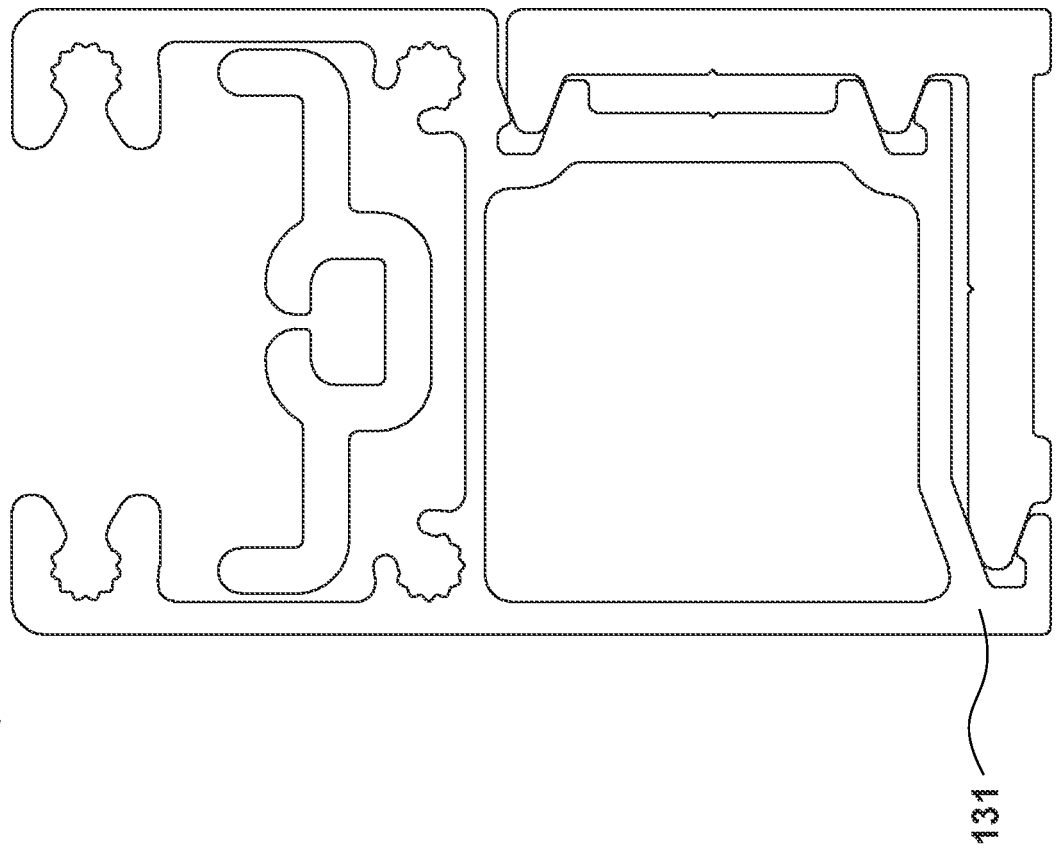
Figure 171:
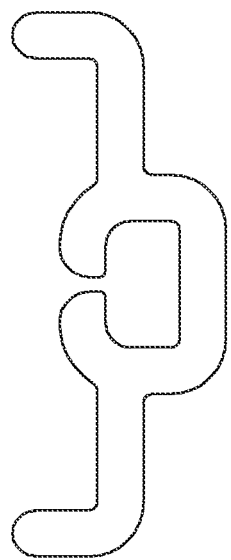
Figure 173:
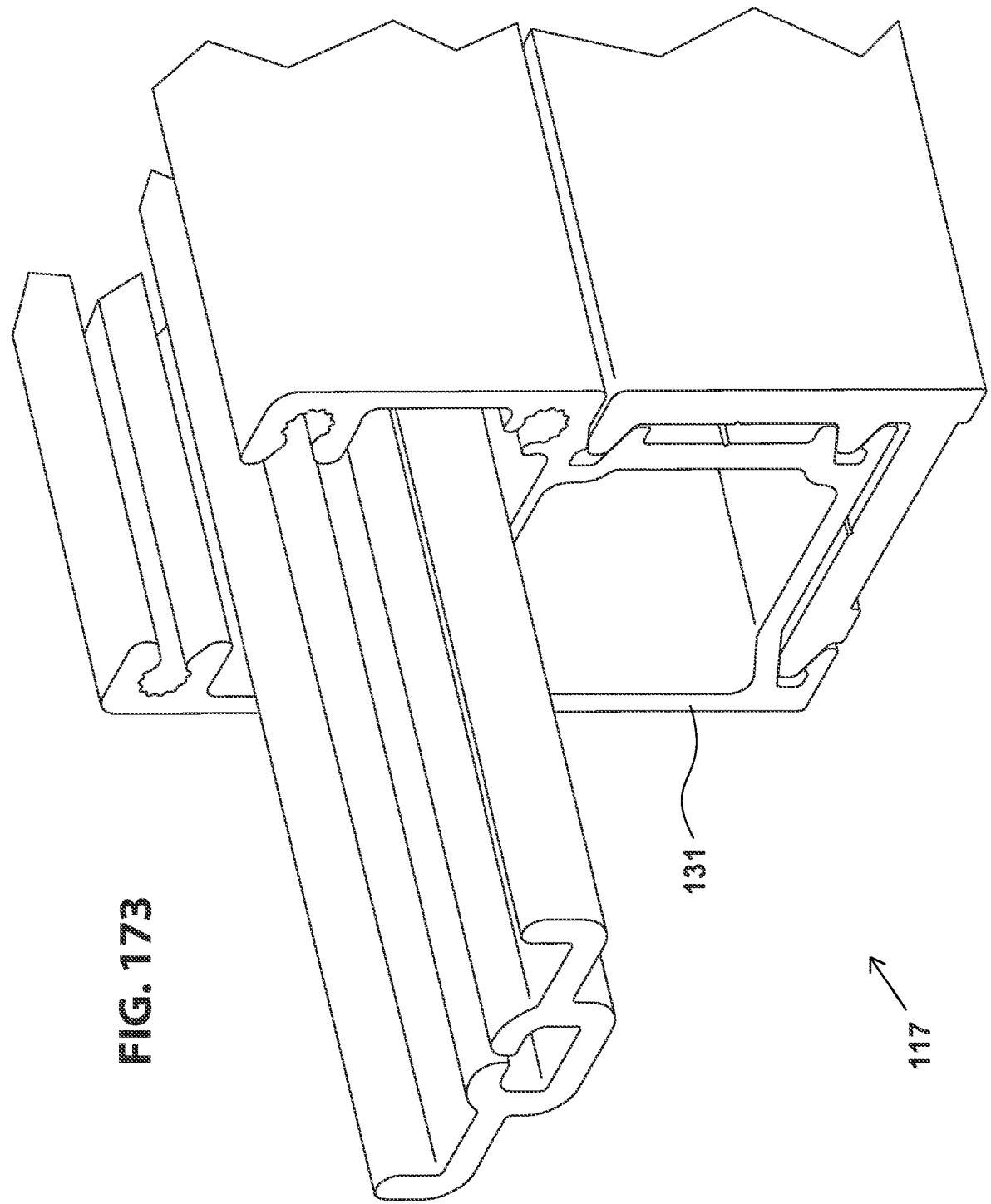

7) LED lights 107 is (or are respectively) for:
Providing low-cost-light to illuminate within the four-device-in-one bleacher-skybox food-dehydrator mobile-marine-sauna wind-and-smoke-redirecting bungalow
(see FIG. 93, and FIG. 94).

8) Multi-function discrete rainwater-channeling-and-collecting mist-cooling multi-accessory-attaching gutter-beam system(s) 108 is (or are respectively) for performing the combined functions of its components.

9) Rainwater-channeling side gutter beams 109 is (or are respectively) for:

a) Providing structure to the four-device-in-one bleacher-skybox food-dehydrator mobile-marine-sauna wind-and-smoke-redirecting bungalow; and b) Providing structure to secure adjustable louver blades 102 onto.

10) Rainwater-channeling end gutter beams 110 is (or are respectively) for:
Providing structure to the four-device-in-one bleacher-skybox food-dehydrator mobile-marine-sauna wind-and-smoke-redirecting bungalow.

11) Discrete rainwater chutes 111 is (or are respectively) for:
Draining rainwater from adjustable louver blades 102 and redirects to discrete rainwater drain openings 112.

12) Discrete rainwater drain openings 112 is (or are respectively) for:
Draining collected water from discrete rainwater chutes 111 into corner-posts 139.

13) Easy-to-install discrete-hydro-mist-emitter track 113 is (or are respectively) for:
Providing easy-to-install means for multiple hydro-mist emitters 114 in the direction of arrow 149*a* (see FIG. 113, FIG. 114, FIG. 115, FIG. 116, FIG. 117, and FIG. 118).

14) Hydro-mist emitters 114 is (or are respectively) for:
Spraying mists of water vapor to cool occupants within the four-device-in-one bleacher-skybox food-dehydrator mobile-marine-sauna wind-and-smoke-redirecting bungalow (see FIG. 116, FIG. 117, and FIG. 118).

15) Hydro-mist-securing clips 115 is (or are respectively) for:
Securing hydro-mist emitters 114 within easy-to-install discrete-hydro-mist-emitter track 113 (see FIG. 116, FIG. 117, and FIG. 118).

16) Hydro-mist water-supply lines 116 is (or are respectively) for:
Delivering water to hydro-mist emitters 114 (see FIG. 115, and FIG. 116).

17) Privacy-enabling wind-and-smoke-redirecting insect-protecting water-mist-cooling horizontal-and-vertical-sliding-door-securing cold-weather-insulating weather-sealing food-dehydrating bleacher-skybox-capable mobile-marine-sauna-capable forge-fire-stoking louvered-window-and-barrier system(s) 117 is (or are respectively) for performing the combined functions of its components.

18) Door-window-and-wall-panel frames 118 is (or are respectively) for:
Providing surrounding structure for privacy-enabling wind-and-smoke-redirecting cold-weather-insulating rainwater-sealing skybox-enabling marine-sauna-enabling food-dehydrating-enabling window-panel inserts 119 (see FIG. 51, FIG. 52, FIG. 53, FIG. 54, FIG. 55, FIG. 58, FIG. 59, FIG. 60, FIG. 61, FIG. 62, FIG. 63, FIG. 64, FIG. 65A, FIG. 65B, FIG. 66A, and FIG. 66B).

Figure 46A:
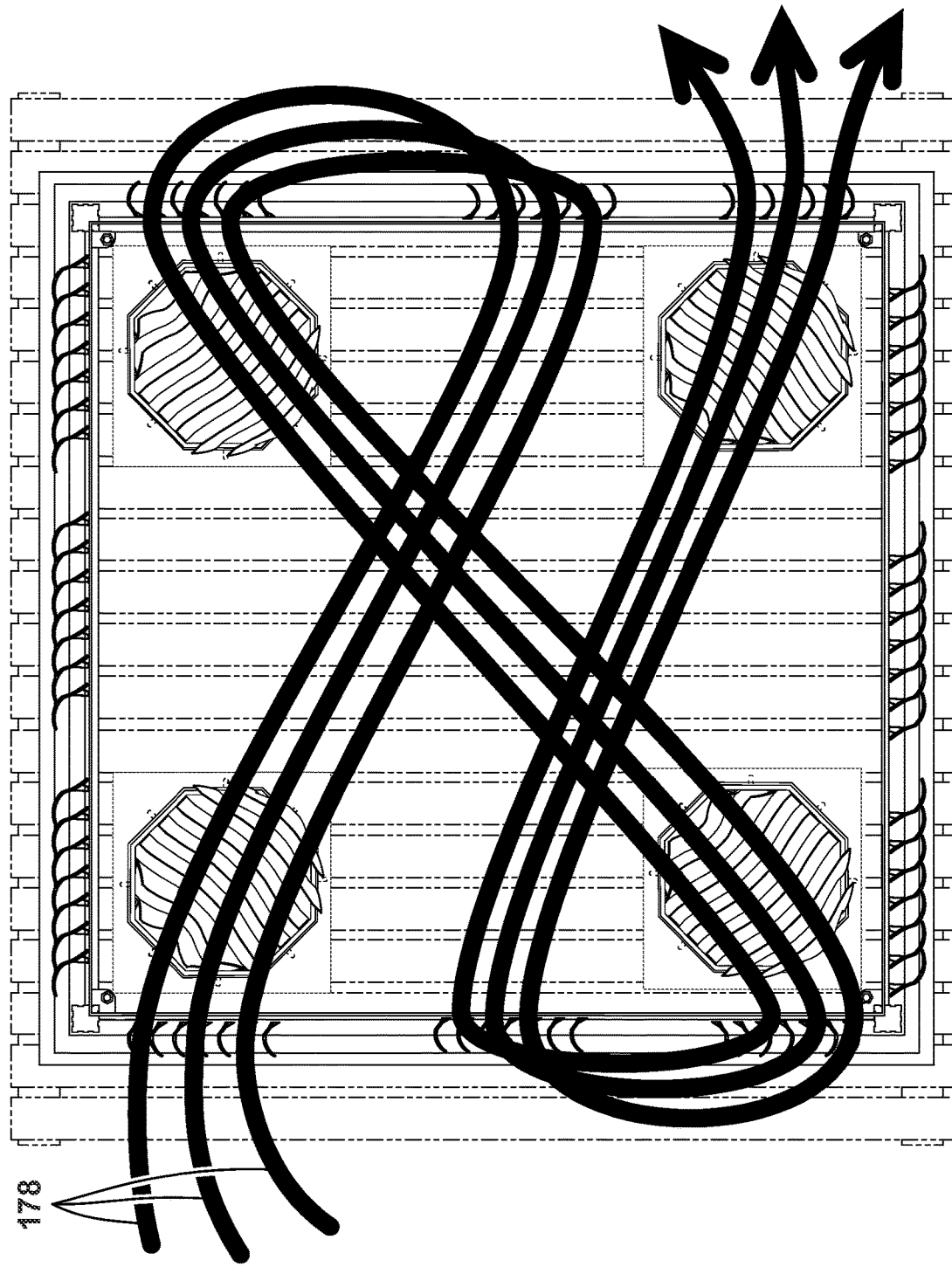
Figure 46B:
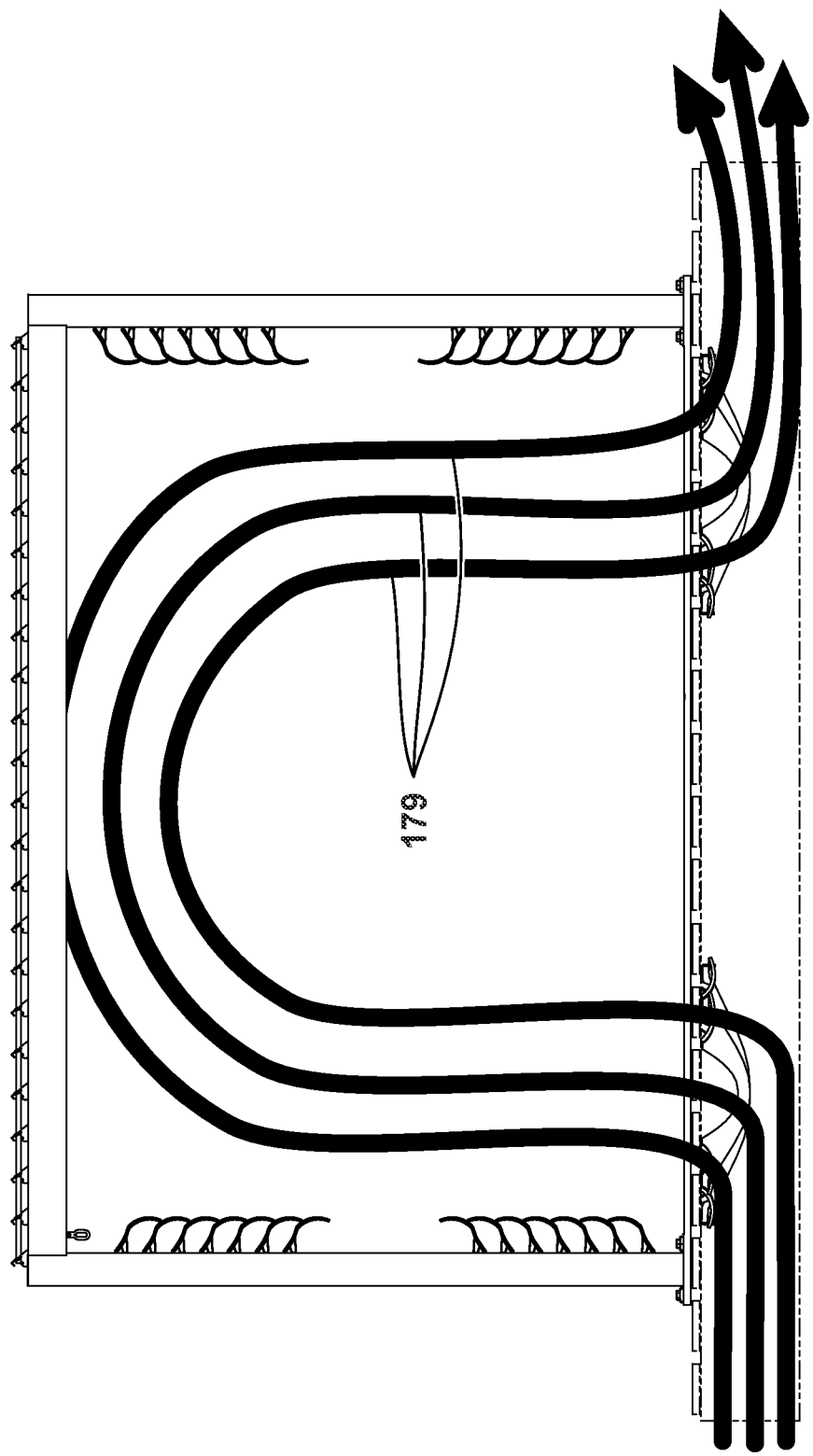
Figure 46E:
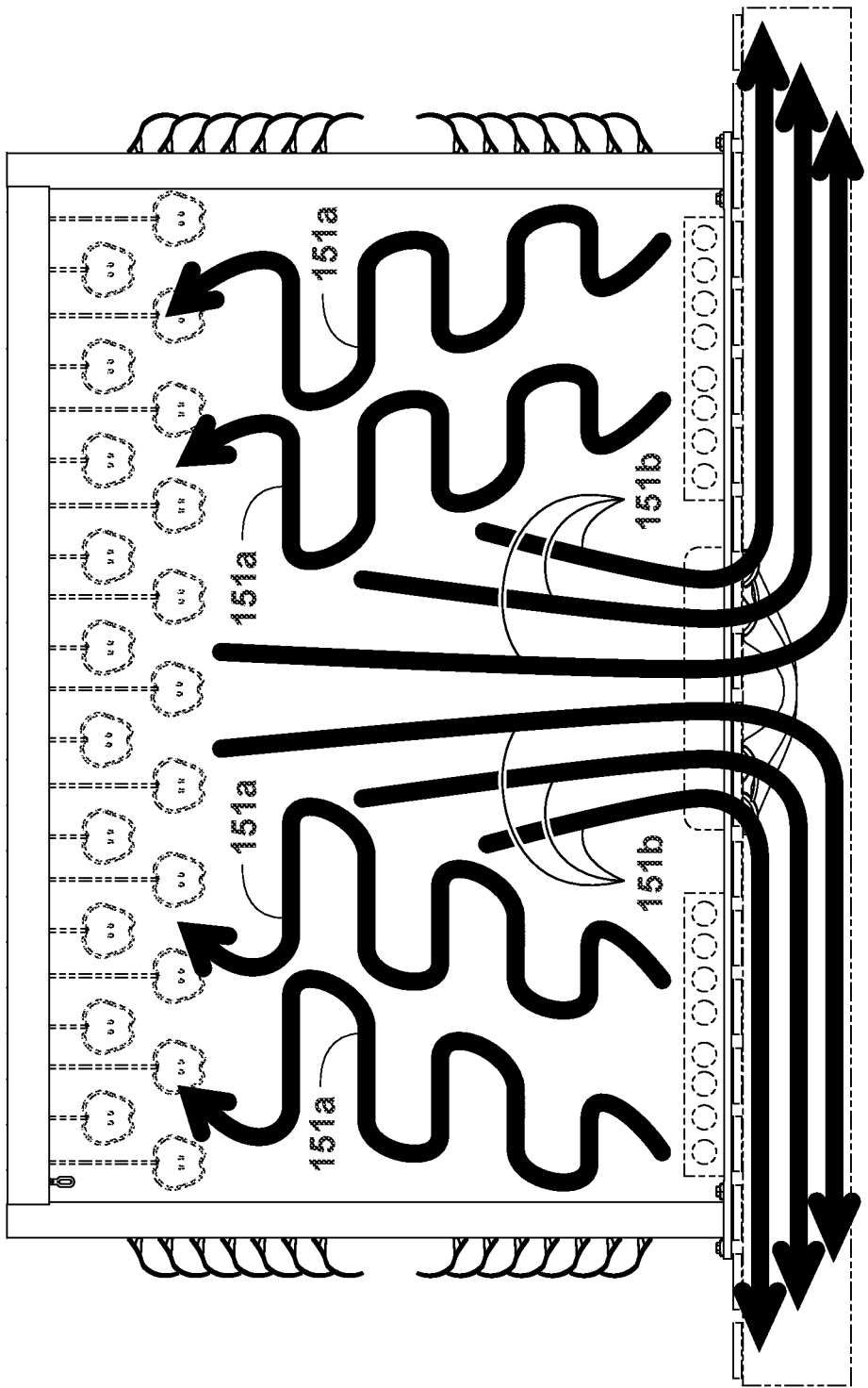
FIG. 46E illustrates a perspective view of the four-device-in-one bleacher-skybox food-dehydrator mobile-marine-sauna wind-and-smoke-redirecting bungalow functioning as a food dehydrator.

19) Privacy-enabling wind-and-smoke-redirecting cold-weather-insulating rainwater-sealing skybox-enabling marine-sauna-enabling food-dehydrating-enabling window-panel inserts 119 is (or are respectively) for:

a) Enabling the four-device-in-one bleacher-skybox food-dehydrator mobile-marine-sauna wind-and-smoke-redirecting bungalow to become a mobile-marine sauna in the directions of arrows 149*b*, 149*c*, and 149*d* (see FIG. 1C, FIG. 1D, FIG. 1E, FIG. 31A, FIG. 31B, FIG. 31C, and FIG. 31D);

b) Enabling four-device-in-one bleacher-skybox food-dehydrator mobile-marine-sauna wind-and-smoke-redirecting bungalow to become bleacher skybox in the directions of arrows 150*a* and 150*b* (see FIG. 1F, FIG. 1G, FIG. 1H, FIG. 31E, FIG. 31F, FIG. 31G, and FIG. 31H);

c) Enabling the four-device-in-one bleacher-skybox food-dehydrator mobile-marine-sauna wind-and-smoke-redirecting bungalow to become food dehydrator in the directions of arrows 151*a*, 151*b*, 151*c*, and 151*d* (see FIG. 1I, FIG. 46E, and FIG. 46F);

d) Providing security within the four-device-in-one bleacher-skybox food-dehydrator mobile-marine-sauna wind-and-smoke-redirecting bungalow;

e) Providing insulation within the four-device-in-one bleacher-skybox food-dehydrator mobile-marine-sauna wind-and-smoke-redirecting bungalow from cold or warm weather; Providing protection within the four-device-in-one bleacher-skybox food-dehydrator mobile-marine-sauna wind-and-smoke-redirecting bungalow from wind; and f) Slidably and replaceably allowing door-window-and-wall-panel frames 118 to be positioned in variety of ways.

20) Privacy-enabling wind-and-smoke-redirecting cold-weather-insulating rainwater-sealing skybox-enabling marine-sauna-enabling food-dehydrator-enabling rotatable-and-reversible-and-flippable louver braces 120 is (or are respectively) for:

a) Allowing privacy-enabling wind-and-smoke-redirecting cold-weather-insulating rainwater-sealing skybox-enabling marine-sauna-enabling food-dehydrator-enabling louvers 122 to be rotated and positioned to redirect wind direction in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

b) Allowing privacy-enabling wind-and-smoke-redirecting cold-weather-insulating rainwater-sealing skybox-enabling marine-sauna-enabling food-dehydrating-enabling louvers 122 to be flipped and positioned to redirect wind direction in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D); and c) Structuringly securing privacy-enabling wind-and-smoke-redirecting cold-weather-insulating rainwater-sealing skybox-enabling marine-sauna-enabling food-dehydrating-enabling louvers 122.

Figure 16:
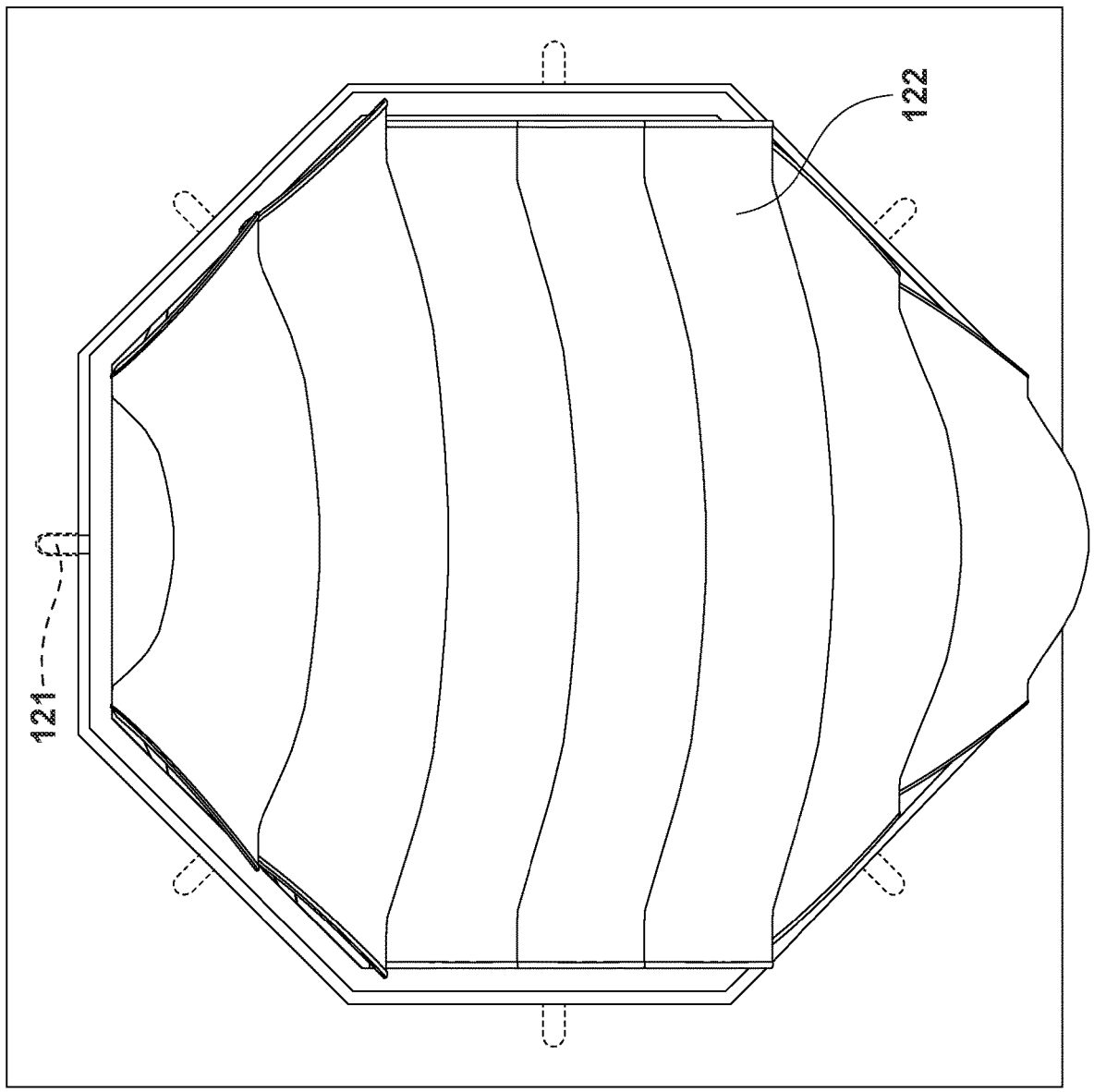
Figure 17:
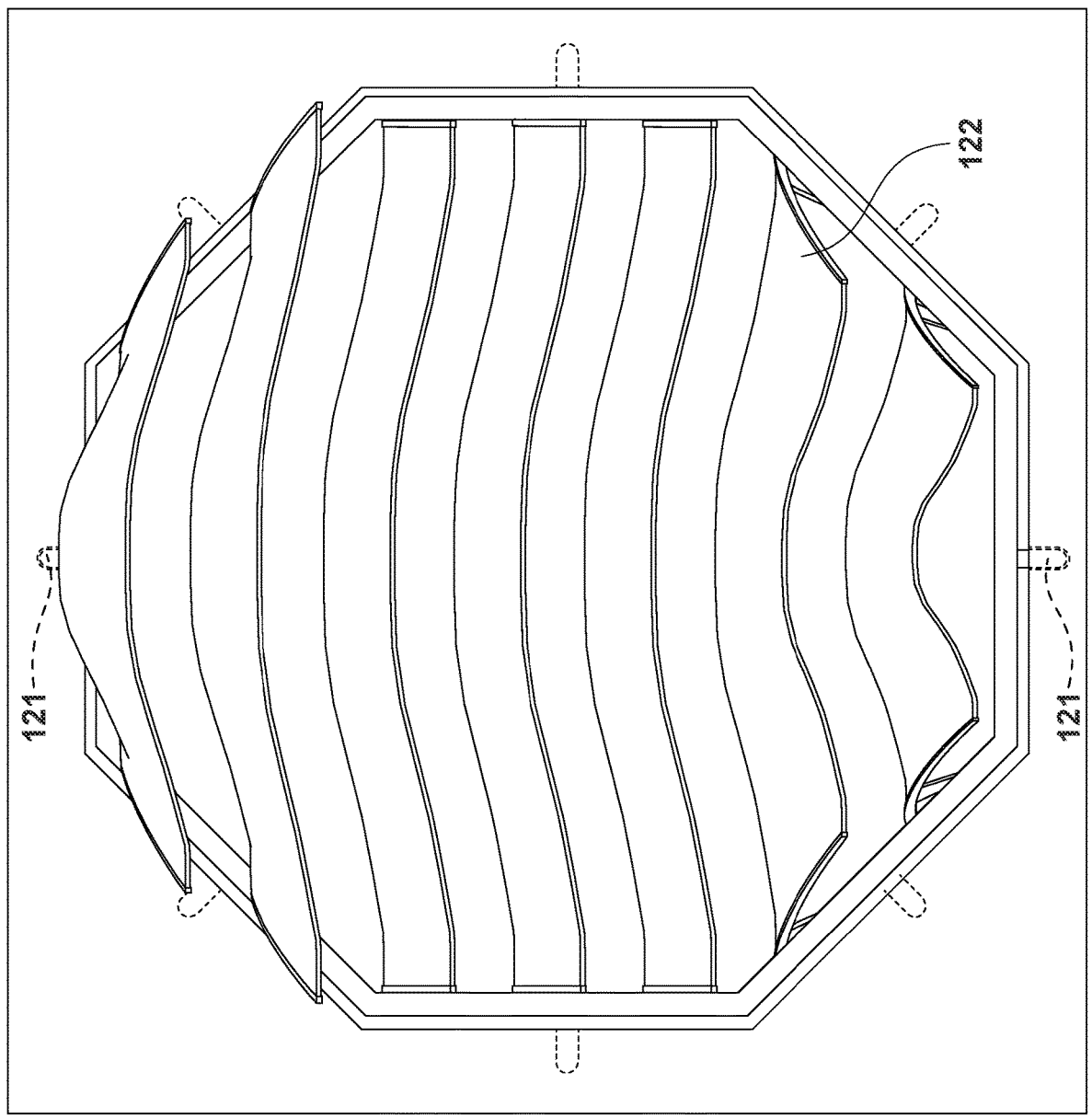
Figure 18:
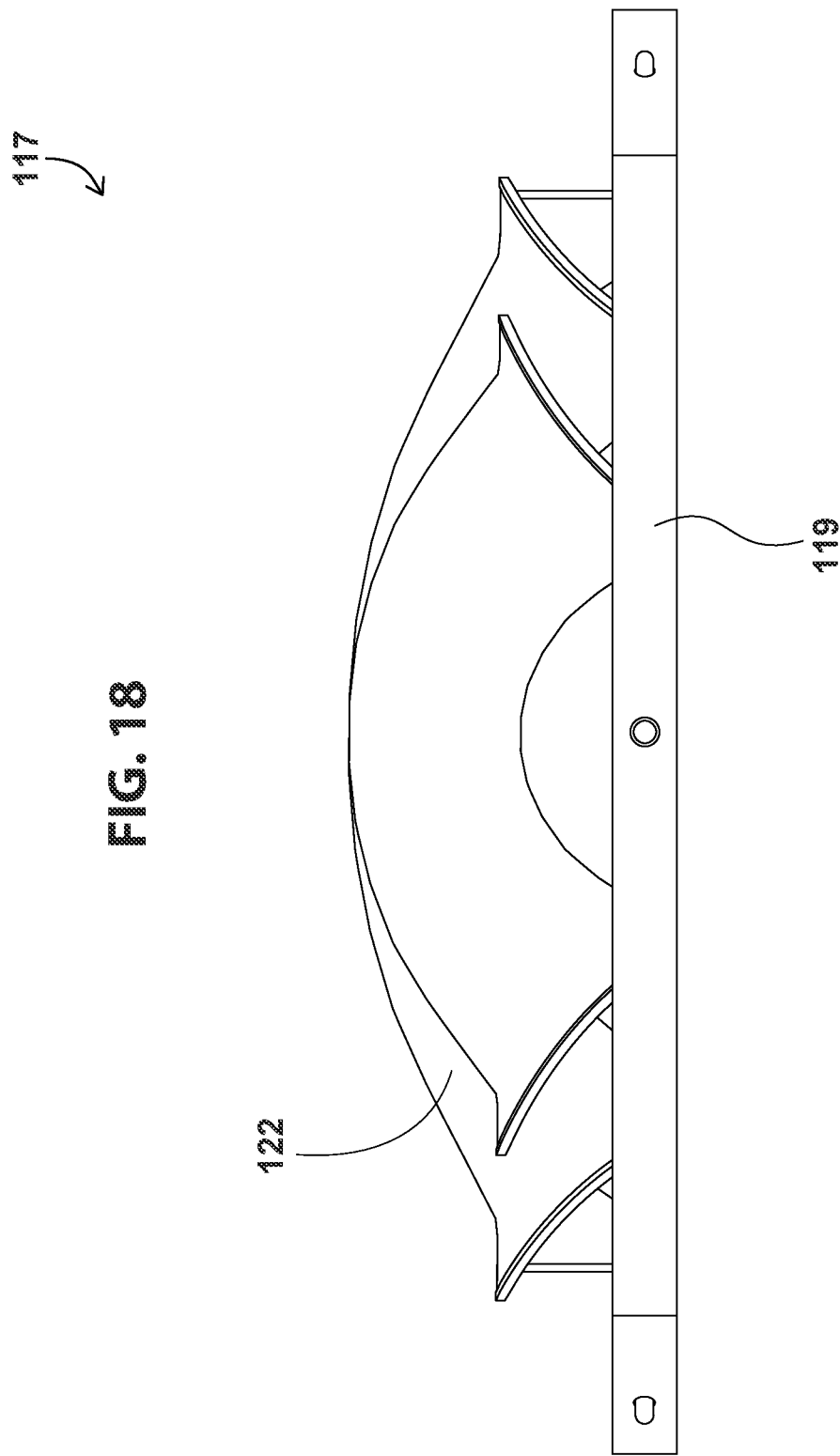
Figure 19:
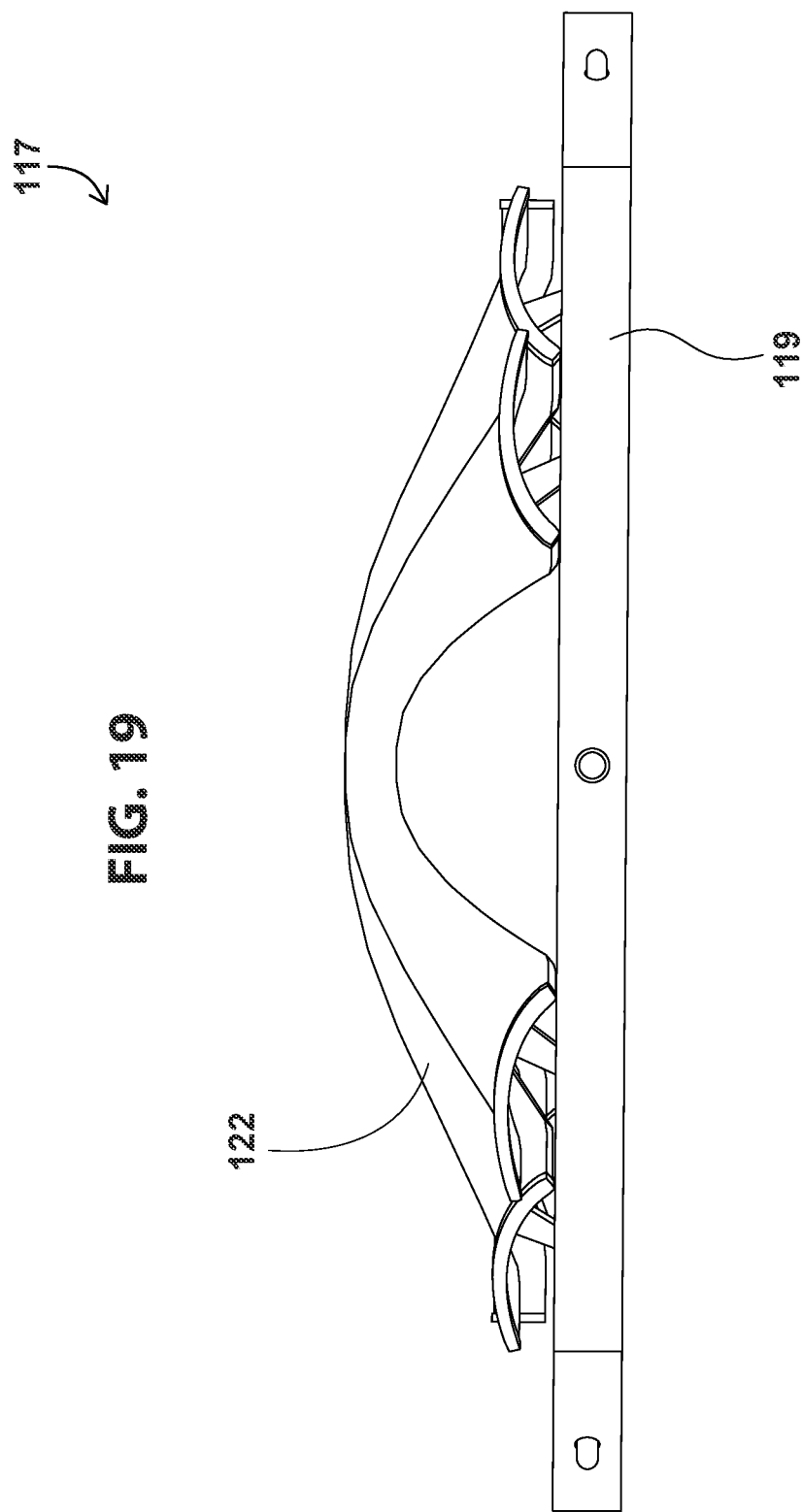
Figure 20:
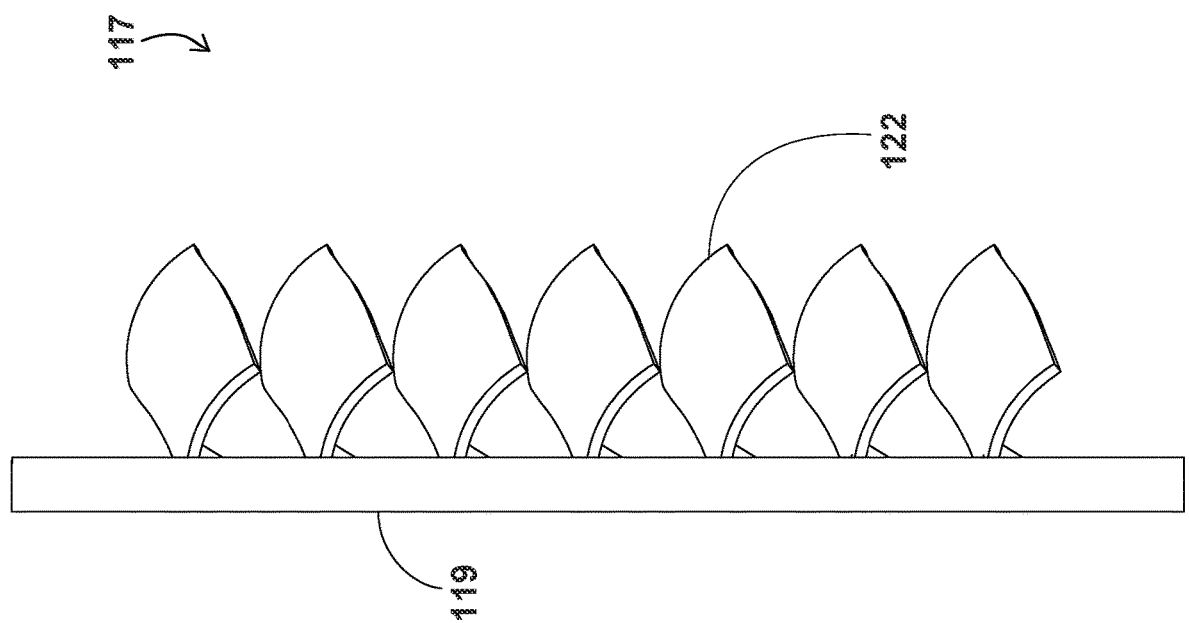
Figure 21:
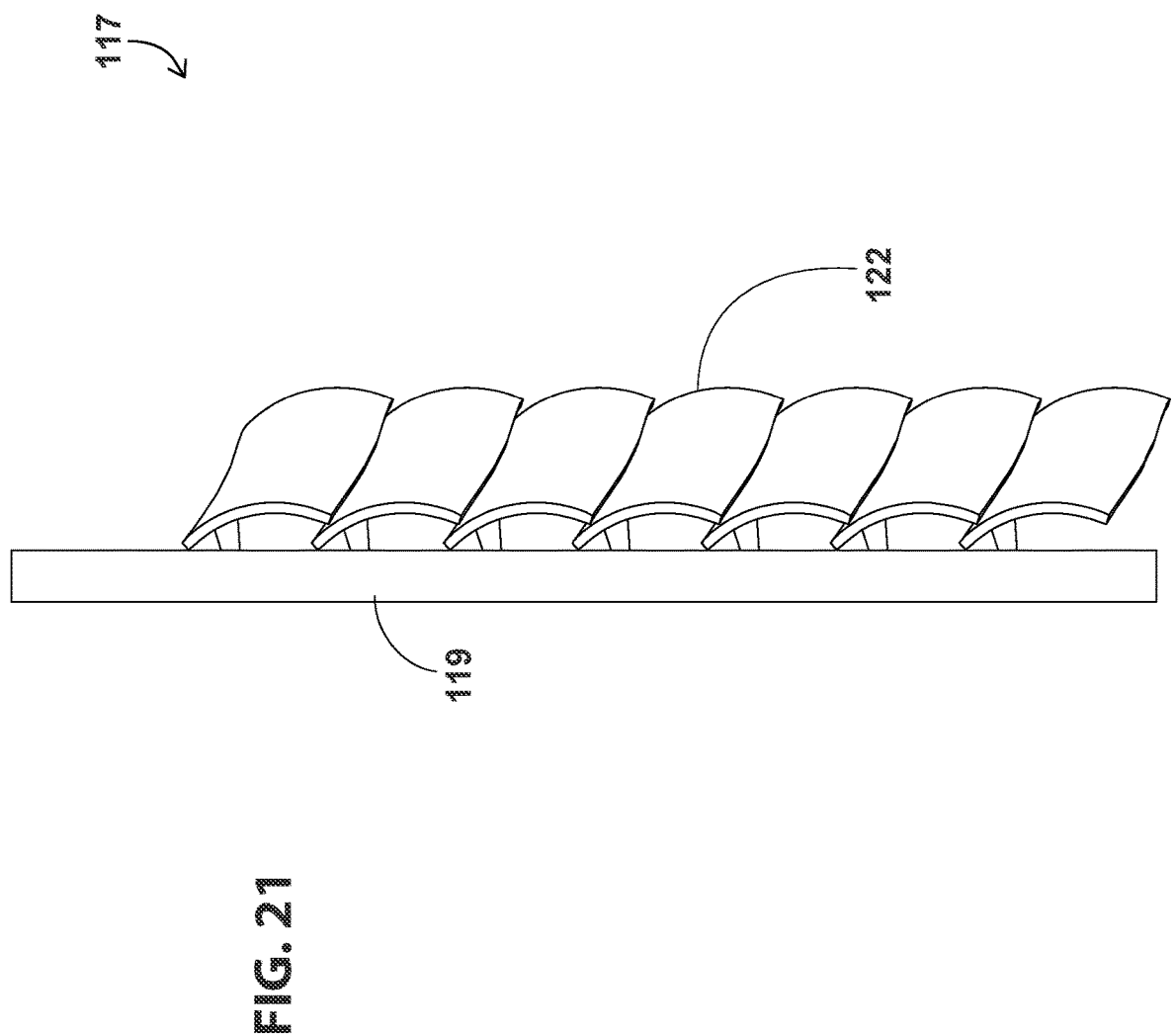
Figure 22:
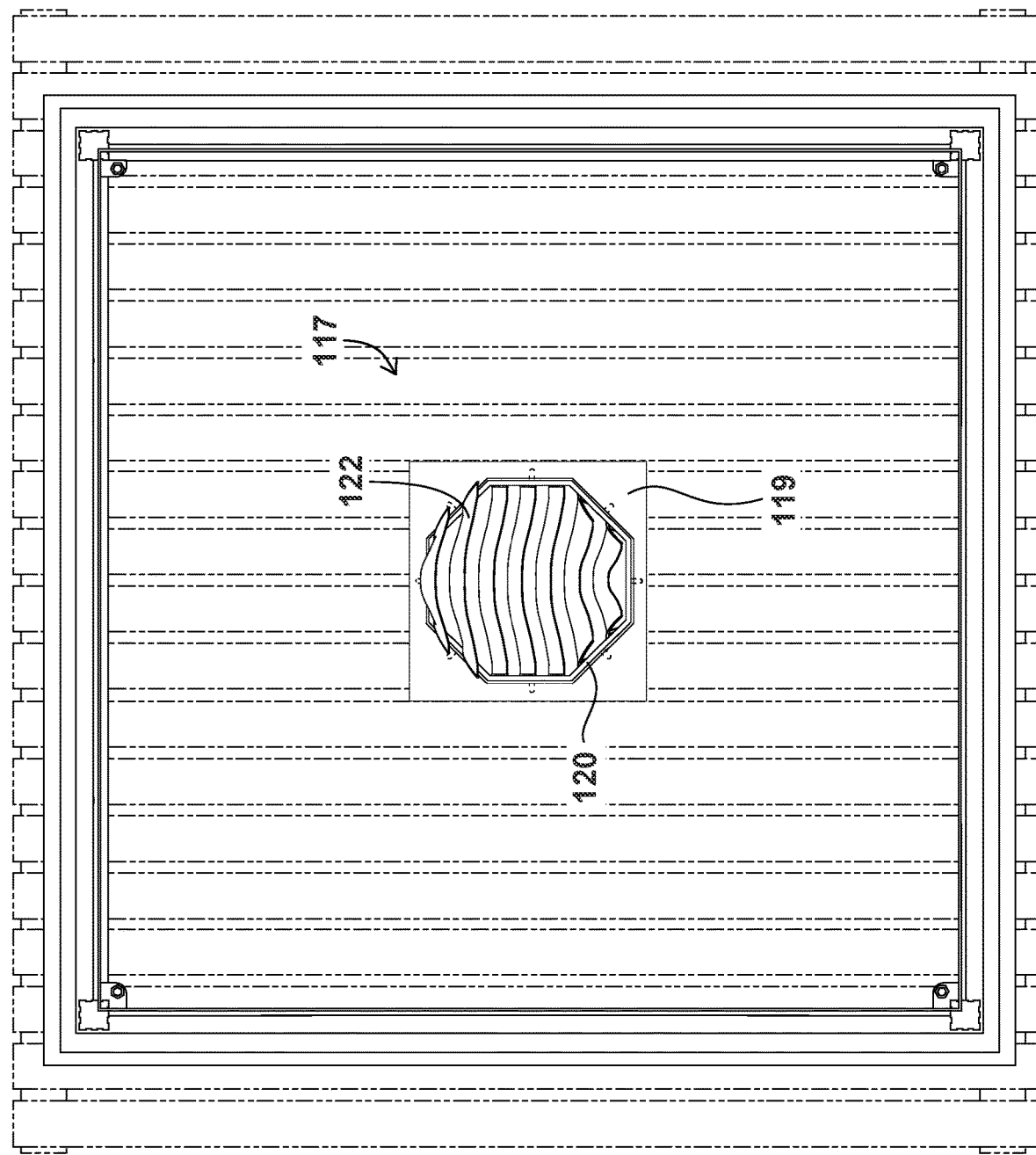
FIG. 22 illustrates a top view of the privacy-enabling wind-and-smoke-redirecting cold-weather-insulating rainwater-sealing skybox-enabling marine-sauna-enabling food-dehydrating-enabling louvers being installed on a floor.
Figure 23:
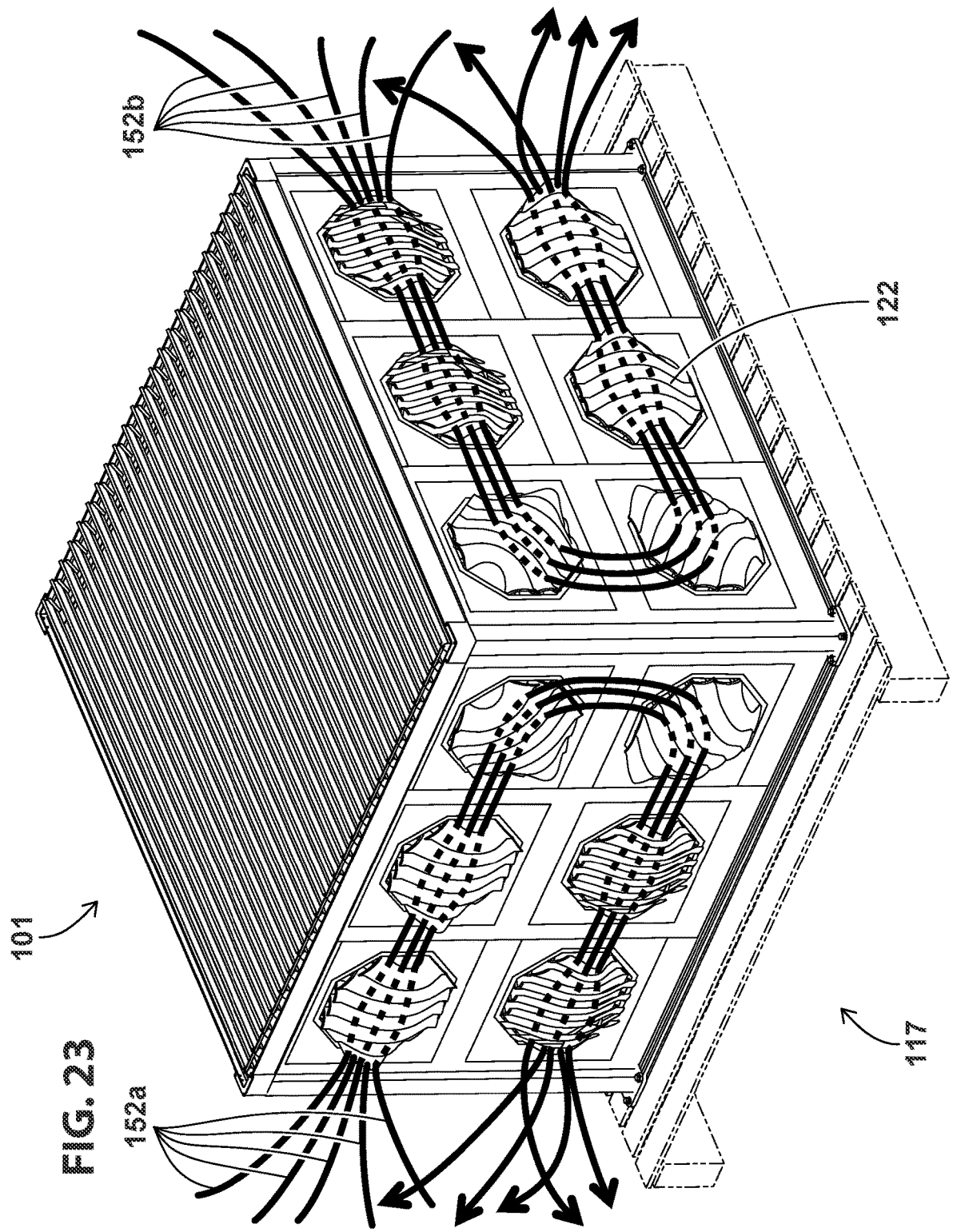
FIG. 23, FIG. 24, FIG. 25, FIG. 26, FIG. 27, FIG. 28, FIG. 29, and FIG. 30 illustrates perspective and front views demonstrating how the privacy-enabling wind-and-smoke-redirecting cold-weather-insulating rainwater-sealing skybox-enabling marine-sauna-enabling food-dehydrating-enabling louvers can be configured to redirect wind in a variety of ways.
Figure 24:
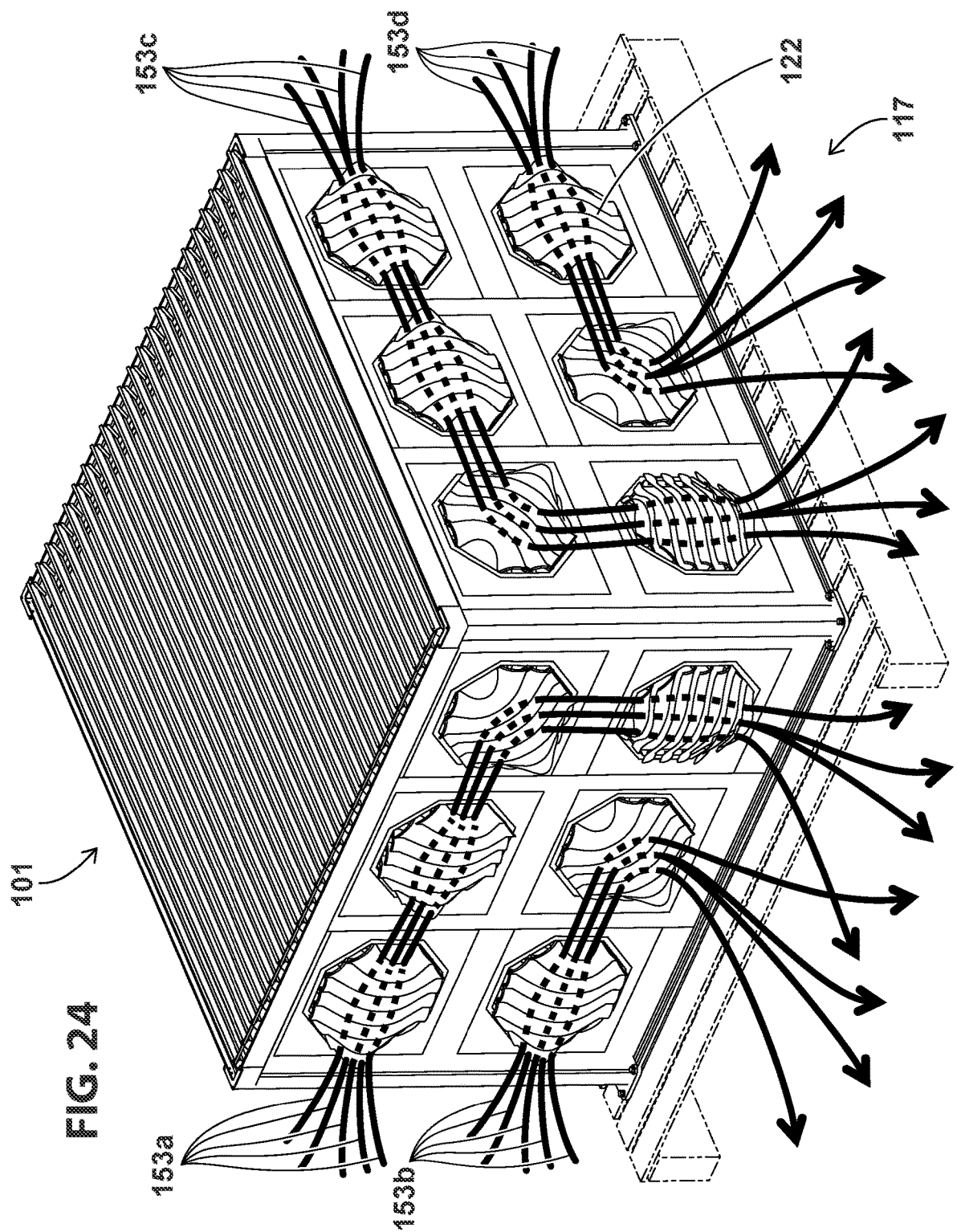
Figure 25:
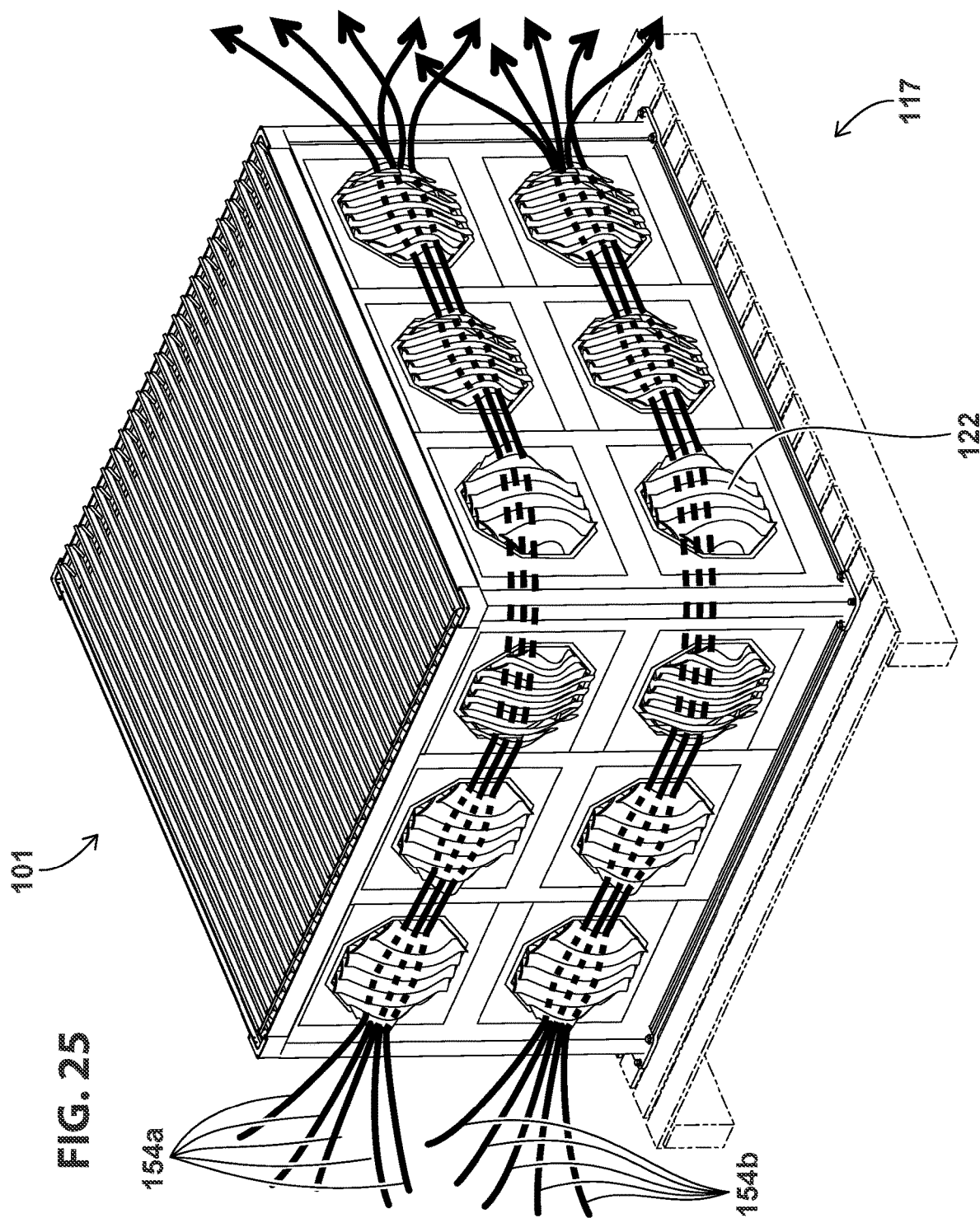
Figure 26:
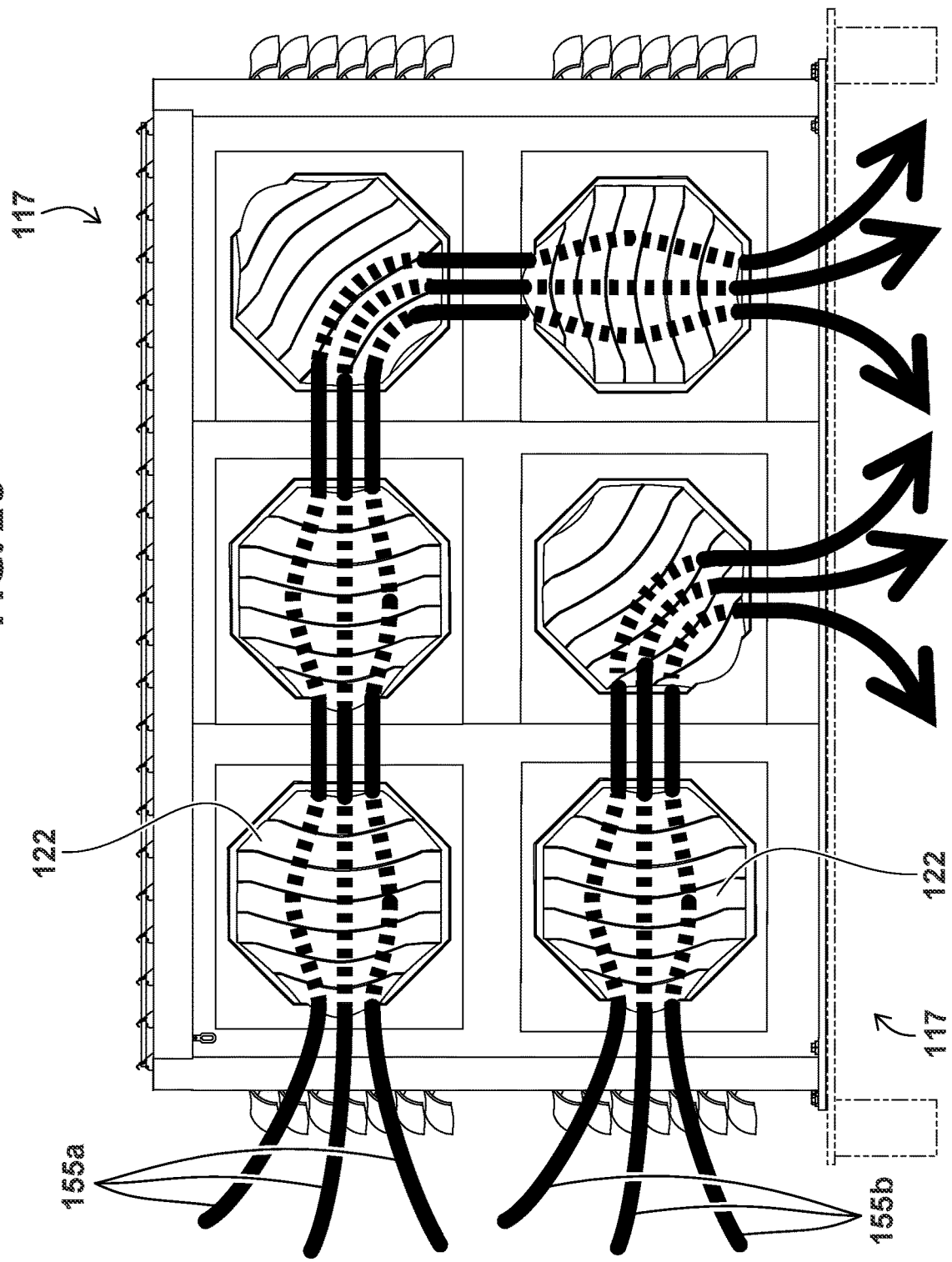
Figure 27:
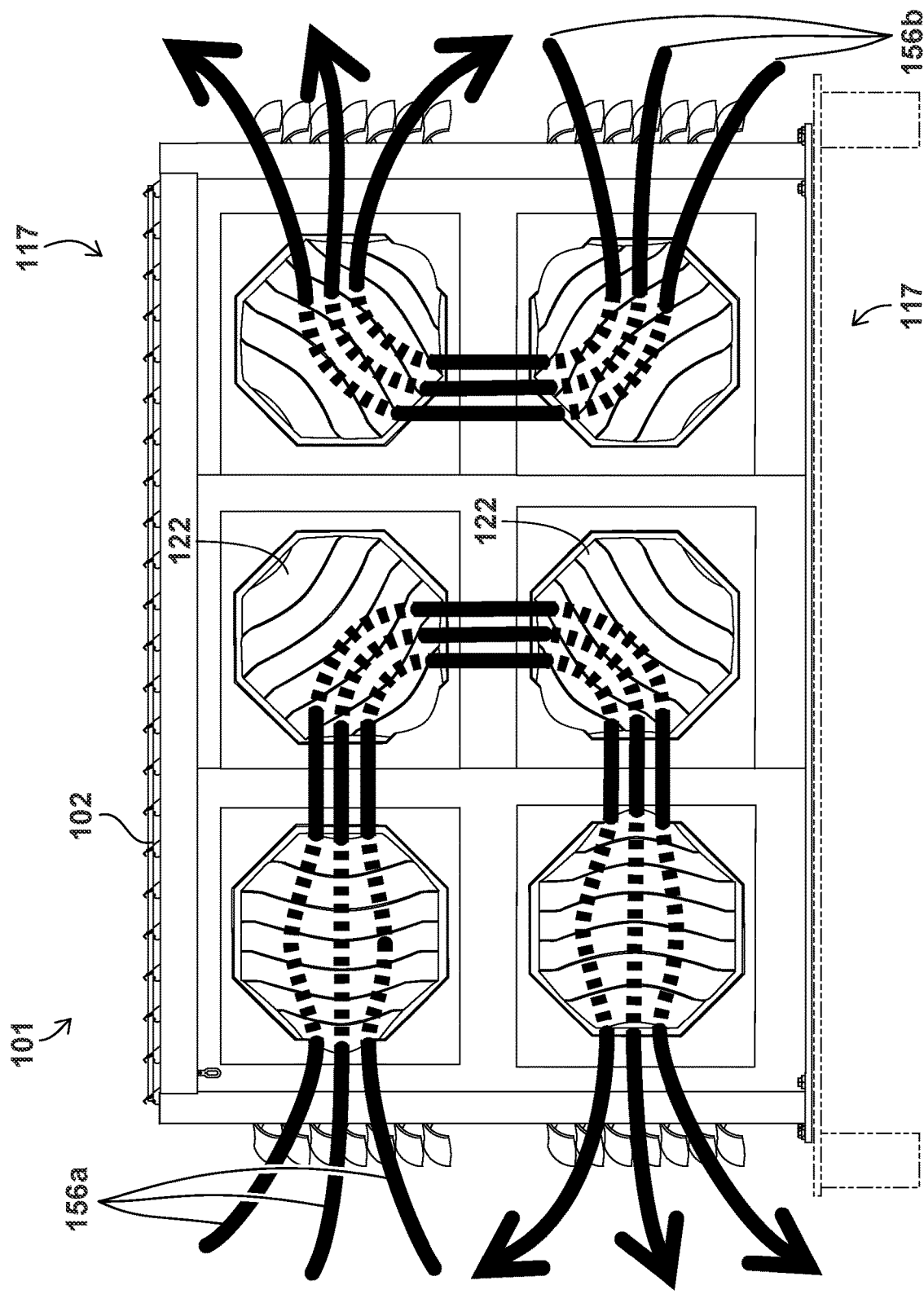
Figure 28:
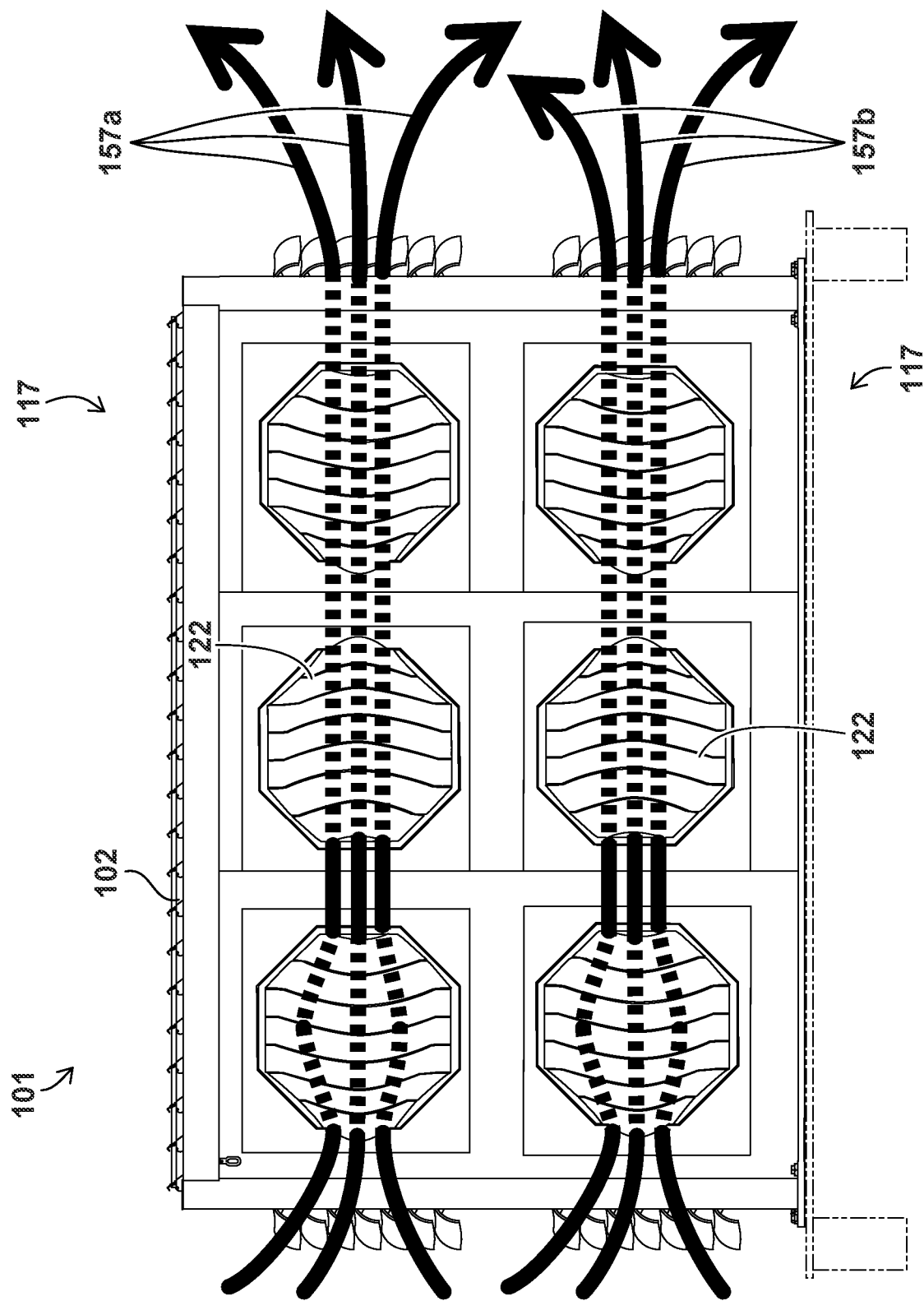
Figure 29:
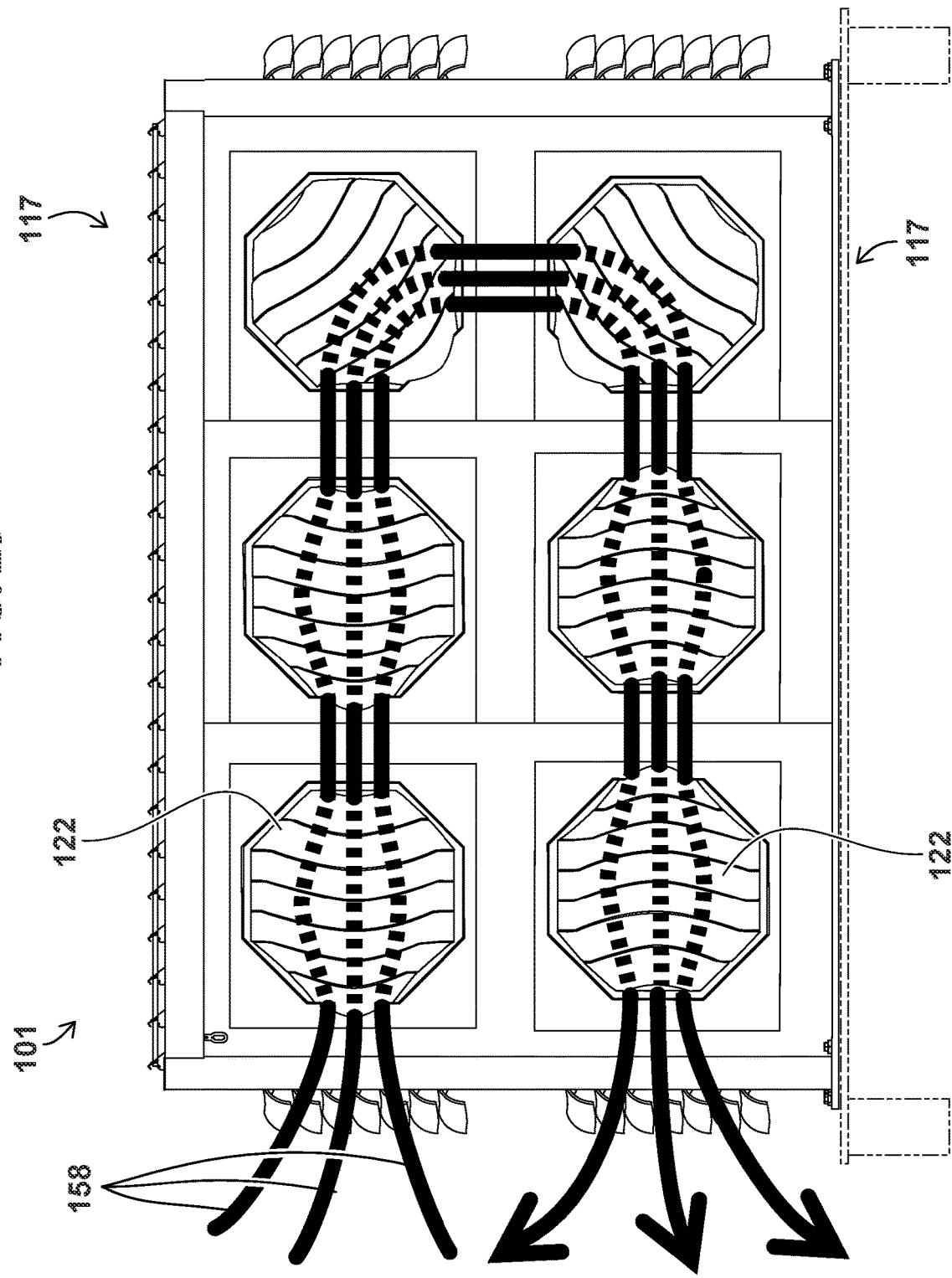
Figure 30:
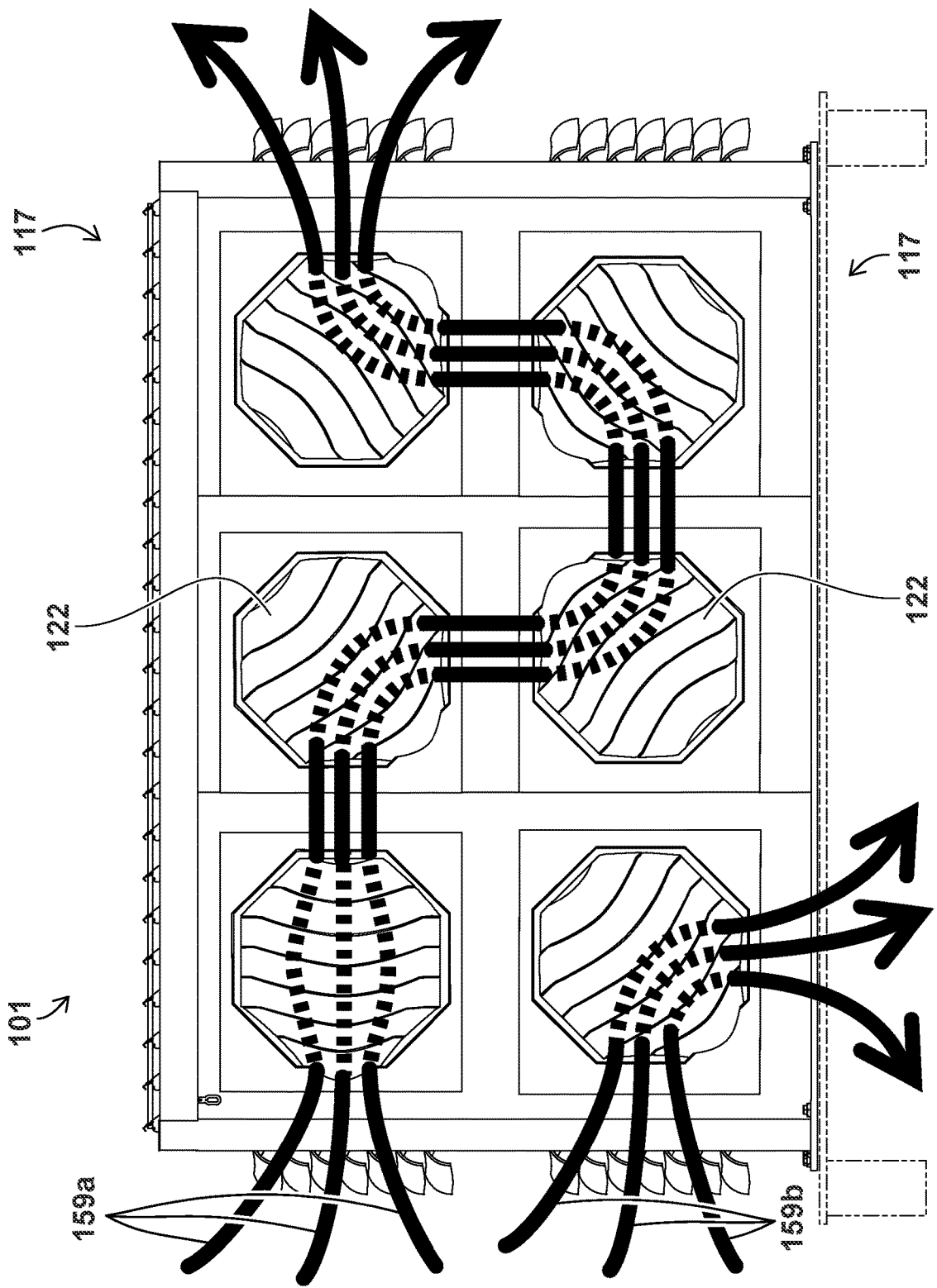
Figure 31A:
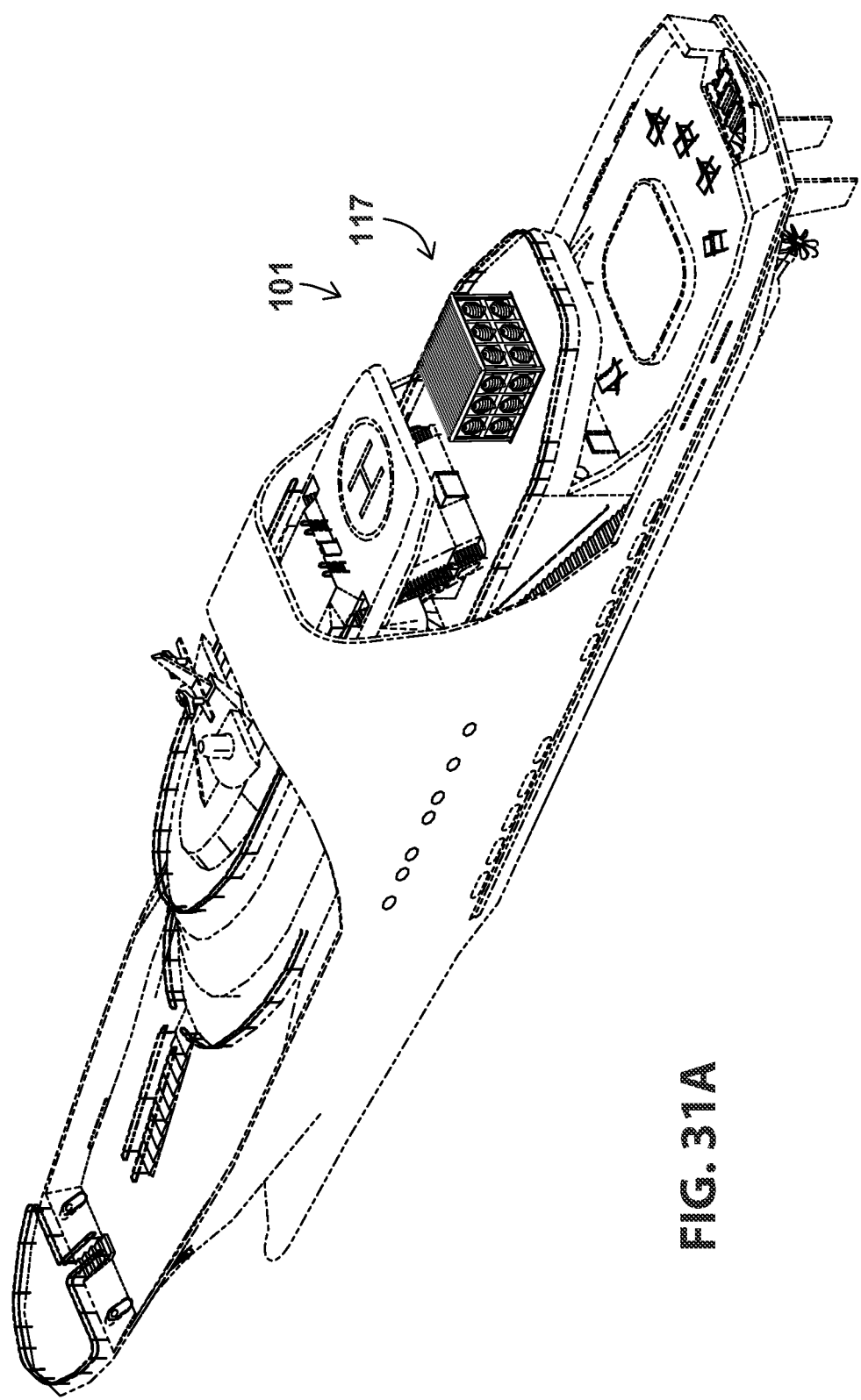
FIG. 31A, FIG. 31B, and FIG. 31C illustrate perspective views of the four-device-in-one bleacher-skybox food-dehydrator mobile-marine-sauna wind-and-smoke-redirecting bungalow functioning as a moveable-marine sauna on a ship's deck.
Figure 31B:
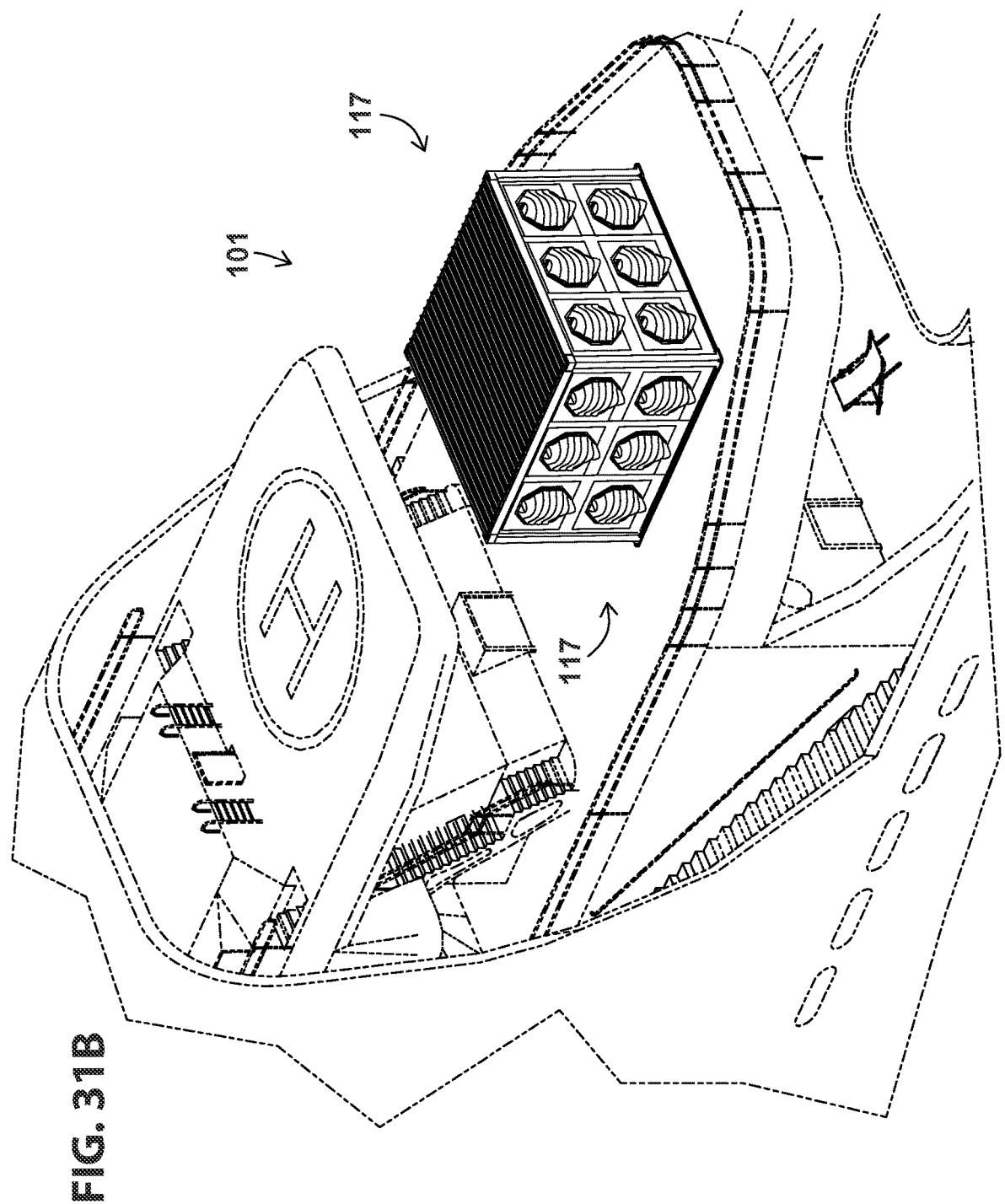
Figure 31C:
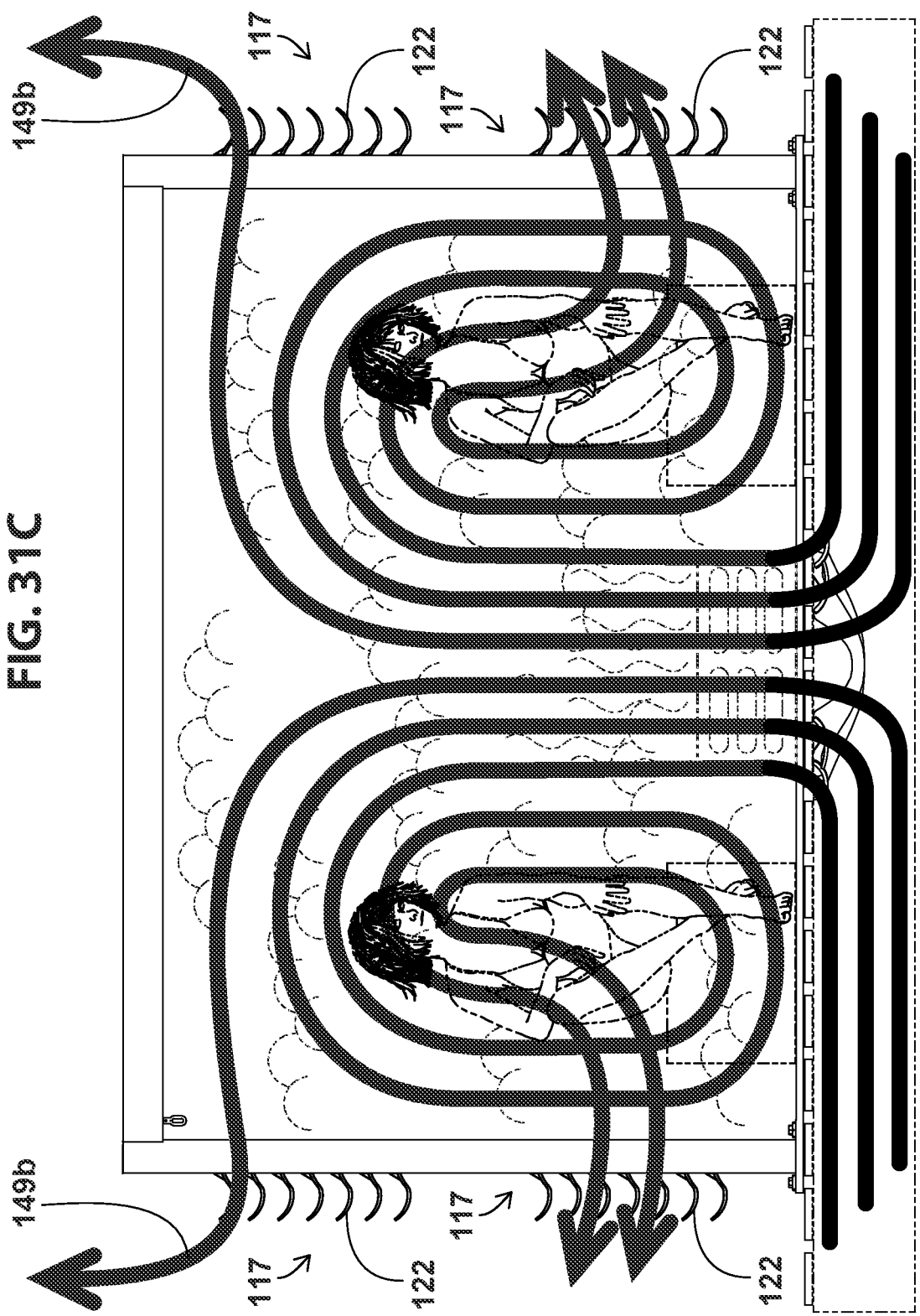
Figure 31E:
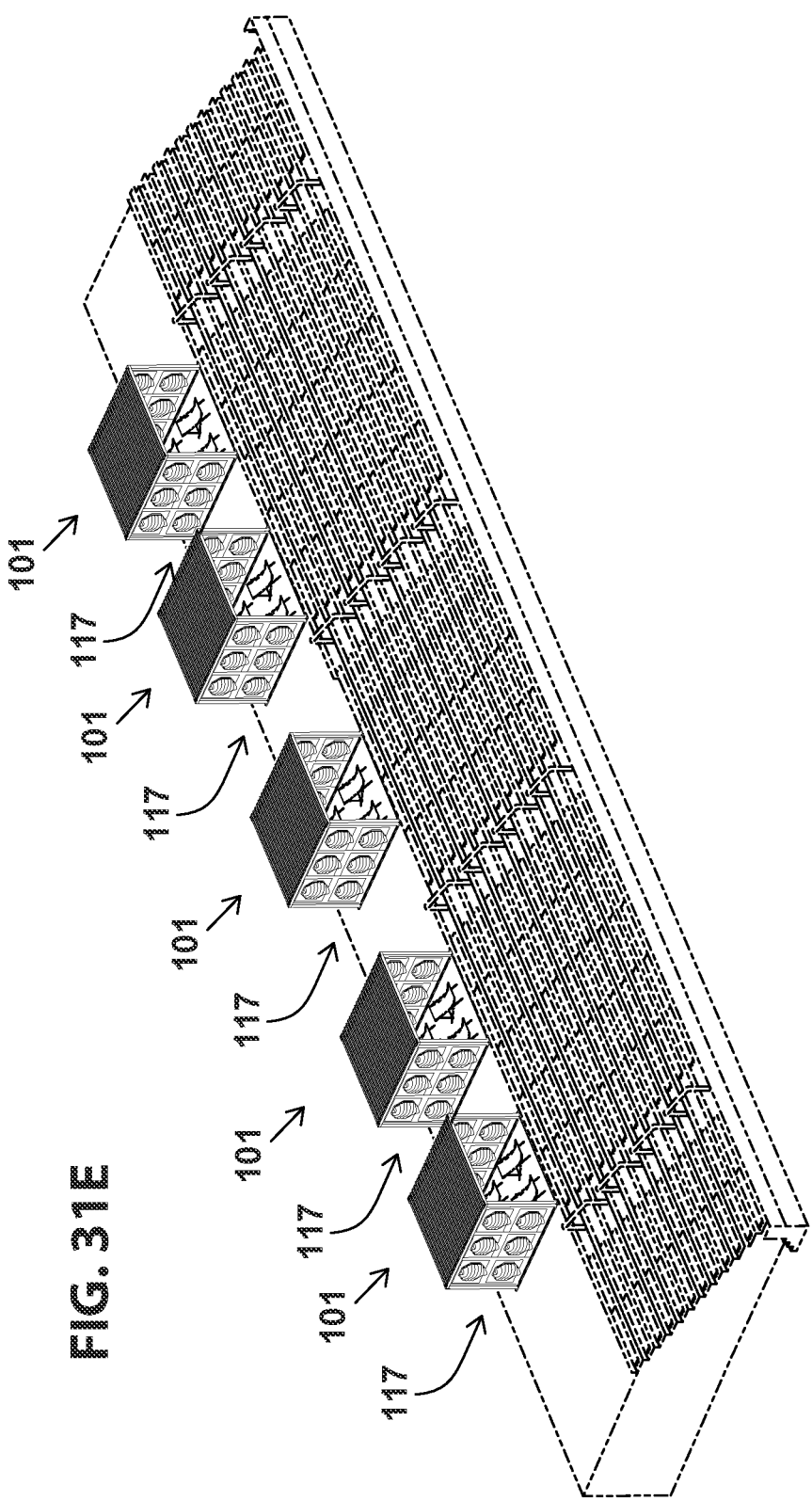
Figure 34:
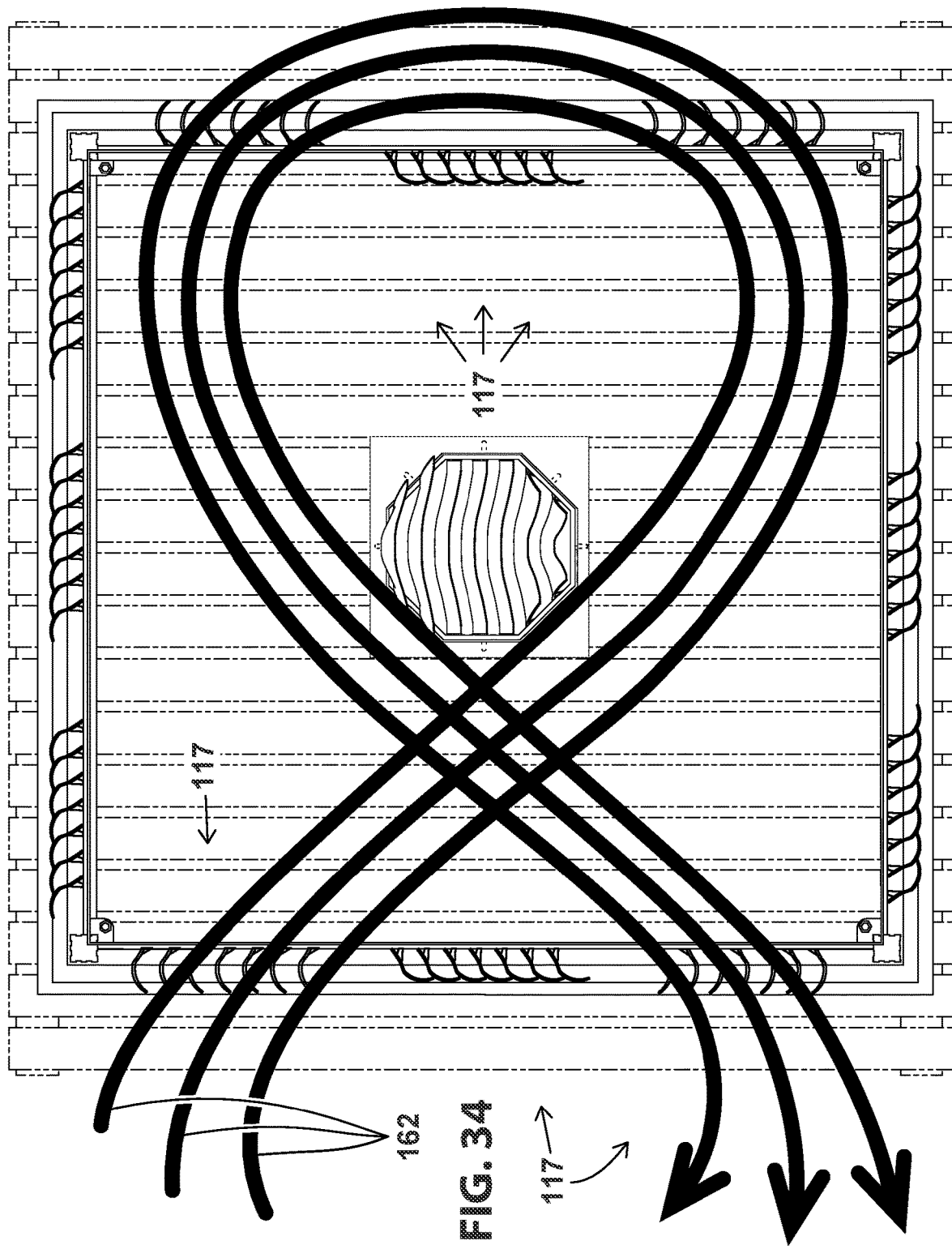
Figure 35:
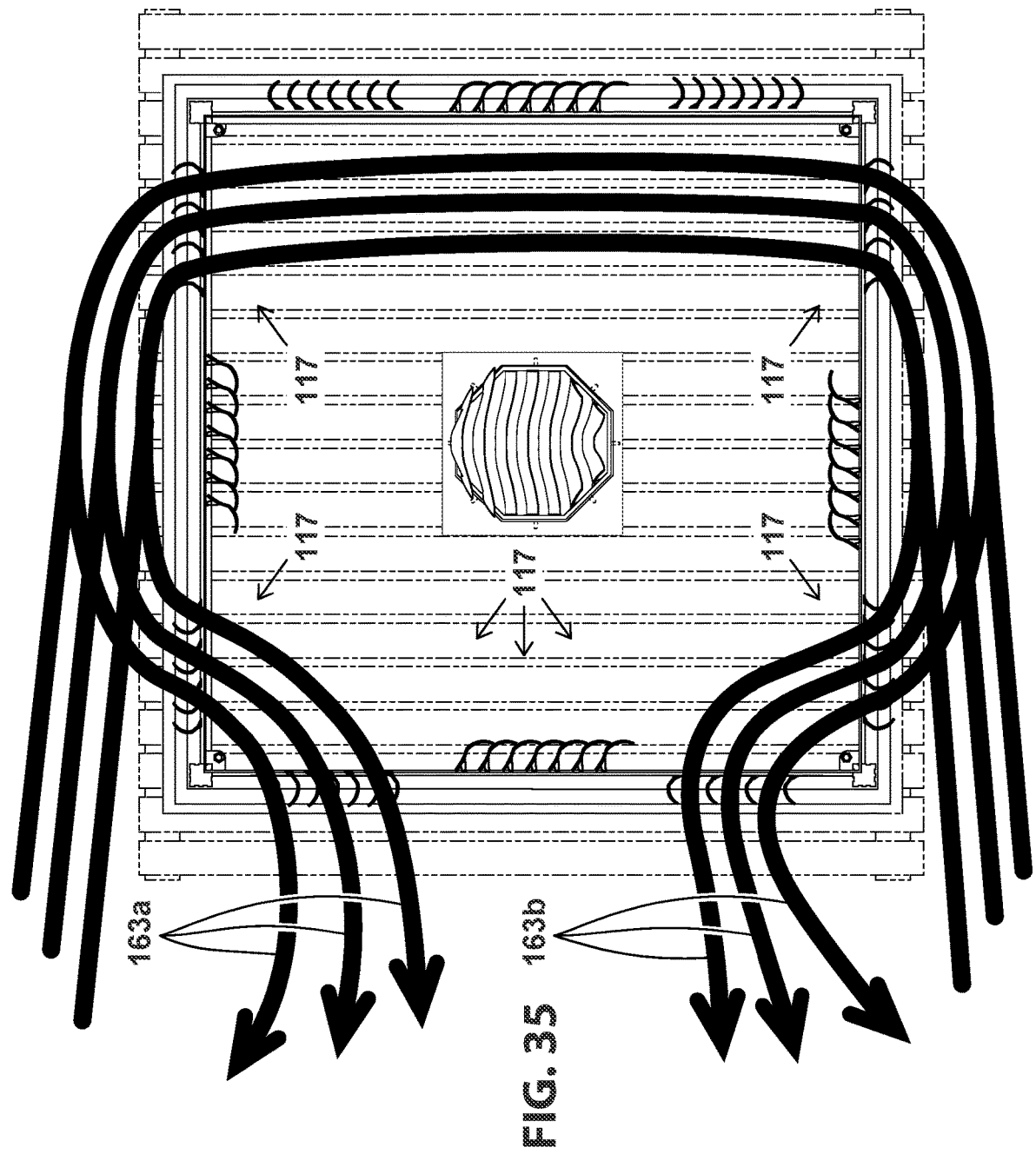
Figure 36:
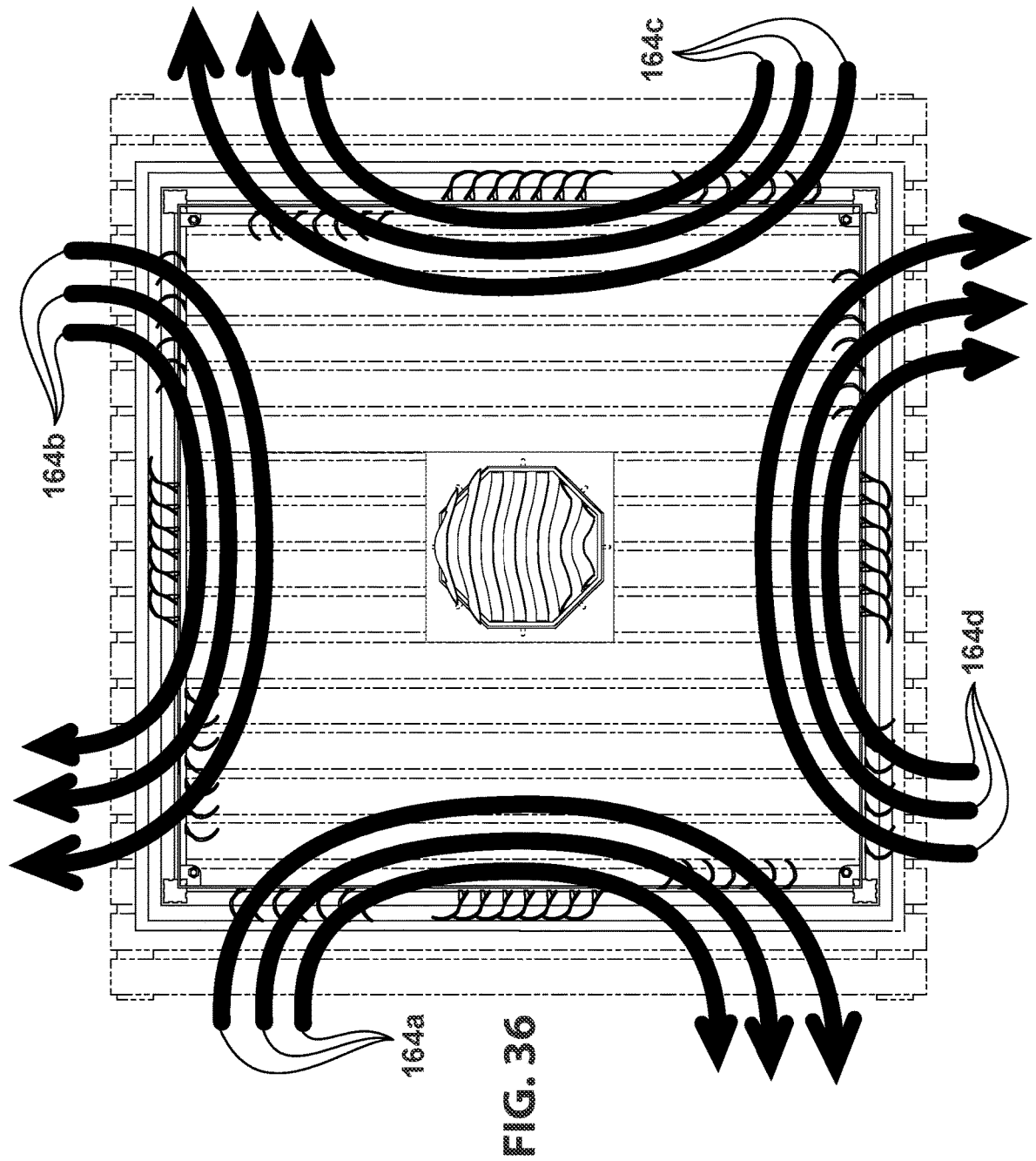
Figure 37:
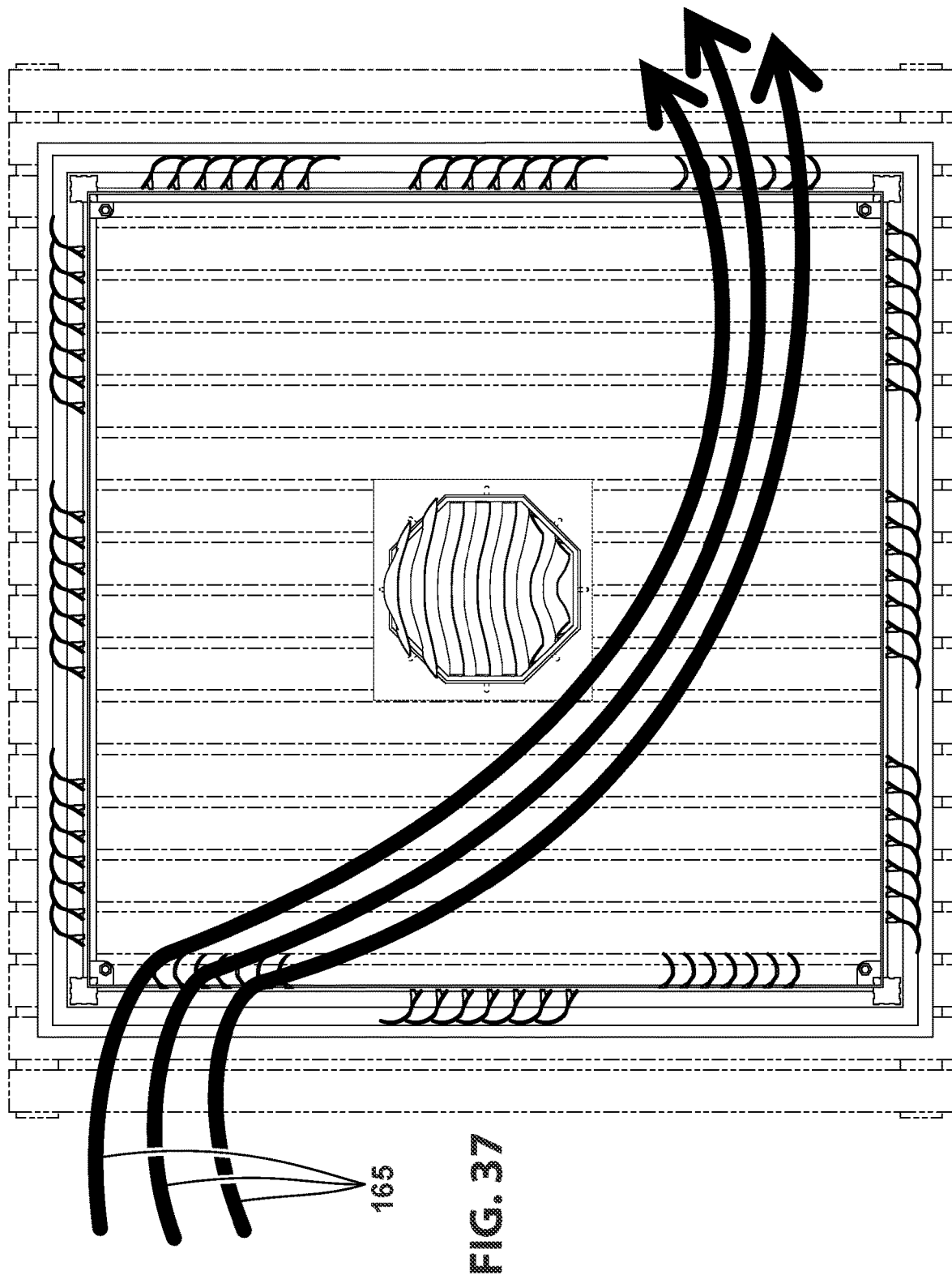
Figure 38:
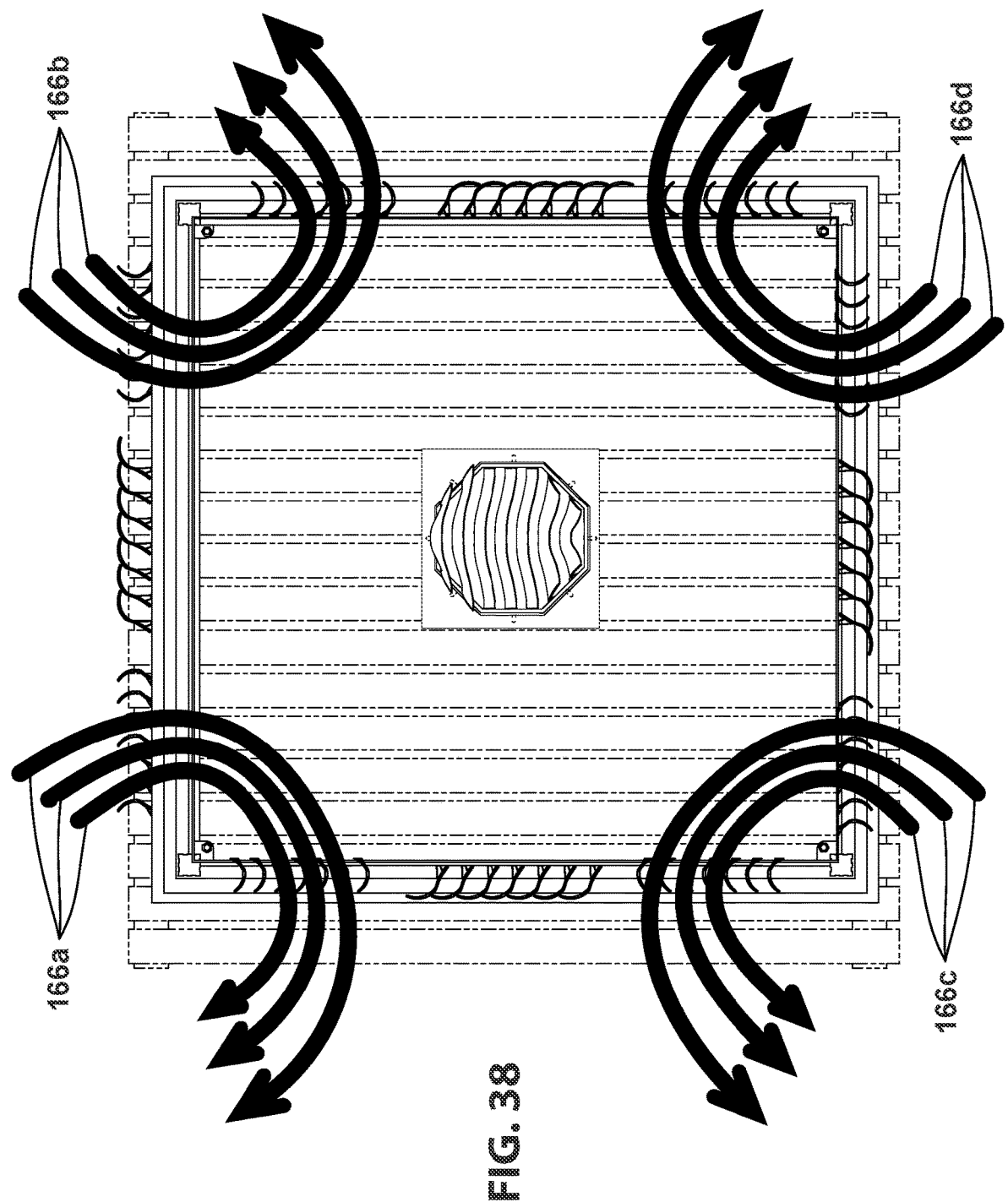
Figure 39A:
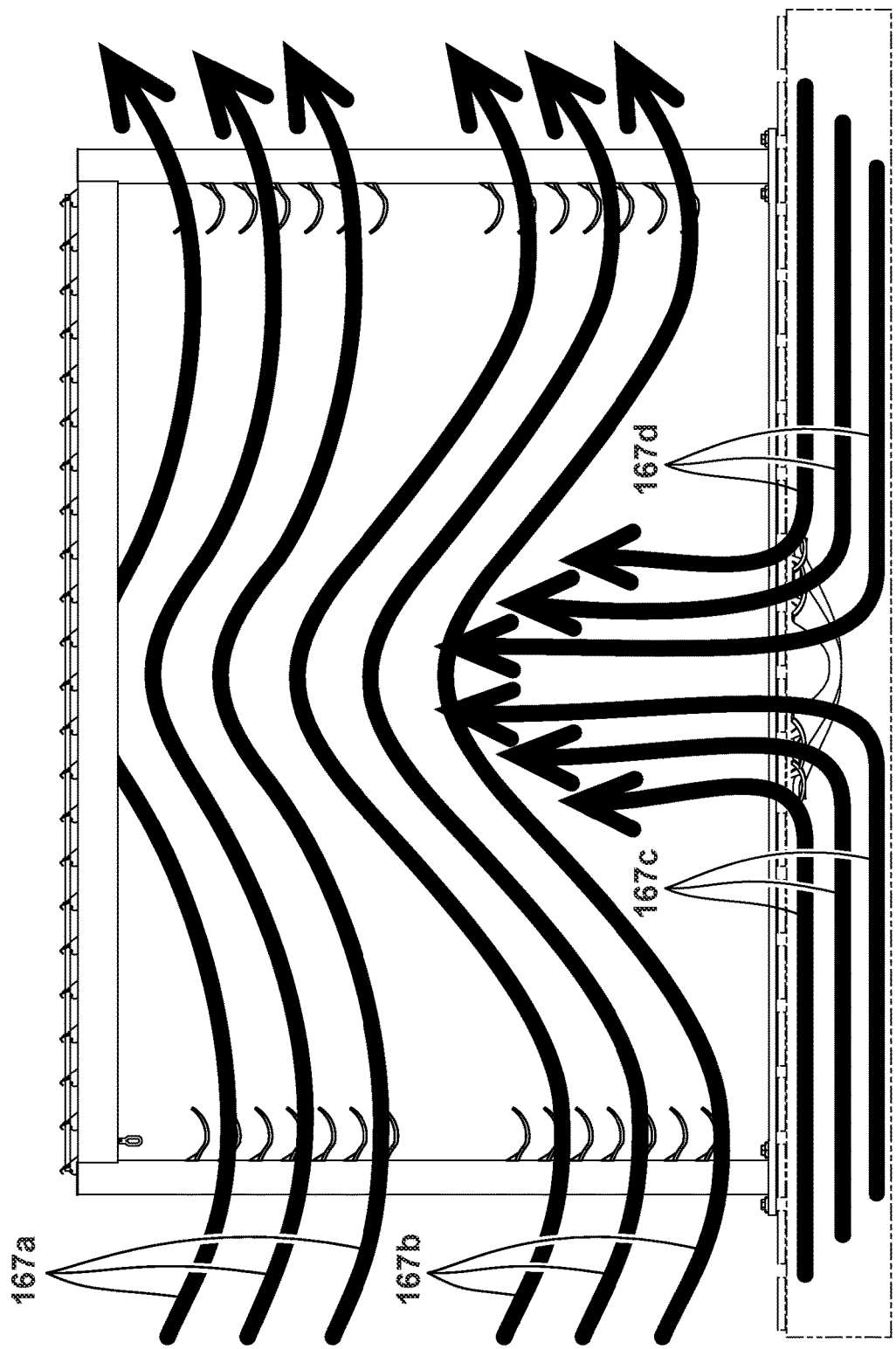
Figure 40A:
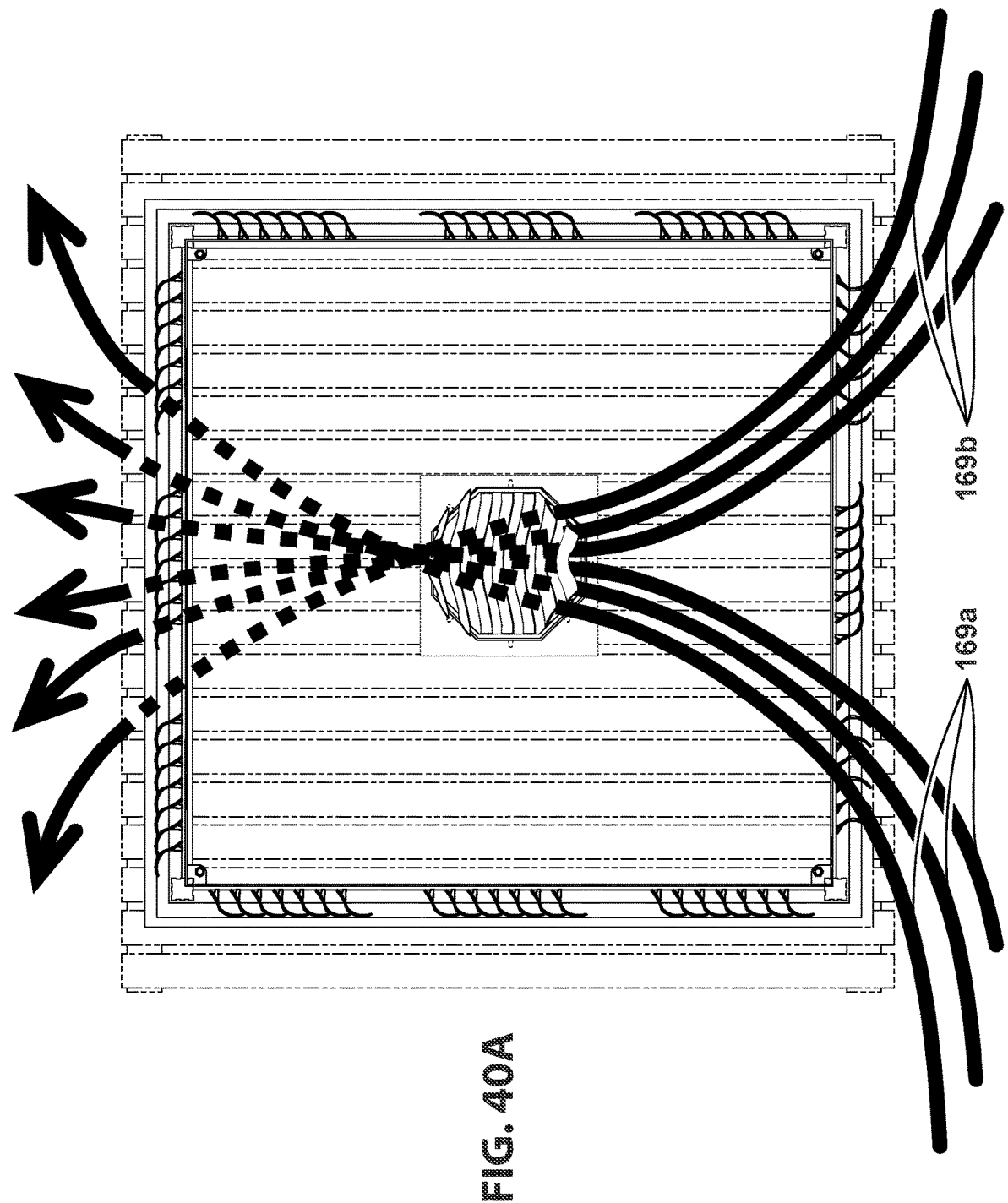
Figure 40B:
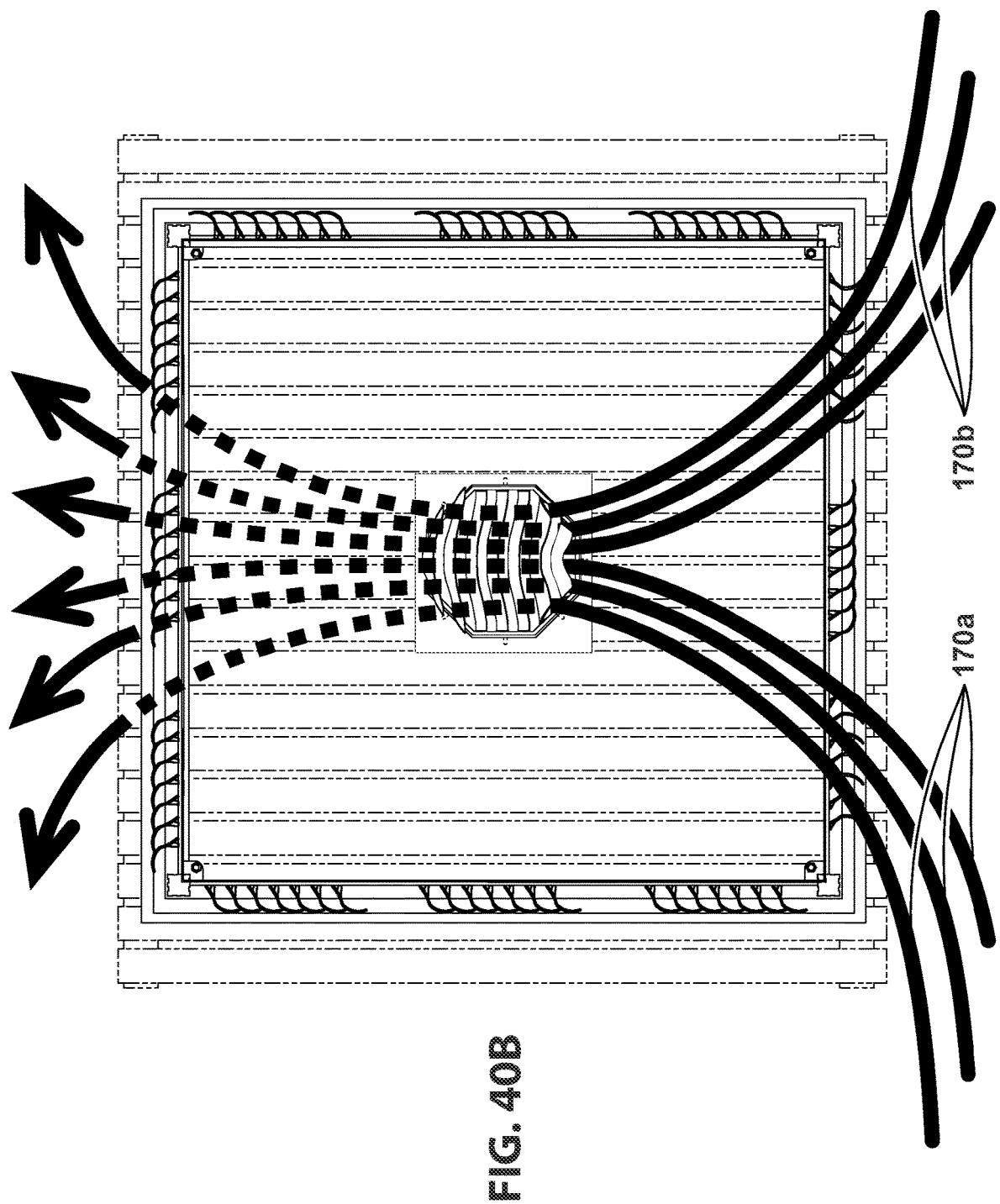
Figure 41:
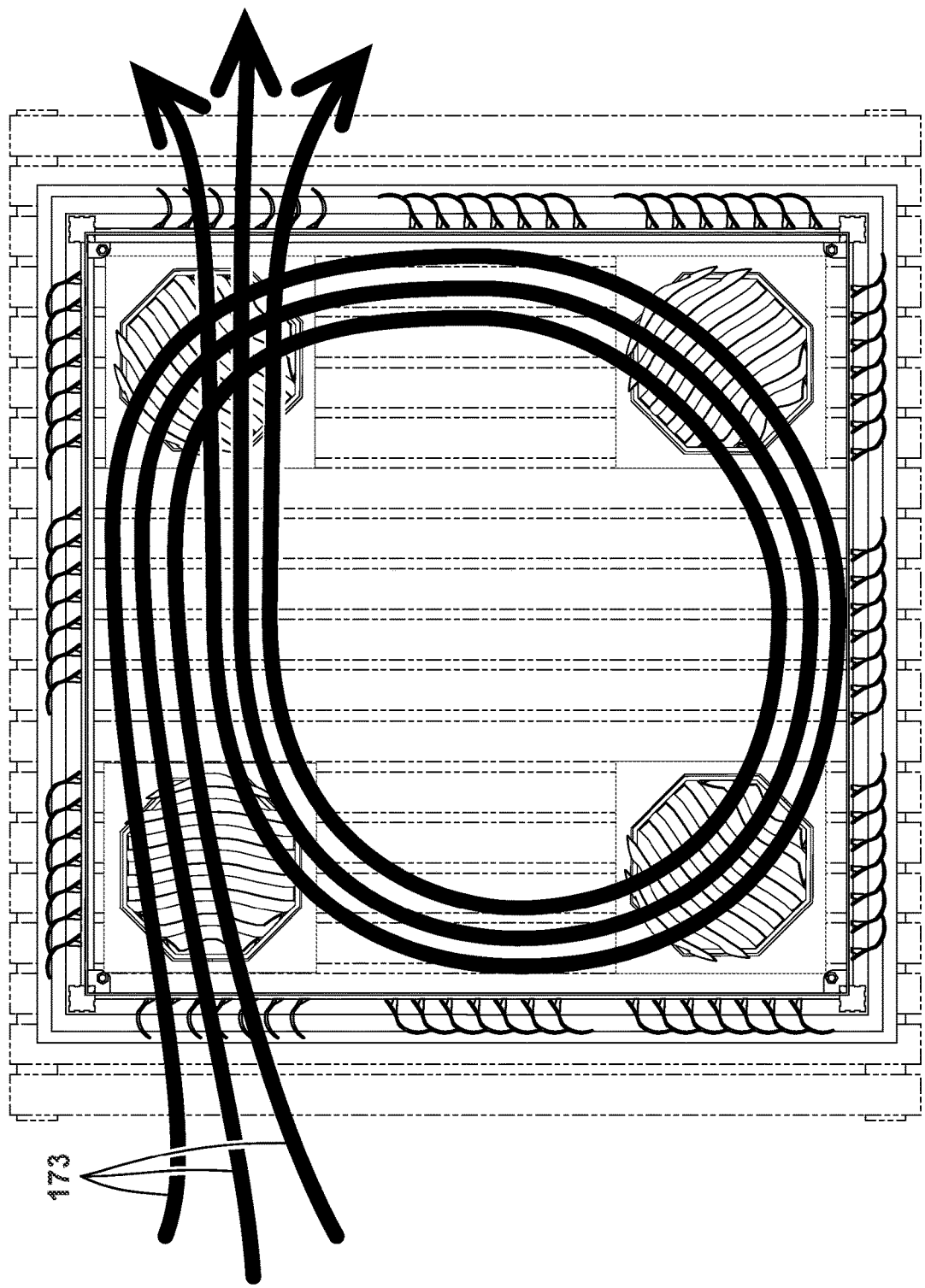
FIG. 41, FIG. 42, FIG. 43, FIG. 44, FIG. 45, and FIG. 46A illustrate side and top views demonstrating how the privacy-enabling wind-and-smoke-redirecting cold-weather-insulating rainwater-sealing skybox-enabling marine-sauna-enabling food-dehydrating-enabling louvers can be configured to redirect wind in a variety of ways.
Figure 42:
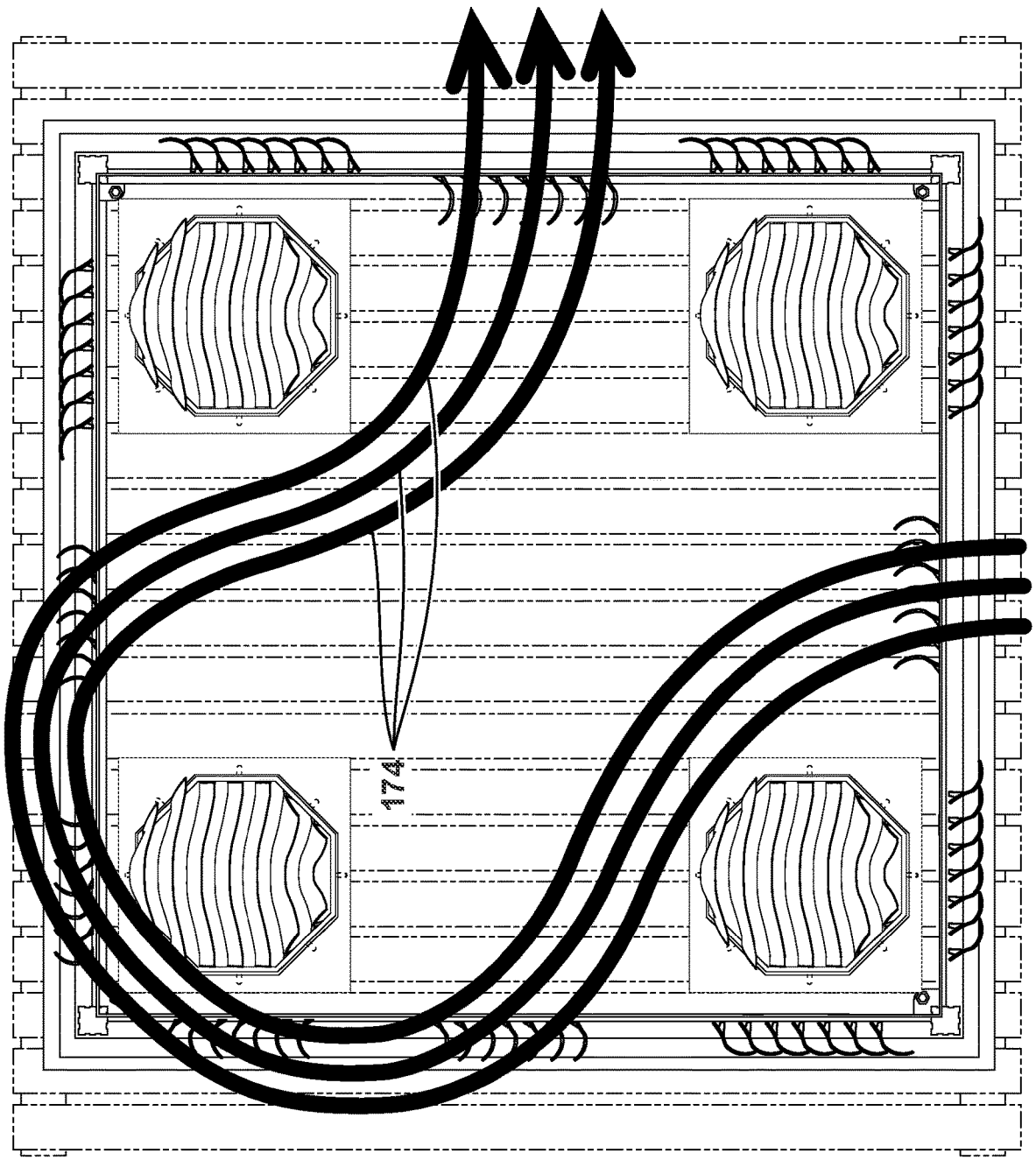
Figure 43:
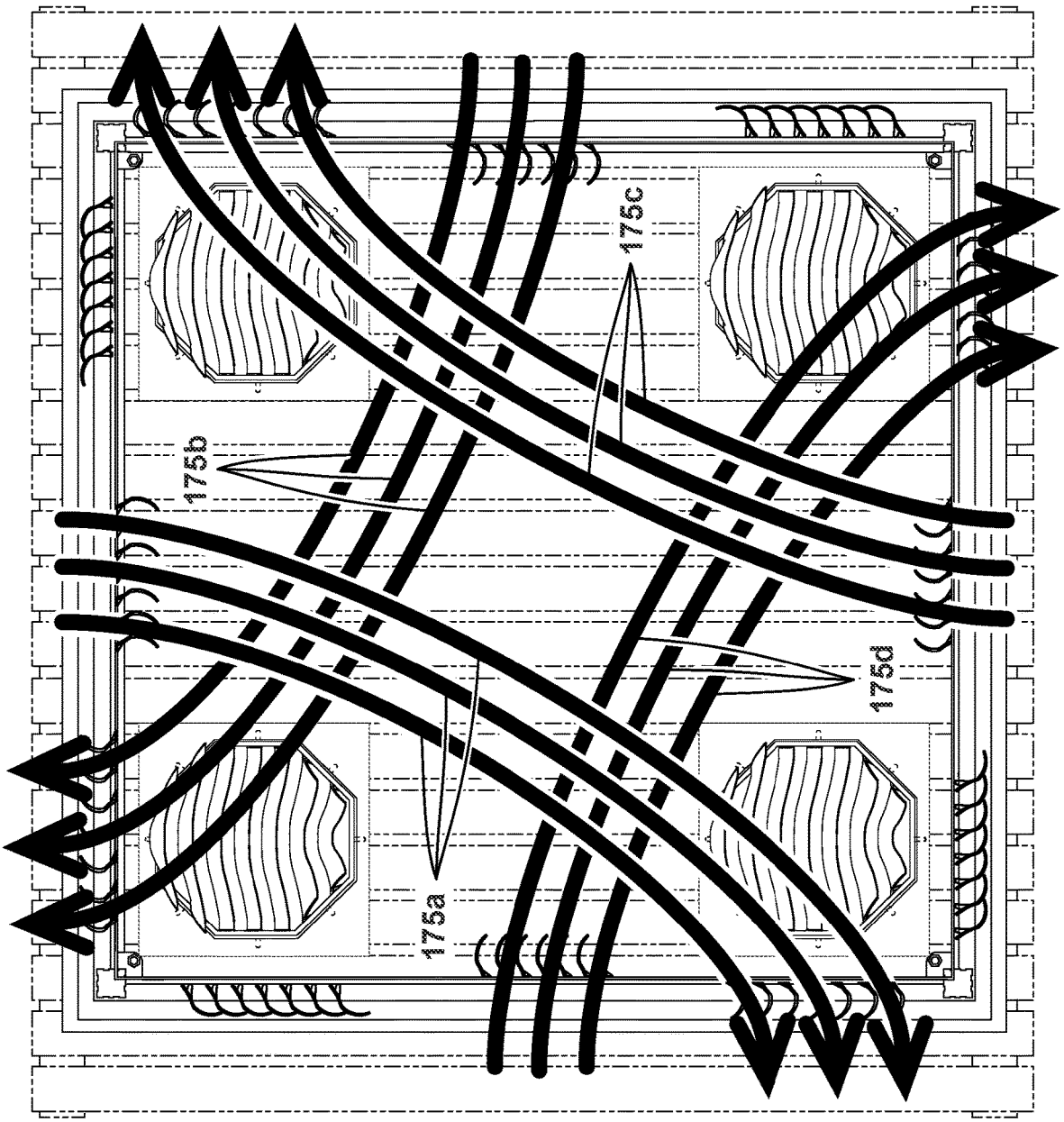
Figure 44:
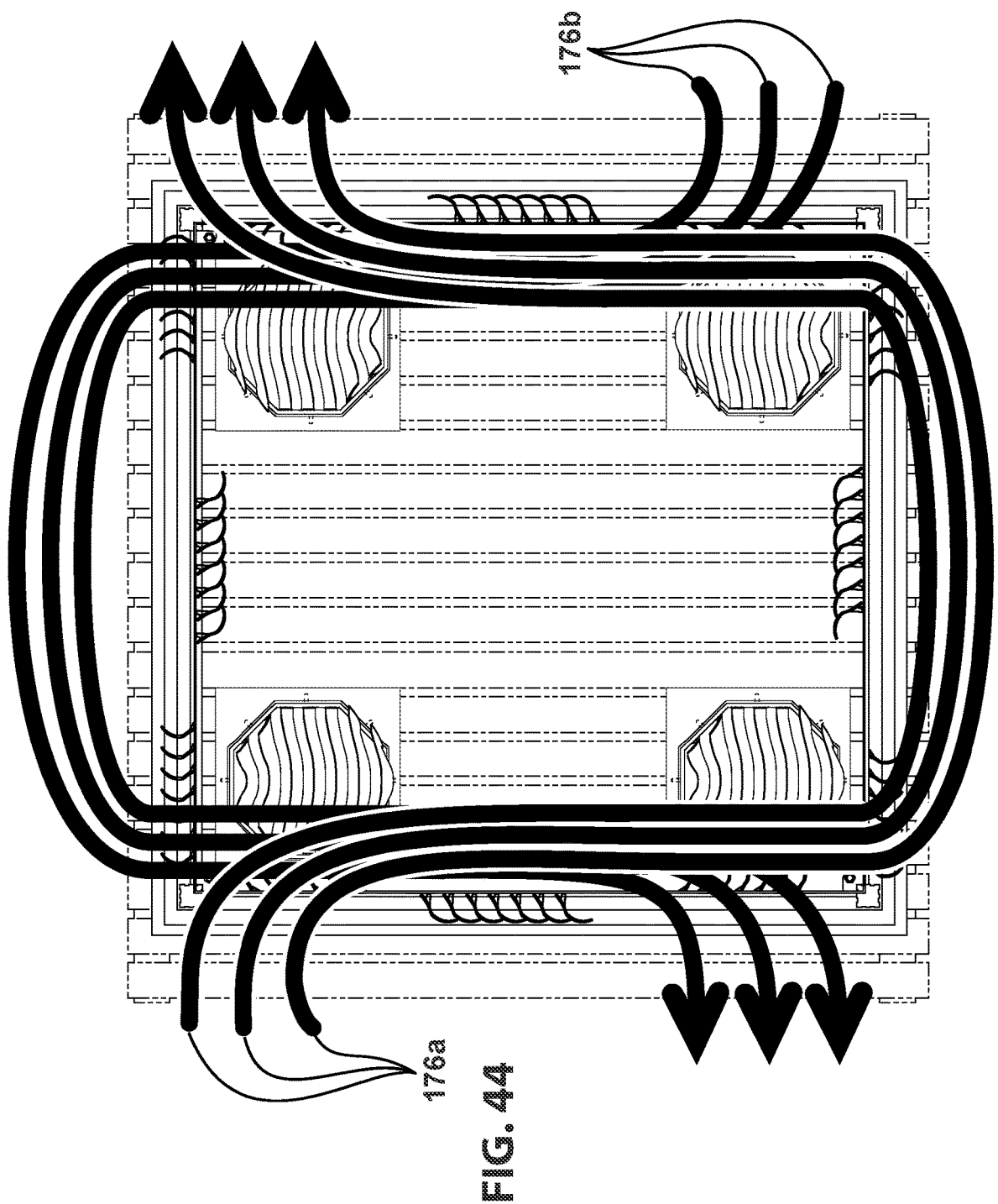
Figure 45:
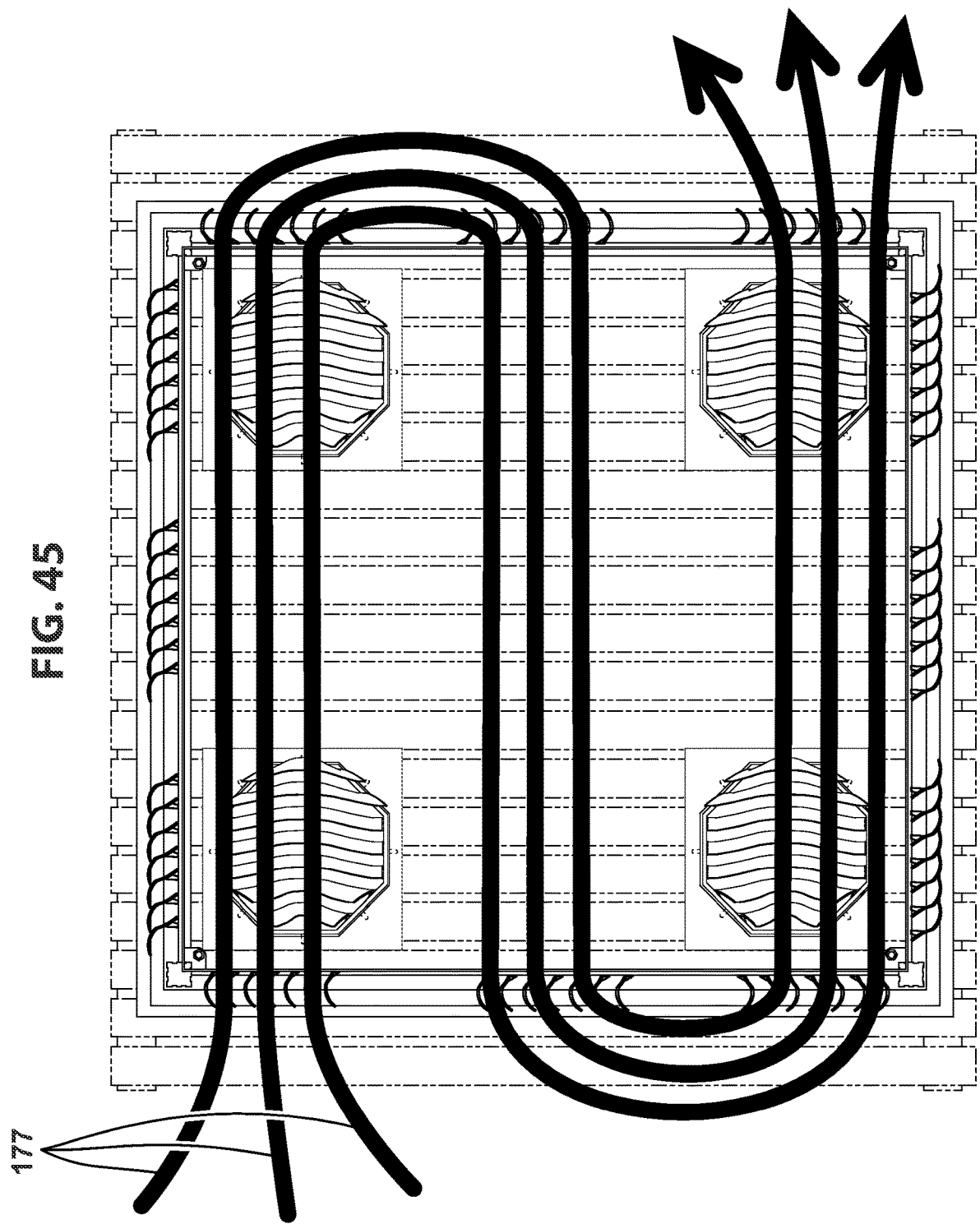

21) Spring-loaded rotation-locking axis pins 121 is (or are respectively) for:

a) easily locking and unlocking privacy-enabling wind-and-smoke-redirecting cold-weather-insulating rainwater-sealing skybox-enabling marine-sauna-enabling food-dehydrator-enabling rotatable-and-reversible-and-flippable louver braces 120 (see FIG. 16, and FIG. 17);

b) pivotingly functionalizing privacy-enabling wind-and-smoke-redirecting cold-weather-insulating rainwater-sealing skybox-enabling marine-sauna-enabling food-dehydrator-enabling rotatable-and-reversible-and-flippable louver braces 120 (see FIG. 16, and FIG. 17); and c) Providing eight locking points the reposition privacy-enabling wind-and-smoke-redirecting cold-weather-insulating rainwater-sealing skybox-enabling marine-sauna-enabling food-dehydrator-enabling rotatable-and-reversible-and-flippable louver braces 120 at different angles (see FIG. 16, and FIG. 17).

22) Privacy-enabling wind-and-smoke-redirecting cold-weather-insulating rainwater-sealing skybox-enabling marine-sauna-enabling food-dehydrating-enabling louvers 122 is (or are respectively) for:

a) Redirecting wind and smoke in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

b) Blocking wind and smoke in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

c) Reducing wind and smoke in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

d) Sealing the four-device-in-one bleacher-skybox food-dehydrator mobile-marine-sauna wind-and-smoke-redirecting bungalow to create a mobile-marine sauna in the directions of arrows 149b, 149c, and 149d (see FIG. 1C, FIG. 1D, FIG. 1E, FIG. 31A, FIG. 31B, FIG. 31C, and FIG. 31D);

e) Sealing the four-device-in-one bleacher-skybox food-dehydrator mobile-marine-sauna wind-and-smoke-redirecting bungalow to create a bleacher skybox in the directions of arrows 150*a* and 150*b* (see FIG. 1F, FIG. 1G, FIG. 1H, FIG. 31E, FIG. 31F, FIG. 31G, and FIG. 31H);
f) Redirecting wind to stoke a fire or blacksmith forge in the directions of arrows 172*a* and 172*b* (see FIG. 40D); and
g) Sealing the four-device-in-one bleacher-skybox food-dehydrator mobile-marine-sauna wind-and-smoke-redirecting bungalow to become a food dehydrator in the directions of arrows 151*a*, 151*b*, 151*c*, and 151*d* (see FIG. 1I, FIG. 46E, and FIG. 46F).

23) Half-moon multi-position-locking bracket 123 is (or are respectively) for:
Providing privacy-enabling wind-and-smoke-redirecting cold-weather-insulating rainwater-sealing skybox-enabling marine-sauna-enabling food-dehydrating-enabling louvers 122 multiple positions to lock in the directions of arrows 182*a*, 182*b*, 182*c*, 183, 184*a*, 184*b*, 184*c*, and 185 (see FIG. 67, FIG. 68, FIG. 69, FIG. 150, FIG. 151, FIG. 152, and FIG. 153).

24) Multi-position-locking spring-loaded louver-adjusting control knob 124 is (or are respectively) for:
Spring-locking privacy-enabling wind-and-smoke-redirecting cold-weather-insulating rainwater-sealing skybox-enabling marine-sauna-enabling food-dehydrating-enabling louvers 122 in multiple positions in the directions of arrows 182*a*, 182*b*, 182*c*, 183, 184*a*, 184*b*, 184*c*, and 185 (see FIG. 67, FIG. 68, FIG. 69, FIG. 150, FIG. 151, FIG. 152, and FIG. 153).

25) Easy-to-install noise-dampening-multi-purpose-curtain-and-insect-screen-hook-sliding track 125 is (or are respectively) for:
a) Providing a track for easy-to-install sound-dampening-inner-track insert 126 to be inserted (see FIG. 80); and
b) Providing easy-to-install method of attaching easy-to-install privacy curtain-and-insect-screen-securing easy-slide hooks 127 in the directions of arrows 186*a*, 186*b*, and 186*c* (see FIG. 81 and FIG. 82).

26) Easy-to-install sound-dampening-inner-track insert 126 is (or are respectively) for:
a) Providing a track for easy-to-install privacy curtain-and-insect-screen-securing easy-slide hooks 127 to be secured in the directions of arrows 186*b* and 186*c* (see FIG. 81);
b) Providing sound-dampening to reduce noise; and
c) Providing smooth track for easily sliding easy-to-install privacy curtain-and-insect-screen-securing easy-slide hooks 127 within in the directions of arrows 186*b* and 186*c* (see FIG. 81).

27) Easy-to-install privacy curtain-and-insect-screen-securing easy-slide hooks 127 is (or are respectively) for:
a) Providing hooks for privacy-enabling wind-protecting curtain 128 to attach securely in the directions of arrows 186*b* and 186*c* (see FIG. 81);
b) Providing hooks for insect-preventing screen 129 to attach securely in the directions of arrows 186*b* and 186*c* (see FIG. 81);
c) Providing T-shaped design to keep easy-to-install privacy curtain-and-insect-screen-securing easy-slide hooks 127 from falling out in the directions of arrows 186*b* and 186*c* (see FIG. 81); and
d) Providing T-shaped design for easy sliding back-and-forth in the directions of arrows 186*b* and 186*c* (see FIG. 81).

28) Privacy-enabling wind-protecting curtain 128 is (or are respectively) for:
a) Providing privacy;
b) Providing protection from harmful sun rays;
c) Providing protection from wind; and
d) Providing protection from insects.

Figure 86:
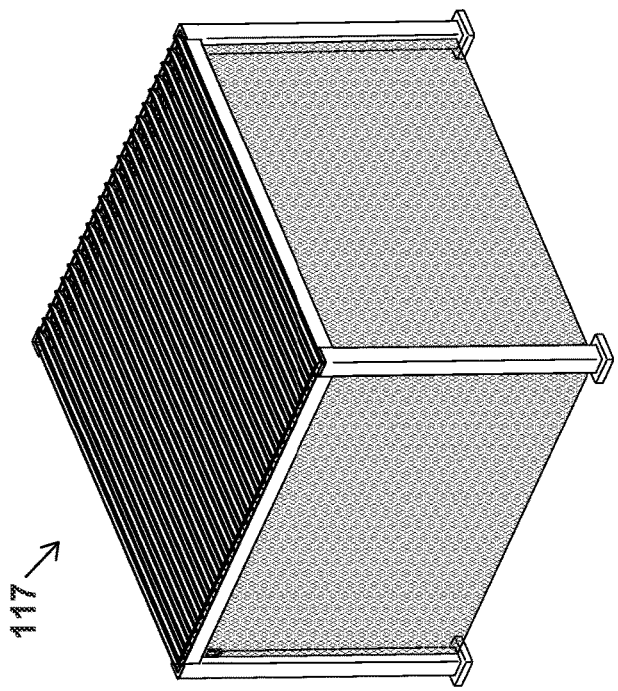
Figure 87:
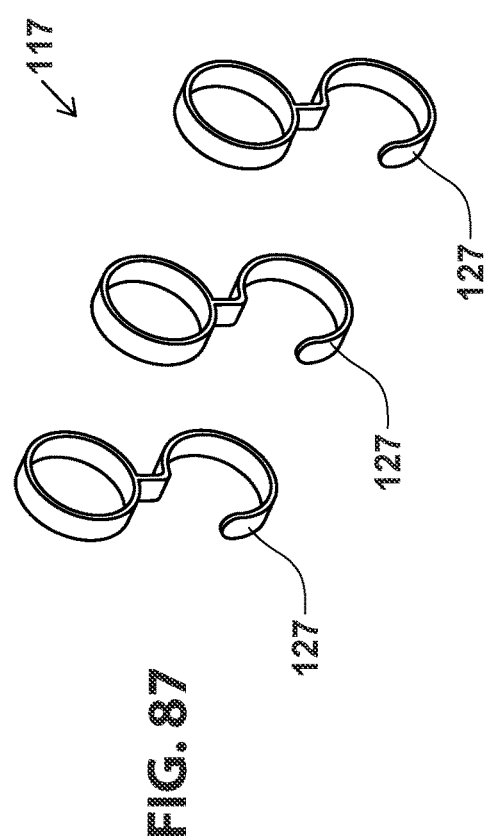
FIG. 87, FIG. 88, FIG. 89, and FIG. 90 illustrate perspective views demonstrating variation of easy-to-install noise-dampening-multi-purpose-curtain-and-insect-screen-hook-sliding track, and easy-to-install privacy curtain-and-insect-screen-securing easy-slide hooks.
Figure 88:
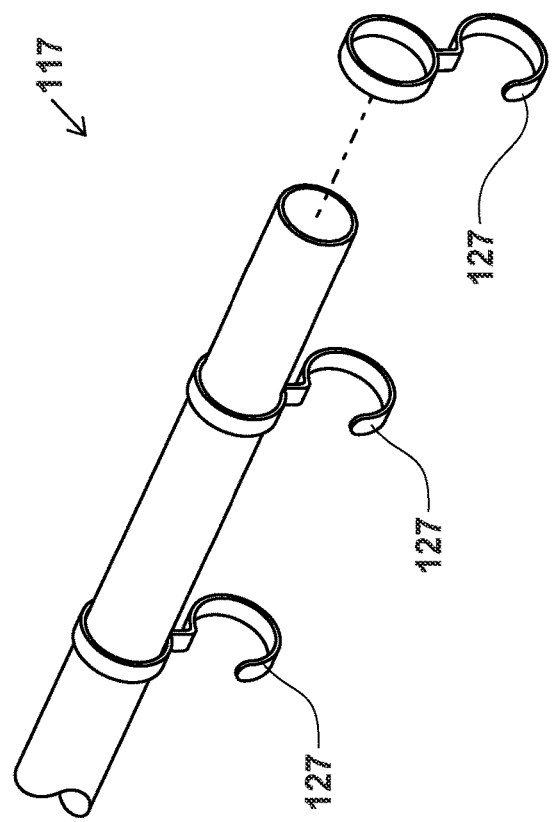
Figure 90:
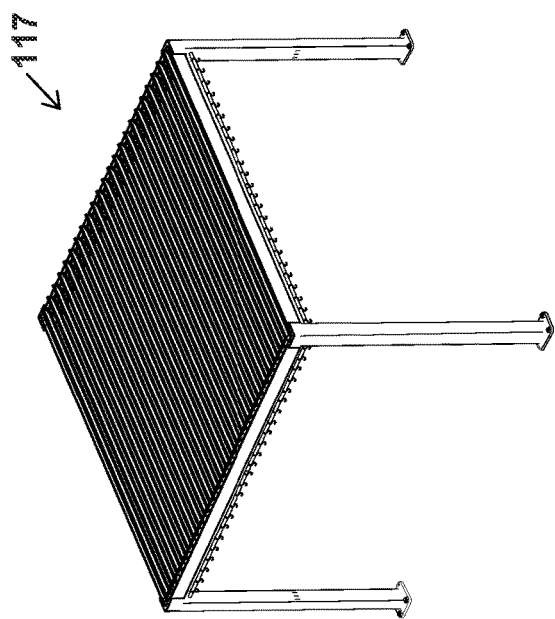
Figure 89:
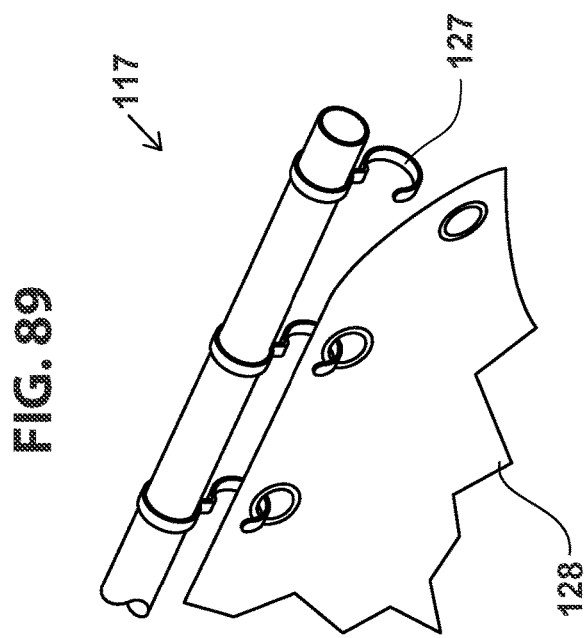
Figure 93:
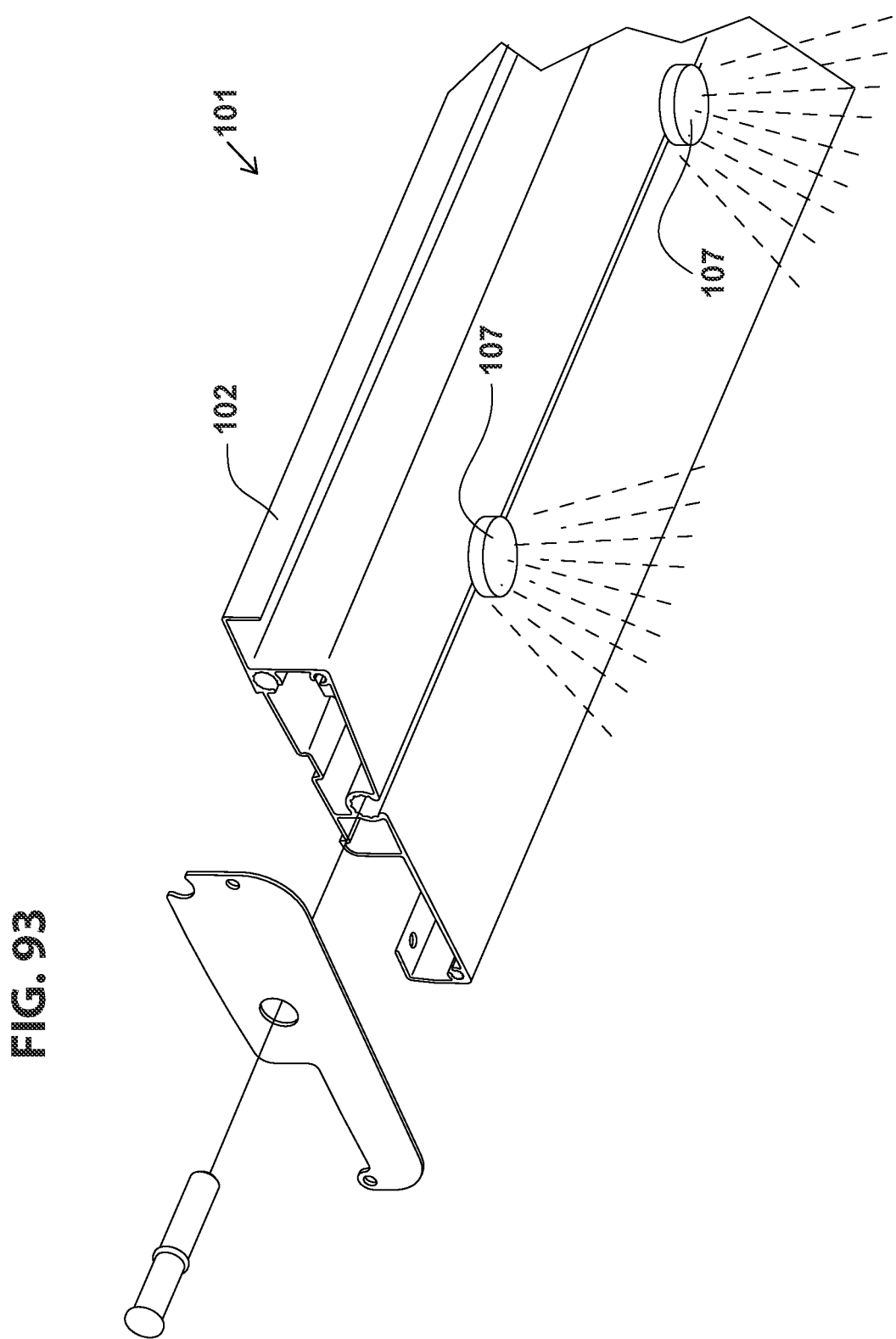

29) Insect-preventing screen 129 is (or are respectively) for:
a) Providing protection from insects; and
b) Allowing airflow into interior of the four-device-in-one bleacher-skybox food-dehydrator mobile-marine-sauna wind-and-smoke-redirecting bungalow (see FIG. 83, FIG. 84, and FIG. 86).

30) Easy-to-install-extending-and-retracting-door-spool-housing bracket 130 is (or are respectively) for:
Providing easy-to-install attachment to rainwater-channeling side gutter beams 109 in the directions of arrows 187*a* and 187*b* (see FIG. 167 and FIG. 168).

Figure 178:
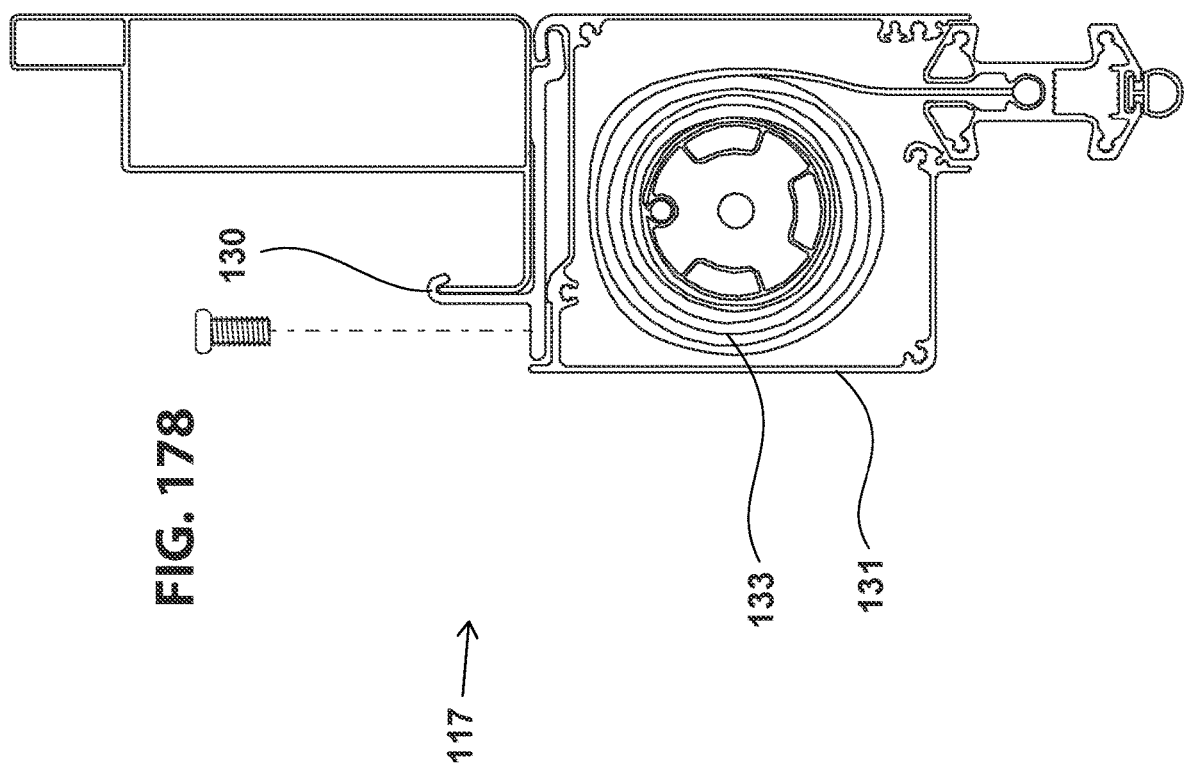
Figure 180:
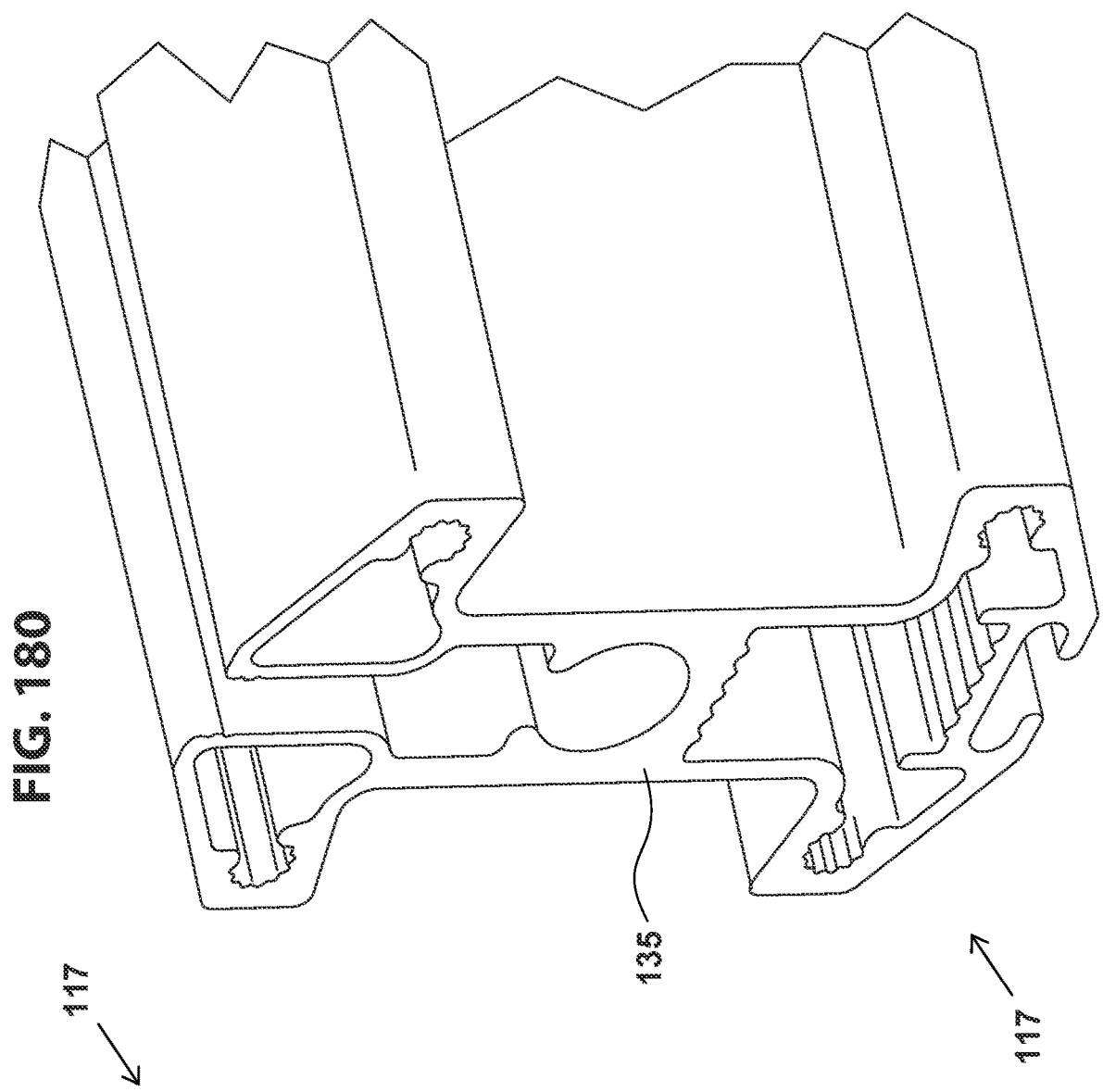
Figure 179:
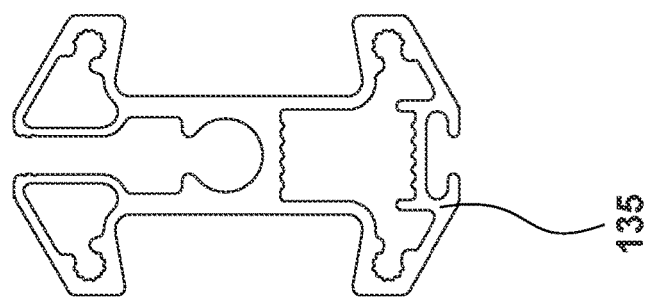
Figure 183:
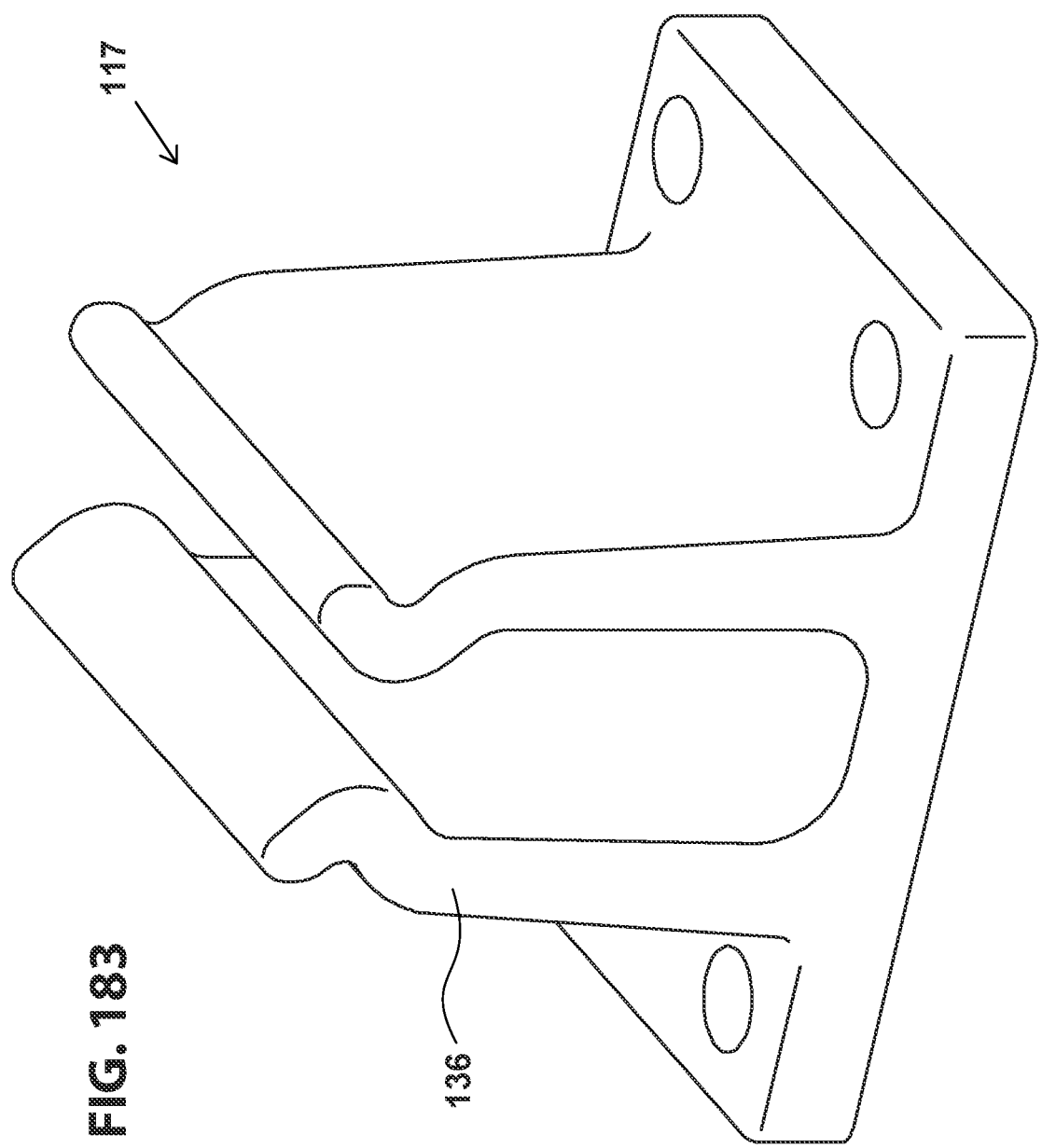
Figure 184:
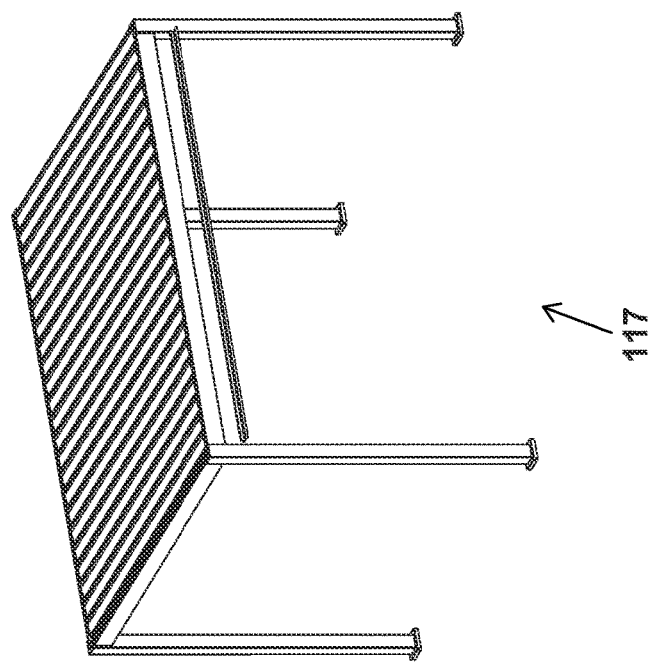
Figure 185:
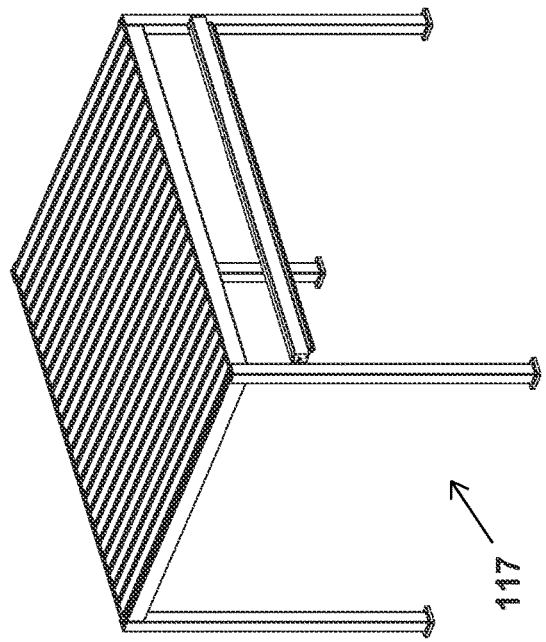
Figure 186:
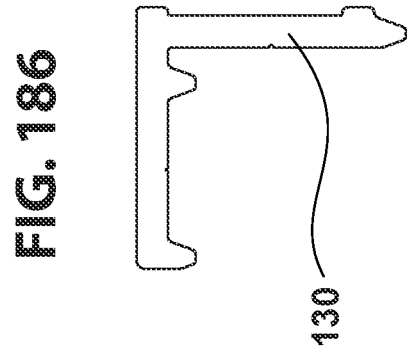
Figure 187:
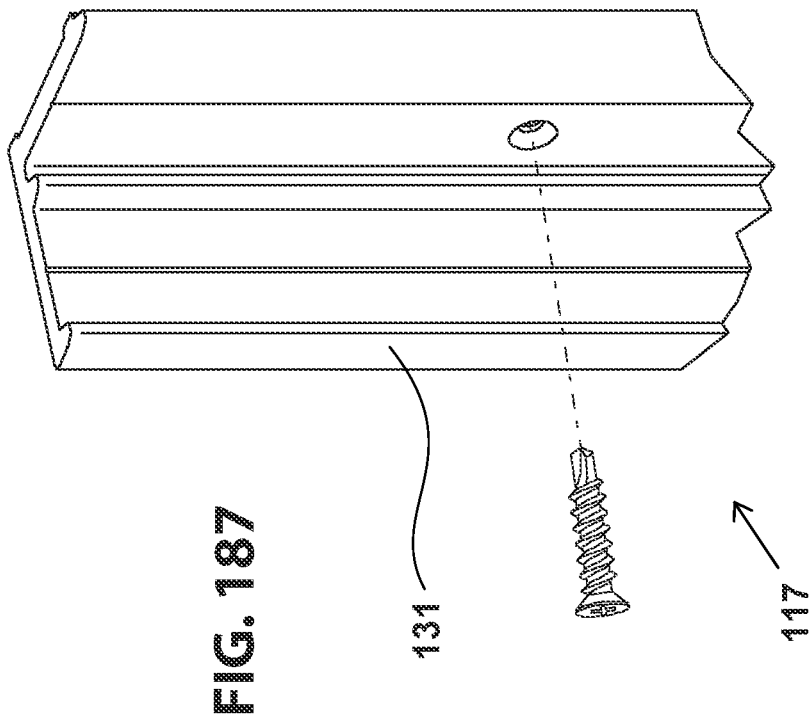
Figure 192:
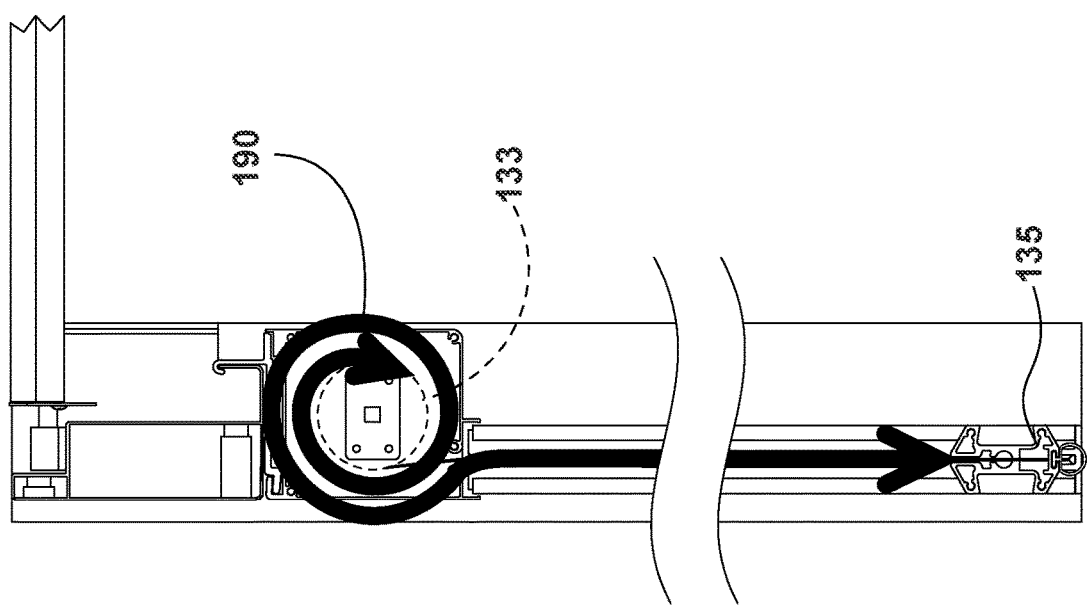

31) Easy-to-install-extending-and-retracting-door-spool housing 131 is (or are respectively) for:
a) Providing easy-to-install attachment to easy-to-install-extending-and-retracting-door-spool-housing bracket 130 in the directions of arrows 188 and 189 (see FIG. 176, FIG. 177, and FIG. 178);
b) Providing location for storage of extending-and-retracting door 133 (see FIG. 176, FIG. 177, 178, and FIG. 192);
c) Protecting extending-and-retracting door 133 from damage while inside; and
d) Providing discrete location for extending-and-retracting door 133 to retract into in the direction of arrow 190 (see FIG. 192).

32) Easy-to-install-extending-and-retracting-door spool 132 is (or are respectively) for:
a) Providing core for extending-and-retracting door 133 to be wrapped upon in the direction of arrow 190 (see FIG. 192); and
b) Providing smooth rotation for easy operation of extending-and-retracting door 133 in the directions of arrows 191*a* and 191*b* (see FIG. 160 and FIG. 161).

33) Extending-and-retracting door 133 is (or are respectively) for:
a) Providing protection from wind;
b) Providing protection from harmful sun rays;
c) Providing insulation from cold temperatures; and
d) Providing security within the four-device-in-one bleacher-skybox food-dehydrator mobile-marine-sauna wind-and-smoke-redirecting bungalow.

Figure 189:
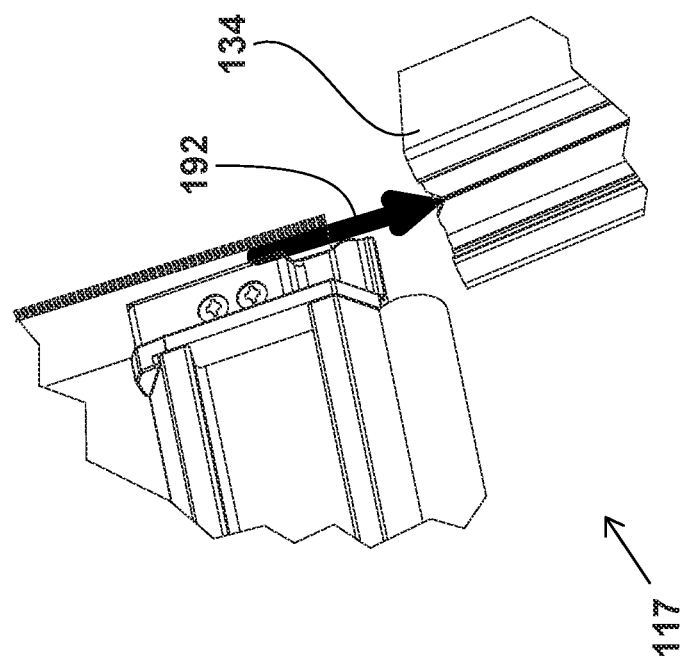
Figure 188:
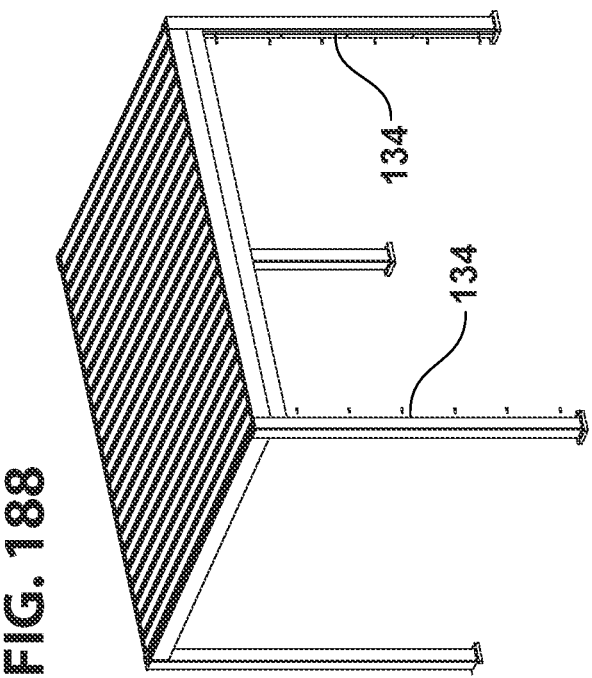

34) Extending-and-retracting-door-side-post bracket and guide 134 is (or are respectively) for:
a) Providing guide for easily sliding extending-and-retracting door 133 up and down in the directions of arrows 191*a* and 191*b* (see FIG. 160 and FIG. 161);
b) Providing secure track to prevent extending-and-retracting door 133 from dislodging during operation in the direction of arrow 192 (see FIG. 189); and
c) Sealing edges of extending-and-retracting door 133 to aid in insulation.

Figure 193:
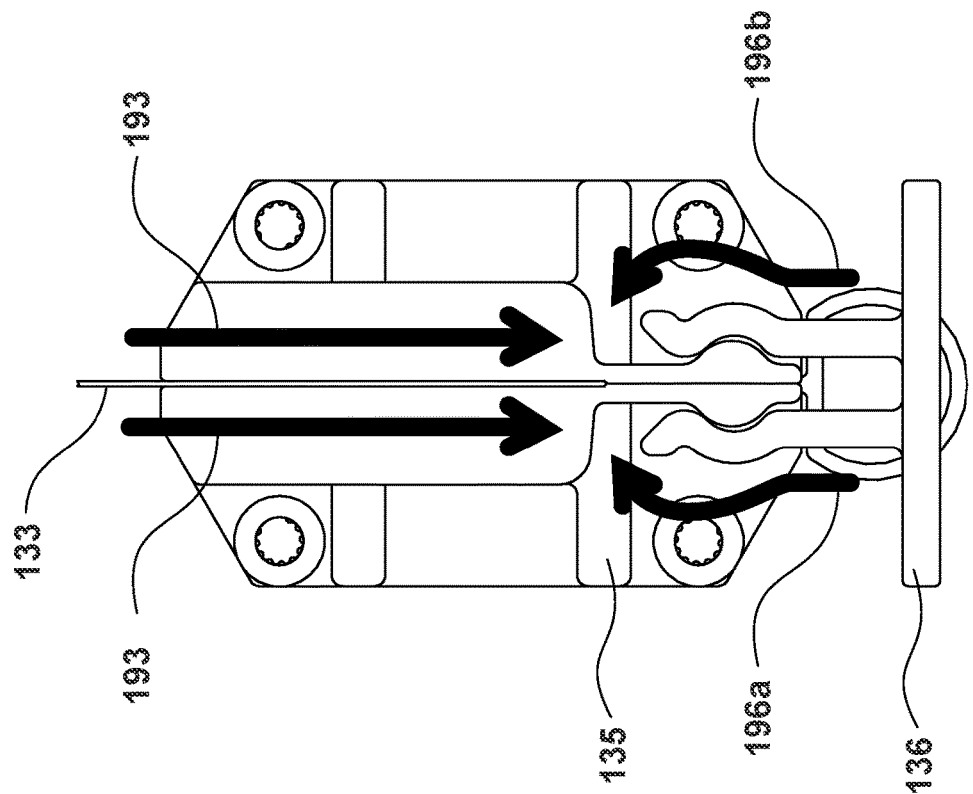

35) Extending-and-retracting-door-securing lock 135 is (or are respectively) for:
a) Providing a grip for a hand to easily operate extending-and-retracting door 133; and
b) Providing flange for locking to extending-and-retracting-door-securing bracket 136 in the direction of arrow 193 (see FIG. 193).

36) Extending-and-retracting-door-securing bracket 136 is (or are respectively) for:
a) Snap-locking extending-and-retracting door 133 to prevent retraction in the directions of arrows 194*a*, and 194*b* (see FIG. 193); and b) Securing extending-and-retracting door 133 in the extended position to provide protection from wind and rain in the directions of arrows 194*a*, and 194*b* (see FIG. 193).

37) Extending-and-retracting-door water-sealing weather strip 137 is (or are respectively) for:
   a) Sealing extending-and-retracting door 133 to prevent rain from enter into the four-device-in-one bleacher-skybox food-dehydrator mobile-marine-sauna wind-and-smoke-redirecting bungalow; and
   b) Sealing extending-and-retracting door 133 to prevent wind from enter into the four-device-in-one bleacher-skybox food-dehydrator mobile-marine-sauna wind-and-smoke-redirecting bungalow.

38) Adjustably-leveling rainwater-draining-legs-and-base system(s) 138 is (or are respectively) for performing the combined functions of its components.

39) Corner-posts 139 is (or are respectively) for:
   a) Providing structure to the four-device-in-one bleacher-skybox food-dehydrator mobile-marine-sauna wind-and-smoke-redirecting bungalow; and
   b) Providing conduit for rainwater to drain down.

40) Corner-post L-shaped caps 140 is (or are respectively) for:
   a) Providing an aesthetically finished look to corner-posts 139; and
   b) Preventing dust and sand from getting inside rainwater-channeling side gutter beams 109 and rainwater-channeling end gutter beams 110.

41) Gutter-beam cradles 141 is (or are respectively) for:
   Distributing the load of rainwater-channeling side gutter beams 109 and rainwater-channeling end gutter beams 110.

42) Hydro-mist water-supply quick-release coupler 142 is (or are respectively) for:
   a) Providing an easily accessible hose connection point to provide water for hydro-mist emitters 114; and
   b) Providing a quick-release fitting for a garden hose to attach.

43) Corner-post-base-plate cover 143 is (or are respectively) for:
   a) Providing a cover to hide corner-posts base-plate 144; and
   b) Providing aesthetically finished corner-posts 139.

44) Corner-posts base-plate 144 is (or are respectively) for:
   Providing a secure base for the four-device-in-one bleacher-skybox food-dehydrator mobile-marine-sauna wind-and-smoke-redirecting bungalow to stand.

45) Sliding-door lower track 145 is (or are respectively) for:
   Providing a grooved tracks for door-window-and-wall-panel frames 118 to slide therein.

46) Anchoring-screw holes 146 is (or are respectively) for:
   Providing access for height-and-angle-adjustable tube-screws 147 and anchoring bolts 148 to secure to a ground surface.

Figure 49:
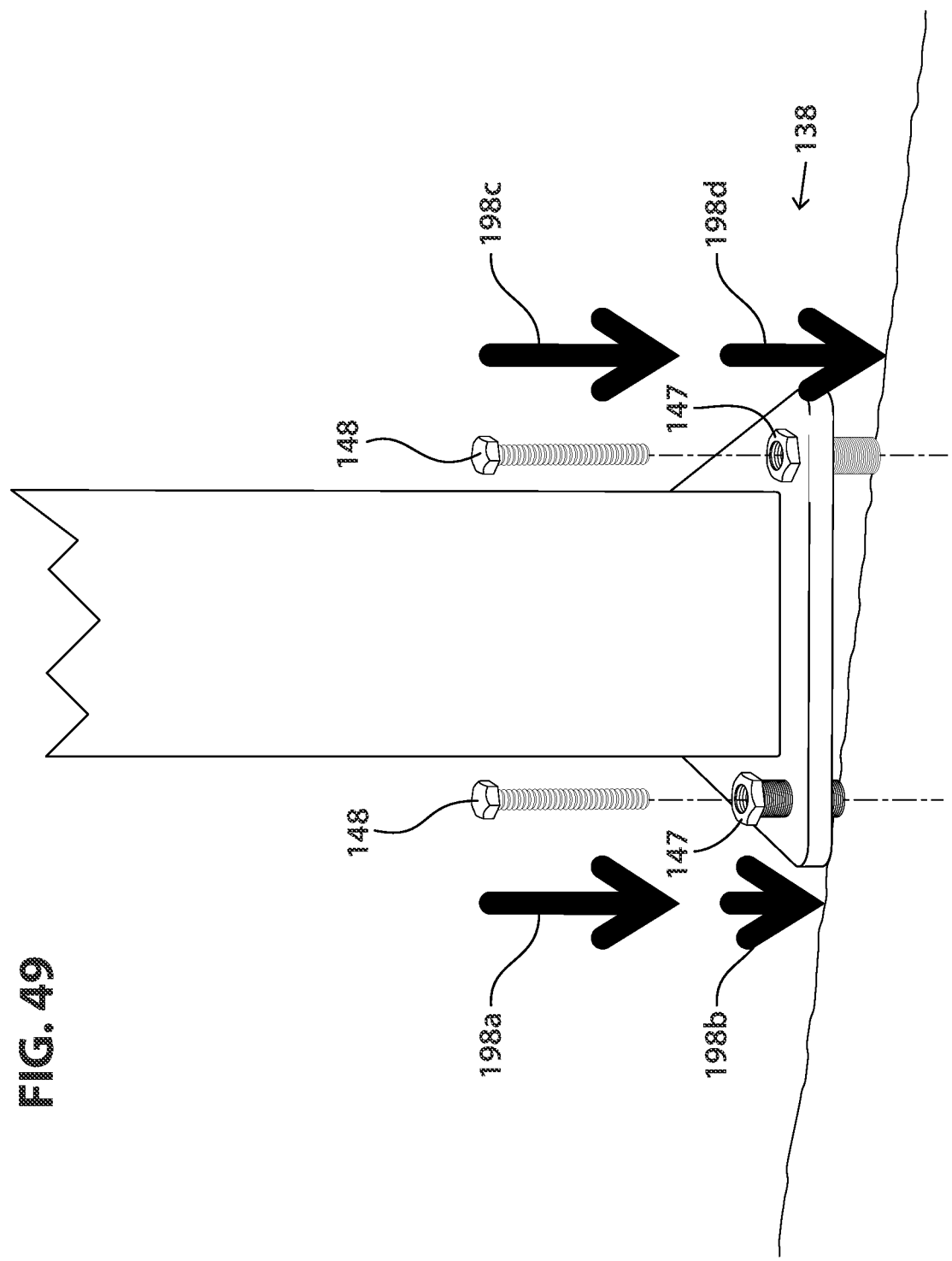
Figure 50:
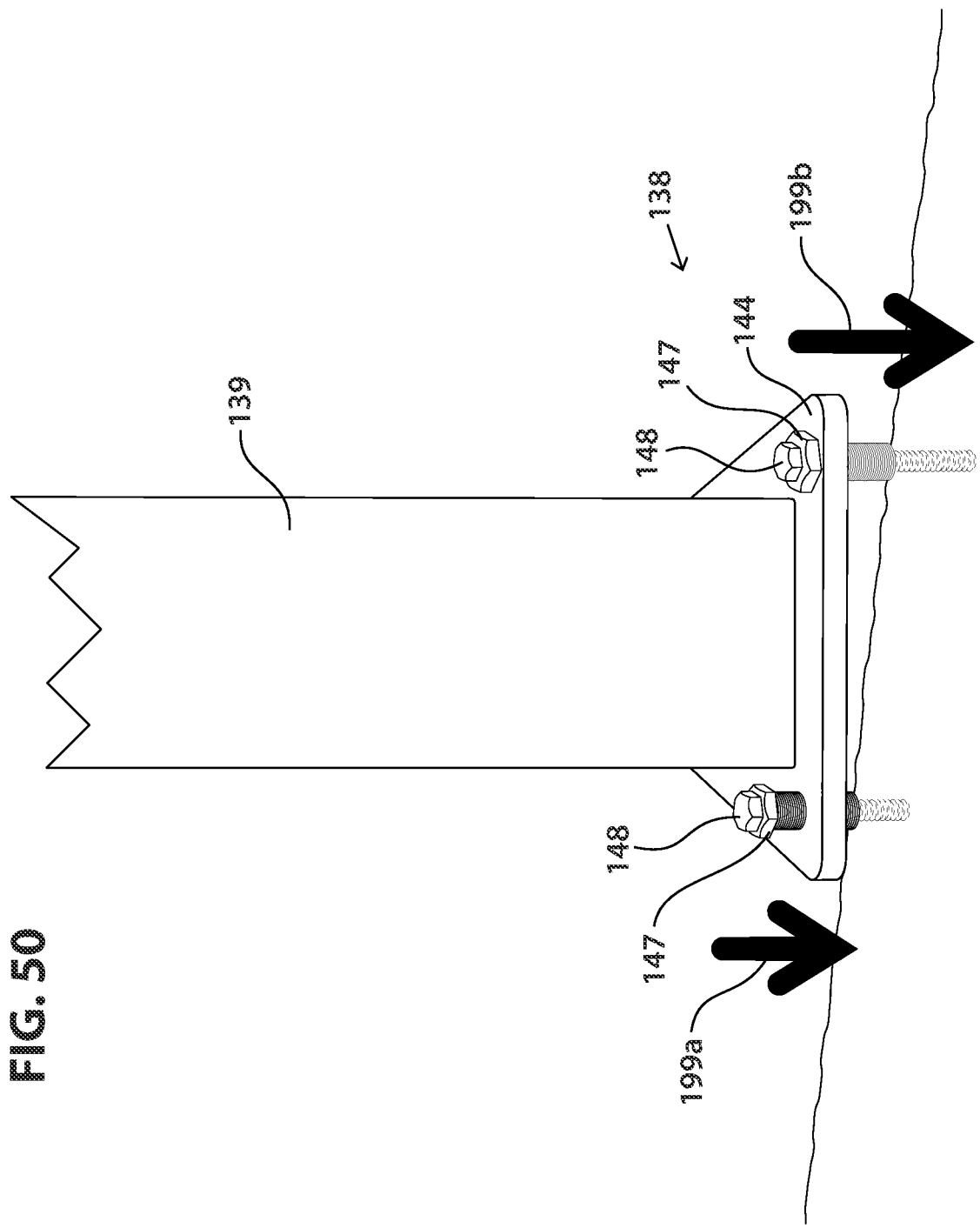
Figure 51:
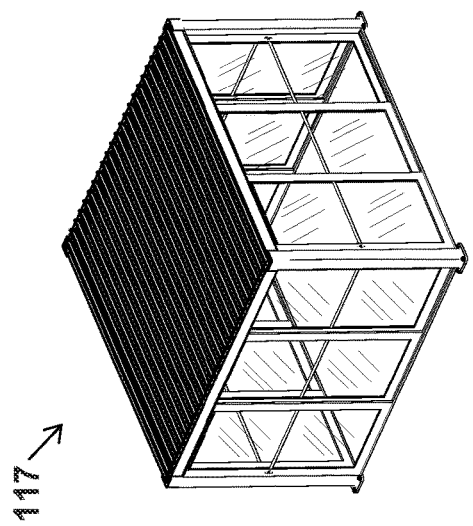
FIG. 51, FIG. 52, FIG. 53, FIG. 54, FIG. 55, FIG. 56, FIG. 57, FIG. 58, FIG. 59, FIG. 60, and FIG. 61 illustrate side and perspective views demonstrating how the privacy-enabling wind-and-smoke-redirecting cold-weather-insulating rainwater-sealing skybox-enabling marine-sauna-enabling food-dehydrating-enabling window-panel inserts can be configured in a variety of ways.
Figure 52:
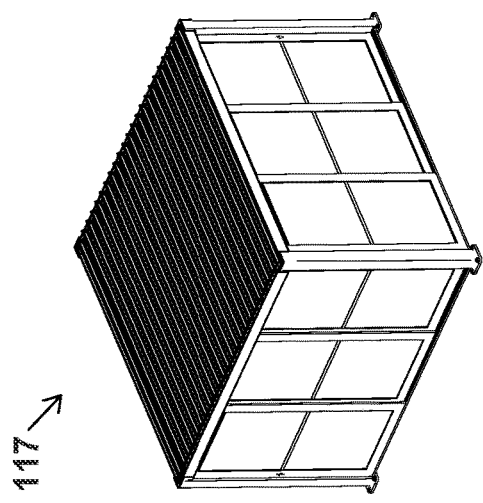
Figure 53:
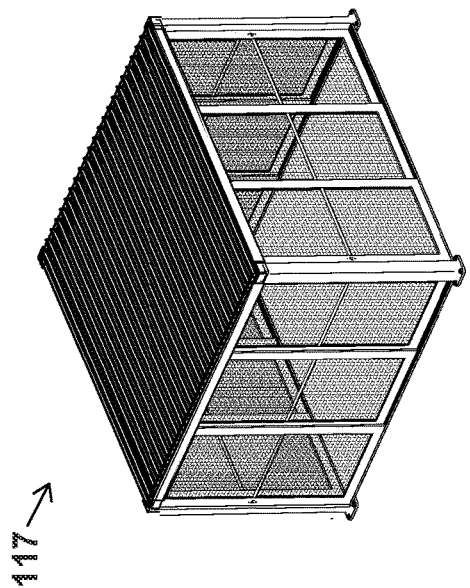
Figure 54:
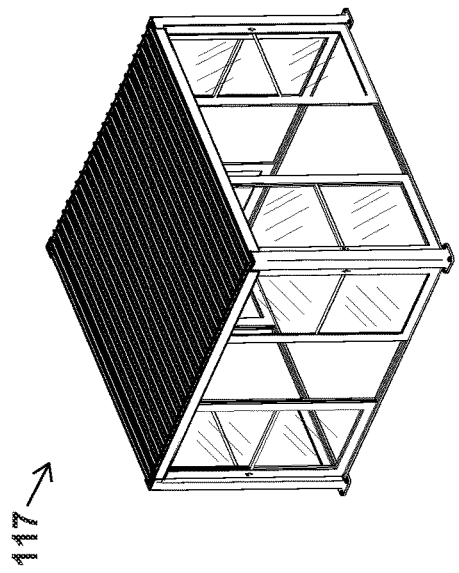
Figure 56:
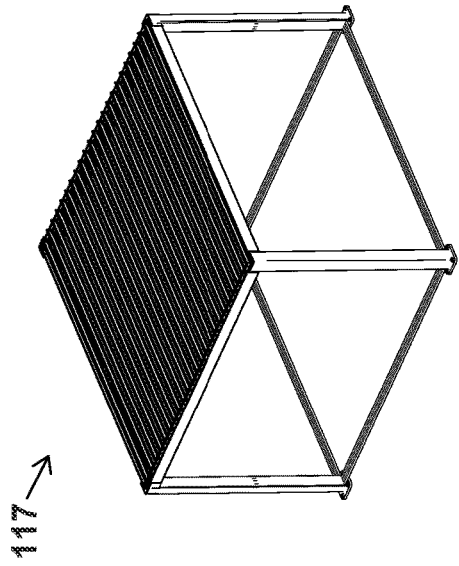
Figure 55:
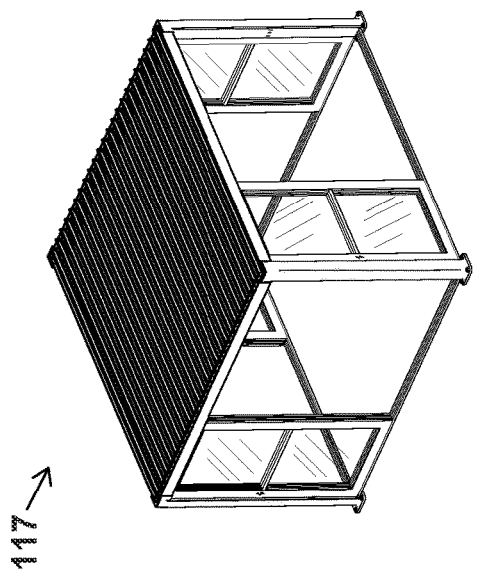
Figure 58:
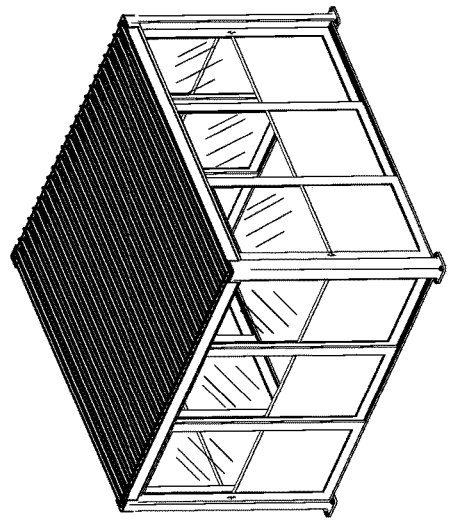
Figure 57:
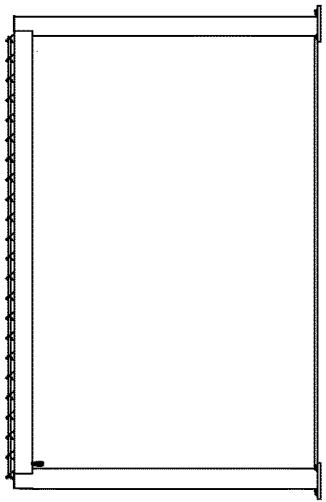
Figure 59:
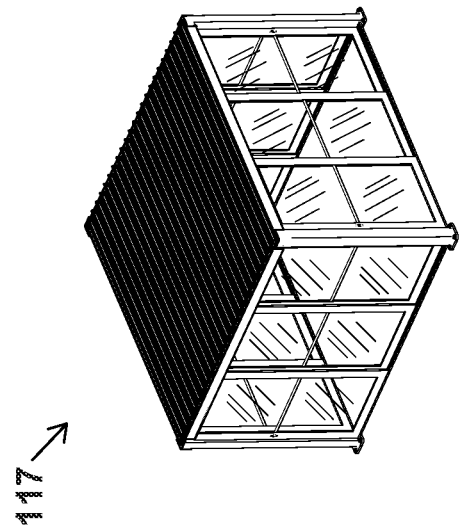
Figure 60:
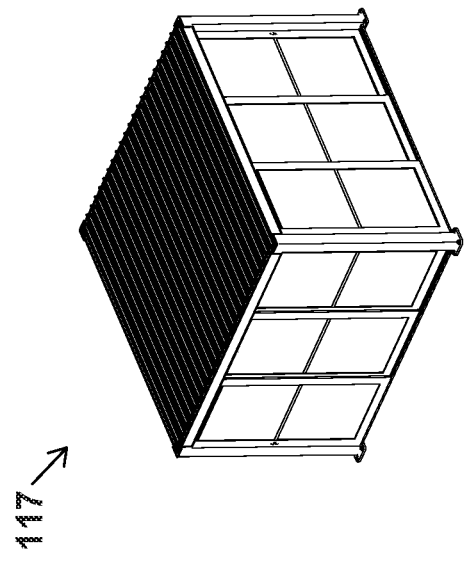
Figure 61:
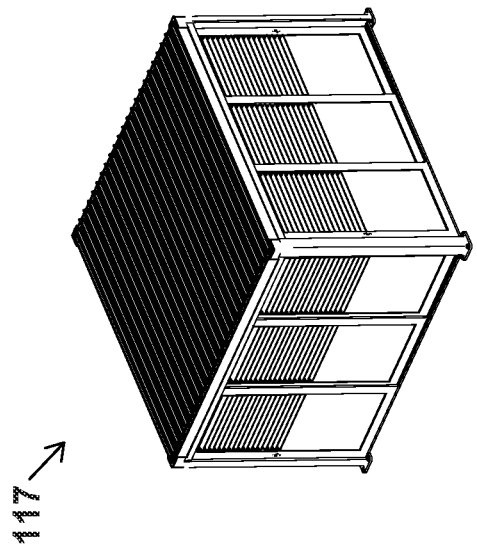
Figure 64:
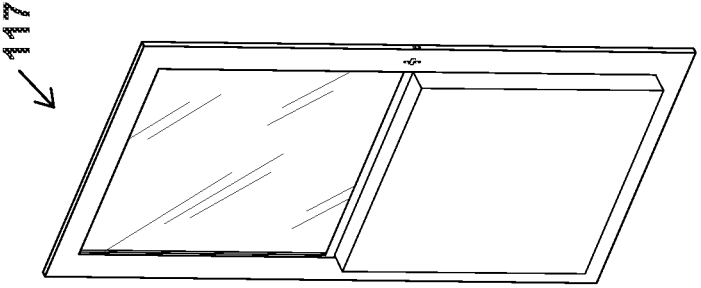
Figure 63:
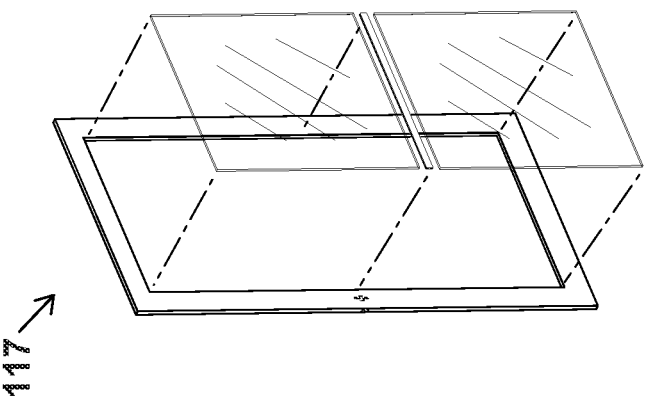
Figure 62:
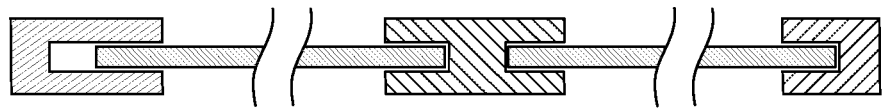
Figure 71:
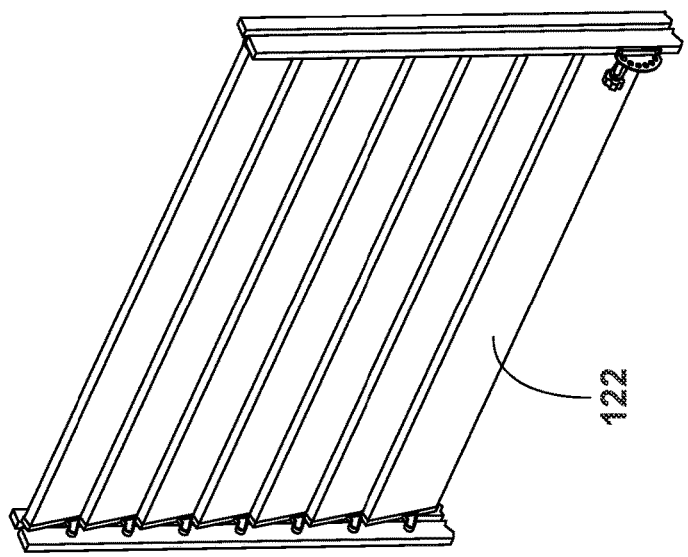
FIG. 70, FIG. 71, FIG. 72, FIG. 73, FIG. 74, FIG. 75, FIG. 76, and FIG. 77 illustrate perspective views demonstrating a variation of how the privacy-enabling wind-and-smoke-redirecting cold-weather-insulating rainwater-sealing skybox-enabling marine-sauna-enabling food-dehydrating-enabling louvers can be opened and closed.
Figure 70:
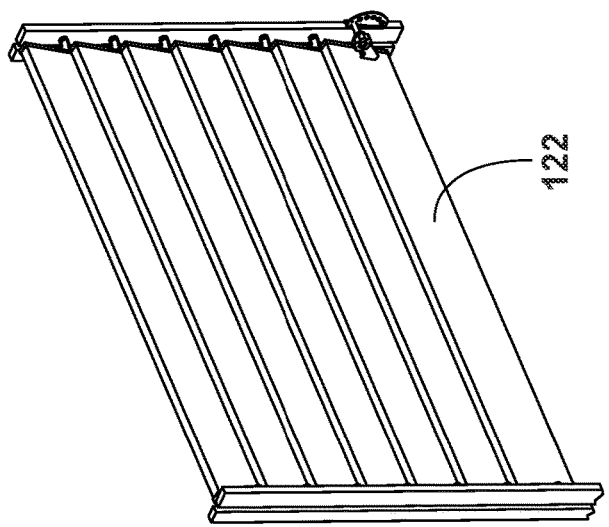
Figure 73:
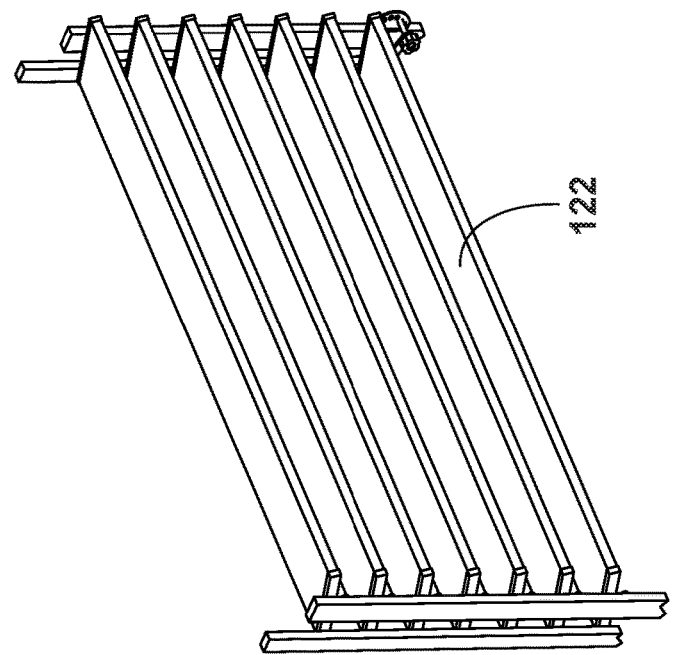
Figure 72:
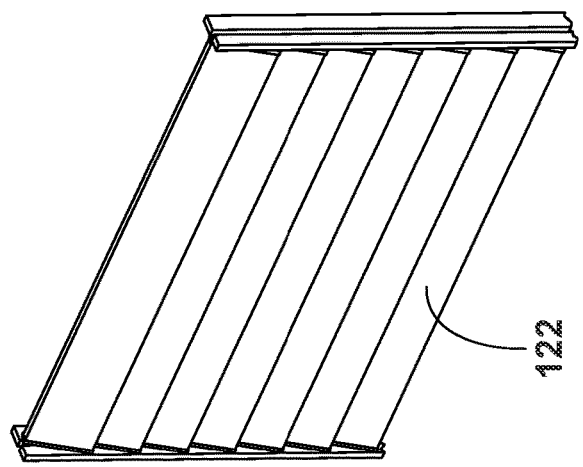
Figure 74:
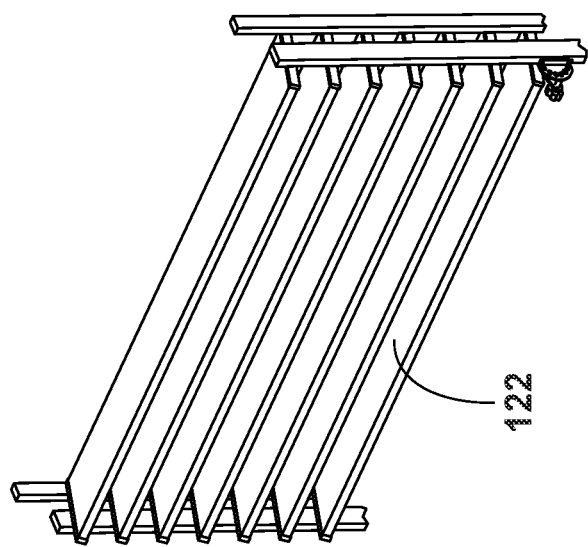
Figure 75:
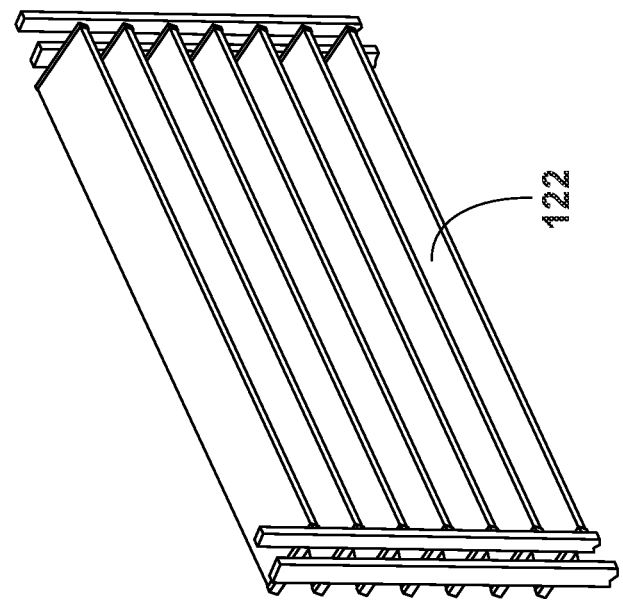
Figure 76:
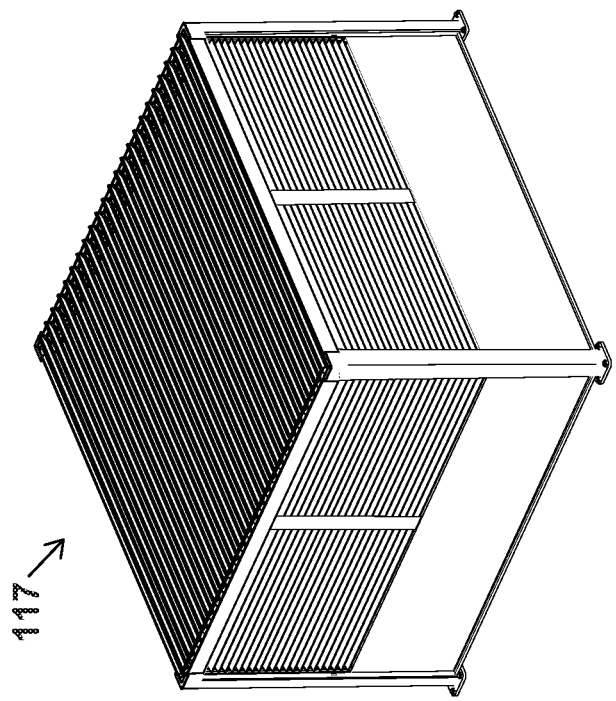
Figure 77:
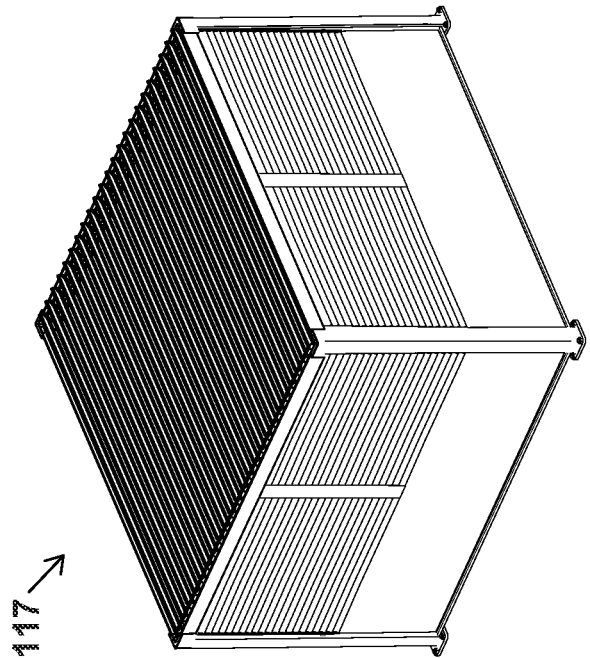
Figure 79:
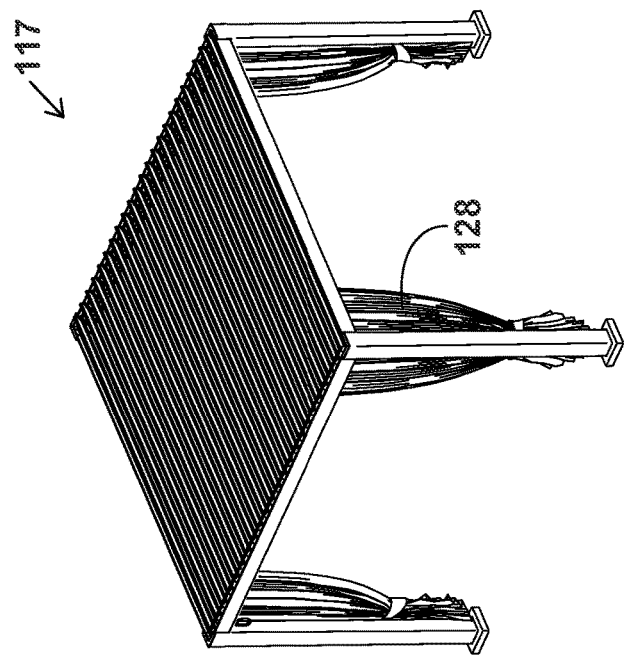
Figure 78:
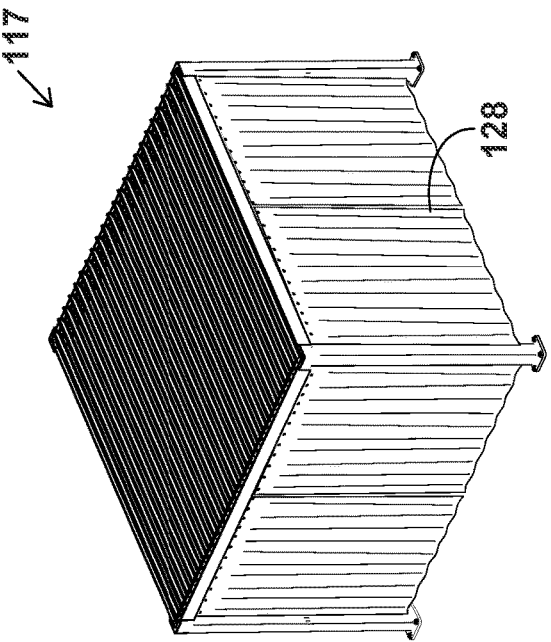
Figure 85:
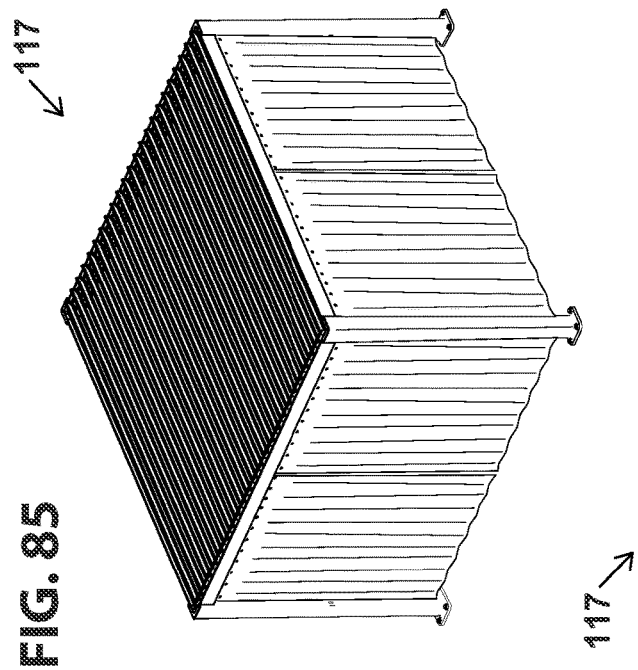

47) Height-and-angle-adjustable tube-screws 147 is (or are respectively) for:
   a) Leveling the four-device-in-one bleacher-skybox food-dehydrator mobile-marine-sauna wind-and-smoke-redirecting bungalow when installed on an uneven ground surface in the directions of arrows 195*a*, 195*b*, 195*c*, 195*d*, 196*a*, 196*b*, 196*c*, 196*d*, 197*a*, and 197*b* (see FIG. 48, FIG. 49, and FIG. 50);
   b) Securing corner-posts base-plate 144 to a ground surface; and
   c) Providing adjustment points for corner-post base-plates 144 in the directions of arrows 195*a*, 195*b*, 195*c*, 195*d*, 196*a*, 196*b*, 196*c*, 196*d*, 197*a*, and 197*b* (see FIG. 48, FIG. 49, and FIG. 50).

48) Anchoring bolts 148 is (or are respectively) for:
   Securing the four-device-in-one bleacher-skybox food-dehydrator mobile-marine-sauna wind-and-smoke-redirecting bungalow to a ground surface in the directions of arrows 195*a*, 195*c*, 196*a*, 196*c*, 197*a*, and 197*b* (see FIG. 48, FIG. 49, and FIG. 50).

Variation

Referring to FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, FIG. 128, FIG. 129, FIG. 130, FIG. 131, FIG. 132, FIG. 133, FIG. 134, FIG. 135, FIG. 136, FIG. 137, FIG. 138, FIG. 139, FIG. 140, FIG. 141, FIG. 142, FIG. 143, FIG. 144, FIG. 145, FIG. 146, FIG. 147, FIG. 148, FIG. 149, FIG. 150, FIG. 151, FIG. 152, FIG. 153, FIG. 154, FIG. 155, FIG. 156, FIG. 157, FIG. 158, FIG. 159, FIG. 160, FIG. 161, FIG. 162, FIG. 163, FIG. 164, FIG. 165, FIG. 166, FIG. 167, FIG. 168, FIG. 169, FIG. 170, FIG. 171, FIG. 172, FIG. 173, FIG. 174, FIG. 175, FIG. 176, FIG. 177, FIG. 178, FIG. 179, FIG. 180, FIG. 181, FIG. 182, FIG. 183, FIG. 184, FIG. 185, FIG. 186, FIG. 187, FIG. 188, FIG. 189, FIG. 190, FIG. 191, FIG. 192, and FIG. 193:

Any component of the four-device-in-one bleacher-skybox food-dehydrator mobile-marine-sauna wind-and-smoke-redirecting bungalow can have any shape and size. Any component of the four-device-in-one bleacher-skybox food-dehydrator mobile-marine-sauna wind-and-smoke-redirecting bungalow can be made of any material(s). FIG. 87, FIG. 88, FIG. 89, and FIG. 90 illustrate perspective views demonstrating variation of easy-to-install noise-dampening-multi-purpose-curtain-and-insect-screen-hook-sliding track, and easy-to-install privacy curtain-and-insect-screen-securing easy-slide hooks. FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, and FIG. 112 illustrate perspective views demonstrating variations of adjustable LED-light-powering solar panel, adjustable-LED-battery cover, LED-powering solar-chargeable batteries, battery housing, and LED lights. FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, and FIG. 126 illustrate perspective and face views demonstrating a variation of easy-to-install discrete-hydro-mist-emitter track, hydro-mist emitters, hydro-mist-securing clips, and hydro-mist water-supply lines, and their installation. FIG. 127, FIG. 128, FIG. 129, FIG. 130, FIG. 131, FIG. 132, FIG. 133, FIG. 134, FIG. 135, FIG. 136, FIG. 137, FIG. 138, FIG. 139, FIG. 140, FIG. 141, FIG. 142, FIG. 143, FIG. 144, FIG. 145, FIG. 146, FIG. 147, and FIG. 148 illustrate perspective and face views demonstrating variations of easy-to-install discrete-hydro-mist-emitter track, hydro-mist emitters, hydro-mist-securing clips, and hydro-mist water-supply lines, and their installation. FIG. 149, FIG. 150, FIG. 151, FIG. 152, FIG. 153, FIG. 154, FIG. 155, FIG. 156, FIG. 157, FIG. 158, and FIG. 159 illustrate perspective and side views demonstrating a variation of half-moon multi-position-locking bracket, and its operation. FIG. 160, FIG. 161, FIG. 162, FIG. 163, FIG. 164, FIG. 165, FIG. 166, FIG. 167, FIG. 168, FIG. 169, FIG. 170, FIG. 171, FIG. 172, FIG. 173, FIG. 174, FIG. 175, FIG. 176, FIG. 177, FIG. 178, FIG. 179, FIG. 180, FIG. 181, FIG. 182, FIG. 183, FIG. 184, FIG. 185, FIG. 186, FIG. 187, FIG. 188, FIG. 189, FIG. 190, FIG. 191, FIG. 192, and FIG. 193 illustrate perspective and profile views demonstrating variations of easy-to-install-extending-and-retracting-door-spool-housing bracket, easy-to-install-extending-and-retracting-door-spool housing, easy-to-install-extending-and-retracting-door spool, extending-and-retracting door, extending-and-retracting-door-side-post bracket and guide, extending-and-retracting-door-securing lock, extending-and-retracting-door-securing bracket, and extending-and-retracting-door water-sealing weather strip, and their installation and operation.

MAJOR ADVANTAGES OF THE INVENTION

The present invention substantially departs from the conventional concepts and designs of the prior art. In doing so, the present invention provides (a or an) four-device-in-one bleacher-skybox food-dehydrator mobile-marine-sauna wind-and-smoke-redirecting bungalow, having many unique and significant features, functions, and advantages, which overcome all the disadvantages of the prior art, as follows:
1) It is an object of the new invention to provide (a or an) four-device-in-one bleacher-skybox food-dehydrator mobile-marine-sauna wind-and-smoke-redirecting bungalow, having adjustable louver blades 102.
    Therefore, the four-device-in-one bleacher-skybox food-dehydrator mobile-marine-sauna wind-and-smoke-redirecting bungalow is (or are each):
    a) Capable of shedding water into discrete rainwater chutes 111;
    b) Capable of preventing rainwater from getting into four-device-in-one bleacher-skybox food-dehydrator mobile-marine-sauna wind-and-smoke-redirecting bungalow;
    c) Capable of adjustably control amount of sunlight shining into four-device-in-one bleacher-skybox food-dehydrator mobile-marine-sauna wind-and-smoke-redirecting bungalow; and
    d) Capable of adjustably controlling and redirect wind.
2) It is yet another object of the new invention to provide (a or an) four-device-in-one bleacher-skybox food-dehydrator mobile-marine-sauna wind-and-smoke-redirecting bungalow, having an adjustable LED-light-powering solar panel 103.
    Therefore, the four-device-in-one bleacher-skybox food-dehydrator mobile-marine-sauna wind-and-smoke-redirecting bungalow is (or are each):
    a) Capable of collecting solar energy to charge led-powering solar-rechargeable batteries 105 (see FIG. 98, FIG. 99, FIG. 100, FIG. 101, FIG. 102, FIG. 103, and FIG. 104);
    b) Capable of collecting solar energy to recharge led-powering solar-rechargeable batteries 105 (see FIG. 98, FIG. 99, FIG. 100, FIG. 101, FIG. 102, FIG. 103, and FIG. 104);
    c) Capable of saving energy costs associated with lighting the four-device-in-one bleacher-skybox food-dehydrator mobile-marine-sauna wind-and-smoke-redirecting bungalow;
    d) Capable of saving costs of repeatedly replacing with non-rechargeable alkaline batteries;
    e) Capable of providing freedom to place four-device-in-one bleacher-skybox food-dehydrator mobile-marine-sauna wind-and-smoke-redirecting bungalow away from a power outlet; and
    f) Capable of helping reduce carbon footprint.
3) It is still yet another object of the new invention to provide (a or an) four-device-in-one bleacher-skybox food-dehydrator mobile-marine-sauna wind-and-smoke-redirecting bungalow, having an LED-powering solar-rechargeable batteries 105.
    Therefore, the four-device-in-one bleacher-skybox food-dehydrator mobile-marine-sauna wind-and-smoke-redirecting bungalow is (or are each):
    a) Capable of powering led lights 107;
    b) Capable of saving costs of repeatedly replacing non-rechargeable alkaline batteries; and
    c) Capable of helping reduce carbon footprint.
4) It is even still yet another object of the new invention to provide (a or an) four-device-in-one bleacher-skybox food-dehydrator mobile-marine-sauna wind-and-smoke-redirecting bungalow, having a privacy-enabling wind-and-smoke-redirecting cold-weather-insulating rainwater-sealing skybox-enabling marine-sauna-enabling food-dehydrating-enabling window-panel inserts 119.
    Therefore, the four-device-in-one bleacher-skybox food-dehydrator mobile-marine-sauna wind-and-smoke-redirecting bungalow is (or are each):
    a) Capable of enabling four-device-in-one bleacher-skybox food-dehydrator mobile-marine-sauna wind-and-smoke-redirecting bungalow to become a mobile-marine sauna in the directions of arrows 149*b*, 149*c*, and 149*d* (see FIG. 1C, FIG. 1D, FIG. 1E, FIG. 31A, FIG. 31B, FIG. 31C, and FIG. 31D);
    b) Capable of enabling four-device-in-one bleacher-skybox food-dehydrator mobile-marine-sauna wind-and-smoke-redirecting bungalow to become bleacher skybox in the directions of arrows 150*a* and 150*b* (see FIG. 1F, FIG. 1G, FIG. 1H, FIG. 31E, FIG. 31F, FIG. 31G, and FIG. 31H);
    c) Capable of enabling four-device-in-one bleacher-skybox food-dehydrator mobile-marine-sauna wind-and-smoke-redirecting bungalow to become food dehydrator in the directions of arrows 151*a*, 151*b*, 151*c*, and 151*d* (see FIG. 1I, FIG. 46E, and FIG. 46F);
    d) Capable of providing security within four-device-in-one bleacher-skybox food-dehydrator mobile-marine-sauna wind-and-smoke-redirecting bungalow;
    e) Capable of providing insulation within four-device-in-one bleacher-skybox food-dehydrator mobile-marine-sauna wind-and-smoke-redirecting bungalow from cold or warm weather;
    f) Capable of providing protection within four-device-in-one bleacher-skybox food-dehydrator mobile-marine-sauna wind-and-smoke-redirecting bungalow from wind; and
    g) Capable of slidably and replaceably allowing door-window-and-wall-panel frames 118 to be positioned in variety of ways.
5) It is even still yet another object of the new invention to provide (a or an) four-device-in-one bleacher-skybox food-dehydrator mobile-marine-sauna wind-and-smoke-redirecting bungalow, having privacy-enabling wind-and-smoke-redirecting cold-weather-insulating rainwater-sealing skybox-enabling marine-sauna-enabling food-dehydrator-enabling rotatable-and-reversible-and-flippable louver braces 120.
    Therefore, the four-device-in-one bleacher-skybox food-dehydrator mobile-marine-sauna wind-and-smoke-redirecting bungalow is (or are each):

a) Capable of allowing privacy-enabling wind-and-smoke-redirecting cold-weather-insulating rainwater-sealing skybox-enabling marine-sauna-enabling food-dehydrator-enabling louvers 122 to be rotated and positioned to redirect wind direction in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

b) Capable of allowing privacy-enabling wind-and-smoke-redirecting cold-weather-insulating rainwater-sealing skybox-enabling marine-sauna-enabling food-dehydrator-enabling louvers 122 to be flipped and positioned to redirect wind direction in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D); and c) Capable of providing structure for securing privacy-enabling wind-and-smoke-redirecting cold-weather-insulating rainwater-sealing skybox-enabling marine-sauna-enabling food-dehydrator-enabling louvers 122.

6) It is even still yet another object of the new invention to provide (a or an) four-device-in-one bleacher-skybox food-dehydrator mobile-marine-sauna wind-and-smoke-redirecting bungalow, having spring-loaded rotation-locking axis pins 121

Therefore, the four-device-in-one bleacher-skybox food-dehydrator mobile-marine-sauna wind-and-smoke-redirecting bungalow is (or are each):

a) Capable of providing means for easily locking and unlocking privacy-enabling wind-and-smoke-redirecting cold-weather-insulating rainwater-sealing skybox-enabling marine-sauna-enabling food-dehydrator-enabling rotatable-and-reversible-and-flippable louver braces 120 (see FIG. 16, and FIG. 17);

b) Capable of providing axis for privacy-enabling wind-and-smoke-redirecting cold-weather-insulating rainwater-sealing skybox-enabling marine-sauna-enabling food-dehydrator-enabling rotatable-and-reversible-and-flippable louver braces 120 to pivot (see FIG. 16, and FIG. 17); and c) Capable of providing 8 locking points the reposition privacy-enabling wind-and-smoke-redirecting cold-weather-insulating rainwater-sealing skybox-enabling marine-sauna-enabling food-dehydrator-enabling rotatable-and-reversible-and-flippable louver braces 120 at different angles (see FIG. 16, and FIG. 17).

7) It is even still yet another object of the new invention to provide (a or an) four-device-in-one bleacher-skybox food-dehydrator mobile-marine-sauna wind-and-smoke-redirecting bungalow, having privacy-enabling wind-and-smoke-redirecting cold-weather-insulating rainwater-sealing skybox-enabling marine-sauna-enabling food-dehydrator-enabling louvers 122

Therefore, the four-device-in-one bleacher-skybox food-dehydrator mobile-marine-sauna wind-and-smoke-redirecting bungalow is (or are each):

a) Capable of redirecting wind and smoke in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

b) Capable of blocking wind and smoke in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

c) Capable of reducing wind and smoke in the directions of arrows 152a, 152b, 153a, 153b, 153c, 153d, 154a, 154b, 155a, 155b, 156a, 156b, 157a, 157b, 158, 159a, 159b, 160a, 160b, 161, 162, 163a, 163b, 164a, 164b, 164c, 164d, 165, 166a, 166b, 166c, 166d, 167a, 167b, 167c, 167d, 168a, 168b, 169a, 169b, 170a, 170b, 171a, 171b, 172a, 172b, 173, 174, 175a, 175b, 175c, 175d, 176a, 176b, 177, 178, 179, 180a, 180b, 181a, and 181b (see FIG. 1A, FIG. 1B, FIG. 23, FIG. 24, FIG. 25, FIG. 26, FIG. 27, FIG. 28, FIG. 29, FIG. 30, FIG. 32, FIG. 33, FIG. 34, FIG. 35, FIG. 36, FIG. 37, FIG. 38, FIG. 39A, FIG. 39B, FIG. 40A, FIG. 40B, FIG. 40C, FIG. 40D, FIG. 41, FIG. 42, FIG. 43, FIG. 44, FIG. 45, FIG. 46A, FIG. 46B, FIG. 46C, and FIG. 46D);

d) Capable of sealing four-device-in-one bleacher-skybox food-dehydrator mobile-marine-sauna wind-and-smoke-redirecting bungalow to create a mobile-marine sauna in the directions of arrows 149b, 149c, and 149d (see FIG. 1C, FIG. 1D, FIG. 1E, FIG. 31A, FIG. 31B, FIG. 31C, and FIG. 31D);

e) Capable of sealing four-device-in-one bleacher-skybox food-dehydrator mobile-marine-sauna wind-and-smoke-redirecting bungalow to create a bleacher skybox in the directions of arrows 150a and 150b

(see FIG. 1F, FIG. 1G, FIG. 1H, FIG. 31E, FIG. 31F, FIG. 31G, and FIG. 31H);
  f) Capable of sealing four-device-in-one bleacher-skybox food-dehydrator mobile-marine-sauna wind-and-smoke-redirecting bungalow to become a food dehydrator; and
  g) Capable of redirecting wind to stoke a fire or a blacksmith forge in the directions of arrows 172*a* and 172*b* (see FIG. 40D).
8) It is even still yet another object of the new invention to provide (a or an) four-device-in-one bleacher-skybox food-dehydrator mobile-marine-sauna wind-and-smoke-redirecting bungalow, having an easy-to-install sound-dampening-inner-track insert 126
  Therefore, the four-device-in-one bleacher-skybox food-dehydrator mobile-marine-sauna wind-and-smoke-redirecting bungalow is (or are each):
    a) Capable of providing a track for easy-to-install privacy curtain-and-insect-screen-securing easy-slide hooks 127 to be secured in the directions of arrows 186*b* and 186*c* (see FIG. 81);
    b) Capable of providing sound-dampening to reduce noise; and
    c) Capable of providing smooth track for easily sliding easy-to-install privacy curtain-and-insect-screen-securing easy-slide hooks 127 within in the directions of arrows 186*b* and 186*c* (see FIG. 81).
9) It is even still yet another object of the new invention to provide (a or an) four-device-in-one bleacher-skybox food-dehydrator mobile-marine-sauna wind-and-smoke-redirecting bungalow, having a privacy-enabling wind-protecting curtain 128
  Therefore, the four-device-in-one bleacher-skybox food-dehydrator mobile-marine-sauna wind-and-smoke-redirecting bungalow is (or are each):
    a) Capable of providing privacy;
    b) Capable of providing protection from harmful sun rays;
    c) Capable of providing protection from wind; and
    d) Capable of providing protection from insects.
10) It is even still yet another object of the new invention to provide (a or an) four-device-in-one bleacher-skybox food-dehydrator mobile-marine-sauna wind-and-smoke-redirecting bungalow, having an easy-to-install-extending-and-retracting-door-spool housing 131
  Therefore, the four-device-in-one bleacher-skybox food-dehydrator mobile-marine-sauna wind-and-smoke-redirecting bungalow is (or are each):
    a) Capable of providing easy-to-install attachment to easy-to-install-extending-and-retracting-door-spool-housing bracket 130 in the directions of arrows 188 and 189 (see FIG. 176, FIG. 177, and FIG. 178);
    b) Capable of providing location for storage of extending-and-retracting door 133 (see FIG. 176, FIG. 177, FIG. 178, and FIG. 192);
    c) Capable of protecting extending-and-retracting door 133 from damage while inside; and
    d) Capable of providing discrete location for extending-and-retracting door 133 to retract into in the direction of arrow 190 (see FIG. 192).
11) It is even still yet another object of the new invention to provide (a or an) four-device-in-one bleacher-skybox food-dehydrator mobile-marine-sauna wind-and-smoke-redirecting bungalow, having an extending-and-retracting door 133
  Therefore, the four-device-in-one bleacher-skybox food-dehydrator mobile-marine-sauna wind-and-smoke-redirecting bungalow is (or are each):
    a) Capable of providing protection from wind;
    b) Capable of providing protection from harmful sun rays;
    c) Capable of providing insulation from cold temperatures; and
    d) Capable of providing security within the four-device-in-one bleacher-skybox food-dehydrator mobile-marine-sauna wind-and-smoke-redirecting bungalow.
12) It is even still yet another object of the new invention to provide (a or an) four-device-in-one bleacher-skybox food-dehydrator mobile-marine-sauna wind-and-smoke-redirecting bungalow, having height-and-angle-adjustable tube-screws 147
  Therefore, the four-device-in-one bleacher-skybox food-dehydrator mobile-marine-sauna wind-and-smoke-redirecting bungalow is (or are each):
    a) Capable of leveling the four-device-in-one bleacher-skybox food-dehydrator mobile-marine-sauna wind-and-smoke-redirecting bungalow when installed on an uneven ground surface in the directions of arrows 195*a*, 195*b*, 195*c*, 195*d*, 196*a*, 196*b*, 196*c*, 196*d*, 197*a*, and 197*b* (see FIG. 48, FIG. 49, and FIG. 50);
    b) Capable of securing corner-posts base-plate 144 to the ground; and
    c) Capable of providing adjustment points for each corner-posts base-plate 144 in the directions of arrows 195*a*, 195*b*, 195*c*, 195*d*, 196*a*, 196*b*, 196*c*, 196*d*, 197*a*, and 197*b* (see FIG. 48, FIG. 49, and FIG. 50).

What is claimed is:
1. A four-device-in-one bleacher-skybox food-dehydrator mobile-marine-sauna wind-and-smoke-redirecting bungalow, comprising:
  a plurality of adjustable louver blades
    for
    shedding water,
    preventing rainwater from getting into said four-device-in-one bleacher-skybox food-dehydrator mobile-marine-sauna wind-and-smoke-redirecting bungalow,
    adjustably controlling amount of sunlight shining into said four-device-in-one bleacher-skybox food-dehydrator mobile-marine-sauna wind-and-smoke-redirecting bungalow, and
    adjustably controlling and redirecting wind and smoke;
  a plurality of rainwater-channeling side gutter beams,
    said adjustable louver blades rotatably attached to said rainwater-channeling side gutter beams;
  a plurality of rainwater-channeling end gutter beams;
  a plurality of discrete rainwater chutes
    formed to said rainwater-channeling side gutter beams and said rainwater-channeling end gutter beams;
  a plurality of discrete rainwater drain openings;
  a plurality of door-window-and-wall-panel frames;
  a plurality of privacy-enabling wind-and-smoke-redirecting cold-weather-insulating rainwater-sealing skybox-enabling marine-sauna-enabling food-dehydrator-enabling window-panel inserts
    inserted within said door-window-and-wall-panel frames
    for enabling said four-device-in-one bleacher-skybox food-dehydrator mobile-marine-sauna wind-and-smoke-redirecting bungalow to become a mobile-marine sauna, enabling said four-device-in-one bleacher-skybox food-dehydrator mobile-marine-sauna wind-and-smoke-redirecting bungalow to become a bleacher skybox, enabling said four-device-in-one bleacher-skybox food-dehydrator mobile-marine-sauna wind-and-smoke-redirecting bungalow to become a food dehydrator, providing security within said four-device-in-one bleacher-skybox food-dehydrator mobile-marine-sauna wind-and-smoke-redirecting bungalow, providing insulation within said four-device-in-one bleacher-skybox food-dehydrator mobile-marine-sauna wind-and-smoke-redirecting bungalow from cold or warm weather, providing protection within said four-device-in-one bleacher-skybox food-dehydrator mobile-marine-sauna wind-and-smoke-redirecting bungalow from wind, and slidably and replaceably allowing said door-window-and-wall-panel frames to be positioned in a plurality of ways;

a plurality of privacy-enabling wind-and-smoke-redirecting cold-weather-insulating rainwater-sealing skybox-enabling marine-sauna-enabling food-dehydrator-enabling louvers
for
redirecting wind and smoke,
blocking wind and smoke,
reducing wind and smoke,
sealing said four-device-in-one bleacher-skybox food-dehydrator mobile-marine-sauna wind-and-smoke-redirecting bungalow to create a mobile-marine sauna,
sealing said four-device-in-one bleacher-skybox food-dehydrator mobile-marine-sauna wind-and-smoke-redirecting bungalow to create a bleacher skybox,
sealing said four-device-in-one bleacher-skybox food-dehydrator mobile-marine-sauna wind-and-smoke-redirecting bungalow to become a food dehydrator, and
redirecting wind to stoke a fire or a blacksmith forge;

a plurality of privacy-enabling wind-and-smoke-redirecting cold-weather-insulating rainwater-sealing skybox-enabling marine-sauna-enabling food-dehydrator-enabling rotatable-and-reversible-and-flippable louver braces
rotatably inserted within said door-window-and-wall-panel frames, said privacy-enabling wind-and-smoke-redirecting cold-weather-insulating rainwater-sealing skybox-enabling marine-sauna-enabling food-dehydrator-enabling louvers rotatably and adjustably attached to said privacy-enabling wind-and-smoke-redirecting cold-weather-insulating rainwater-sealing skybox-enabling marine-sauna-enabling food-dehydrator-enabling rotatable-and-reversible-and-flippable louver braces
for
allowing said privacy-enabling wind-and-smoke-directing cold-weather-insulating rainwater-sealing meat-smoke-house-creating fruit-drying-chamber-creating louvers to be rotated and positioned to redirect wind direction,
allowing said privacy-enabling wind-and-smoke-directing cold-weather-insulating rainwater-sealing meat-smoke-house-creating fruit-drying-chamber-creating louvers to be flipped and positioned to redirect wind direction, and
structuringly securing said privacy-enabling wind-and-smoke-directing cold-weather-insulating rainwater-sealing meat-smoke-house-creating fruit-drying-chamber-creating louver;

a plurality of spring-loaded rotation-locking axis pins
inserted within said privacy-enabling wind-and-smoke-redirecting cold-weather-insulating rainwater-sealing skybox-enabling marine-sauna-enabling food-dehydrator-enabling rotatable-and-reversible-and-flippable louver braces
for
easily locking and unlocking said privacy-enabling wind-and-smoke-redirecting cold-weather-insulating rainwater-sealing skybox-enabling marine-sauna-enabling food-dehydrator-enabling rotatable-and-reversible-and-flippable louver braces,
pivotingly functionalizing said privacy-enabling wind-and-smoke-redirecting cold-weather-insulating rainwater-sealing skybox-enabling marine-sauna-enabling food-dehydrator-enabling rotatable-and-reversible-and-flippable louver braces, and
providing eight locking points to reposition said privacy-enabling wind-and-smoke-redirecting cold-weather-insulating rainwater-sealing skybox-enabling marine-sauna-enabling food-dehydrator-enabling rotatable-and-reversible-and-flippable louver braces at a plurality of angles;

a plurality of corner-posts
attached to said rainwater-channeling side gutter beams and said rainwater-channeling end gutter beams,
said discrete rainwater drain openings formed into said corner-posts;

a plurality of corner-post L-shaped caps
screwed to said corner-posts;

a plurality of gutter-beam cradles
formed into said corner-posts,
said rainwater-channeling side gutter beams, and said rainwater-channeling end gutter beams each attached to said gutter-beam cradles;

a plurality of corner-post-base-plate covers
slidably attached onto said corner-posts;

a plurality of corner-post base-plates
secured to said corner-posts,
said extending-and-retracting-door-securing bracket attached to said corner-posts base-plate;

at least one sliding-door lower track
attached to said corner-post base-plates,
said door-window-and-wall-panel frames interchangably and slidably placed into said sliding-door lower track;

a plurality of anchoring-screw holes
drilled into said corner-posts base-plate;

a plurality of height-and-angle-adjustable tube-screws
screwed in said anchoring-screw holes
for leveling said four-device-in-one bleacher-skybox food-dehydrator mobile-marine-sauna wind-and-smoke-redirecting bungalow when installed on an uneven ground surface, securing said corner-posts base-plate to a ground surface, and providing adjustment points for each of said corner-posts base-plate;

a plurality of anchoring bolts screwed through said height-and-angle-adjustable tube-screws into said anchoring-screw holes.

2. The four-device-in-one bleacher-skybox food-dehydrator mobile-marine-sauna wind-and-smoke-redirecting bungalow of claim 1, further comprising:

a plurality of LED lights attached to said adjustable louver blades for providing illumination within said four-device-in-one bleacher-skybox food-dehydrator mobile-marine-sauna wind-and-smoke-redirecting bungalow, a plurality of LED-powering solar-rechargeable batteries for powering said led lights, saving costs of repeatedly replacing non-rechargeable alkaline batteries, and helping reduce carbon footprint, an adjustable LED-light-powering solar panel attached to said adjustable louver blades for collecting solar energy to charge said led-powering solar-rechargeable batteries, collecting solar energy to recharge said led-powering solar-rechargeable batteries, saving energy costs associated with lighting said four-device-in-one bleacher-skybox food-dehydrator mobile-marine-sauna wind-and-smoke-redirecting bungalow, saving costs of repeatedly replacing non-rechargeable alkaline batteries, providing freedom to place said four-device-in-one bleacher-skybox food-dehydrator mobile-marine-sauna wind-and-smoke-redirecting bungalow away from a power outlet, and helping reduce carbon footprint, a battery cover for preventing rainwater from reaching said led-powering solar-rechargeable batteries, and a battery housing inserted within said adjustable louver blades, said battery cover attached to said battery housing, said LED-powering solar-rechargeable batteries inserted within said battery housing said battery housing for securing said led-powering solar-rechargeable batteries.

3. The four-device-in-one bleacher-skybox food-dehydrator mobile-marine-sauna wind-and-smoke-redirecting bungalow of claim 1, further comprising:

an easy-to-install discrete-hydro-mist-emitter track hooked onto said discrete rainwater chutes, a plurality of hydro-mist-securing clips formed into said easy-to-install discrete-hydro-mist-emitter track, a plurality of hydro-mist emitters snapped into said hydro-mist-securing clips for spraying mists of water vapor to cool occupants within said four-device-in-one bleacher-skybox food-dehydrator mobile-marine-sauna wind-and-smoke-redirecting bungalow, and a plurality of hydro-mist water-supply lines connected to said hydro-mist emitters for delivering water to said hydro-mist emitters.

4. The four-device-in-one bleacher-skybox food-dehydrator mobile-marine-sauna wind-and-smoke-redirecting bungalow of claim 1, further comprising:

a half-moon multi-position-locking bracket attached to said door-window-and-wall-panel frames for providing said privacy-enabling wind-and-smoke-directing cold-weather-insulating rainwater-sealing meat-smoke-house-creating fruit-drying-chamber-creating louvers multiple positions to lock, and a multi-position-locking spring-loaded louver-adjusting control knob springingly attached to said privacy-enabling wind-and-smoke-directing cold-weather-insulating rainwater-sealing meat-smoke-house-creating fruit-drying-chamber-creating louvers for spring-locking said privacy-enabling wind-and-smoke-directing cold-weather-insulating rainwater-sealing meat-smoke-house-creating fruit-drying-chamber-creating louvers in multiple positions.

5. The four-device-in-one bleacher-skybox food-dehydrator mobile-marine-sauna wind-and-smoke-redirecting bungalow of claim 1, further comprising:

an easy-to-install noise-dampening-multi-purpose-curtain-and-insect-screen-hook-sliding track removably attached to said discrete rainwater chutes and screwed to said rainwater-channeling side gutter beams, a plurality of easy-to-install privacy curtain-and-insect-screen-securing easy-slide hooks, an easy-to-install sound-dampening-inner-track insert slidably inserted within said easy-to-install noise-dampening-multi-purpose-curtain-and-insect-screen-hook-sliding track, said easy-to-install privacy curtain-and-insect-screen-securing easy-slide hooks slidably inserted within said easy-to-install sound-dampening-inner-track insert, said easy-to-install sound-dampening-inner-track insert for providing a track for said easy-to-install privacy curtain-and-insect-screen-securing easy-slide hooks to be secured, providing sound-dampening to reduce noise, and providing smooth track for easily sliding said easy-to-install privacy curtain-and-insect-screen-securing easy-slide hooks within, a privacy-enabling wind-protecting curtain removably hooked onto said easy-to-install privacy curtain-and-insect-screen-securing easy-slide hooks
for
providing privacy,
providing protection from harmful sun rays,
providing protection from wind, and
providing protection from insects, and
an insect-preventing screen
removably hooked onto said easy-to-install privacy curtain-and-insect-screen-securing easy-slide hooks
for
providing protection from insects, and
allowing airflow into interior of said four-device-in-one bleacher-skybox food-dehydrator mobile-marine-sauna wind-and-smoke-redirecting bungalow.

6. The four-device-in-one bleacher-skybox food-dehydrator mobile-marine-sauna wind-and-smoke-redirecting bungalow of claim 5,
wherein
said easy-to-install privacy curtain-and-insect-screen-securing easy-slide hooks
are for
providing hooks for said privacy-enabling wind-protecting curtain to attach securely,
providing hooks for said insect-preventing screen to attach securely,
providing T-shaped design to keep said easy-to-install privacy curtain-and-insect-screen-securing easy-slide hooks from falling out, and
providing T-shaped design for easy sliding back-and-forth.

7. The four-device-in-one bleacher-skybox food-dehydrator mobile-marine-sauna wind-and-smoke-redirecting bungalow of claim 1,
further comprising:
an easy-to-install-extending-and-retracting-door-spool-housing bracket is
removably attached to said rainwater-channeling side gutter beams
for
providing easy-to-install attachment to said rainwater-channeling side gutter beams,
an extending-and-retracting door
for
providing protection from wind,
providing protection from harmful sun rays,
providing insulation from cold temperatures, and
providing security within said four-device-in-one bleacher-skybox food-dehydrator mobile-marine-sauna wind-and-smoke-redirecting bungalow,
an easy-to-install-extending-and-retracting-door-spool housing
attached to said easy-to-install-extending-and-retracting-door-spool-housing bracket
for
providing easy-to-install attachment to said easy-to-install-extending-and-retracting-door-spool-housing bracket,
providing location for storage of said extending-and-retracting door, protecting said extending-and-retracting door from damage while inside, and
providing discrete location for said extending-and-retracting door to retract into,
an easy-to-install-extending-and-retracting-door spool
rollably inserted with said easy-to-install-extending-and-retracting-door-spool housing,
said extending-and-retracting door rolled around said easy-to-install-extending-and-retracting-door spool,
said easy-to-install-extending-and-retracting-door spool
for
providing core for said extending-and-retracting door to be wrapped
upon, and
providing smooth rotation for easy operation of said extending-and-retracting door,
an extending-and-retracting-door-side-post bracket and guide
attached to said corner-posts
for
providing guide for easily sliding said extending-and-retracting door up and down,
providing secure track to prevent said extending-and-retracting door
from
dislodging during operation, and
sealing edges of said extending-and-retracting door to
aid in insulation,
an extending-and-retracting-door-securing lock
attached to said extending-and-retracting door
for
providing a grip for a hand to easily operate said extending-and-retracting door,
an extending-and-retracting-door-securing bracket
attached to said corner-posts base-plate
for
snap-locking said extending-and-retracting door to prevent retraction, and
securing said extending-and-retracting door in the extended position to provide protection from wind and rain, and
an extending-and-retracting-door water-sealing weather strip
attached to said extending-and-retracting-door-securing lock
for
sealing said extending-and-retracting door to prevent rain from enter into said four-device-in-one bleacher-skybox food-dehydrator mobile-marine-sauna wind-and-smoke-redirecting bungalow, and
sealing said extending-and-retracting door to prevent wind from enter into said four-device-in-one bleacher-skybox food-dehydrator mobile-marine-sauna wind-and-smoke-redirecting bungalow.

8. The four-device-in-one bleacher-skybox food-dehydrator mobile-marine-sauna wind-and-smoke-redirecting bungalow of claim 1,
further comprising
a hydro-mist water-supply quick-release coupler
mounted to said corner-posts and attached to said hydro-mist water-supply lines
for
providing a quick-release fitting for a water-hose to attach, and
providing a convenient connection location for attaching a water-hose for the purpose of delivering water through said hydro-mist water-supply lines to said hydro-mist emitters.

9. The four-device-in-one bleacher-skybox food-dehydrator mobile-marine-sauna wind-and-smoke-redirecting bungalow of claim 1,
wherein said privacy-enabling wind-and-smoke-redirecting cold-weather-insulating rainwater-sealing skybox-enabling marine-sauna-enabling food-dehydrator-enabling window-panel inserts are each made of the material of metal, glass, plastic, wood, insulation, or composite, and said privacy-enabling wind-and-smoke-redirecting cold-weather-insulating rainwater-sealing skybox-enabling marine-sauna-enabling food-dehydrator-enabling louvers are each made of the material of metal, wood, or composite.

10. A four-device-in-one skybox dehydrator mobile-sauna wind-and-smoke-redirecting bungalow, comprising:

a plurality of adjustable louver blades
  for
    shedding water,
    preventing rainwater from getting into said four-device-in-one skybox dehydrator mobile-sauna wind-and-smoke-redirecting bungalow,
    adjustably controlling amount of sunlight shining into said four-device-in-one skybox dehydrator mobile-sauna wind-and-smoke-redirecting bungalow, and
    adjustably controlling and redirecting wind and smoke;
a plurality of rainwater-channeling side gutter beams,
  said adjustable louver blades rotatably attached to said rainwater-channeling side gutter beams;
a plurality of rainwater-channeling end gutter beams;
a plurality of discrete rainwater chutes
  formed to said rainwater-channeling side gutter beams and said rainwater-channeling end gutter beams;
a plurality of discrete rainwater drain openings;
a plurality of door-window-and-wall-panel frames;
a plurality of wind-and-smoke-redirecting weather-insulating rainwater-sealing skybox-enabling sauna-enabling dehydrator-enabling window-panel inserts
  inserted within said door-window-and-wall-panel frames
    for
      enabling said four-device-in-one skybox dehydrator mobile-sauna wind-and-smoke-redirecting bungalow to become a mobile-marine sauna,
      enabling said four-device-in-one skybox dehydrator mobile-sauna wind-and-smoke-redirecting bungalow to become a bleacher skybox,
      enabling said four-device-in-one skybox dehydrator mobile-sauna wind-and-smoke-redirecting bungalow to become a food dehydrator,
      providing security within said four-device-in-one skybox dehydrator mobile-sauna wind-and-smoke-redirecting bungalow,
      providing insulation within said four-device-in-one skybox dehydrator mobile-sauna wind-and-smoke-redirecting bungalow from cold or warm weather,
      providing protection within said four-device-in-one skybox dehydrator mobile-sauna wind-and-smoke-redirecting bungalow from wind, and
      slidably and replaceably allowing said door-window-and-wall-panel frames to be positioned in a plurality of ways;
a plurality of wind-and-smoke-redirecting weather-insulating rainwater-sealing skybox-enabling sauna-enabling dehydrator-enabling louvers
  for
    redirecting wind and smoke,
    blocking wind and smoke,
    reducing wind and smoke,
    sealing said four-device-in-one skybox dehydrator mobile-sauna wind-and-smoke-redirecting bungalow to create a mobile-marine sauna,
    sealing said four-device-in-one skybox dehydrator mobile-sauna wind-and-smoke-redirecting bungalow to create a bleacher skybox,
    sealing said four-device-in-one skybox dehydrator mobile-sauna wind-and-smoke-redirecting bungalow to become a food dehydrator, and
    redirecting wind to stoke a fire or a blacksmith forge;
a plurality of wind-and-smoke-redirecting weather-insulating rainwater-sealing skybox-enabling sauna-enabling dehydrator-enabling rotatable-and-reversible-and-flippable louver braces
  rotatably inserted within said door-window-and-wall-panel frames,
  said wind-and-smoke-redirecting weather-insulating rainwater-sealing skybox-enabling sauna-enabling dehydrator-enabling louvers rotatably and
  adjustably attached to said wind-and-smoke-redirecting weather-insulating rainwater-sealing skybox-enabling sauna-enabling dehydrator-enabling rotatable-and-reversible-and-flippable louver braces
    for
      allowing said wind-and-smoke-redirecting weather-insulating rainwater-sealing skybox-enabling sauna-enabling dehydrator-enabling louvers to be rotated and positioned to redirect wind direction,
      allowing said wind-and-smoke-redirecting weather-insulating rainwater-sealing skybox-enabling sauna-enabling dehydrator-enabling louvers to be flipped and positioned to redirect wind direction, and
      structuringly securing said wind-and-smoke-redirecting weather-insulating rainwater-sealing skybox-enabling sauna-enabling dehydrator-enabling louvers;
a plurality of spring-loaded axis pins
  inserted within said wind-and-smoke-redirecting weather-insulating rainwater-sealing skybox-enabling sauna-enabling dehydrator-enabling rotatable-and-reversible-and-flippable louver braces
    for
      easily locking and unlocking said wind-and-smoke-redirecting weather-insulating rainwater-sealing skybox-enabling sauna-enabling dehydrator-enabling rotatable-and-reversible-and-flippable louver braces,
      pivotingly functionalizing said wind-and-smoke-redirecting weather-insulating rainwater-sealing skybox-enabling sauna-enabling dehydrator-enabling rotatable-and-reversible-and-flippable louver braces, and
      providing eight locking points to reposition said wind-and-smoke-redirecting weather-insulating rainwater-sealing skybox-enabling sauna-enabling dehydrator-enabling rotatable-and-reversible-and-flippable louver braces at a plurality of angles;
a plurality of corner-posts
  attached to said rainwater-channeling side gutter beams and said rainwater-channeling end gutter beams,
  said discrete rainwater drain openings formed into said corner-posts;
a plurality of corner-post caps
  screwed to said corner-posts;
a plurality of gutter-beam cradles formed into said corner-posts,
said rainwater-channeling side gutter beams, and
said rainwater-channeling end gutter beams each attached to said gutter-beam cradles;
a plurality of corner-post-base-plate covers
slidably attached onto said corner-posts;
a plurality of corner-post base-plates
secured to said corner-posts,
said extending-and-retracting-door-securing bracket attached to said corner-posts base-plate;
at least one sliding-door lower track
attached to said corner-post base-plates,
said door-window-and-wall-panel frames interchangably and slidably placed into said sliding-door lower track;
a plurality of anchoring-screw holes
drilled into said corner-posts base-plate;
a plurality of height-and-angle-adjustable tube-screws
screwed in said anchoring-screw holes
for
leveling said four-device-in-one skybox dehydrator mobile-sauna wind-and-smoke-redirecting bungalow when installed on an uneven ground surface,
securing said corner-posts base-plate to a ground surface, and
providing adjustment points for each of said corner-posts base-plate;
a plurality of anchoring bolts
screwed through said height-and-angle-adjustable tube-screws into said anchoring-screw holes.

11. The four-device-in-one skybox dehydrator mobile-sauna wind-and-smoke-redirecting bungalow of claim 10, further comprising:
a plurality of LED lights
attached to said adjustable louver blades
for
providing illumination within said four-device-in-one skybox dehydrator mobile-sauna wind-and-smoke-redirecting bungalow,
a plurality of LED-powering solar-rechargeable batteries
for
powering said led lights,
saving costs of repeatedly replacing non-rechargeable alkaline batteries, and
helping reduce carbon footprint,
an LED-light-powering solar panel attached to said adjustable louver blades
for
collecting solar energy to charge said led-powering solar-rechargeable batteries,
collecting solar energy to recharge said led-powering solar-rechargeable batteries,
saving energy costs associated with lighting said four-device-in-one skybox dehydrator mobile-sauna wind-and-smoke-redirecting bungalow,
saving costs of repeatedly replacing non-rechargeable alkaline batteries,
providing freedom to place said four-device-in-one skybox dehydrator mobile-sauna wind-and-smoke-redirecting bungalow away from a power outlet, and
helping reduce carbon footprint,
a battery cover
for
preventing rainwater from reaching said led-powering solar-rechargeable batteries, and
a battery housing
inserted within said adjustable louver blades,
said battery cover attached to said battery housing,
said LED-powering solar-rechargeable batteries inserted within said battery housing
said battery housing
for
securing said led-powering solar-rechargeable batteries.

12. The four-device-in-one skybox dehydrator mobile-sauna wind-and-smoke-redirecting bungalow of claim 10, further comprising:
an discrete-hydro-mist-emitter track
hooked onto said discrete rainwater chutes,
a plurality of hydro-mist-securing clips
formed into said discrete-hydro-mist-emitter track,
a plurality of hydro-mist emitters
snapped into said hydro-mist-securing clips
for
spraying mists of water vapor to cool occupants within said four-device-in-one skybox dehydrator mobile-sauna wind-and-smoke-redirecting bungalow, and
a plurality of hydro-mist water-supply lines
connected to said hydro-mist emitters
for
delivering water to said hydro-mist emitters.

13. The four-device-in-one skybox dehydrator mobile-sauna wind-and-smoke-redirecting bungalow of claim 10, further comprising:
a half-moon multi-position-locking bracket
attached to said door-window-and-wall-panel frames
for
providing said wind-and-smoke-redirecting weather-insulating rainwater-sealing skybox-enabling sauna-enabling dehydrator-enabling louvers multiple positions to lock, and
a multi-position-locking spring-loaded louver-adjusting control knob springingly attached to said wind-and-smoke-redirecting weather-insulating rainwater-sealing skybox-enabling sauna-enabling dehydrator-enabling louvers
for
spring-locking said wind-and-smoke-redirecting weather-insulating rainwater-sealing skybox-enabling sauna-enabling dehydrator-enabling louvers in multiple positions.

14. The four-device-in-one skybox dehydrator mobile-sauna wind-and-smoke-redirecting bungalow of claim 10, further comprising:
an noise-dampening-multi-purpose-curtain-and-insect-screen-hook-sliding track removably attached to said discrete rainwater chutes and screwed to said rainwater-channeling side gutter beams,
a plurality of privacy curtain-and-insect-screen-securing easy-slide hooks,
an sound-dampening-inner-track insert
slidably inserted within said noise-dampening-multi-purpose-curtain-and-insect-screen-hook-sliding track,
said privacy curtain-and-insect-screen-securing easy-slide hooks slidably inserted within said sound-dampening-inner-track insert,
said sound-dampening-inner-track insert
for
providing a track for said privacy curtain-and-insect-screen-securing easy-slide hooks to be secured, providing sound-dampening to reduce noise, and
providing smooth track for easily sliding said privacy curtain-and-insect-screen-securing easy-slide hooks within, a privacy-enabling wind-protecting curtain
removably hooked onto said privacy curtain-and-insect-screen-securing easy-slide hooks
for
providing privacy,
providing protection from harmful sun rays,
providing protection from wind, and
providing protection from insects, and an insect-preventing screen
removably hooked onto said privacy curtain-and-insect-screen-securing easy-slide hooks
for
providing protection from insects, and
allowing airflow into interior of said four-device-in-one skybox dehydrator mobile-sauna wind-and-smoke-redirecting bungalow.

15. The four-device-in-one skybox dehydrator mobile-sauna wind-and-smoke-redirecting bungalow of claim 14, wherein
said privacy curtain-and-insect-screen-securing easy-slide hooks
are for
providing hooks for said privacy-enabling wind-protecting curtain to attach securely,
providing hooks for said insect-preventing screen to attach securely,
providing T-shaped design to keep said privacy curtain-and-insect-screen-securing easy-slide hooks from falling out, and
providing T-shaped design for easy sliding back-and-forth.

16. The four-device-in-one skybox dehydrator mobile-sauna wind-and-smoke-redirecting bungalow of claim 10, further comprising:
an extending-and-retracting-door-spool-housing bracket is
removably attached to said rainwater-channeling side gutter beams
for
providing attachment to said rainwater-channeling side gutter beams,
an extending-and-retracting door
for
providing protection from wind,
providing protection from harmful sun rays,
providing insulation from cold temperatures, and
providing security within said four-device-in-one skybox dehydrator mobile-sauna wind-and-smoke-redirecting bungalow,
an extending-and-retracting-door-spool housing
attached to said extending-and-retracting-door-spool-housing bracket
for
providing attachment to said extending-and-retracting-door-spool-housing bracket,
providing location for storage of said extending-and-retracting door,
protecting said extending-and-retracting door from damage while inside, and
providing discrete location for said extending-and-retracting door to retract into,
an extending-and-retracting-door spool
rollably inserted with said extending-and-retracting-door-spool housing, said extending-and-retracting door rolled around said extending-and-retracting-door spool,
said extending-and-retracting-door spool
for
providing core for said extending-and-retracting door to be wrapped upon, and
providing smooth rotation for easy operation of said extending-and-retracting door,
an extending-and-retracting-door-side-post bracket and guide
attached to said corner-posts
for
providing guide for easily sliding said extending-and-retracting door up and down,
providing secure track to prevent said extending-and-retracting door
from
dislodging during operation, and
sealing edges of said extending-and-retracting door to
aid in insulation,
an extending-and-retracting-door-securing lock
attached to said extending-and-retracting door
for
providing a grip for a hand to easily operate said extending-and-retracting door,
an extending-and-retracting-door-securing bracket
attached to said corner-posts base-plate
for
snap-locking said extending-and-retracting door to prevent retraction, and
securing said extending-and-retracting door in the extended position to provide protection from wind and rain, and
an extending-and-retracting-door water-sealing weather strip
attached to said extending-and-retracting-door-securing lock
for
sealing said extending-and-retracting door to prevent rain from enter into said four-device-in-one skybox dehydrator mobile-sauna wind-and-smoke-redirecting bungalow, and
sealing said extending-and-retracting door to prevent wind from enter into said four-device-in-one skybox dehydrator mobile-sauna wind-and-smoke-redirecting bungalow.

17. The four-device-in-one skybox dehydrator mobile-sauna wind-and-smoke-redirecting bungalow of claim 10, further comprising
a hydro-mist water-supply quick-release coupler
mounted to said corner-posts and attached to said hydro-mist water-supply lines
for
providing a quick-release fitting for a water-hose to attach, and
providing a convenient connection location for attaching a water-hose for the purpose of delivering water through said hydro-mist water-supply lines to said hydro-mist emitters.

18. The four-device-in-one skybox dehydrator mobile-sauna wind-and-smoke-redirecting bungalow of claim 10, wherein
said wind-and-smoke-redirecting weather-insulating rainwater-sealing skybox-enabling sauna-enabling dehydrator-enabling window-panel inserts are each made of the material of metal, glass, plastic, wood, insulation, or composite, and said wind-and-smoke-redirecting weather-insulating rainwater-sealing skybox-enabling sauna-enabling dehydrator-enabling louvers are each made of the material of metal, wood, or composite.

19. A four-device-in-one skybox dehydrator sauna wind-redirecting bungalow, comprising:
 a plurality of adjustable louver blades;
 a plurality of side gutter beams,
  said adjustable louver blades rotatably attached to said side gutter beams;
 a plurality of end gutter beams;
 a plurality of chutes
  formed to said side gutter beams and said end gutter beams;
 a plurality of drain openings;
 a plurality of panel frames;
 a plurality of panel inserts
  inserted within said panel frames
   for
    enabling said four-device-in-one skybox dehydrator sauna wind-redirecting bungalow to become a sauna,
    enabling said four-device-in-one skybox dehydrator sauna wind-redirecting bungalow to become a skybox,
    enabling said four-device-in-one skybox dehydrator sauna wind-redirecting bungalow to become a dehydrator,
    providing security within said four-device-in-one skybox dehydrator sauna wind-redirecting bungalow,
    providing insulation within said four-device-in-one skybox dehydrator sauna wind-redirecting bungalow from cold or warm weather,
    providing protection within said four-device-in-one skybox dehydrator sauna wind-redirecting bungalow from wind, and
    slidably and replaceably allowing said panel frames to be positioned in a plurality of ways;
 a plurality of louvers
  for
   redirecting wind and smoke,
   blocking wind and smoke,
   reducing wind and smoke,
   sealing said four-device-in-one skybox dehydrator sauna wind-redirecting bungalow to create a sauna,
   sealing said four-device-in-one skybox dehydrator sauna wind-redirecting bungalow to create a skybox, and
   sealing said four-device-in-one skybox dehydrator sauna wind-redirecting bungalow to become a dehydrator;
 a plurality of louver braces
  rotatably inserted within said panel frames,
  said louvers rotatably and adjustably attached to said louver braces;
 a plurality of axis pins
  inserted within said louver braces;
 a plurality of corner-posts
  attached to said side gutter beams and said end gutter beams,
  said drain openings formed into said corner-posts;
 a plurality of corner-post caps
  screwed to said corner-posts;
 a plurality of gutter-beam cradles
  formed into said corner-posts,
  said side gutter beams, and
  said end gutter beams each attached to said gutter-beam cradles;
 a plurality of corner-post-base-plate covers
  slidably attached onto said corner-posts;
 a plurality of corner-post base-plates
  secured to said corner-posts;
 at least one sliding-door track
  attached to said corner-post base-plates,
  said panel frames interchangably and slidably placed into said sliding-door track;
 a plurality of anchoring-screw holes
  drilled into said corner-post base-plates;
 a plurality of tube-screws
  screwed in said anchoring-screw holes;
 a plurality of anchoring bolts
  screwed through said tube-screws into said anchoring-screw holes.

20. The said four-device-in-one skybox dehydrator sauna wind-redirecting bungalow of claim 19,
 wherein
 said panel inserts are each made of the material of metal, glass, plastic, wood, insulation, or composite, and
 said louvers are each made of the material of metal, wood, or composite.

* * * * *